(12) United States Patent
Sakai et al.

(10) Patent No.: US 7,167,266 B2
(45) Date of Patent: Jan. 23, 2007

(54) IMAGE MEMORY APPARATUS

(75) Inventors: Masanori Sakai, Yokohama (JP);
Toshihiro Kadowaki, Kawasaki (JP);
Naoto Arakawa, Kawasaki (JP);
Tetsuya Ohnishi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 599 days.

(21) Appl. No.: 10/754,924

(22) Filed: Jan. 12, 2004

(65) Prior Publication Data

US 2004/0141204 A1    Jul. 22, 2004

Related U.S. Application Data

(60) Continuation of application No. 09/079,473, filed on May 15, 1998, now abandoned, which is a division of application No. 08/478,394, filed on Jun. 7, 1995, now Pat. No. 5,784,180, which is a division of application No. 08/288,429, filed on Aug. 10, 1994, now Pat. No. 5,703,696, which is a continuation of application No. 07/979,665, filed on Nov. 16, 1992, now abandoned, which is a continuation of application No. 07/521,674, filed on May 10, 1990, now abandoned.

(30) Foreign Application Priority Data

May 10, 1989 (JP) ............................ 11-118467

(51) Int. Cl.
*G06F 3/12* (2006.01)
*G06K 15/00* (2006.01)

(52) U.S. Cl. ............... 358/1.15; 358/1.13; 358/1.16; 358/1.9

(58) Field of Classification Search ............... 358/1.9, 358/1.16, 1.17, 1.15, 1.14, 1.13, 1.18, 1.1, 358/1.2, 1.6, 2.1, 500, 501, 404, 444, 468, 358/474
See application file for complete search history.

(56) References Cited

U.S. PATENT DOCUMENTS

| | | | |
|---|---|---|---|
| 4,294,537 A | 10/1981 | Laska et al. | 355/35 |
| 4,506,342 A | 3/1985 | Yamamoto | 358/403 |
| 4,563,706 A | 1/1986 | Nagashima | 358/280 |
| 4,652,933 A | 3/1987 | Koshiishi | 358/442 |
| 4,653,900 A | 3/1987 | Kito et al. | 355/29 |
| 4,663,663 A | 5/1987 | Lee | 358/80 |
| 4,672,462 A | 6/1987 | Yamada | 358/280 |
| 4,695,895 A | 9/1987 | Nagashima | 358/280 |
| 4,721,951 A | 1/1988 | Holler | 345/603 |
| 4,731,672 A | 3/1988 | Sugishima et al. | 358/296 |
| 4,748,513 A | 5/1988 | Yamada | 358/280 |
| 4,760,458 A * | 7/1988 | Watanabe et al. | 358/537 |
| 4,760,463 A | 7/1988 | Nonoyama et al. | 358/474 |
| 4,771,343 A | 9/1988 | Takenaka | 358/335 |
| 4,814,898 A | 3/1989 | Arimoto et al. | 358/260 |
| 4,841,359 A | 6/1989 | Hawkins et al. | 358/76 |
| 4,847,654 A | 7/1989 | Honma et al. | 358/501 |

(Continued)

FOREIGN PATENT DOCUMENTS

JP    62-180665    8/1987

*Primary Examiner*—Dov Popovici
(74) *Attorney, Agent, or Firm*—Fitzpatrick, Cella, Harper & Scinto

(57) ABSTRACT

An image memory apparatus includes a unit for storing input image information, a unit for designating a storing capacity of the storing unit for the input image information, and a control unit for performing storing control of the storing unit for the input image information in accordance with an instruction from the designating unit.

23 Claims, 123 Drawing Sheets

U.S. PATENT DOCUMENTS

| | | | |
|---|---|---|---|
| 4,884,147 A | 11/1989 | Arimoto et al. | 358/443 |
| 4,887,115 A | 12/1989 | Inoue et al. | 354/289.1 |
| 4,905,095 A | 2/1990 | Yamada | 358/451 |
| 4,906,986 A | 3/1990 | Takeda | 340/799 |
| 4,935,809 A | 6/1990 | Hayashi et al. | 358/500 |
| 4,963,898 A | 10/1990 | Kadowaki et al. | |
| 4,972,271 A | 11/1990 | Koumura | 355/202 |
| 4,980,760 A | 12/1990 | Hiratsuka et al. | 358/538 |
| 4,992,884 A | 2/1991 | Sakata | 358/468 |
| 5,016,114 A * | 5/1991 | Sakata et al. | 358/404 |
| 5,020,096 A | 5/1991 | Sakakibara et al. | 358/444 |
| 5,032,928 A | 7/1991 | Sakai et al. | 358/448 |
| 5,285,290 A | 2/1994 | Sakai et al. | 358/404 |
| 5,333,068 A | 7/1994 | Sakai et al. | 358/500 |
| 5,583,538 A | 12/1996 | Watanabe et al. | 345/121 |

* cited by examiner

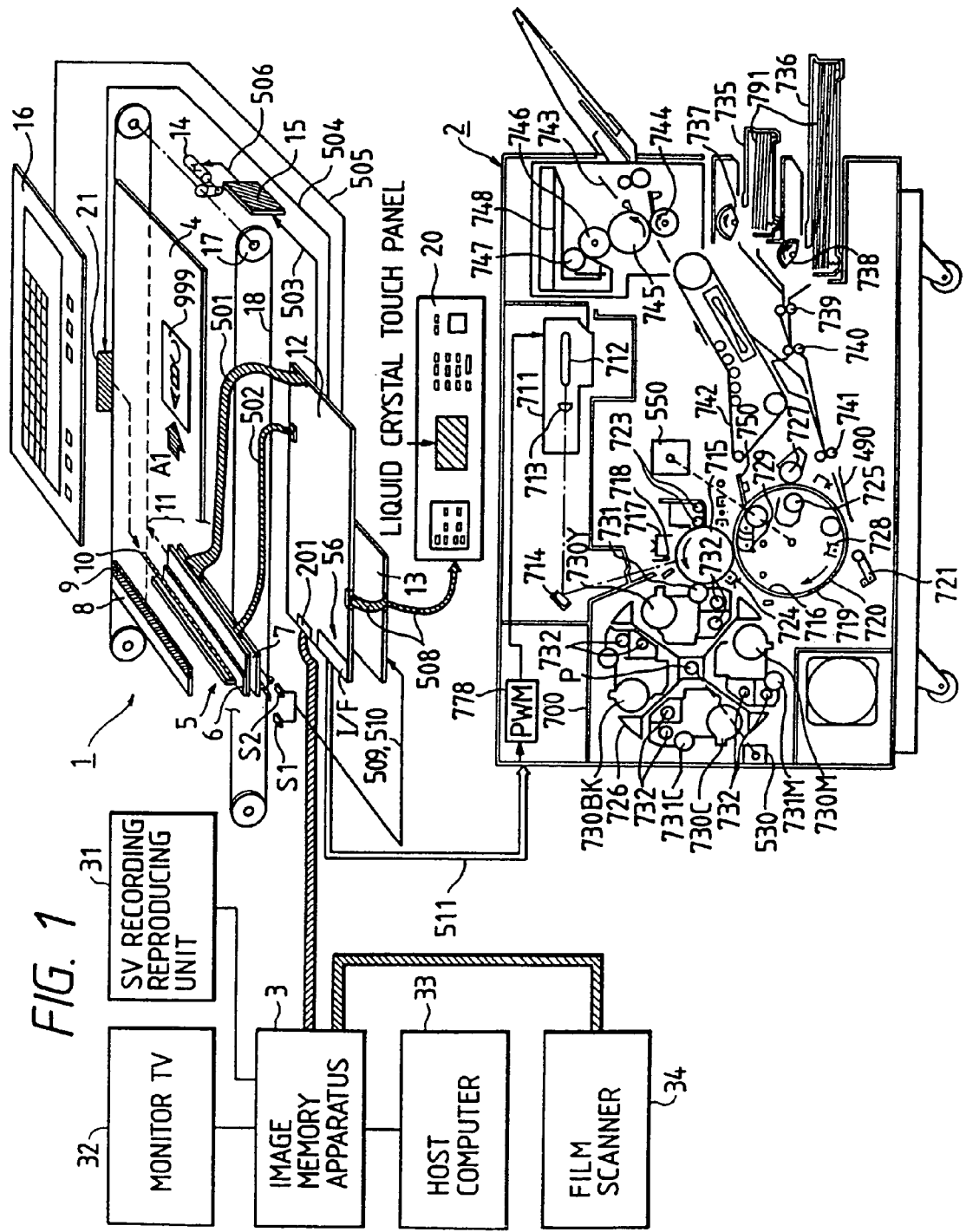

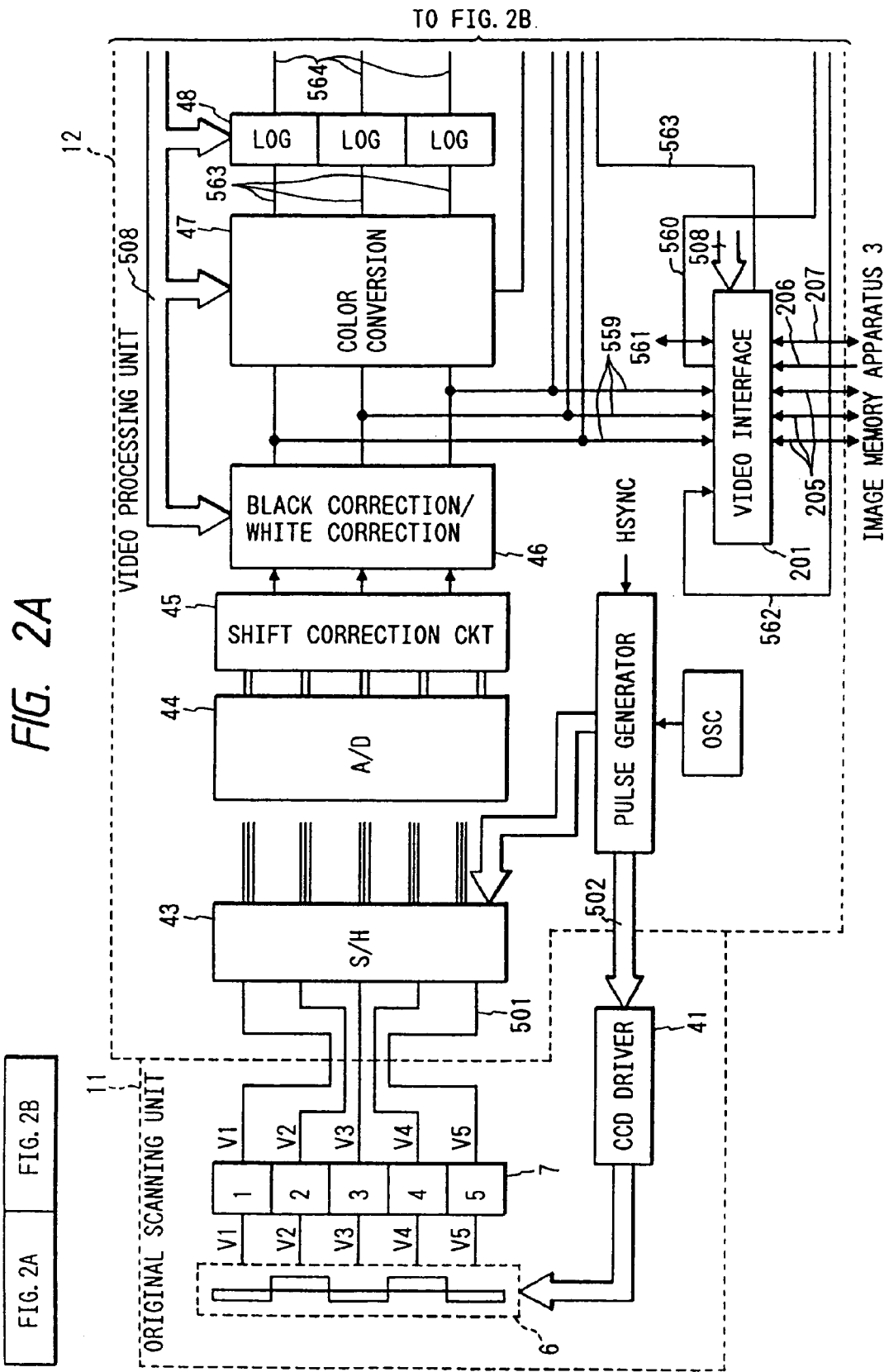

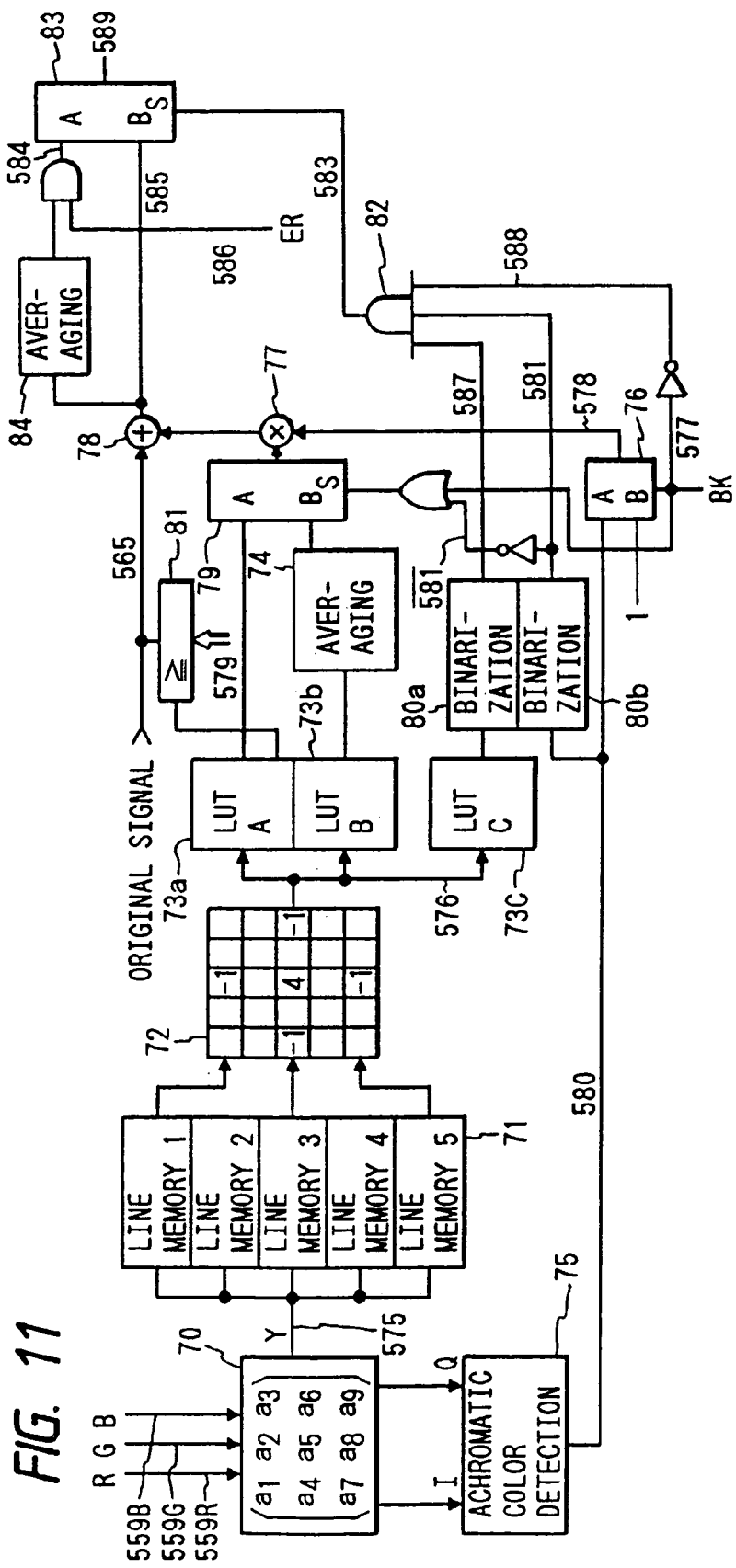

LUT(LOOKUP TABLE)A

LUT(LOOKUP TABLE)B

LUT(LOOKUP TABLE)C

CLK

HSYNC

V ADDRESS
600 A₁
599 A₀
602
598

(i)            (ii)

OUTPUTS FROM MASK
MEMORY 91 AND
INTERPOLATION
CKT 109

CUTTING OUT

OUTPUT FROM
MASK MEMORY 91

SYNTHESIS

FIG. 21A  FIG. 21B  FIG. 21C
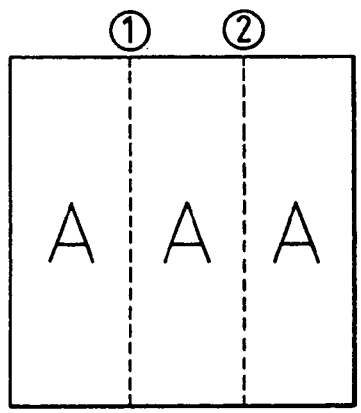
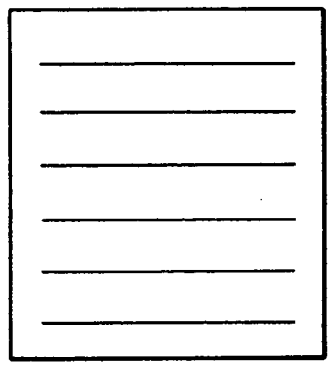
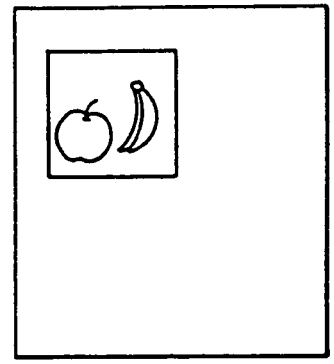
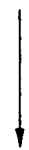
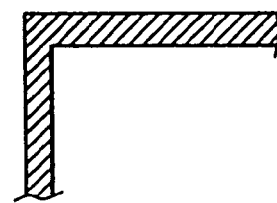

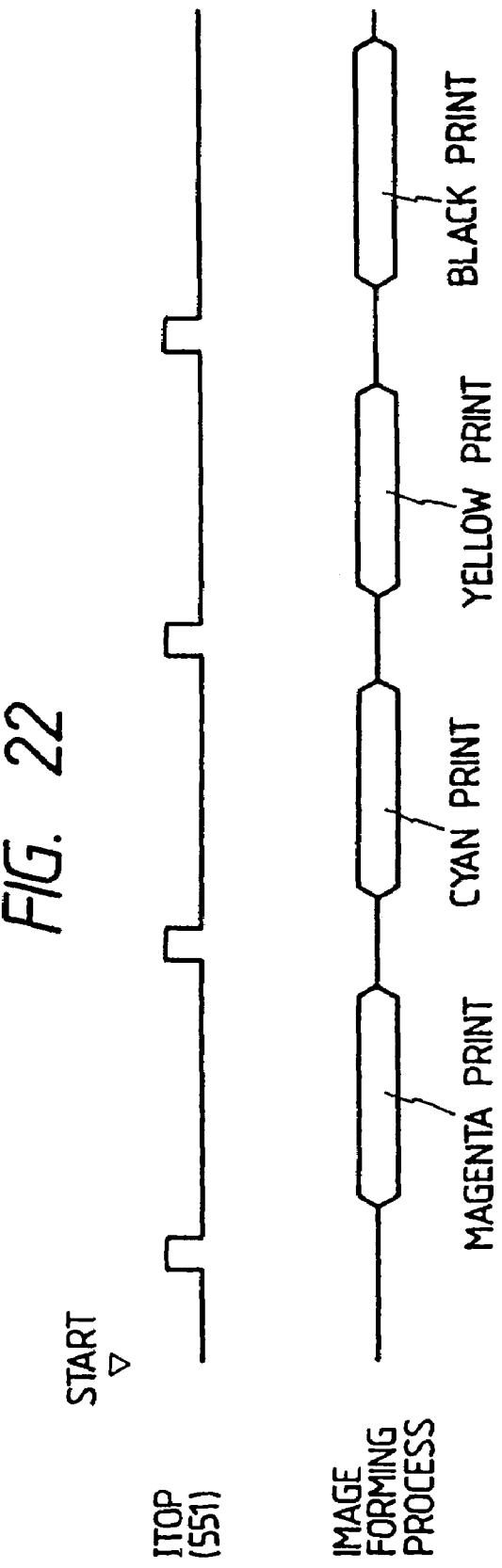

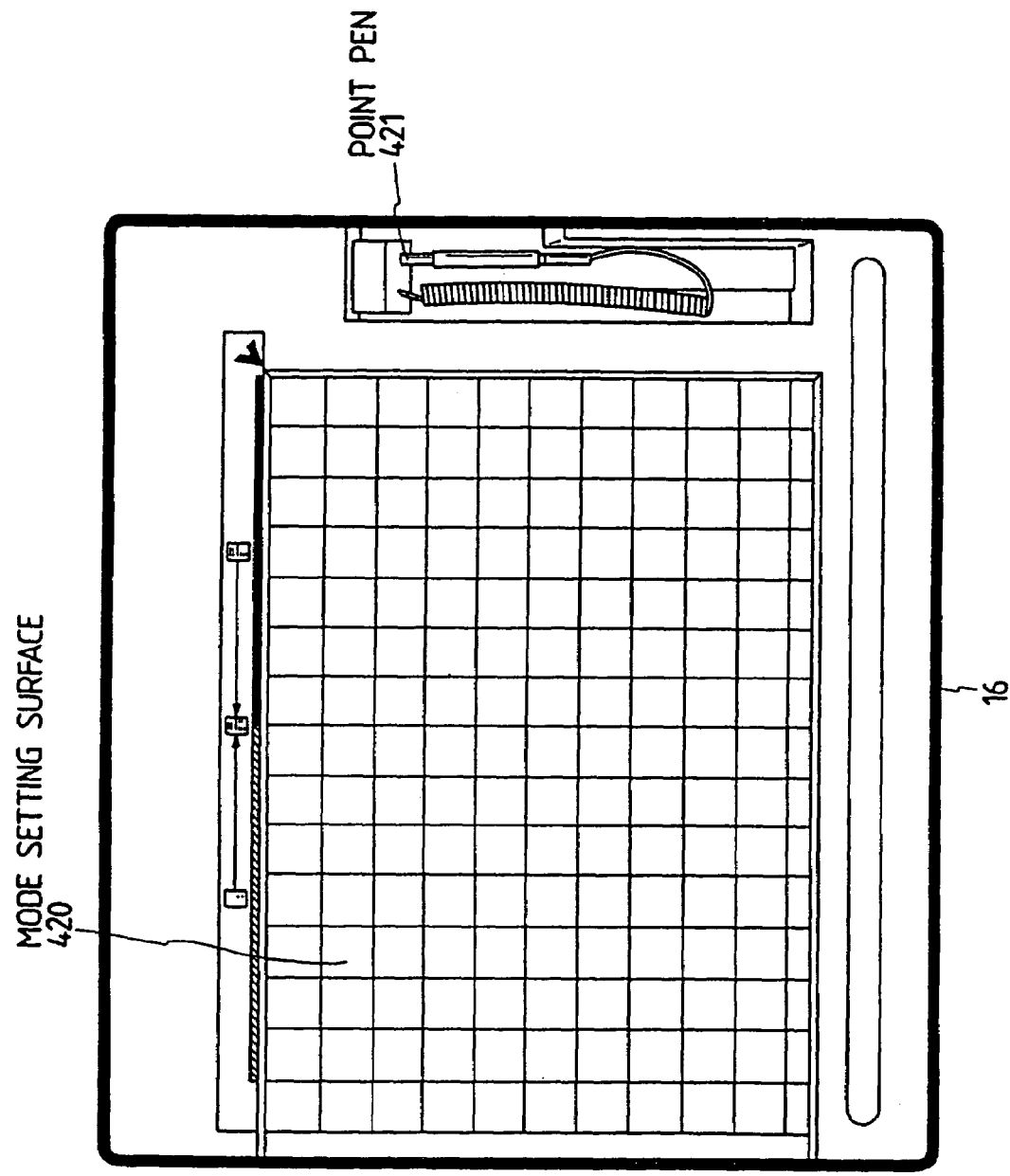

FIG. 25I

| | INPUT | | | OUTPUT | | | | |
|---|---|---|---|---|---|---|---|---|
| | FUNCTION CODE | CHARACTER SIGNAL | MSB | S0 | S1 | S2 | S3 | S4 |
| 1 | 0 0 0 | / | 0 | 0 | 0 | 0 | 1 | 0 |
|   |       |   | 1 |   | 1 |   |   |   |
| 2 | 0 0 1 | / | 0 | 0 | 0 | 1 | 0 | 0 |
|   |       |   | 1 |   | 1 |   |   |   |
| 3 | 0 1 0 | 0 | 0 | 0 | 0 | 0 | 1 | 0 |
|   |       |   | 1 |   | 1 |   |   |   |
|   |       | 1 | 0 | 0 | 1 | 1 | 0 | 1 |
|   |       |   | 1 |   | 0 |   |   |   |
| 4 | 0 1 1 | 0 | 0 | 0 | 0 | 1 | 0 | 0 |
|   |       |   | 1 |   | 1 |   |   |   |
|   |       | 1 | 0 | 0 | 1 | — | 0 | 1 |
|   |       |   | 1 |   | 0 |   |   |   |
| 5 | 1 0 0 | / | 0 | 1 | 0 | 0 | 1 | 0 |
|   |       |   | 1 |   | 1 |   |   |   |
|   |       |   | 0 |   | 0 |   |   |   |
|   |       |   | 1 |   | 1 |   |   |   |
| 6 | 1 0 1 | 0 | 0 | 1 | 0 | 0 | 1 | 0 |
|   |       |   | 1 |   | 1 |   |   |   |
|   |       | 1 | 0 | 1 | 1 |   | 0 | 1 |
|   |       |   | 1 |   | 0 |   |   |   |

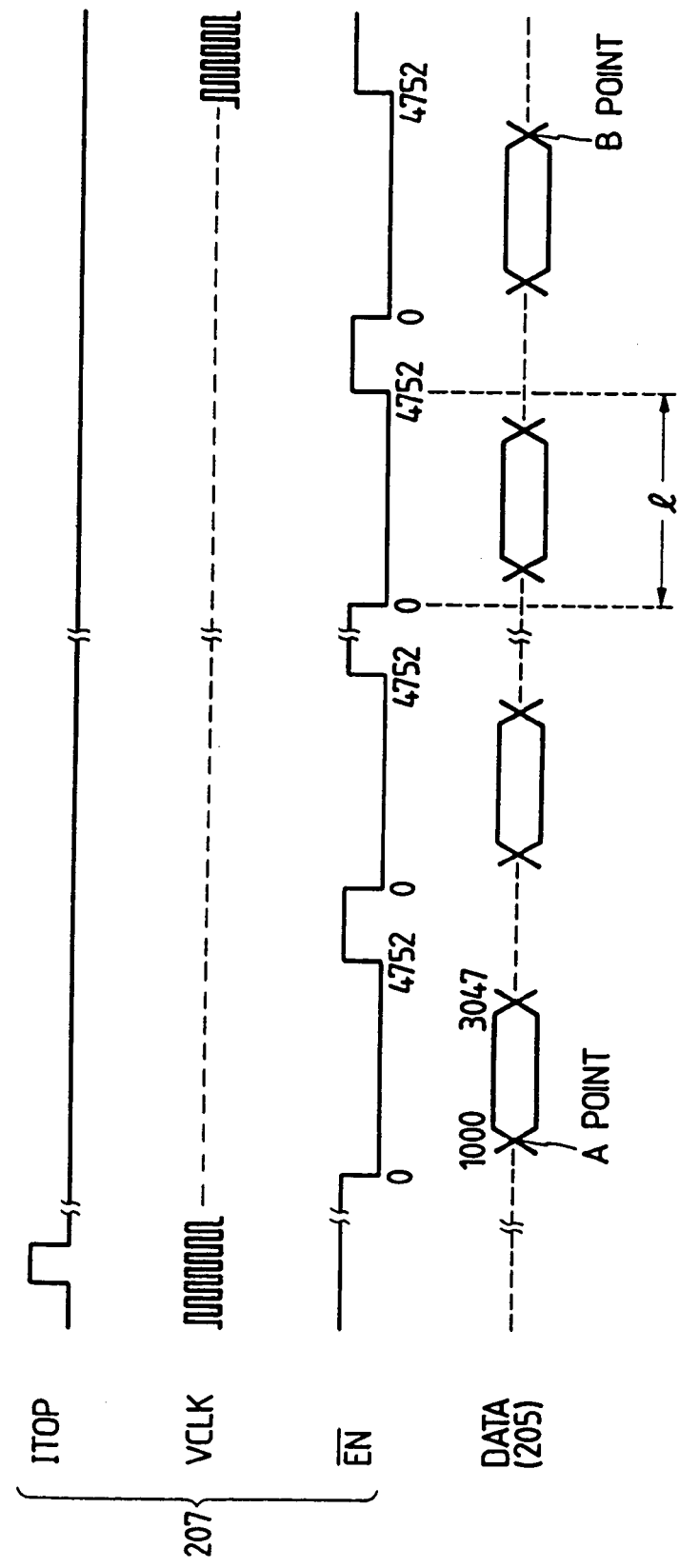

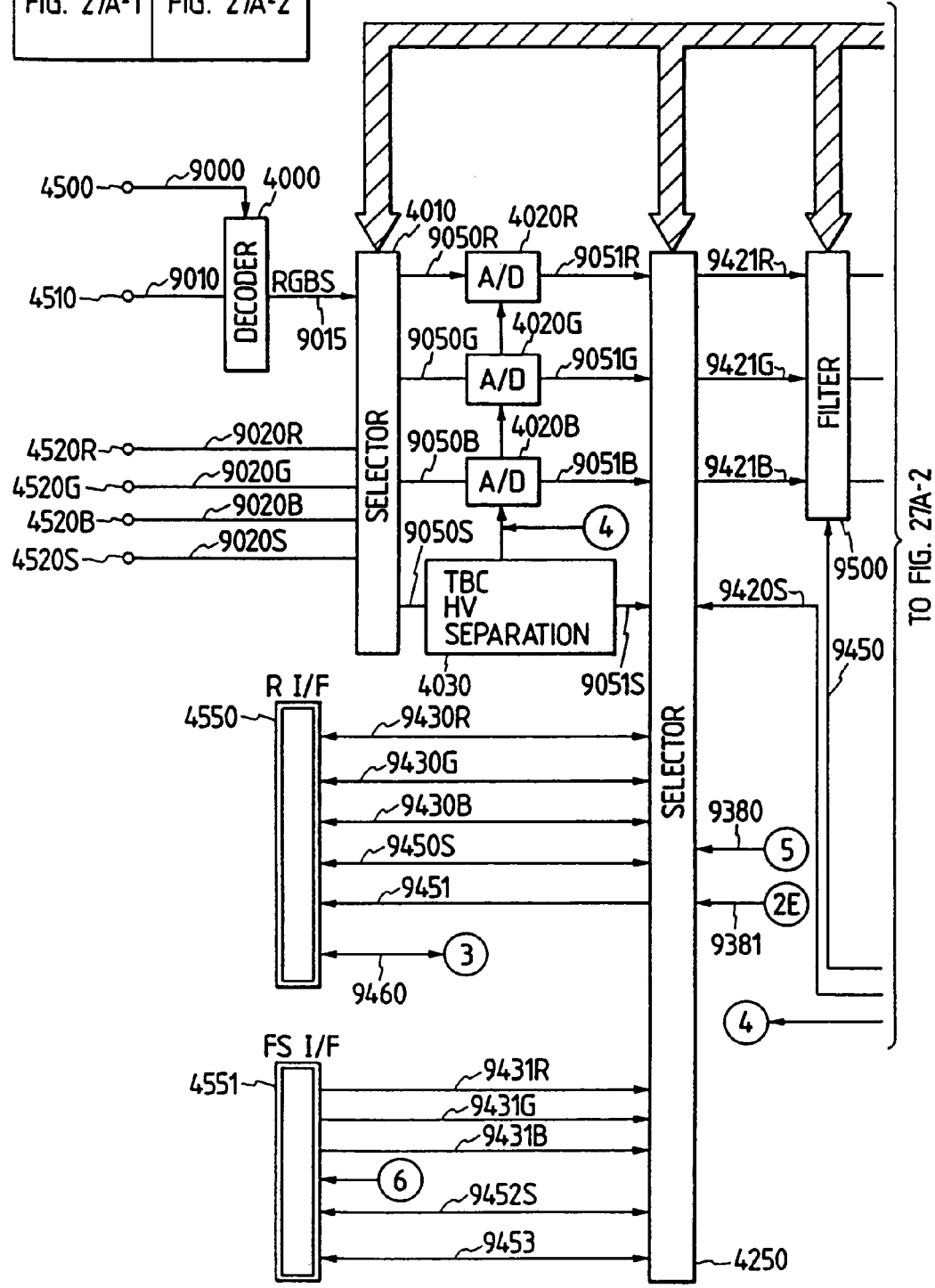

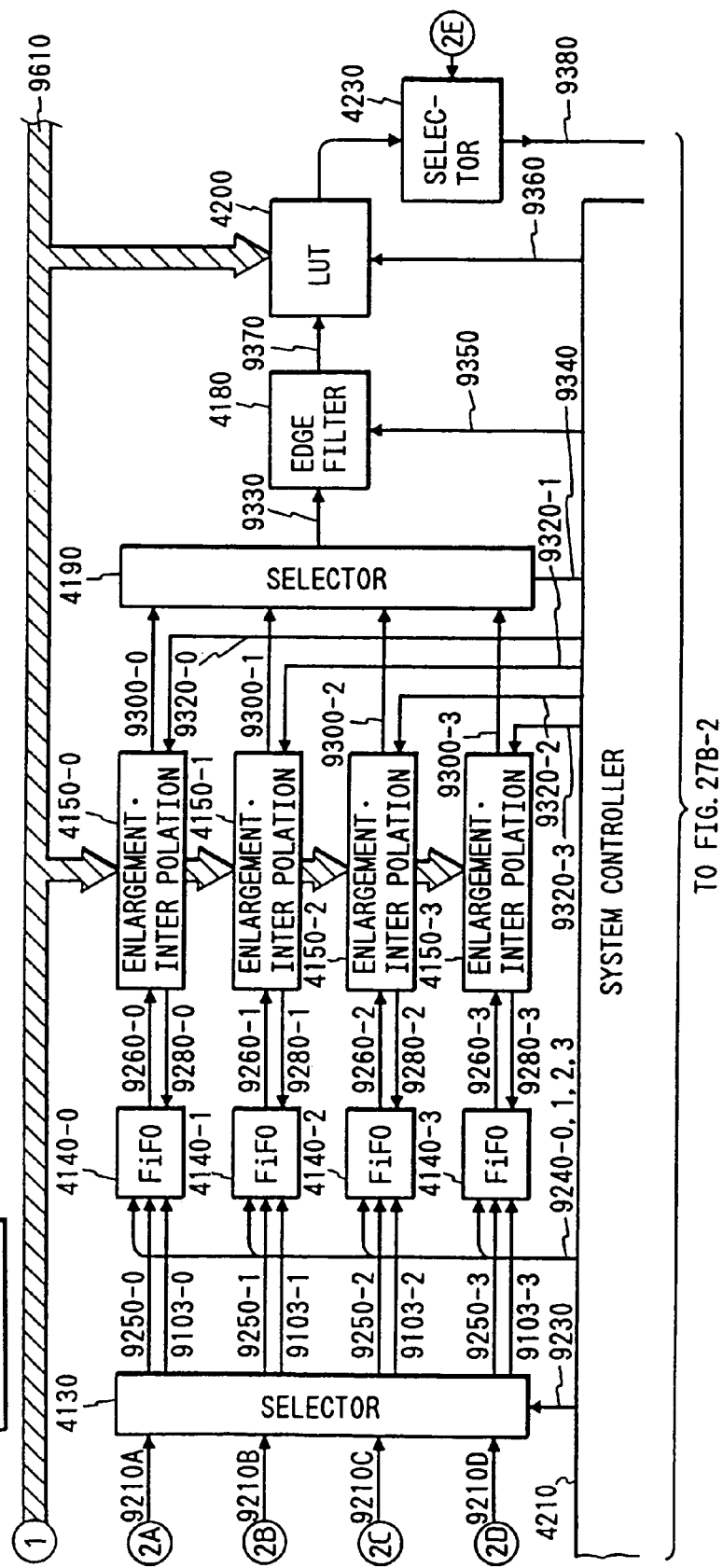

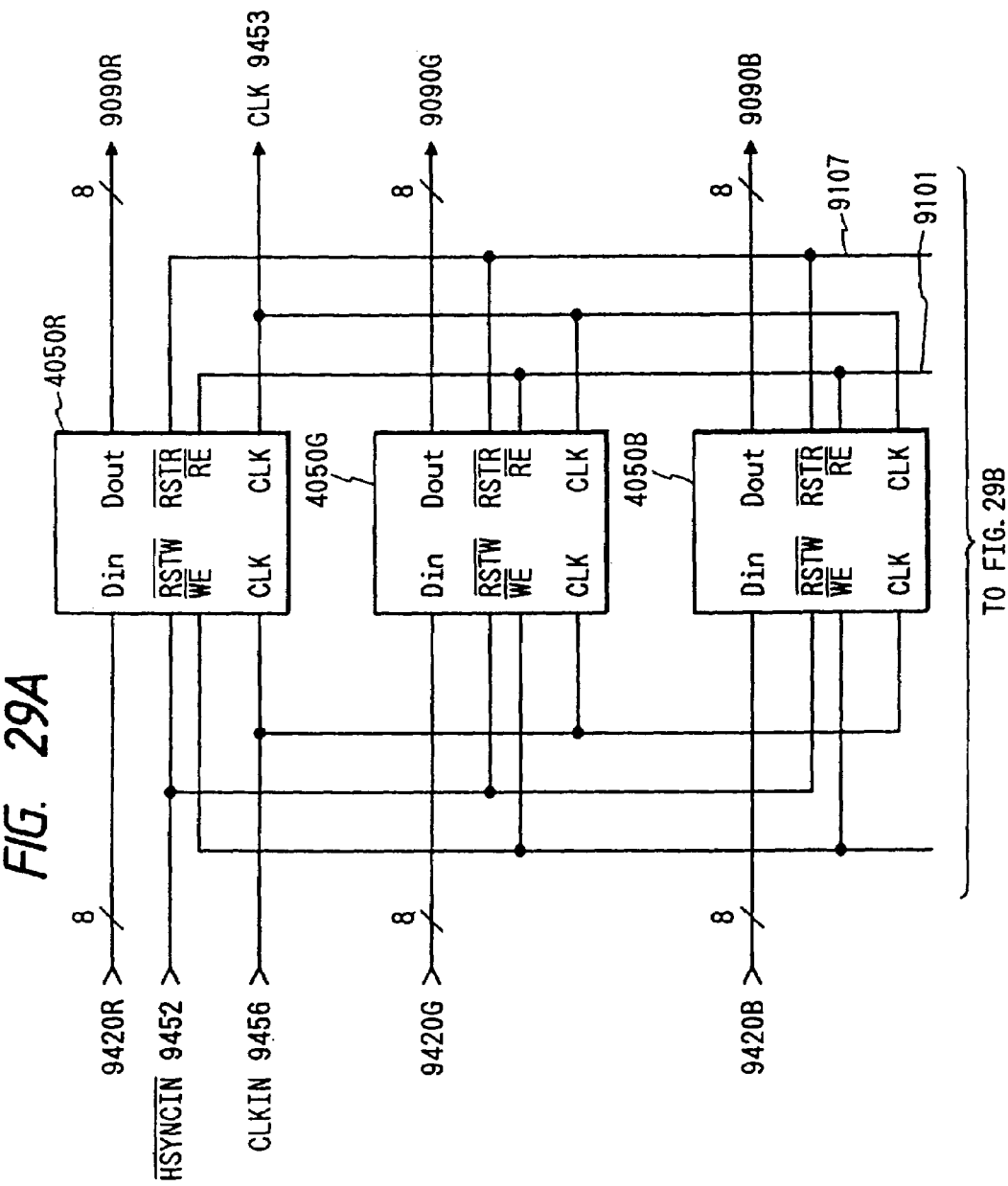

FIG. 33

| | MEMORY (R)<br>4060R | MEMORY (G)<br>4060G | MEMORY (B)<br>4060B |
|---|---|---|---|
| 2M | IMAGE 15 | IMAGE 15 | IMAGE 15 |
| 1.875M | IMAGE 14 | IMAGE 14 | IMAGE 14 |
| 1.75M | IMAGE 13 | IMAGE 13 | IMAGE 13 |
| 1.625M | IMAGE 12 | IMAGE 12 | IMAGE 12 |
| 1.5M | IMAGE 11 | IMAGE 11 | IMAGE 11 |
| 1.375M | IMAGE 10 | IMAGE 10 | IMAGE 10 |
| 1.25M | IMAGE 9 | IMAGE 9 | IMAGE 9 |
| 1.125M | IMAGE 8 | IMAGE 8 | IMAGE 8 |
| 1M | IMAGE 7 | IMAGE 7 | IMAGE 7 |
| 0.875M | IMAGE 6 | IMAGE 6 | IMAGE 6 |
| 0.75M | IMAGE 5 | IMAGE 5 | IMAGE 5 |
| 0.625M | IMAGE 4 | IMAGE 4 | IMAGE 4 |
| 0.5M | IMAGE 3 | IMAGE 3 | IMAGE 3 |
| 0.375M | IMAGE 2 | IMAGE 2 | IMAGE 2 |
| 0.25M | IMAGE 1 | IMAGE 1 | IMAGE 1 |
| 0.125M | IMAGE 0 | IMAGE 0 | IMAGE 0 |
| 0 | | | |

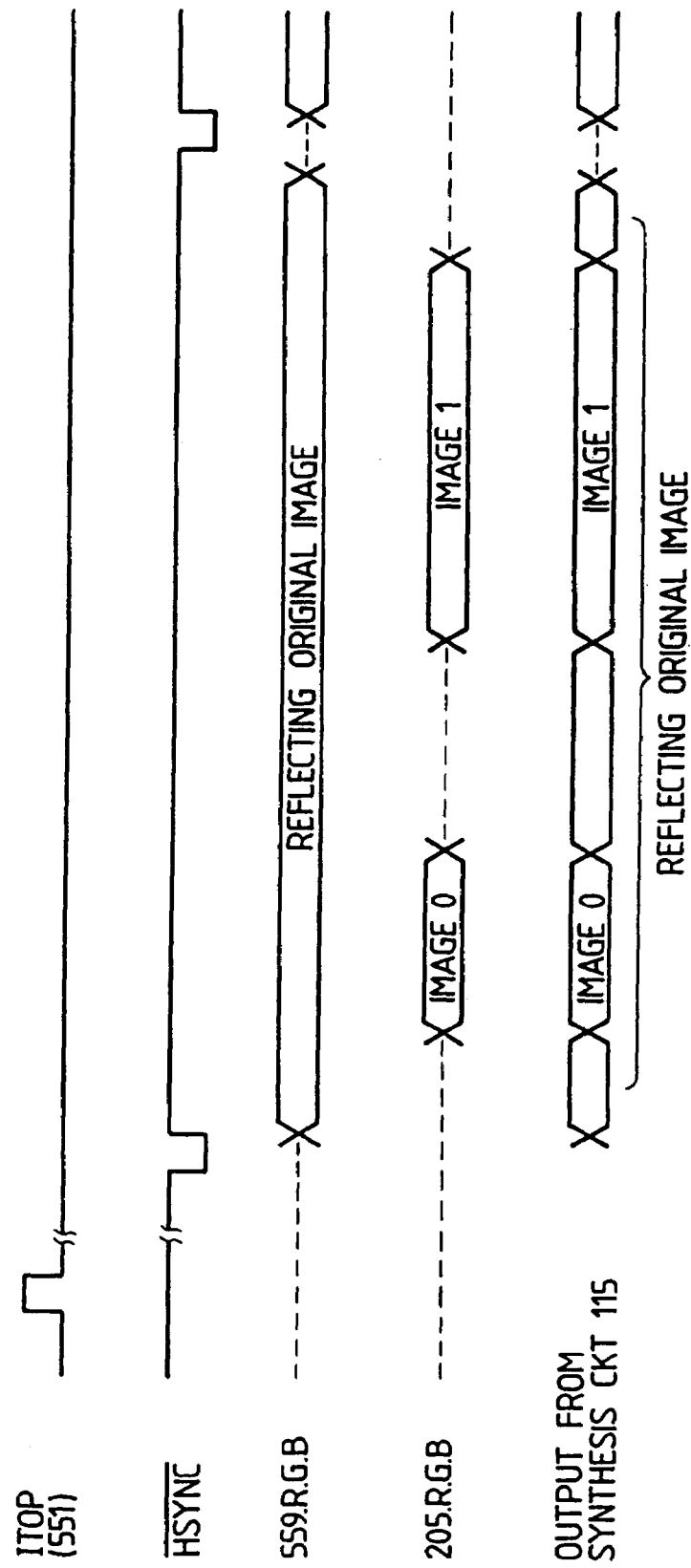

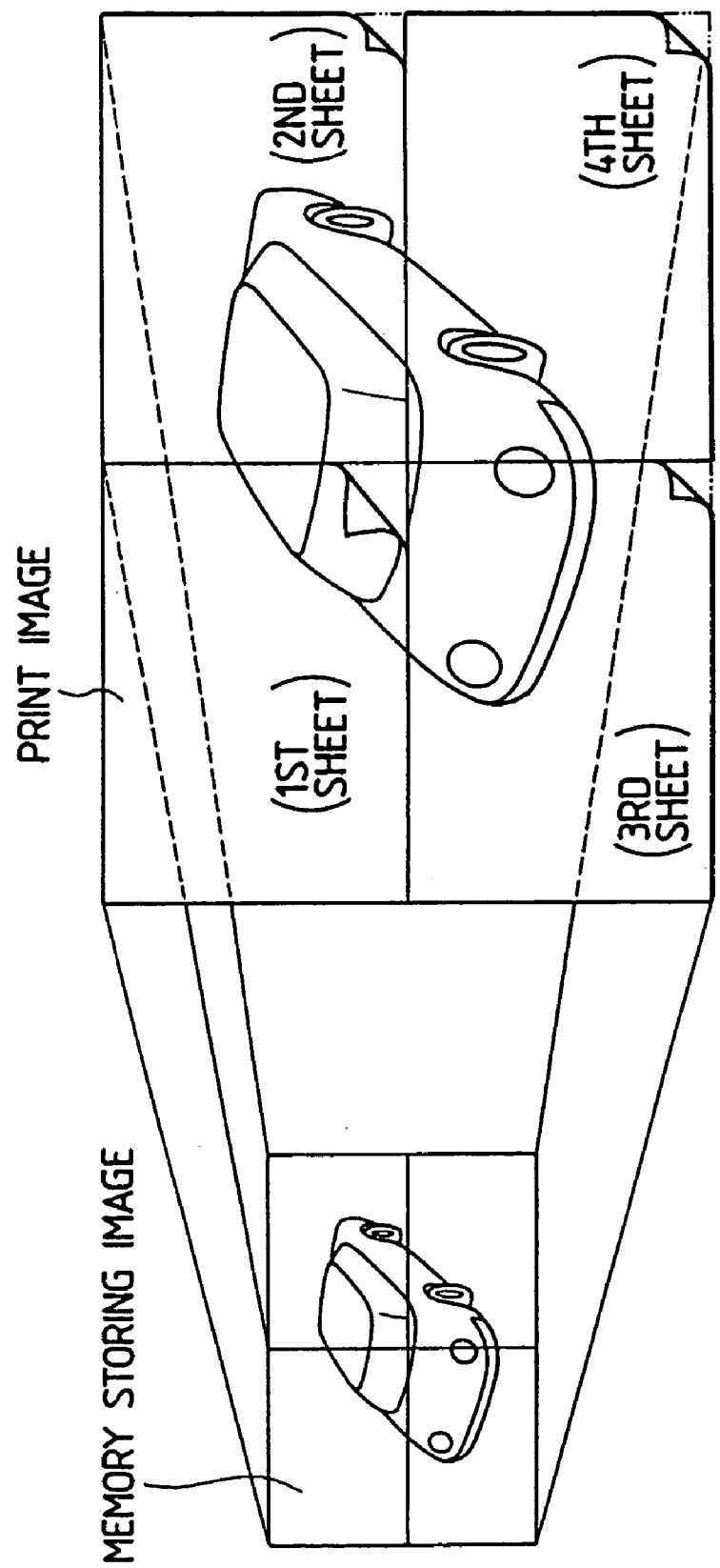

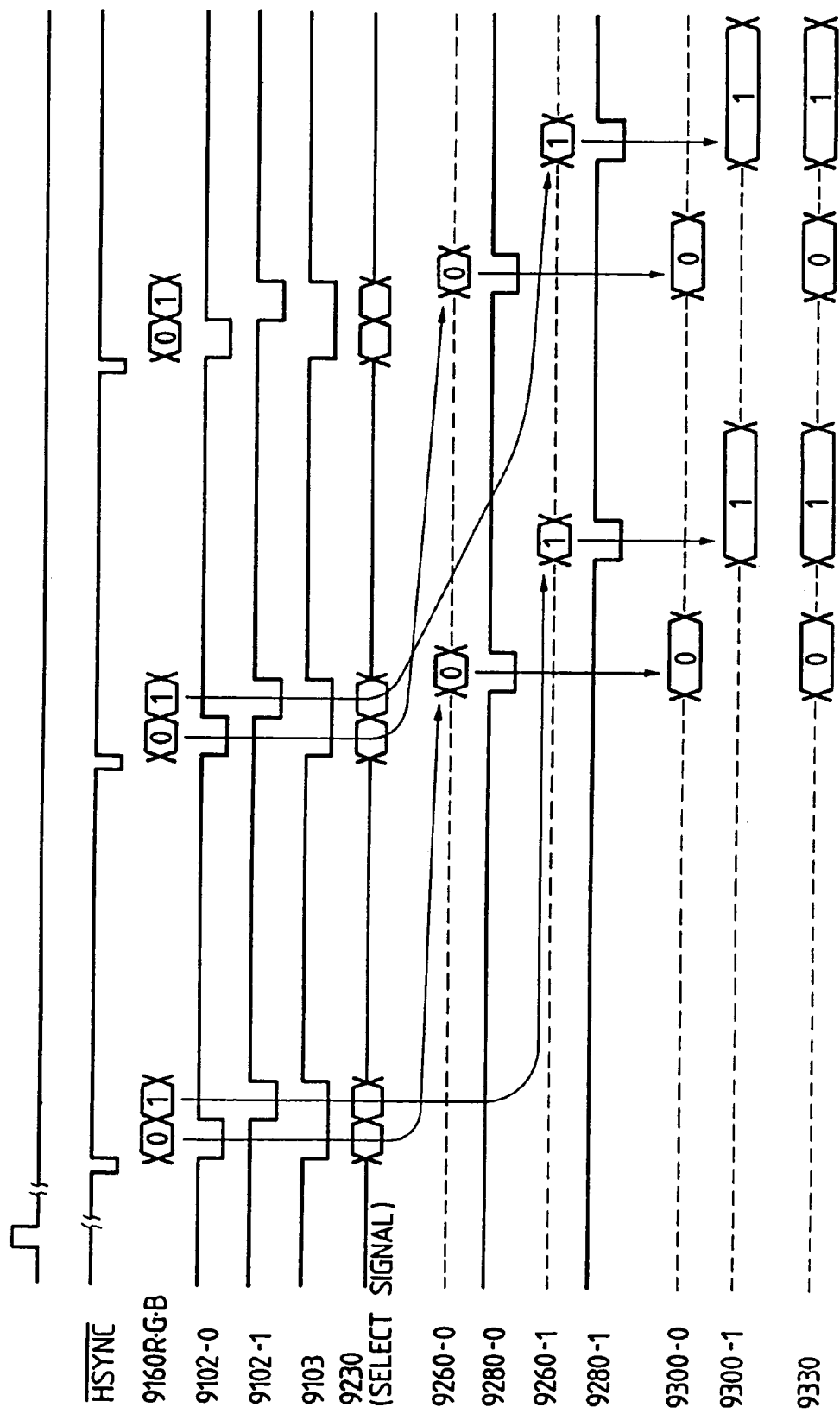

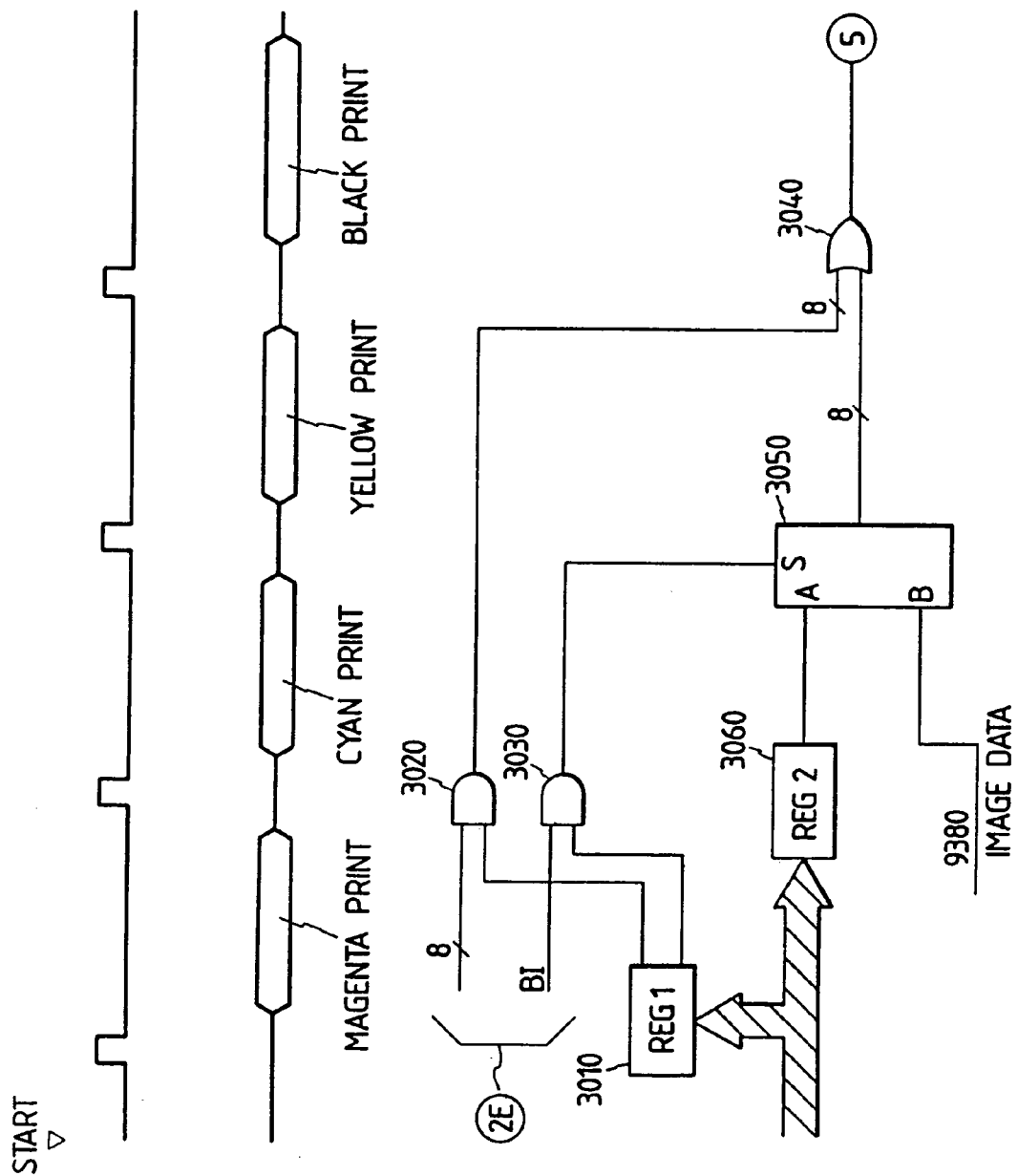

FIG. 46
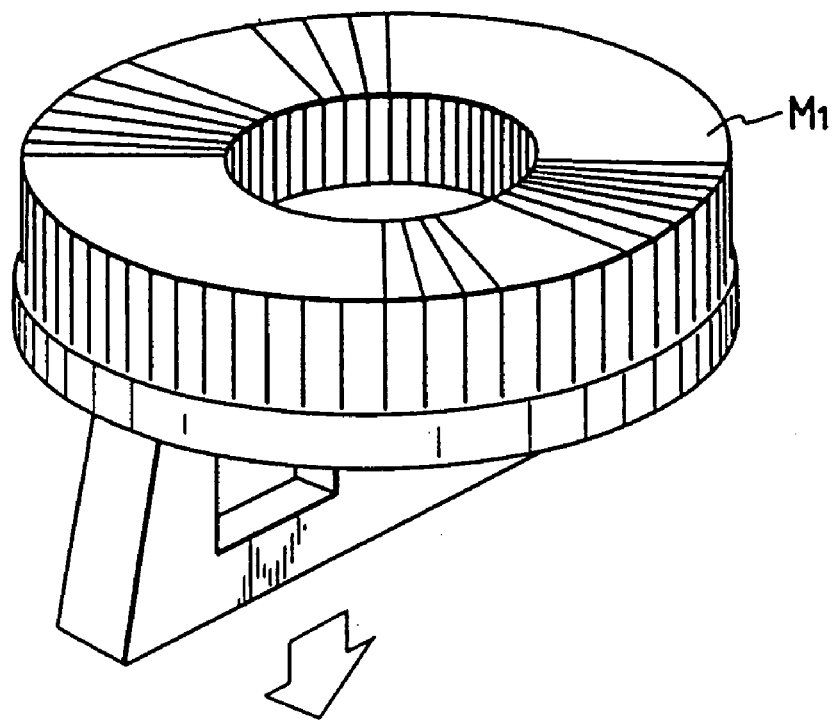
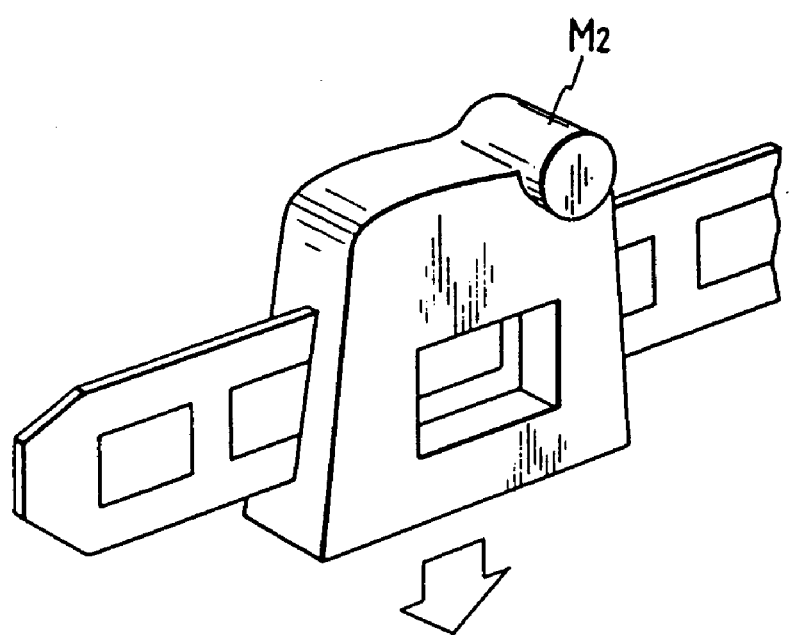

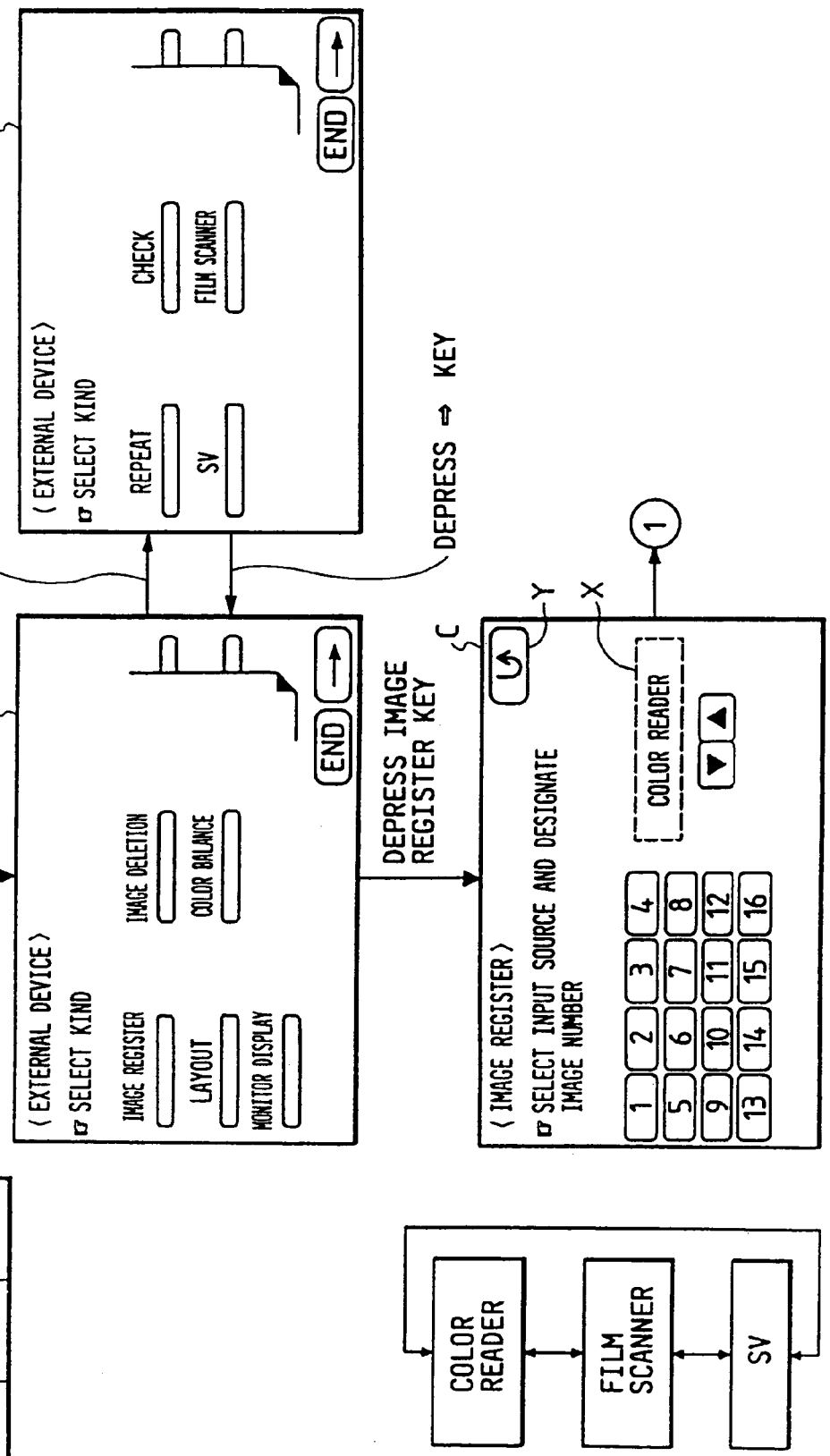

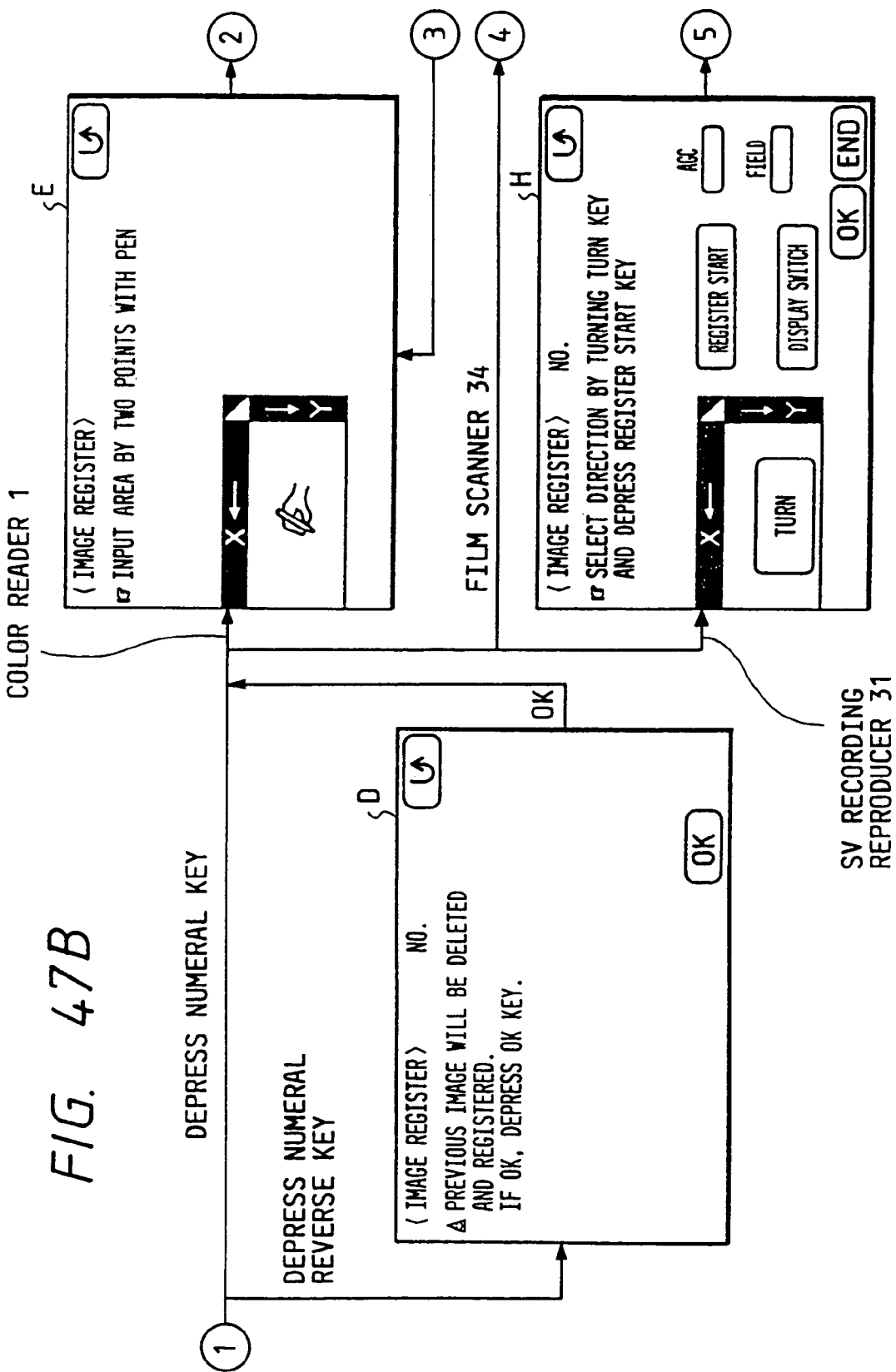

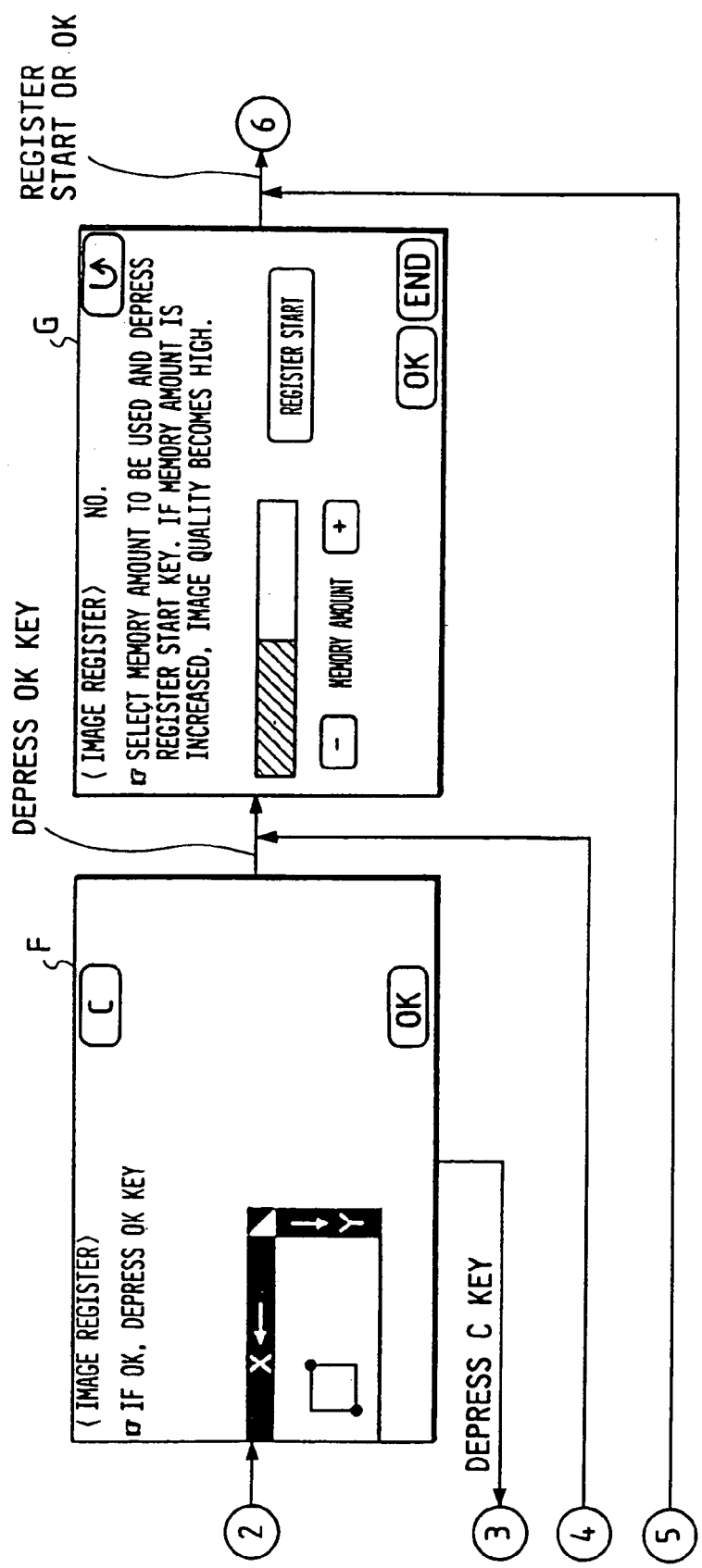

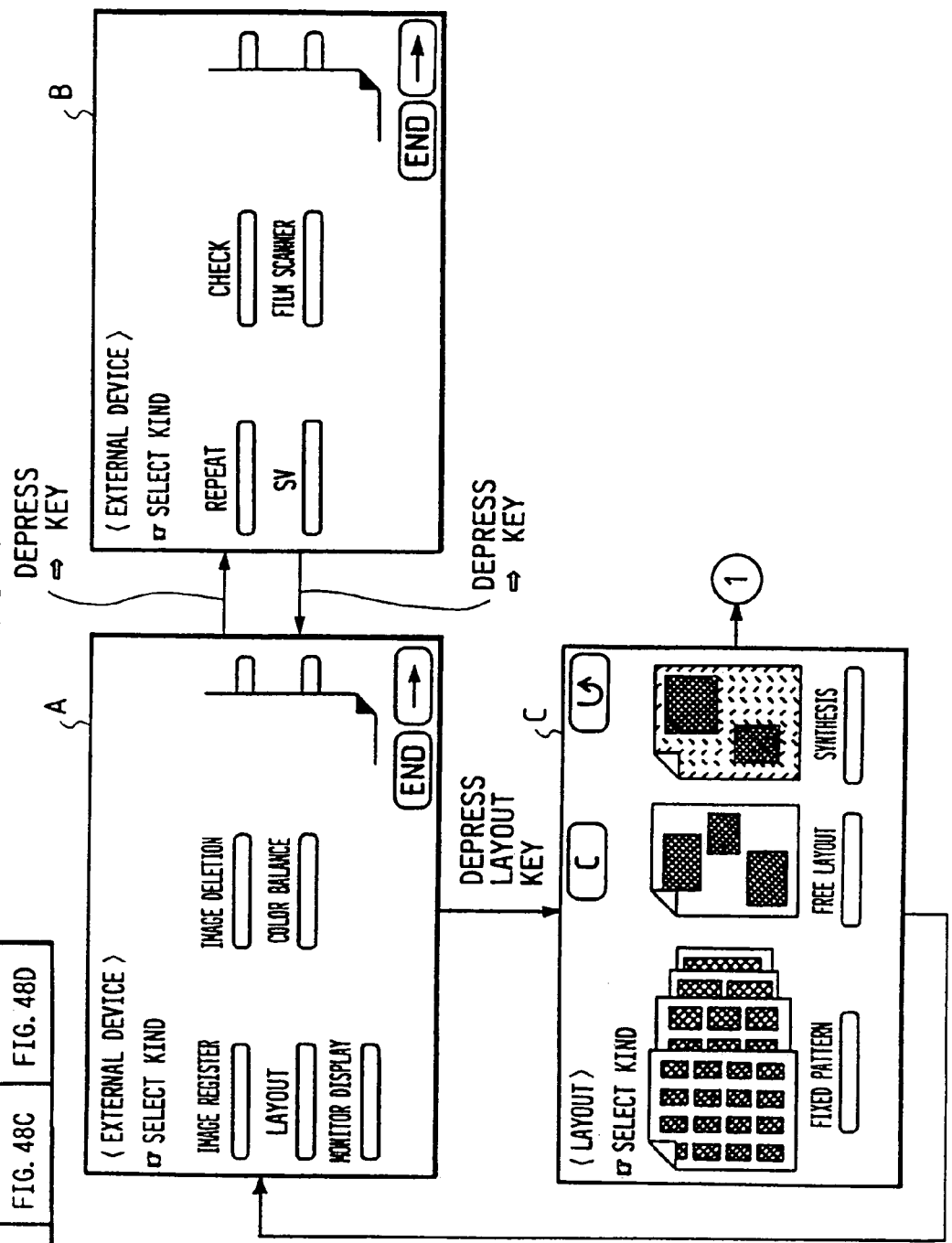

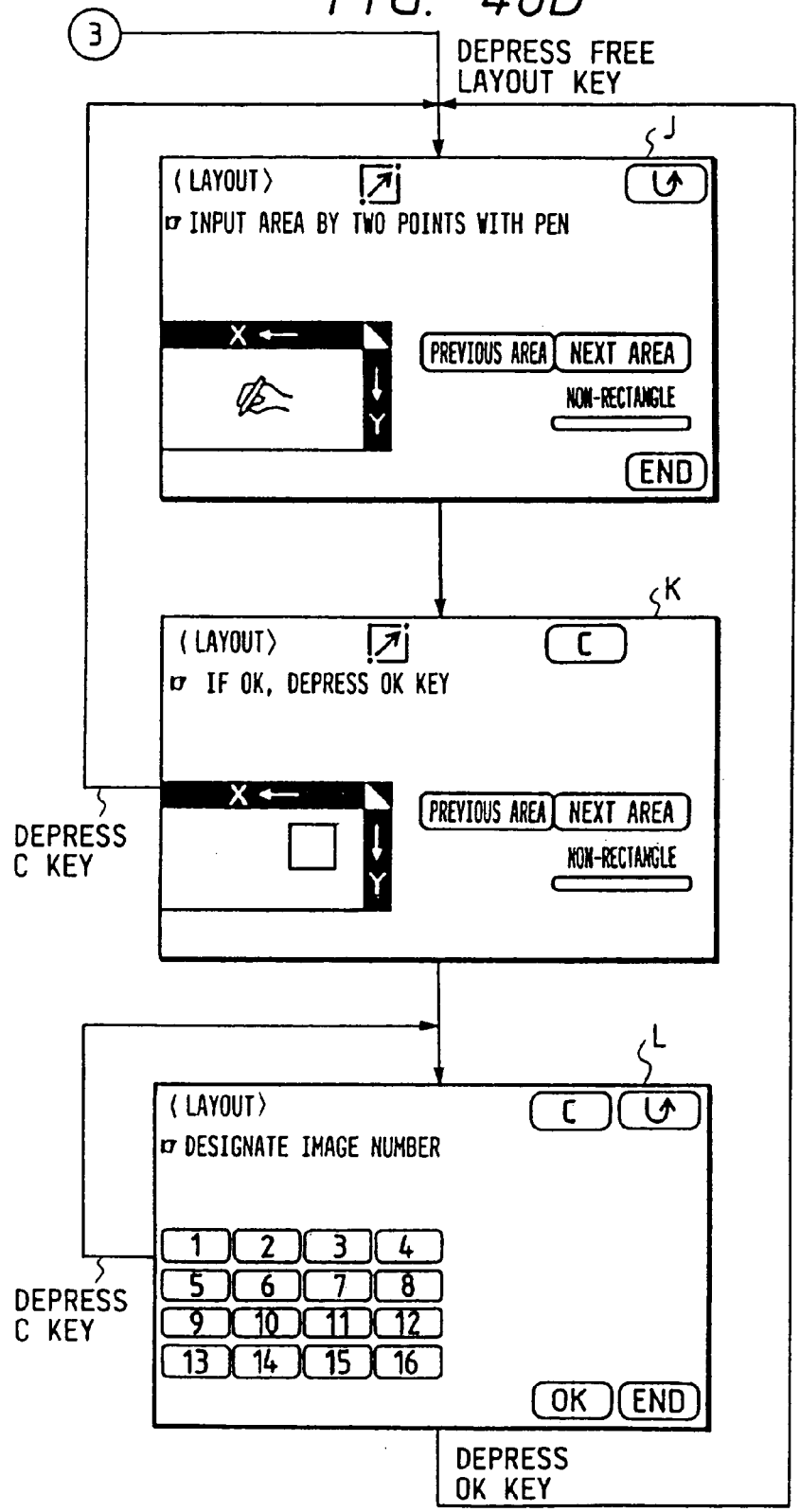

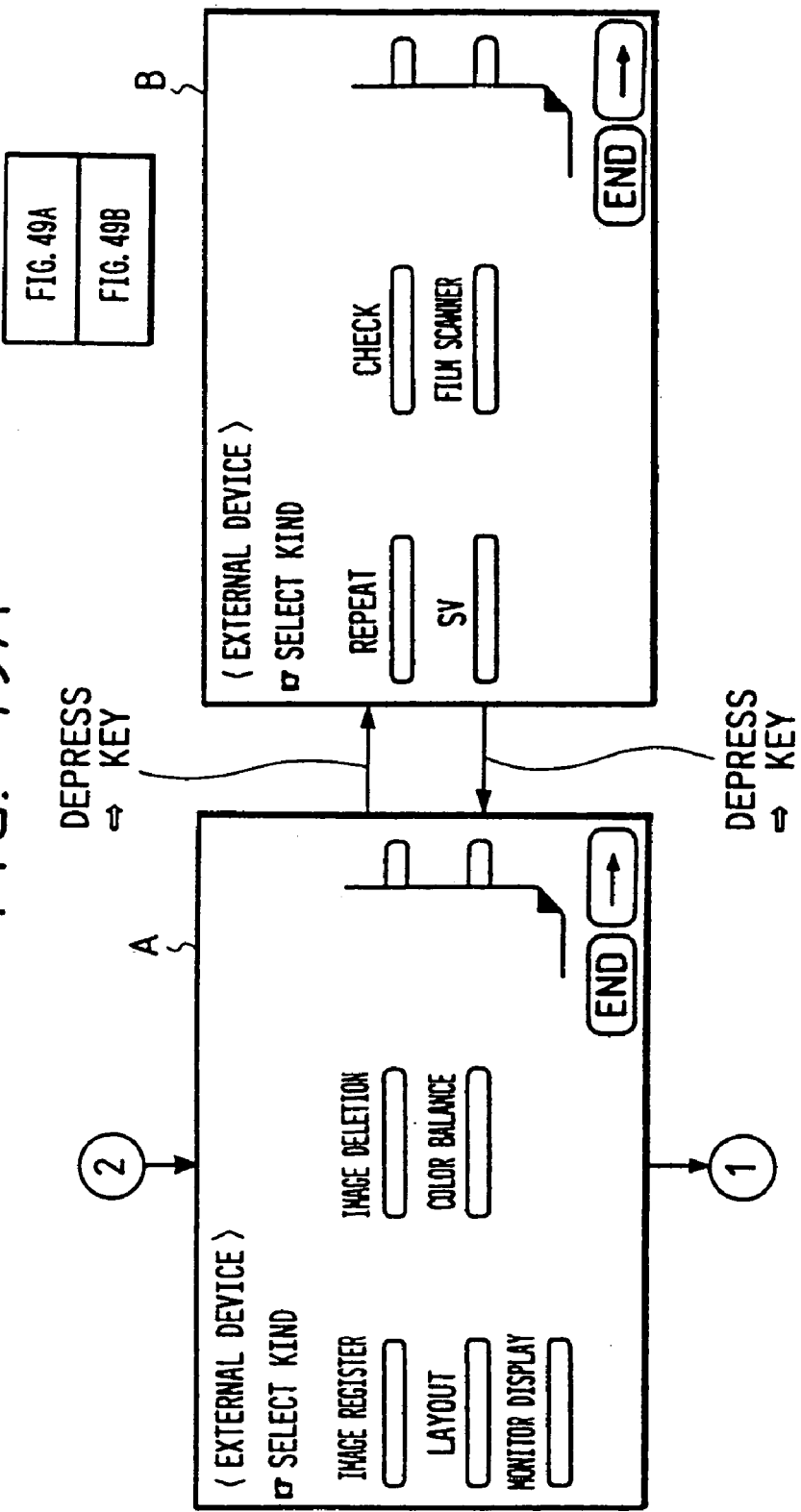

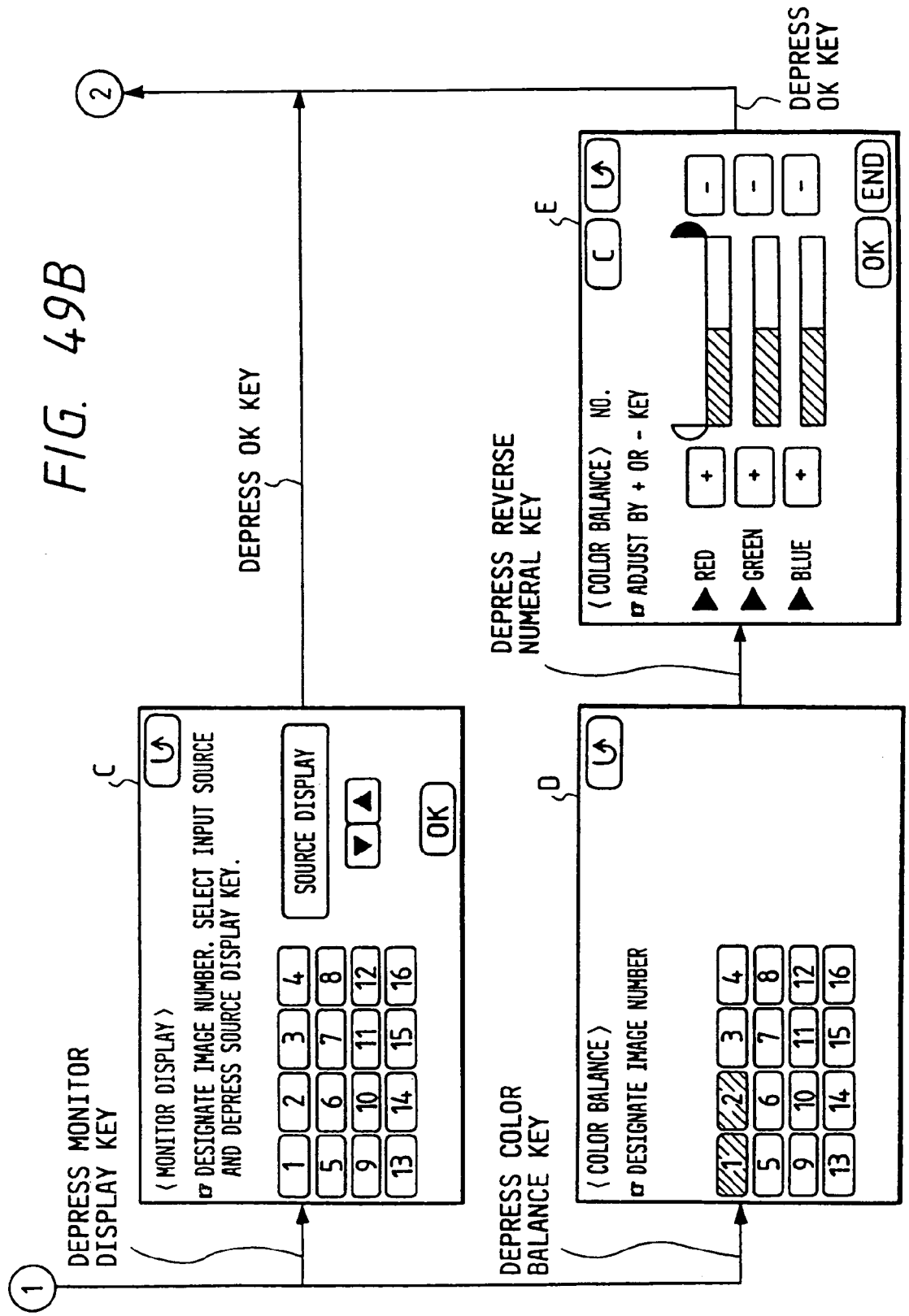

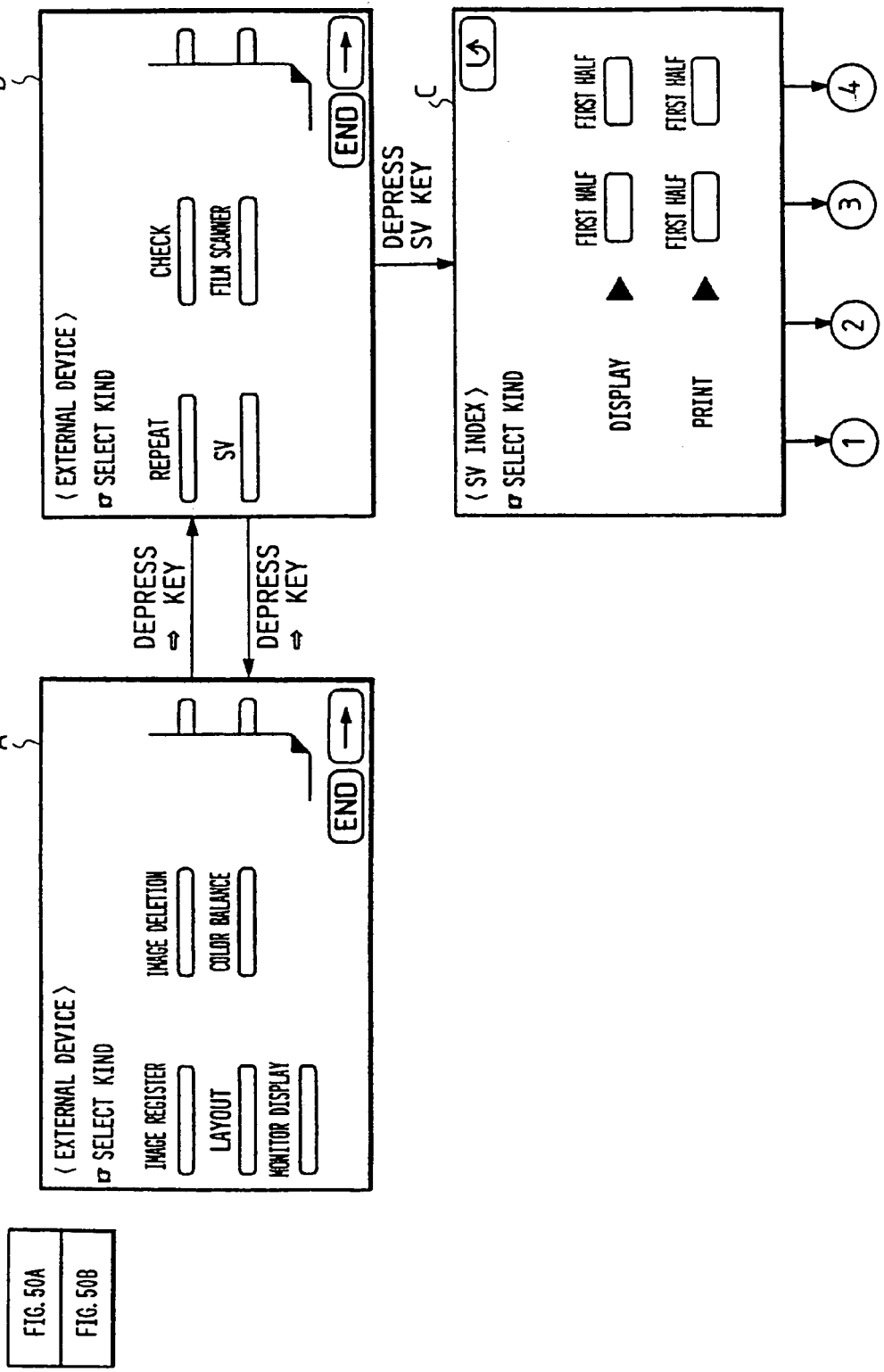

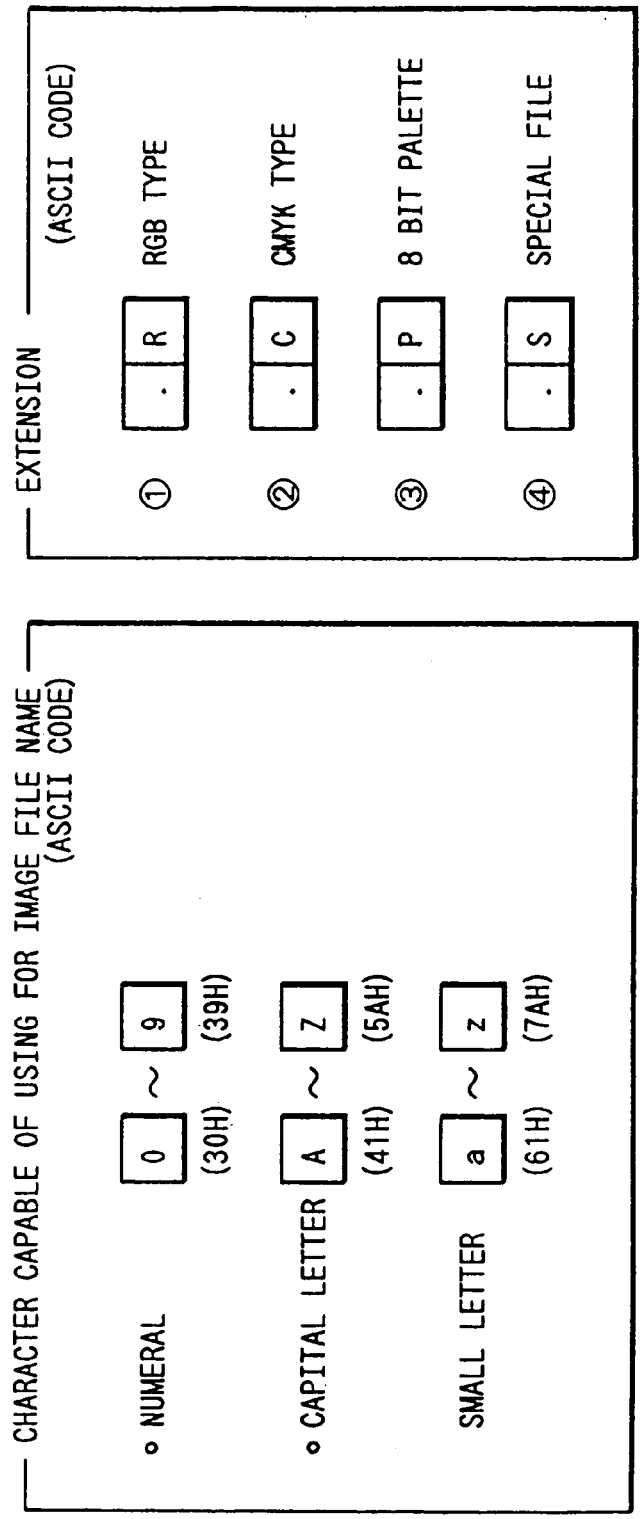
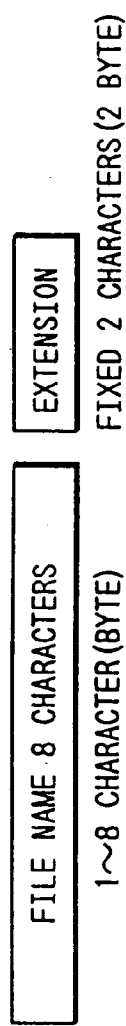
FIG. 56

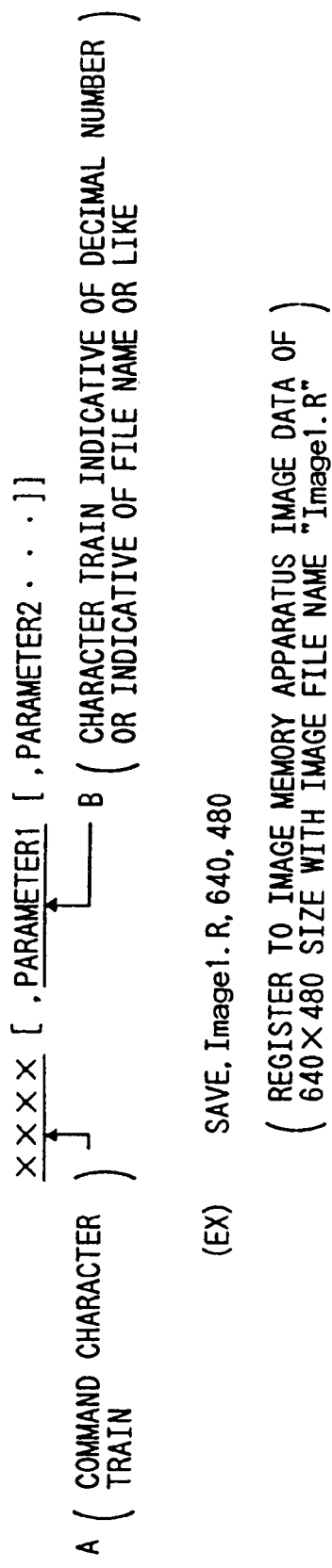

RGB TYPE

8 BIT PALETTE TYPE

BINARY BIT MAP TYPE

FIG. 69

ACK TYPE (AFFIRMATIVE RESPONSE)

3 BYTE

| 2E (HEX) | 0 0 | 0 0 |
|---|---|---|

NAK TYPE (NEGATIVE RESPONSE)

3 BYTE

| 3D (HEX) | LOWER RANK BYTE | UPPER RANK BYTE |
|---|---|---|

(ERROR CODE) = (UPPER RANK BYTE) × 100 (HEX) + (LOWER RANK BYTE)

RET TYPE (RESPONSE WITH ATTACHED INFORMATION)

HEADER

| 02H | FIRST DATA | SECOND DATA | THIRD DATA | FOURTH DATA | FIFTH DATA | SIXTH DATA | SEVENTH DATA |
|---|---|---|---|---|---|---|---|

FIG. 70

| COMMAND CLASSIFICATION | COMMAND NAME |
|---|---|
| INITIALIZING COMMAND | INIT, INITPALET, INITBIT |
| INPUT OUTPUT EXEC. COMMAND | SCAN, PRINT, MPRINT, COPY, DRSCAN, DRPRINT |
| INPUT OUTPUT SEL. COMMAND | SSEL, DSEL |
| INPUT OUTPUT MODE SET COMMAND | SMODE, DMODE, ASMODE, SAREA, DAREA, RPMODE |
| FILE OPERATION COMMAND | SAVE, LOAD, PUT, GET, DELE, REN, FNLIST, FNCHECK, DKCHECK |
| COLOR SET COMMAND | BITCOLOR, PALETTE, BALANCE, GAMMA |
| OTHER COMMAND | PPRREQ, PPRSEL, SENSE, REMOTE, MONITOR |

FIG. 71

| NO. | COMMAND | FUNCTION |
|---|---|---|
| 1 | INIT | INITIALIZATION |
| 2 | INITPALET | CHANGE OF COLOR PALETTE |
| 3 | INITBIT | CLEAR AND INITIALIZATION OF BITMAP OR LIKE |
| 4 | SSEL | SWITCH OF INPUT APPARATUS |
| 5 | DSEL | SWITCH OF OUTPUT APPARATUS |
| 6 | SMODE | SETTING OF INPUT CONDITION UPON INPUTTING IMAGE |
| 7 | DMODE | SETTING OF OUTPUT CONDITION UPON OUTPUTTING IMAGE |
| 8 | RPMODE | SETTING OF REPEAT OUTPUT UPON PRINTER OUTPUT |
| 9 | SAREA | SETTING OF INPUT AREA |
| 10 | DAREA | SETTING OF OUTPUT AREA |
| 11 | SCAN | INPUT APPARATUS→REGISTER OF IMAGE DATA TO IMAGE MEMORY APPARATUS |
| 12 | PRINT | IMAGE MEMORY APPARATUS→OUTPUT OF IMAGE DATA TO OUTPUT APPARATUS |
| 13 | MPRINT | IMAGE MEMORY APPARATUS→VIRTUAL OUTPUT OF IMAGE DATA TO OUTPUT APPARATUS |
| 14 | COPY | INPUT APPARATUS→OUTPUT OF IMAGE DATA TO OUTPUT APPARATUS |
| 15 | DRSCAN | INPUT APPARATUS→TRANSFER OF IMAGE DATA TO COMPUTER |
| 16 | DRPRINT | COMPUTER→OUTPUT OF IMAGE DATA TO OUTPUT APPARATUS |
| 17 | SAVE | COMPUTER→REGISTER OF IMAGE FILE TO IMAGE MEMORY APPARATUS |
| 18 | LOAD | IMAGE MEMORY APPARATUS→TRANSFER OF EXISTING IMAGE FILE TO COMPUTER |
| 19 | PUT | FITTING PORTION OF DATA INTO IMAGE FILE |

FIG. 72

| NO. | COMMAND | FUNCTION |
|---|---|---|
| 20 | GET | CUTTING OUT PORTION OF DATA IN IMAGE FILE |
| 21 | DELE | DELETION OF IMAGE FILE |
| 22 | | |
| 23 | REN | CHANGE OF IMAGE FILE |
| 24 | FNLIST | OBTAINING OF LIST OF ALL REGISTERED IMAGE FILE IN IMAGE MEMORY APPARATUS |
| 25 | FNCHECK | CHECK OF ATTRIBUTE INFORMATION OF IMAGE FILE OF IMAGE MEMORY APPARATUS |
| 26 | DKCHECK | CHECK OF MEMORY CAPACITY OF IMAGE MEMORY APPARATUS |
| 27 | BITCOLOR | SETTING OF COLOR FOR BINARY BIT MAP |
| 28 | PALETTE | SETTING OF COLOR PALETTE |
| 29 | BALANCE | SETTING OF COLOR BALANCE |
| 30 | GAMMA | SETTING OF GAMMA CORRECTION |
| 31 | PPRREQ | SHEET SIZE |
| 32 | PPRSEL | SETTING OF SHEET SELECTION |
| 33 | SENSE | STATUS INFORMATION OF EACH CONNECTING APPARATUS |
| 34 | REMOTE | REMOTE/LOCAL SETTING |
| 35 | ASMODE | SETTING OF INPUT CONDITION UPON INPUT OF ANALOG IMAGE |
| 36 | | |
| 37 | | |
| 38 | MONITOR | THROUGH DISPLAY OF ANALOG INPUT |

FIG. 73

| COMMAND NAME | CONTENTS | RESPONSE |
|---|---|---|
| INIT | INITIALIZATION OF IMAGE MEMORY APPARATUS | ACK<br>NAK |

FUNCTION EXECUTE INITIALIZATION FOR EACH MEMORY APPARATUS

FORM INIT, ⟨no⟩

| COMMAND NAME | CONTENTS | RESPONSE |
|---|---|---|
| INITBIT | INITIALIZATION OF SPECIAL FILE | ACK<br>NAK |

FUNCTION EXECUTE INITIALIZATION OF SPECIAL FILE "BITMAP.S"

FORM INITBIT, ⟨type⟩

| COMMAND NAME | CONTENTS | RESPONSE |
|---|---|---|
| INITPALET | INITIALIZATION OF COLOR PALETTE | ACK<br>NAK |

FUNCTION EXECUTE INITIALIZATION OF COLOR PALETTE

FORM INITPALET

FIG. 74

| COMMAND NAME | CONTENTS | RESPONSE |
|---|---|---|
| SSEL | SWITCHING OF IMAGE INPUT APPARATUS | ACK / NAK |

FUNCTION SWITCH IMAGE INPUT APPARATUS
FORM SSEL, ⟨no⟩, ⟨frame⟩

| COMMAND NAME | CONTENTS | RESPONSE |
|---|---|---|
| DSEL | SELECTION OF OUTPUT APPARATUS | ACK / NAK |

FUNCTION SELECT IMAGE OUTPUT APPARATUS
FORM DSEL, ⟨no⟩

FIG. 75

| FIG. 75A |
| FIG. 75B |

FIG. 75A

| COMMAND NAME | CONTENTS | RESPONSE |
|---|---|---|
| DAREA | SETTING OF OUTPUT AREA | ACK / NAK |

FUNCTION: SET AREA TO BE OUTPUT TO OUTPUT APPARATUS
FORM: DAREA, ⟨type⟩, ⟨sx⟩, ⟨sy⟩, ⟨width⟩, ⟨height⟩

| COMMAND NAME | CONTENTS | RESPONSE |
|---|---|---|
| SAREA | SETTING OF INPUT AREA | ACK / NAK |

FUNCTION: SET AREA TO BE INPUTTED FROM INPUT APPARATUS
FORM: DAREA, ⟨type⟩, ⟨sx⟩, ⟨sy⟩, ⟨width⟩, ⟨height⟩

| COMMAND NAME | CONTENTS | RESPONSE |
|---|---|---|
| DMODE | SETTING OF OUTPUT CONDITION UPON OUTPUTTING IMAGE | ACK / NAK |

FUNCTION: SET SIZE CHANGE CONDITION UPON OUTPUTTING IMAGE
FORM: DMODE, ⟨type⟩, ⟨mx⟩, ⟨my⟩

FROM FIG. 75A

| COMMAND NAME | CONTENTS | RESPONSE |
|---|---|---|
| SMODE | SETTING OF INPUT CONDITION UPON INPUTTING IMAGE | ACK |
| | | NAK |

FUNCTION SET SIZE CHANGE CONDITION UPON INPUTTING IMAGE

FORM SMODE, ⟨type⟩, ⟨mx⟩, ⟨my⟩

| COMMAND NAME | CONTENTS | RESPONSE |
|---|---|---|
| ASMODE | SETTING OF INPUT MODE FOR ANALOG MODE | ACK |
| | | NAK |

FUNCTION SET INPUT MODE OF ANALOG IMAGE

FORM ASMODE, p1, p2

| COMMAND NAME | CONTENTS | RESPONSE |
|---|---|---|
| RPMODE | SETTING OF REPEAT OUTPUT UPON PRINTER OUTPUT | ACK |
| | | NAK |

FUNCTION OUTPUT IMAGE FROM PRINTER REPEATEDLY

FORM RPMODE, ⟨flag⟩

FIG. 76

| FIG. 76A |
| FIG. 76B |

FIG. 76A

| COMMAND NAME | CONTENTS | RESPONSE |
|---|---|---|
| COPY | OUTPUT IMAGE DATA FROM INPUT APPARATUS TO OUTPUT APPARATUS | ACK NAK |

FUNCTION  OUTPUT FROM SCANNER TO PRINTER DIRECTLY

FORM  COPY, ⟨count⟩

| COMMAND NAME | CONTENTS | RESPONSE |
|---|---|---|
| SCAN | REGISTER OF IMAGE DATA FROM INPUT APPARATUS TO IMAGE MEMORY APPARATUS | ACK NAK |

FUNCTION  EXECUTE IMAGE REGISTER FROM DESIGNATED INPUT APPARATUS

FORM  SCAN, ⟨filename⟩, ⟨width⟩, ⟨height⟩

| COMMAND NAME | CONTENTS | RESPONSE |
|---|---|---|
| PRINT | OUTPUT IMAGE DATA FROM IMAGE MEMORY APPARATUS TO OUTPUT APPARATUS | ACK NAK |

FUNCTION  OUTPUT TO DESIGNATED OUTPUT APPARATUS REGISTERED IMAGE IN IMAGE MEMORY APPARATUS

FORM  PRINT, ⟨filename⟩, ⟨count⟩

FROM FIG. 76A

| COMMAND NAME | CONTENTS | RESPONSE |
|---|---|---|
| MPRINT | VIRTUAL OUTPUT OF IMAGE DATA FROM IMAGE MEMORY APPARATUS TO OUTPUT APPARATUS | ACK / NAK |

[FUNCTION] EXECUTE VIRTUAL OUTPUT OF IMAGE DATA FROM IMAGE MEMORY APPARATUS TO OUTPUT APPARATUS
[FORM] MPRINT, ⟨filename⟩

| COMMAND NAME | CONTENTS | RESPONSE |
|---|---|---|
| DRSCAN | INPUT OF IMAGE DATA FROM INPUT APPARATUS TO COMPUTER | ACK / NAK |

[FUNCTION] INPUT IMAGE DATA FROM INPUT APPARATUS TO COMPUTER
[FORM] DRSCAN, ⟨filename⟩, ⟨width⟩, ⟨height⟩

| COMMAND NAME | CONTENTS | RESPONSE |
|---|---|---|
| DRPRINT | OUTPUT OF IMAGE DATA FROM COMPUTER TO OUTPUT APPARATUS | ACK / NAK |

[FUNCTION] OUTPUT IMAGE DATA FROM COMPUTER TO OUTPUT APPARATUS
[FORM] DRPRINT, ⟨filename⟩, ⟨width⟩, ⟨height⟩, ⟨count⟩

FIG. 77

| FIG. 77A |
|---|
| FIG. 77B |

FIG. 77A

| COMMAND NAME | CONTENTS | RESPONSE |
|---|---|---|
| DELE | DELETION OF IMAGE FILE | RET |

FUNCTION DELETE REGISTERED IMAGE FILE IN IMAGE MEMORY APPARATUS
FORM DELE, ⟨filename⟩

| COMMAND NAME | CONTENTS | RESPONSE |
|---|---|---|
| DKCHECK | CHECK OF REGISTERED CAPACITY IN IMAGE MEMORY APPARATUS | RET |

FUNCTION CHECK REGISTERED CAPACITY IN IMAGE MEMORY APPARATUS
FORM DKCHECK, ⟨type⟩, ⟨width⟩, ⟨height⟩

| COMMAND NAME | CONTENTS | RESPONSE |
|---|---|---|
| FNCHECK | CHECK OF ATTRIBUTE INFORMATION OF IMAGE FILE OF IMAGE MEMORY APPARATUS | RET |

FUNCTION CHECK ATTRIBUTE INFORMATION OF IMAGE FILE OF IMAGE MEMORY APPARATUS
FORM FNCHECK, ⟨filename⟩

FROM FIG. 77A

| COMMAND NAME | CONTENTS | RESPONSE |
|---|---|---|
| FNLIST | TRANSFER OF LIST OF ALL REGISTERED IMAGE FILE IN IMAGE MEMORY APPARATUS | RET |

FUNCTION  TRANSFER TO HOST COMPUTER INFORMATION REGARDING ALL REGISTERED IMAGE FILE IN IMAGE MEMORY APPARATUS

FORM  FNLIST

| COMMAND NAME | CONTENTS | RESPONSE |
|---|---|---|
| REN | CHANGE OF IMAGE FILE NAME | ACK NAK |

FUNCTION  CHANGE IMAGE FILE NAME

FORM  REN, ⟨Sfilename⟩, ⟨Dfilename⟩

FIG. 78

| FIG. 78A |
| FIG. 78B |

FIG. 78A

| COMMAND NAME | CONTENTS | RESPONSE |
|---|---|---|
| LOAD | TRANSFER OF REGISTERED IMAGE FILE FROM IMAGE MEMORY APPARATUS TO COMPUTER | ACK NAK |

[FUNCTION] TRANSFER IMAGE FILE REGISTERED IN IMAGE MEMORY APPARATUS TO COMPUTER
[FORM] LOAD, ⟨filename⟩

| COMMAND NAME | CONTENTS | RESPONSE |
|---|---|---|
| SAVE | REGISTER OF IMAGE FILE FROM COMPUTER TO IMAGE MEMORY APPARATUS | ACK NAK |

[FUNCTION] REGISTER IMAGE FILE FROM COMPUTER TO IMAGE MEMORY APPARATUS
[FORM] SAVE, ⟨filename⟩, ⟨width⟩, ⟨height⟩

FROM FIG. 78A

| COMMAND NAME | CONTENTS | RESPONSE |
|---|---|---|
| PUT | FITTING OF PARTIAL IMAGE INTO REGISTERED IMAGE FILE | ACK<br>NAK |

[FUNCTION] FIT PARTIAL IMAGE INTO REGISTERED IMAGE FILE

[FORM] PUT, ⟨filename⟩, ⟨sx⟩, ⟨sy⟩, ⟨width⟩, ⟨height⟩

| COMMAND NAME | CONTENTS | RESPONSE |
|---|---|---|
| GET | CUTTING OFF OF PORTION IN IMAGE FILE | ACK<br>NAK |

[FUNCTION] CUT OFF PORTION IN IMAGE REGISTERED TO IMAGE MEMORY APPARATUS AND TRANSFER IT TO HOST COMPUTER

[FORM] GET, ⟨filename⟩, ⟨sx⟩, ⟨sy⟩, ⟨width⟩, ⟨height⟩

FIG. 79

| COMMAND NAME | CONTENTS | RESPONSE |
|---|---|---|
| BALANCE | SETTING OF COLOR BALANCE | ACK NAK |

- FUNCTION: SET EACH COLOR BALANCE FOR RGB AND CMYBk
- FORM: BALANCE, ⟨type⟩, ⟨c1⟩, ⟨c2⟩, ⟨c3⟩, ⟨c4⟩

| COMMAND NAME | CONTENTS | RESPONSE |
|---|---|---|
| BITCOLOR | SETTING OF COLOR FOR BINARY BIT MAP IMAGE DATA | ACK NAK |

- FUNCTION: DESIGNATE COLOR FOR IMAGE DATA OF BINARY BIT MAP MEMORY
- FORM: BITCOLOR, ⟨sx⟩, ⟨sy⟩, ⟨width⟩, ⟨height⟩, ⟨index⟩

| COMMAND NAME | CONTENTS | RESPONSE |
|---|---|---|
| GAMMA | SETTING OF GAMMA CORRECTION TABLE UPON PRINTING OUT | ACK NAK |

- FUNCTION: SET GAMMA CORRECTION TABLE UPON PRINTING OUT
- FORM: GAMMA, ⟨type⟩

| COMMAND NAME | CONTENTS | RESPONSE |
|---|---|---|
| PALETTE | SETTING OF COLOR PALETTE TABLE | ACK NAK |

- FUNCTION: SET COLOR PALETTE TABLE
- FORM: PALETTE

FIG. 80

| FIG. 80A |
|---|
| FIG. 80B |

FIG. 80A

| COMMAND NAME | CONTENTS | RESPONSE |
|---|---|---|
| MONITOR | SETTING OF MONITOR DISPLAY | ACK / NAK |

FUNCTION: THROUGH-DISPLAY ANALOG IMAGE TO MONITOR TV CONNECTED TO IMAGE MEMORY APPARATUS
FORM: MONITOR, ⟨type⟩

| COMMAND NAME | CONTENTS | RESPONSE |
|---|---|---|
| PPRREQ | TRANSFER OF INFORMATION REGARDING SHEET SIZE | RET |

FUNCTION: TRANSFER DETERMINATION DATA FOR SHEET CASSETTE OF PRINTER TO HOST COMPUTER
FORM: PPRREQ

| COMMAND NAME | CONTENTS | RESPONSE |
|---|---|---|
| PPRSEL | SETTING OF SHEET SELECTION | ACK / NAK |

FUNCTION: SELECT SHEET
FORM: PPRSEL, ⟨no⟩

FROM FIG. 80A

| COMMAND NAME | CONTENTS | RESPONSE |
|---|---|---|
| REMOTE | SETTING OF REMOTE STATUS OF IMAGE MEMORY APPARATUS | ACK / NAK |

[FUNCTION] SET REMOTE/LOCAL STATUS OF IMAGE MEMORY APPARATUS BY COMPUTER
[FORM] RPMOTE, ⟨type⟩

| COMMAND NAME | CONTENTS | RESPONSE |
|---|---|---|
| SENSE | TRANSFER OF INFORMATION FOR EACH PERIPHERAL APPARATUS | RET |

[FUNCTION] CHECK STATUS OF EACH CONNECTING APPARATUS
[FORM] SENSE, ⟨dev⟩, ⟨type⟩

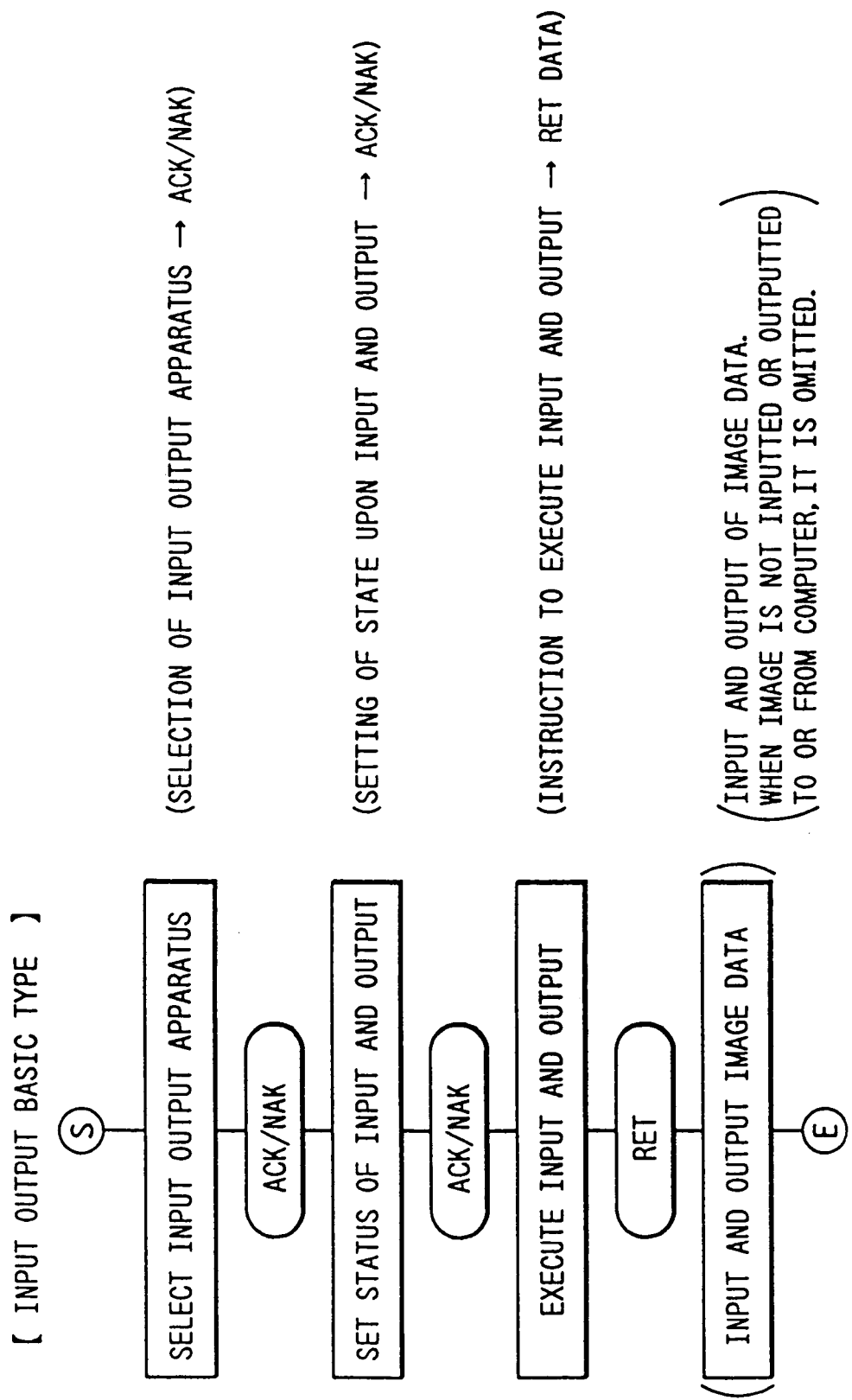

FIG. 88

| ORDER OF OUTPUT COMMAND | OUTPUT IMAGE | SYNTHESIS OUTPUT IMAGE |
|---|---|---|
| MPRINT IMAGE ① <br> MPRINT IMAGE ② <br> ⋮ <br> MPRINT IMAGE n-1 <br> PRINT IMAGE n | IMAGE ① <br> IMAGE ② <br> IMAGE n-1 <br> IMAGE n | |

FIG. 89

| ORDER OF OUTPUT COMMAND | OUTPUT IMAGE | SYNTHESIS OUTPUT IMAGE |
|---|---|---|
| MPRINT IMAGE ① <br> MPRINT IMAGE ② <br> ⋮ <br> MPRINT IMAGE n-1 <br> PRINT BITMAPS | BITMAPS <br> IMAGE ① <br> IMAGE ② <br> IMAGE n-1 | Canon |

FIG. 90
| ORDER OF OUTPUT COMMAND | OUTPUT IMAGE | SYNTHESIS OUTPUT IMAGE |
|---|---|---|
| MPRINT IMAGE ① MPRINT IMAGE ② MPRINT BITMAP.S COPY | 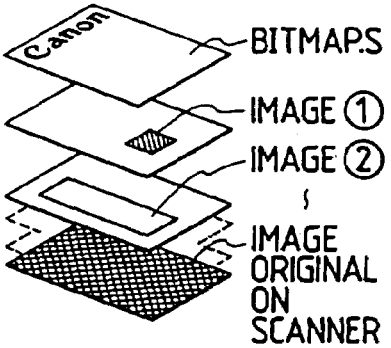 | 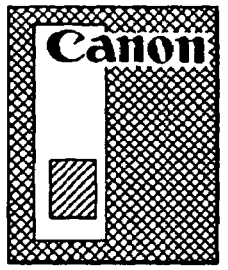 |
FIG. 91
| PALETTE NUMBER | R(RED) | G(GREEN) | B(BLUE) |
|---|---|---|---|
| 0 (00H) | FFH | 00H | 00H |
| 1 (01H) | 00H | FFH | 00H |
| 2 (02H) | 00H | 00H | FFH |
| ~ | ~ | ~ | ~ |
| 254 (FEH) | 33H | FFH | 33H |
| 255 (FFH) | 80H | FFH | 33H |

FIG. 93
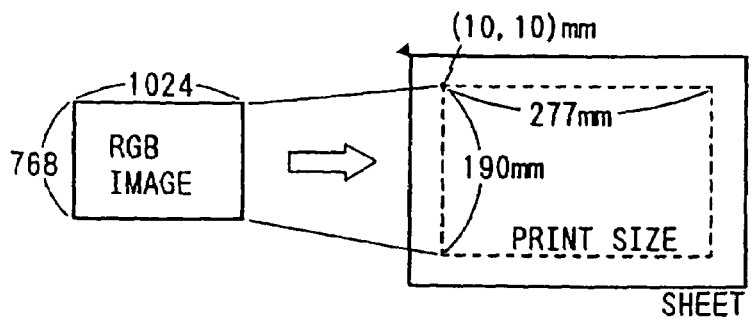
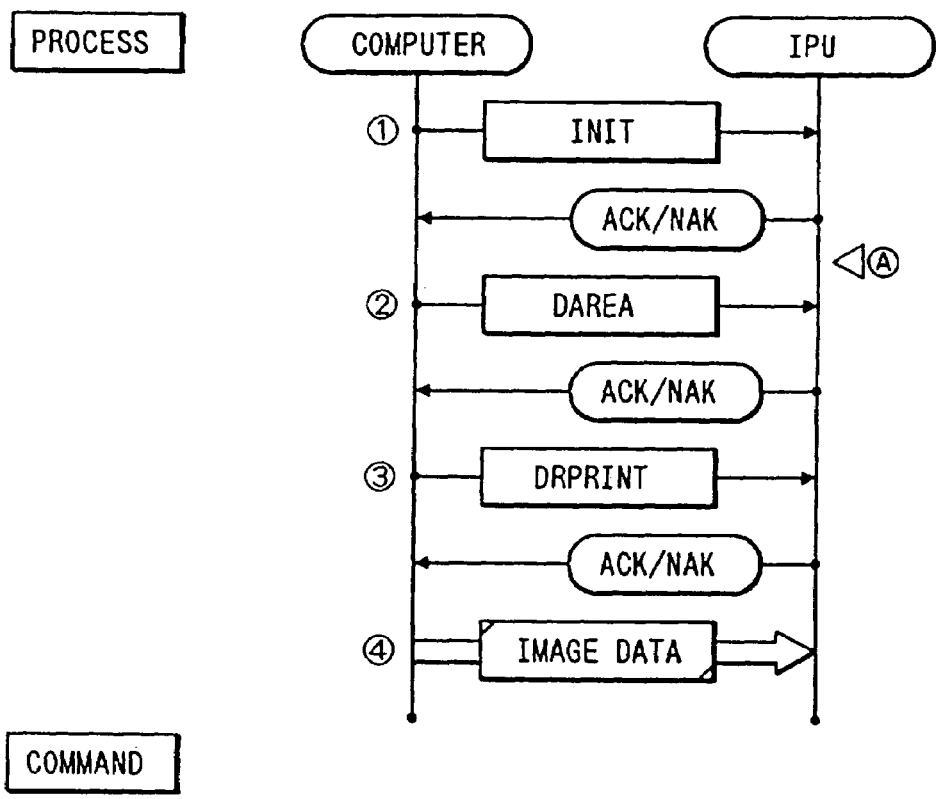
- ① INIT, 0
  INITIALIZATION OF APPARATUS
- ② DAREA, 6, 10, 277, 190
  SET AREA OF 277×190mm FROM LOCATION (10, 10) mm
- ③ DPRINT, tmp. R, 1024, 768, 1
  REGISTER IMAGE OF 1024×768 PIXELS WITH FILE NAME "tmp. R"
  TO IMAGE MEMORY APPARATUS 3 AND PRINT IT BY ONE SHEET
- ④ TRANSFER OF IMAGE DATA
  TRANSFER IMAGE DATA OF RGB TYPE BY 1026×768×3 BYTE

FIG. 95

| PROCESS |
|---|

A REGISTER ALL IMAGE DATA TO IMAGE MEMORY APPARATUS 3, AND THEN OUTPUT TOGETHER

| COMMAND |
|---|

① INITIALIZATION OF APPARATUS

INIT, 0

② REGISTER OF IMAGE DATA TO IMAGE MEMORY APPARATUS 3

SAVE, tmp1. R, 640, 512    REGISTER OF IMAGE DATA tmp1. R
    SAVE, tmp2. R, 640, 512    REGISTER OF IMAGE DATA tmp2. R
    ⋮
    SAVE, tmp4. R, 640, 512    REGISTER OF IMAGE DATA tmp4. R

③ OUTPUT FROM IMAGE MEMORY APPARATUS 3 TO PRINTER

DAREA, 6, 10, 10, 60, 50    } VIRTUAL OUTPUT OF IMAGE DATA tmp1. R
    MPRINT, tmp1. R DAREA, 6, 80, 10, 100, 90    } VIRTUAL OUTPUT OF IMAGE DATA tmp2. R
    MPRINT, tmp2. R

⋮

DAREA, 6, 10, 100, 80, 70    } VIRTUAL OUTPUT OF IMAGE DATA tmp2. R
    PRINT, tmp4. R, 1        AND PRINTOUT OF ALL VIRTUAL OUTPUTS

FIG. 96

PROCESS

B REGISTER EACH IMAGE DATA TO IMAGE MEMORY APPARATUS WHILE OUTPUTTING IT

COMMAND

① INITIALIZATION OF APPARATUS

INIT, 0

② REGISTER OF IMAGE DATA AND VIRTUAL OUTPUT

SAVE, tmp1. R, 640, 512

DAREA, 6, 10, 10, 60, 50

MPRINT, tmp1. R

⋮

③ REGISTER OF IMAGE DATA tmp4. R AND PRINT OUT OF ALL VIRTUAL OUTPUTS

SAVE, tmp4. R, 640, 512

DAREA, 6, 10, 100, 80, 70

PRINT, tmp4. R, 1

IMAGE MEMORY APPARATUS

This application is a continuation of application Ser. No. 09/079,473, filed on May 15, 1998 now abandoned; which is a division of application Ser. No. 08/478,394, filed on Jun. 7, 1995, now U.S. Pat. No. 5,784,180; which is a division of application Ser. No. 08/288,429, filed on Aug. 10, 1994, now U.S. Pat. No. 5,703,696; which is a continuation of application Ser. No. 07/976,665, filed on Nov. 16, 1992, now abandoned; which is a continuation of application Ser. No. 07/521,674, filed on May 10, 1990, now abandoned.

BACKGROUND OF THE INVENTION

1. Field of the Invention

The present invention relates to an image memory apparatus for storing input image information.

2. Related Background Art

In recent years, a digital image copying machine for digitally color-separating a color image to read the color image, performing desired processing of the read digital image, and performing color recording on the basis of the edited digital color image signal has been very popular. In addition, a system obtained by connecting a color image memory apparatus and a monitor display is proposed by the present applicant.

In such a system, data stored in the color image memory apparatus is repeatedly sent to the digital color copying machine to obtain a plurality of color images. In addition, when the monitor display is connected to the digital color copying machine, the stored images can be checked.

In the conventional technique, a capacity of a memory for storing image information is predetermined. For example, when a large or small image is to be stored, an image storing area is fixed. When a large image exceeding the storing area is to be stored, it must be reduced. When the reduced image is to be read out, it must be enlarged. It is therefore impossible to reproduce a high-quality image.

SUMMARY OF THE INVENTION

It is an object of the present invention to provide an image memory apparatus capable of reproducing a high-quality image as needed in consideration of the above situation.

It is another object of the present invention to provide an image memory apparatus capable of effectively using an image storing capacity in correspondence with an input image.

In order to achieve the above objects according to an aspect of the present invention, there is provided an image memory apparatus comprising a memory means for storing input image information, a means for designating a storing capacity of the memory means for the input image information, and storing control means for performing storing control of the input image information in the memory means on the basis of a storing capacity instruction from the designating means.

It is still another object of the present invention to provide an image processing apparatus capable of storing a color image signal with high quality.

It is still another object of the present invention to provide an image memory apparatus capable of storing each image information upon storage of a plurality of pieces of image information at a desired resolution.

It is still another object of the present invention to provide an image memory apparatus having a new function.

It is still another object of the present invention to provide an image memory apparatus whose operability can be improved.

The above and other objects, features, and advantages of the present invention will be apparent from the detailed description of the preferred embodiments in conjunction with the accompanying drawings.

BRIEF DESCRIPTION OF THE DRAWINGS

FIG. 1 is a block diagram showing an arrangement of a system according to an embodiment of the present invention;

FIG. 10B is a table for explaining an operation of the color correction circuit 49 shown in FIG. 10A;

FIG. 11 is a block diagram showing an arrangement of a black character processing circuit 69 shown in FIG. 2;

FIGS. 21A, 21B, and 21C are views showing another output example of the repeat circuit 118;

FIG. 22 is a timing chart showing a print sequence of a printer 2;

FIG. 23 is a plan view of a digitizer 16;

FIG. 25I is a view for explaining an operation of a decoder 146 shown in FIG. 25A;

FIG. 26 is a timing chart showing a signal 207 output from a color reader 1 and an image signal 205;

FIG. 27D-1 is a block diagram showing an arrangement of a bit map memory E;

FIG. 27D-2 is a view showing a relationship between an original and data to be written in the bit map memory E;

FIG. 33 is a view showing capacities of the memories 4060R, 4060G, and 4060B when the memories A, B, C, and D are connected;

FIG. 37C is a timing chart showing timings in an image synthesization mode;

FIGS. 37F and 37G are views for explaining enlargement continuous copying;

FIG. 38 is a timing chart for explaining operations of the respective parts in FIGS. 27A and 27B on the l1 line in FIG. 37A;

FIG. 40 is a timing chart showing a sequence of surface sequential color image formation at the color printer 2;

FIG. 41 is a view showing an internal structure of a selector 4230 shown in FIG. 27B;

FIG. 46 is a perspective view showing an arrangement of a film carrier shown in FIG. 45;

FIGS. 47 to 50 are views showing display states of an operation unit 20 shown in FIG. 1;

FIG. 56 is a view showing a format of image file names;

FIG. 57 is a view showing classification of data transferred between the host computer 33 and the image memory apparatus 3;

FIG. 58 is a view showing a format of a command;

FIG. 69 is a view showing a response data format;

FIG. 70 is a view showing classification of commands;

FIGS. 71 to 80 are views for explaining the respective commands;

FIGS. 81 to 87 are views showing execution sequences of the respective commands;

FIGS. 88, 89, and 90 are views showing image synthesization results in the system of this embodiment;

FIG. 91 is a view showing a structure of a color palette;

FIGS. 93 to 98 are views showing command transfer exchange between the host computer 33 and the image memory apparatus 3.

DESCRIPTION OF THE PREFERRED EMBODIMENTS

Preferred embodiments of the present invention will be described with reference to the accompanying drawings hereinafter.

<System Configuration>

Figures 2, 27A:
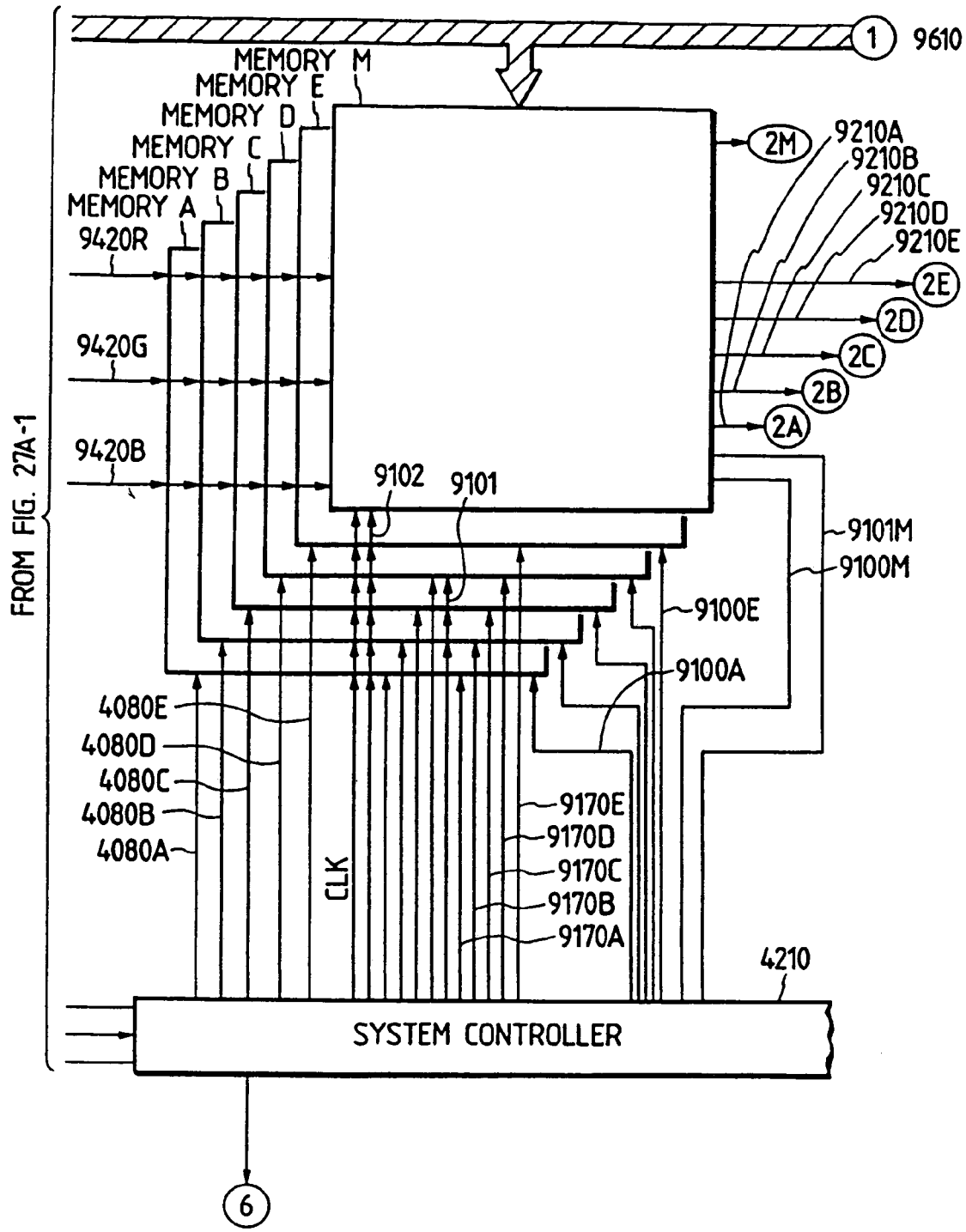
FIGS. 27A and 27B are block diagrams showing an arrangement of an image memory apparatus 3.
Figures 2, 27B:
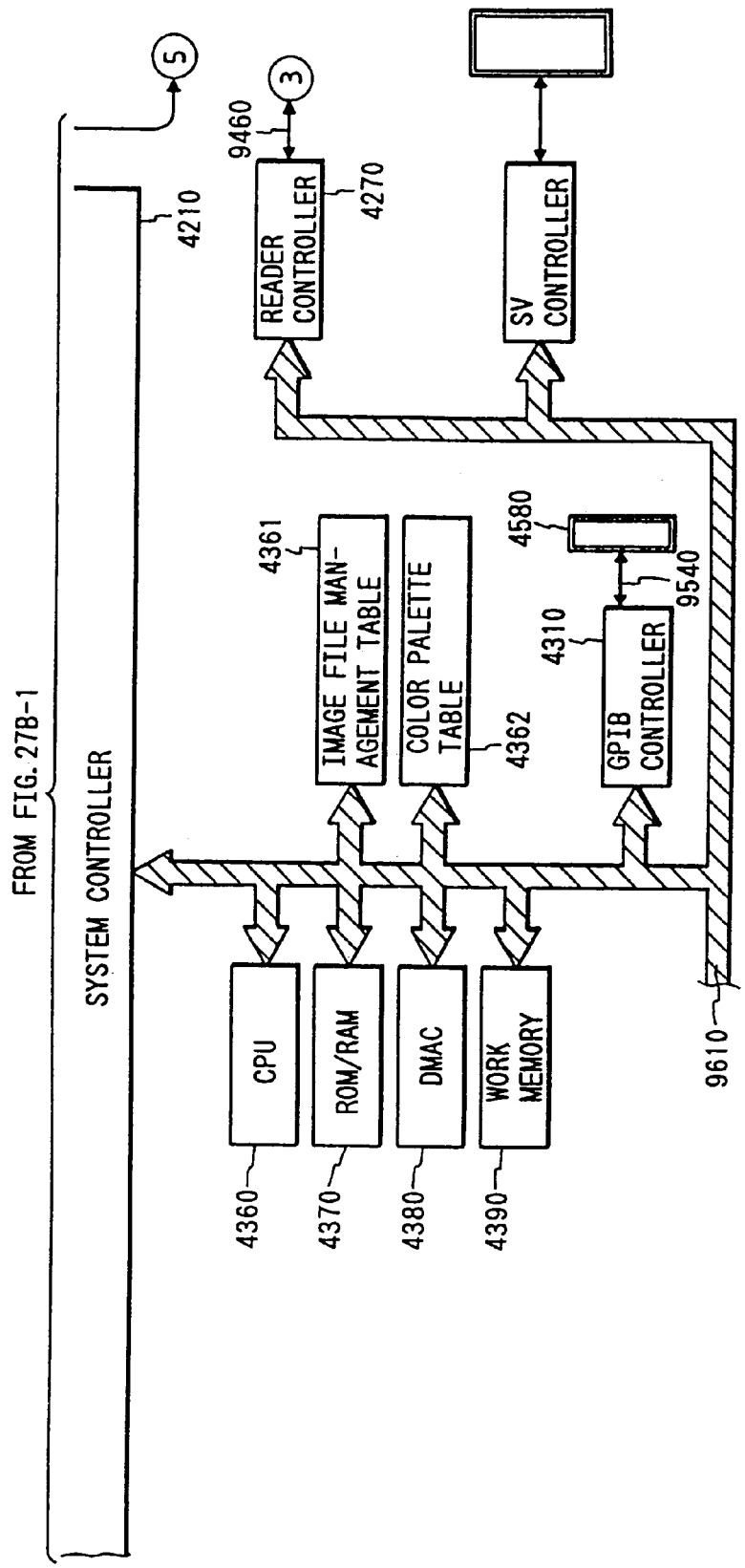
Figure 27C:
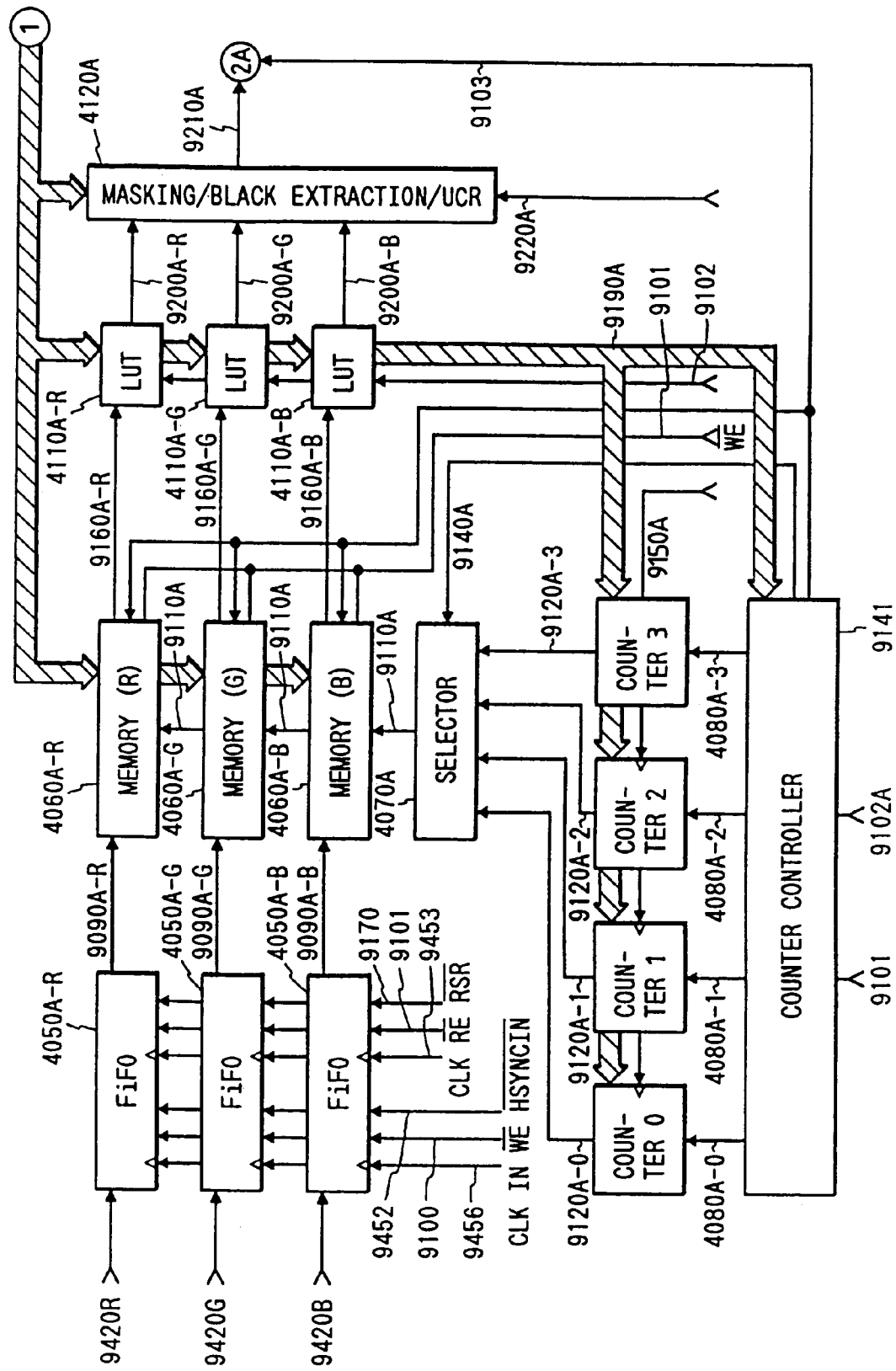
FIG. 27C is a block diagram showing an arrangement of memories A to D shown in FIG. 27A.
Figures 1, 27D:
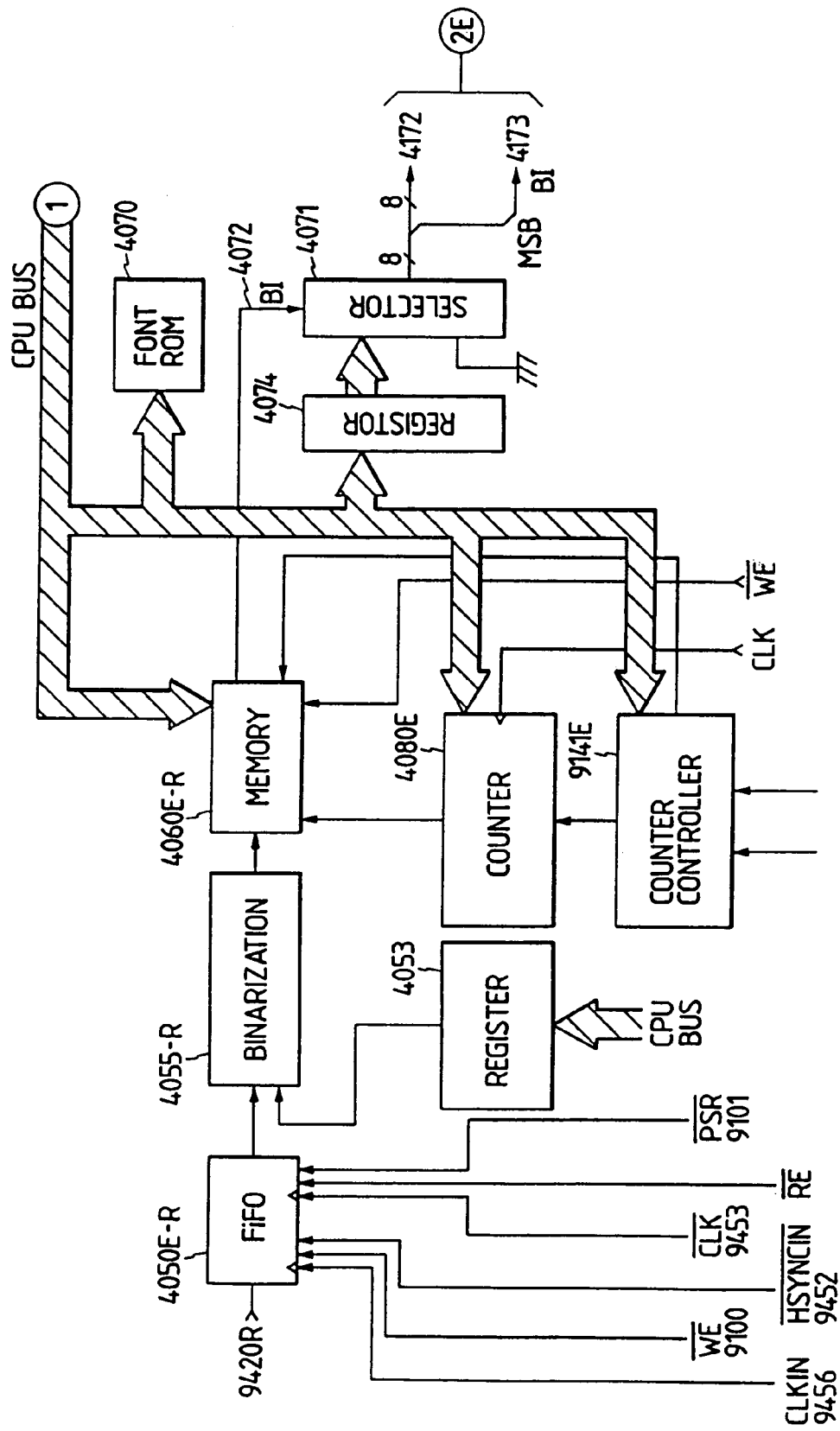
Figures 2, 27D:
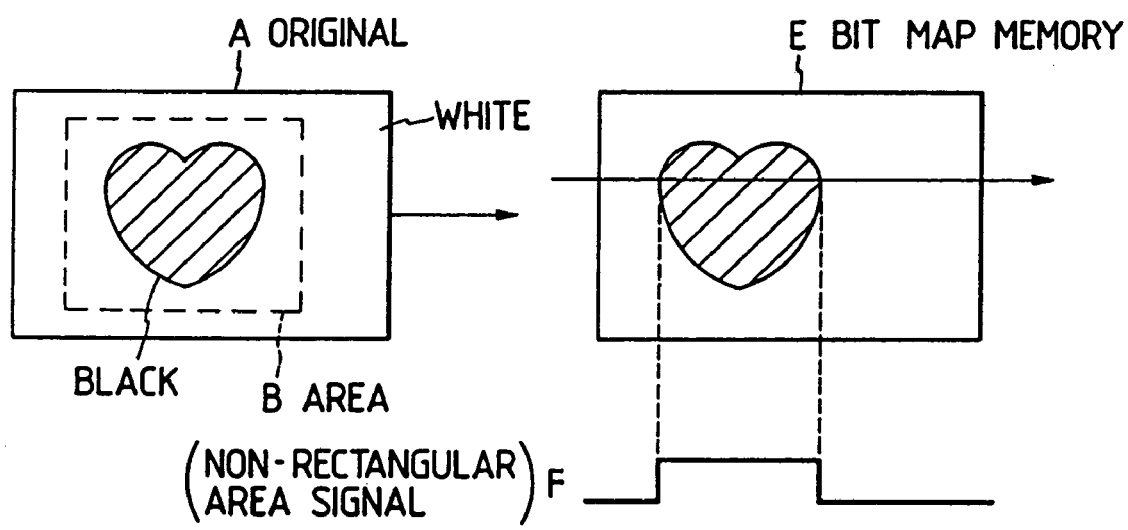

FIG. 1 is a view showing a system configuration as a schematic internal structure of a color image processing system according to an embodiment of the present invention. The system of this embodiment comprises a digital color image reading apparatus (to be referred to as a color reader hereinafter) 1 for reading a digital color image, as shown in the upper portion of FIG. 1, a digital color image printing apparatus (to be referred to as a color printer hereinafter) 2 for printing and outputting a digital color image, as indicated in the lower portion of FIG. 1, an image memory apparatus 3, an SV recording reproducing unit 31, a monitor TV 32, a host computer 33, and a film scanner 34.

The color reader 1 of this embodiment is an apparatus for causing a color separating means (to be described later) and a photoelectric transducer element constituted by a CCD or the like to read color image information of an original in units of color components and for converting the read color image information into electrical digital image signals.

The color printer 2 is an electrophotographic laser beam color printer for limiting a color image in units of colors in response to digital image signals to be output, and recording a color image on a recording sheet in the form of dots upon rotation of a photosensitive body a plurality of times.

The image memory apparatus 3 is an apparatus for quantizing a digital image read by the color reader 1 or the film scanner 34 and an analog video signal from the SV recording reproducing unit 31, converting the input data into a digital image, and storing the digital image.

The SV recording reproducing unit 31 is an apparatus for imaging an image with an SV camera, reproducing image information recorded in an SV floppy disk, and outputting the reproduced image as an analog video signal. The SV recording reproducing unit 31 can also receive an analog video signal and can record it in the SV floppy disk.

The monitor TV 32 is an apparatus for displaying an image stored in the image memory apparatus 3 and contents of analog video signals output from the SV recording reproducing unit 31.

The host computer 33 has a function of transmitting image information to the image memory apparatus 3 and a function of receiving image information output from the color reader 1, the SV recording reproducing unit, and the film scanner 34 and stored in the image memory apparatus 3. The host computer 33 also controls the color reader 1 and the color printer 2.

The film scanner 34 is an apparatus for converting an image of a 35-mm film (positive/negative) into electrical color image information by a photoelectric transducer such as a CCD.

The details of the respective components described above will be described in detail below.

<Description of Color Reader 1>

An arrangement of the color reader 1 will be described below.

The color reader 1 shown in FIG. 1 includes a platen glass 4 on which an original 999 is placed, and a rod array lens 5. The rod array lens 5 focuses an image of light reflected by the original 999 exposed and scanned by a halogen exposure lamp 10 and supplies an image input to equi-magnification full-color color sensors 6. The rod array lens 5, the equi-magnification full-color sensors 6, a sensor output signal amplifier 7, and the halogen exposure lamp 10 constitute an original scanning unit 11. The original scanning unit 11 scans the original 999 in a direction of an arrow A1. Image information to be read from the original 999 is sequentially read every line upon exposure and scanning of the original scanning unit 11. The read color-separated image signals are amplified by the sensor output signal amplifier 7 into predetermined voltages. These voltages are input to a video processing unit through a signal line 501 and are processed by this unit. The signal line 501 comprises a coaxial cable to assure accurate signal transmission. A signal line 502 supplies drive pulses to the equi-magnification full-color sensors 6. All necessary drive pulses are generated by a video processing unit 12. The image reader 1 also includes white and black boards 8 and 9 for adjusting white and black levels of image signals, respectively. When the white and black boards 8 and 9 are irradiated with light from the halogen exposure lamp 10, predetermined density signal levels can be obtained and can be used to correct the black and white levels.

A control unit 13 comprises a microcomputer and controls the overall operation of the color reader 1. The control unit 13 performs display and key input operations on an operation panel or unit 20 and controls the video processing unit 12 through a bus 508. The control unit 13 detects a position of the original scanning unit 11 by position sensors S1 and S2 through signal lines 509 and 510.

The control unit 13 performs the entire control of the color reader 1, i.e., performs control of a stepping motor driving circuit 15 for pulse-driving a stepping motor 14 for moving the scanning unit 11 through a signal line 503, performs ON/OFF control and light amount control of the halogen exposure lamp 10 by an exposure lamp driver 21 through a signal line 504, and performs control of a digitizer 16 or a display unit through a signal line 505.

The operation unit 20 is included in the color reader 1 and includes a liquid crystal display panel also serving as a touch panel and keys for instructing various inputs. Display results of the display panel are shown from FIG. 47.

A color image signal read by the original scanning unit 11 during exposure and scanning of the original is input to the video processing unit 12 through the sensor output signal amplifier 7 and the signal line 501.

The original scanning unit 11 and the video processing unit 12 will be described in detail with reference to FIG. 2.

A color image signal input to the video processing unit 12 is separated into G (green), B (blue), and R (red) color signals by a sample/hold (S/H) circuit 43. The color-separated signals are converted into digital signals by an A/D converter 44, thereby obtaining digital color image signals.

In this embodiment, the color sensors 6 in the original scanning unit 11 comprise five staggered image sensors, as shown in FIG. 2. The read position errors between the preceding second and fourth channels and the remaining first, third, and fifth channels are corrected by the color sensors 6 and a shift correction circuit 45. Shift-corrected signals from the shift correction circuit 45 are input to a black correction/white correction circuit 46, and dark current errors of the color sensors 6, the light amount errors of the halogen exposure lamp 10, and sensitivity variations of the sensors are corrected in accordance with signals corresponding to light reflected by the white and black boards 8 and 9.

Color image data proportional to an amount of input light from the color sensors 6 is input to a video interface 201 and is connected to the image memory apparatus 3.

Figure 2B:
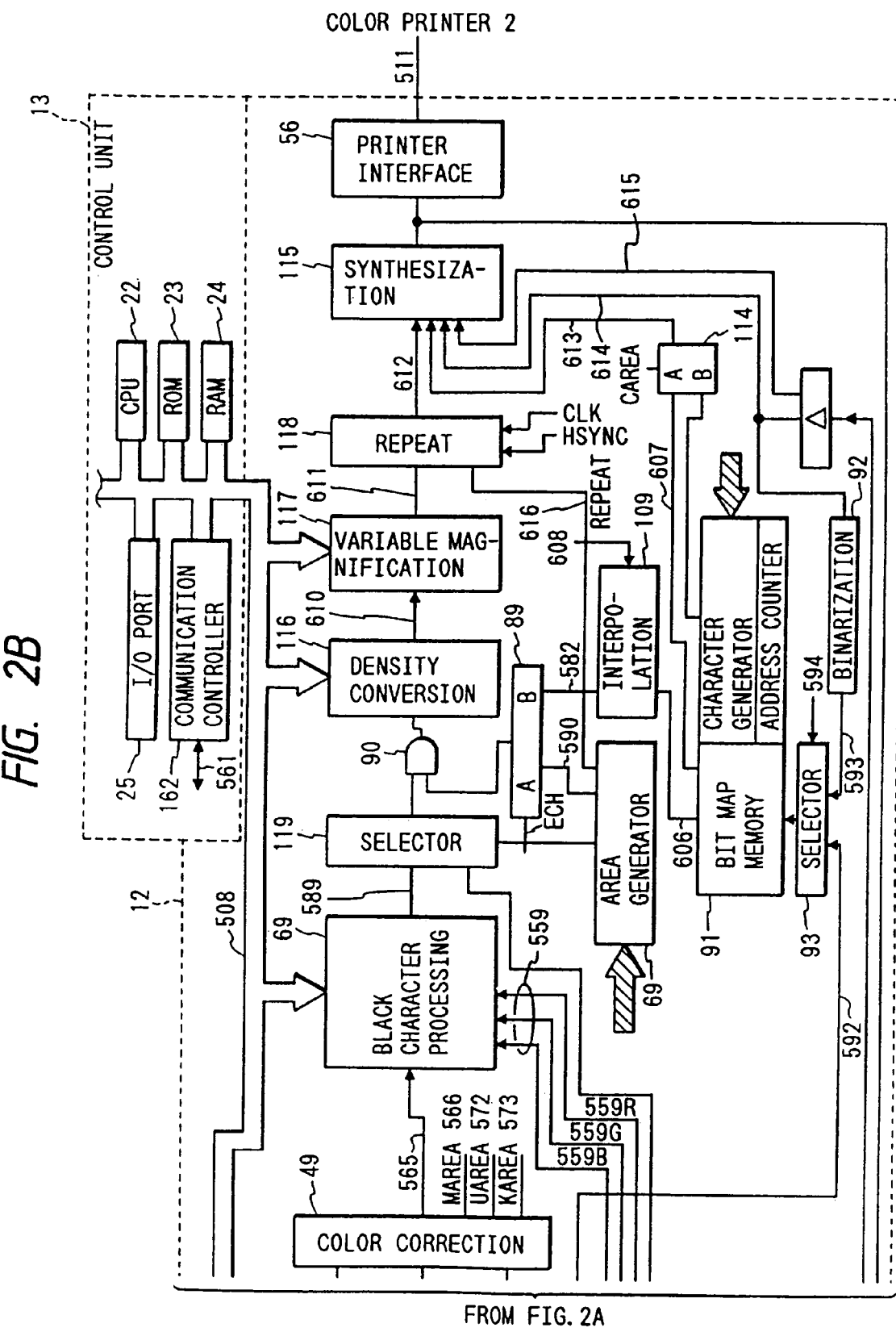
FIG. 2 is a block diagram showing an original scanning unit 11, a video processing unit 12, and a control unit 13 shown in FIG. 1.
Figure 3:
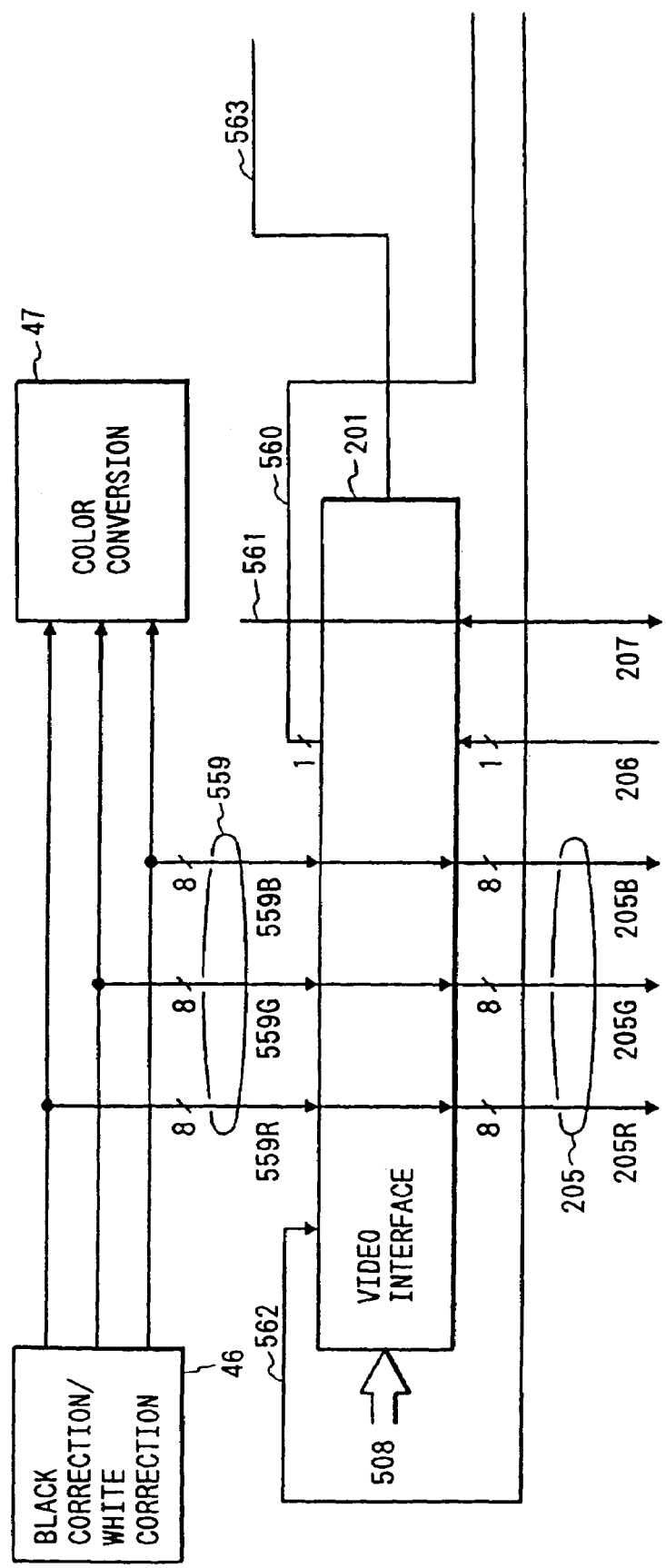
FIGS. 3 to 6 are block diagrams for explaining functions of a video interface 201 shown in FIG. 2.
Figure 4:
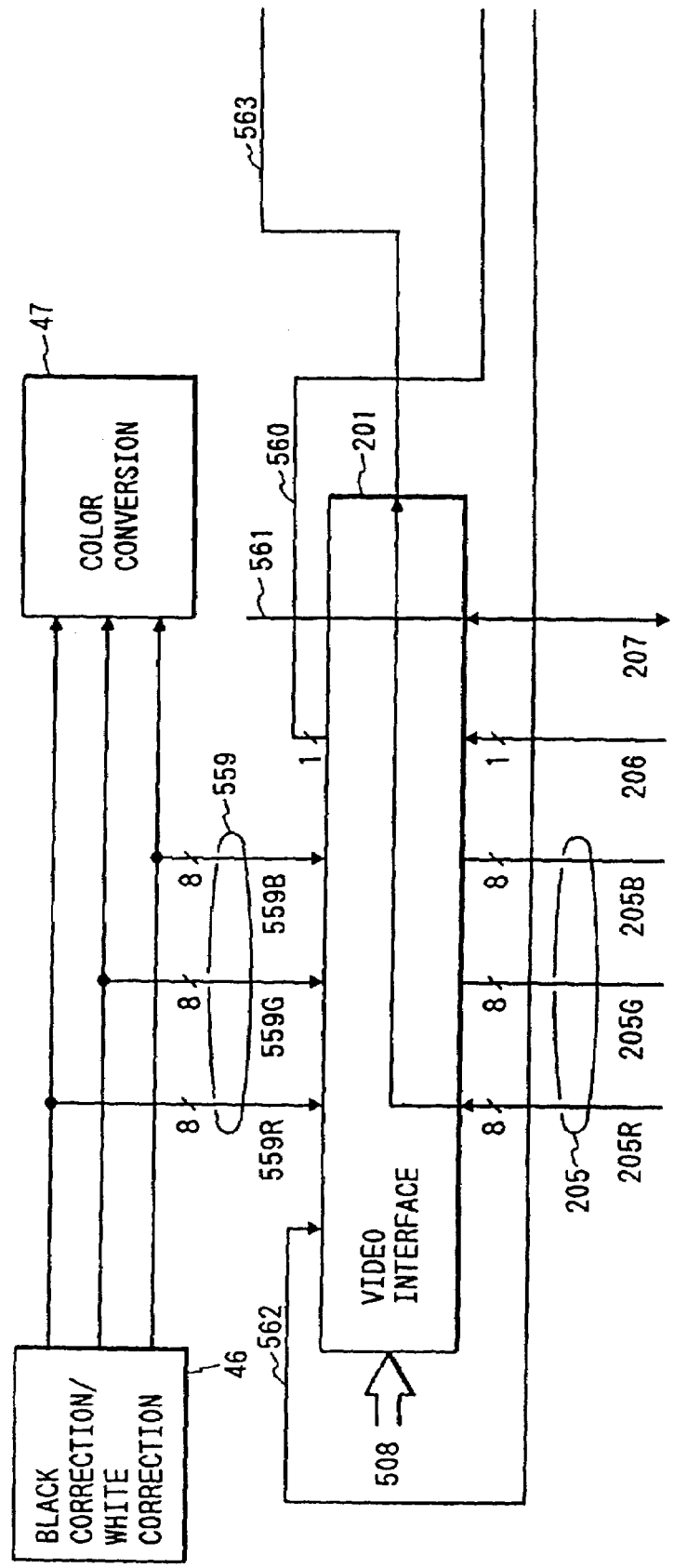
Figure 5:
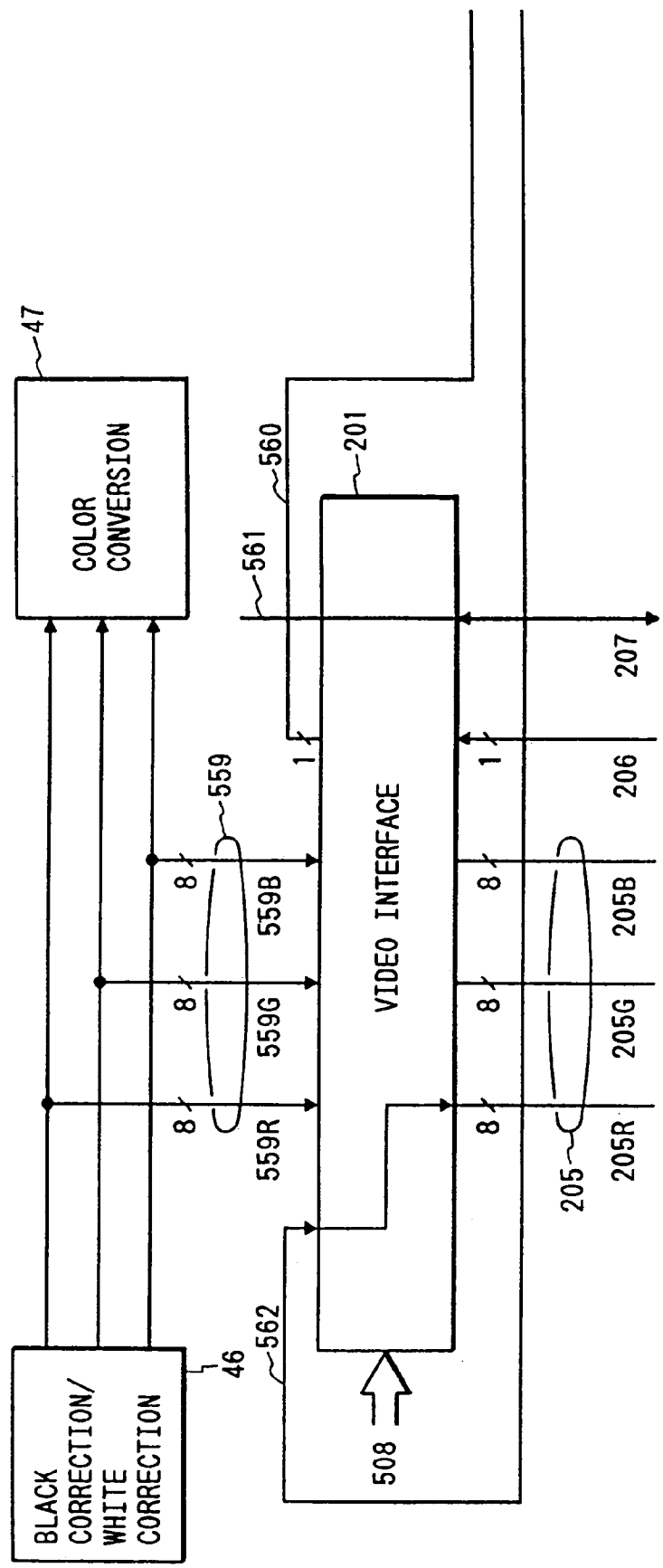

The video interface 201 has functions shown in FIGS. 3 to 6. That is, the video interface 201 has:

(1) a function of outputting a signal 559 from the black correction/white correction circuit 46 to the image memory apparatus 3 (FIG. 3);

(2) a function of inputting image information 563 from the image memory apparatus 3 to a selector 119 (FIG. 4);

(3) a function of outputting image information 562 from a synthesization circuit 115 to the image memory apparatus 3 (FIG. 5);

(4) a function of inputting binary information 206 from the image memory apparatus 3 to the synthesization circuit 115 (FIG. 6); and (5) a function of connecting a control line 207 (lines of HSYNC, VSYNC, and image enable EN signals) between the image memory apparatus 3 and the color reader 1 and a communication line 561 between the image memory apparatus 3 and the CPU. In particular, the CPU communication line is connected to a communication controller 162 in the control unit 13 to perform exchange various commands and various types of area information.

These five functions are switched by the CPU control bus 508, as shown in FIGS. 3 to 6.

As described above, the video interface 201 has the five functions so that a signal line 205 and the signal lines 206 and 207 can perform bidirectional transmission.

Bidirectional transmission can be performed with the above arrangement, the number of signal lines can be reduced, thin cables can be used, and an inexpensive system can be provided.

The signal lines of the interface connector (4550 in FIG. 27A) of the image memory apparatus 3 connected to the color reader 1 can also perform bidirectional transmission.

The number of connecting lines between the respective apparatuses constituting the system can be reduced, and most advanced communications can be performed.

The image information 559 from the black 3 correction/white correction circuit 46 is input to a logarithm (LOG) conversion circuit 48 (FIG. 2) to perform processing for matching an output image with human spectral luminous efficiency.

Figure 7A:
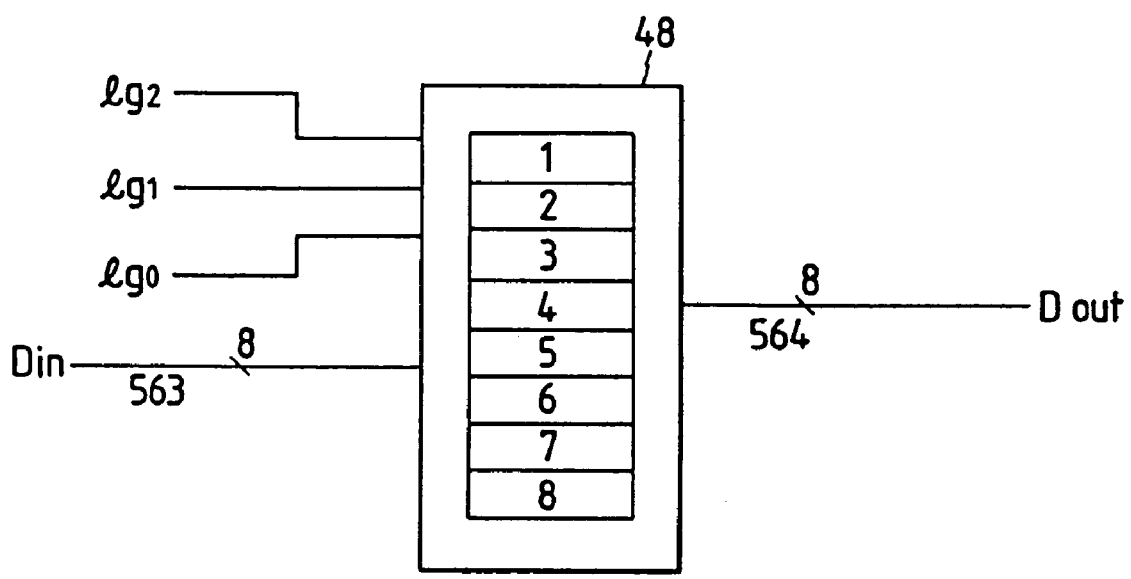
FIGS. 7A and 7B are views for explaining an arrangement of a LOG conversion circuit 48 shown in FIG. 2 and its characteristics.
Figure 7B:
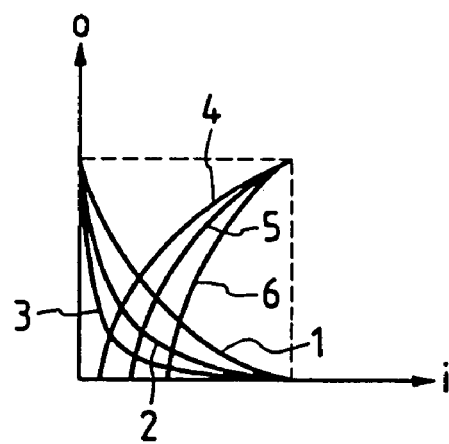

The black correction/white correction circuit 46 performs conversion of white=00H and black=FFH. In addition, characteristics of image sources input to the image read sensors are different. For examples, a normal reflecting original and a transmitting original used in a film projector or the like have different characteristics. In addition, characteristics of positive and negative films belonging to the transmitting originals are different from each other. Furthermore, sensitivities of the films and gamma characteristics of the images input in exposure states vary. As shown in FIGS. 7A and 7B, a plurality of logarithmic conversion LUTs (look-up tables) are prepared and selectively used. This switching is performed through signal lines lg0, lg1, and lg2 by instruction inputs from an operation unit to I/O ports of a CPU 22. Data output in response to the B, R, G inputs correspond to density values of the output image. Since signals of B (blue), G (green), and R (red) correspond to toner amounts of yellow, magenta, and cyan, respectively, the color image data are caused to correspond to Y, M, and C.

A color conversion circuit 47 is a circuit for detecting a specific color from the input color image data R, B, and G and replaces it with another color. For example, this circuit has a function of converting a red portion in an original into a portion of blue or any other color.

Figure 8A:
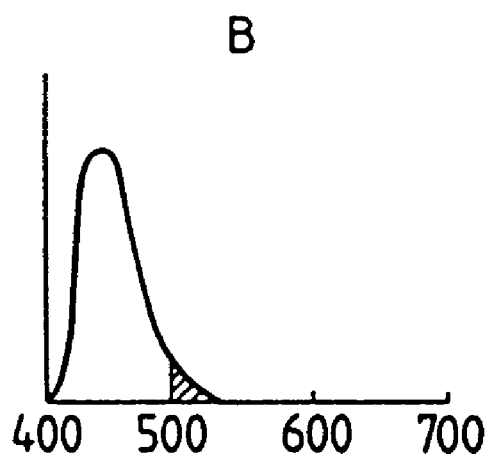
FIGS. 8A and 8B are graphs showing spectral characteristics of color separation filters.
Figure 8B:
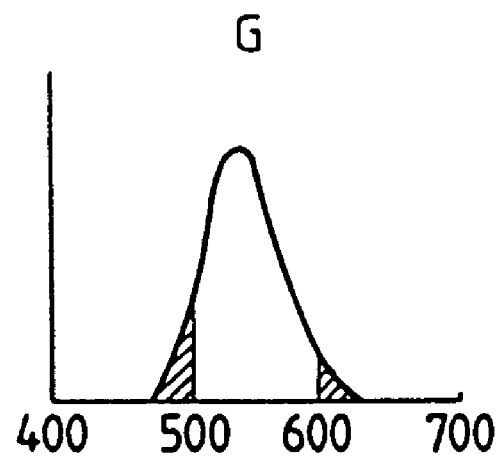
Figure 9A:
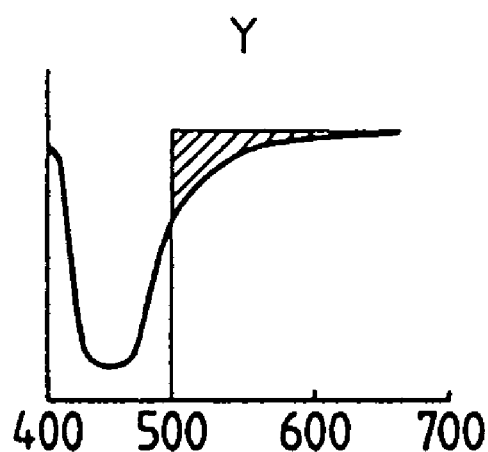
FIGS. 9A and 9B are graphs showing absorption wavelength characteristics of color toners.
Figure 9B:
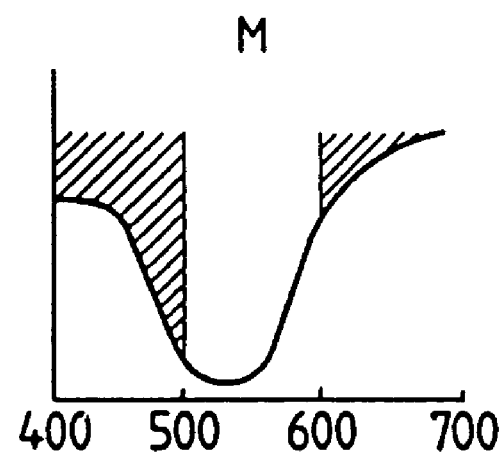

The respective color component image data, i.e., yellow, magenta, and cyan components, derived from the original image from the logarithm conversion circuit 48 are color-corrected by a color correction circuit 49. The spectral characteristics of color separation filters arranged in units of pixels in the color sensors have unnecessary transmission regions indicated by hatched portions in FIG. 8. Color toners (Y, M, and C) to be transferred to a transfer sheet are also known to have unnecessary absorption components, as shown in FIG. 9. FIGS. 8 and 9 show the characteristics of the components R and G and the components Y and M, respectively.

Masking correction for the color component image data Yi, Mi, and Ci upon color correction by linear equations as follows is well-known:

$$\begin{bmatrix} Yo \\ Mo \\ Co \end{bmatrix} = \begin{bmatrix} aY1 & -bM1 & -cC1 \\ -aY2 & bM2 & -cC2 \\ -aY3 & -bM3 & cC3 \end{bmatrix} = \begin{bmatrix} Yi \\ Mi \\ Ni \end{bmatrix}$$

Figure 10A:
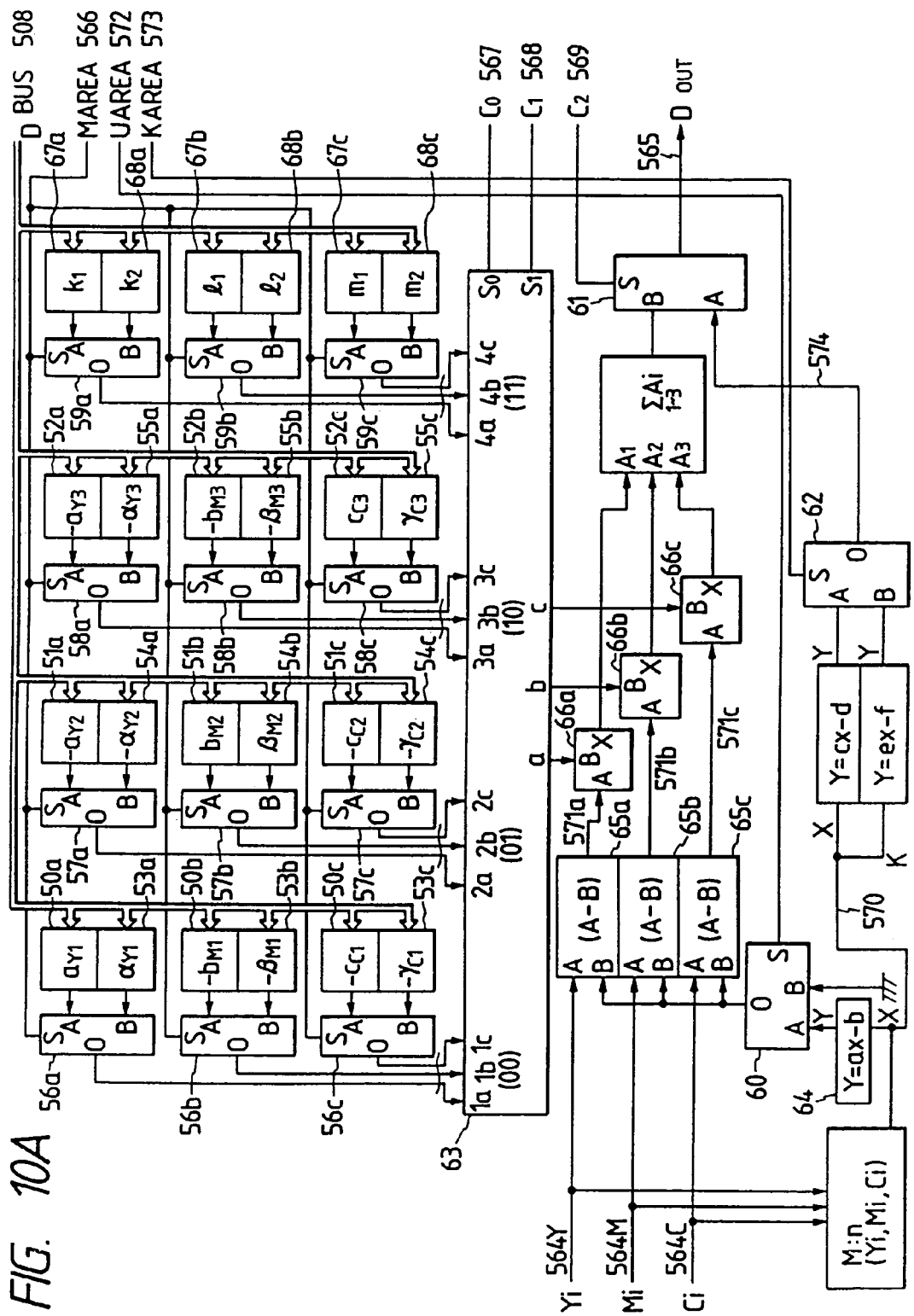
FIG. 10A is a block diagram showing an arrangement of a color correction circuit 49 shown in FIG. 2.

A minimum value Min(Yi,Mi,Ci) (i.e., a minimum value of Yi, Mi, and Ci) is calculated from the color components Yi, Mi, and Ci, and the calculated value is defined as inking (black). Thereafter, an addition of a black toner (inking), and reduction of the respective color components in accordance with an amount of black component added, i.e., undercolor removal (UCR), are often performed. A circuit arrangement of the color correction circuit 49 for performing masking, inking, and UCR is shown in FIG. 10A. The characteristic features of this circuit are as follows:

(1) Two masking matrices are used and can be switched at high speed by a "1/0" state of one signal line.

(2) The presence/absence of UCR can be switched at high speed by a "1/0" state of one signal line.

(3) Two systems for determining an amount of black toner are switched at high speed by a "1/0" state.

Prior to image reading, a desired first matrix coefficient M1 and a desired second matrix coefficient M2 are set through a bus connected to the CPU 22. In this embodiment, the coefficients are given as follows:

$$M1 = \begin{pmatrix} aY1 & -bM1 & -cC1 \\ -aY2 & bM2 & -cC2 \\ -aY3 & -bM3 & cC3 \end{pmatrix}$$

$$M2 = \begin{pmatrix} \alpha Y1 & -\beta M1 & -\gamma C1 \\ -\alpha Y2 & \beta M2 & -\gamma C2 \\ -\alpha Y3 & -\beta M3 & \gamma C3 \end{pmatrix}$$

The coefficient M1 is set in registers 50 to 52, and the coefficient M2 is set in registers 53 to 55.

Each of selectors 56 to 62 selects A when S terminal="1" and B when S terminal="0". In order to select the matrix M1, a switching signal MAREA 566="1" is set. The switching signal 566 is set to "0" for the matrix M2.

A selector 63 selects one of outputs a, b, and c on the basis of a truth table in FIG. 10B in response to select signals C0 and C1 (567 and 568). The select signals C0 and C1 and a select signal C2 correspond to color signals to be output. These signals (C2,C1,C0) are output as (0,0,0), (0,0,1), (0,1,0), and (1,0,0) in an order of, e.g., Y, M, C, and Bk.

These signals are also output as (0,1,1) serving as a monochromatic signal, thereby obtaining color signals corrected to desired colors. The select signals C0, C1, and C2 are output by the CPU 22 in accordance with an image forming sequence of the color printer 2. If (C0,C1,C2)=(0,0,0) and MAREA 566="1", then the contents of registers 50a, 50b, and 50c, i.e., (aY1,−bM1,−cC1) appear at the output (a,b,c) of the selector 63. On the other hand, a black component signal 570 calculated as Min(Yi,Mi,Ci)=k in accordance with the input signals Yi, Mi, and Ci is subjected to primary conversion as Y=ax−b (where a and b are constants) by a subtracter 64. The converted signal is input to the B inputs of subtracters 65a, 65b, and 65c through the selector 60. The subtracters 65a, 65b, and 65c calculate Y=Yi−(ak−b), M=Mi−(ak−b), and c=Ci−(ak−b) as undercolor removal signals. These signals are input to multipliers 66a, 66b, and 66c for masking through signal lines 57a, 571b, and 571c, respectively. The selector 60 is controlled by a signal UAREA 572. The signal 572 can switch the presence/absence of UCR (undercolor removal) at high speed in accordance with its logical state of "1/0".

The A inputs of the multipliers 66a, 66b, and 66c receive the signals (aY1, −bM1, and −cC1), and the B inputs receive signals [Yi−(ak−b), Mi−(ak−b), and Ci−(ak−b)]=[Yi, Mi, and Ci]. As is apparent from FIG. 10A, Yout=Yi×(aY1)+ Mi×(−bM1)+Ci×(−cC1) is obtained at an output Dout under the condition C2=0 (selection of Y, M, or C). Therefore, masking color correction and UCR processing are performed, and the resultant yellow image data can be obtained. Similarly, the following outputs appear at the Dout:

Mout=Yi×(−aY2)+Mi×(bM2)+Ci×(−cC2)

Cout=Yi×(−aY3)+Mi×(−bm3)+Ci×(cC3)

Color selection is controlled by the CPU 22 by the table shown in FIG. 10B in an order of outputs to the color printer. Registers 67a, 67b, and 67c, and registers 68a, 68b, and 68c are monochromatic image forming registers output MONO=k1Yi+l1Mi+m1Ci upon weighting and additions as in the principle of masking color correction.

A switching signal MAREA 566, the switching signal UAREA 572, and a switching signal KAREA 573 have the following functions. The signal MAREA 566 is used to switch between the masking color correction coefficient matrices M1 and M2 at high speed. The signal UAREA 572 switches the UCR presence/absence at high speed. The signal KAREA 573 switches primary conversion of the black component signal (i.e., Dout through a signal line 574 and the selector 61), i.e., switches Y=ck−d or Y=ek−f (c, e, and f are constant parameters) in response to the K=Min (Yi,Mi,Ci) at high speed. For example, the masking coefficient, a UCR amount, or an inking amount is changed in units of areas in one copy image. The system of this embodiment is suitable when images-obtained from image input sources having different color separation characteristics or a plurality of images having different black tones are synthesized. The area signals MAREA, UAREA, and KAREA (566, 572, and 573) are generated by an area generator (a black character processing circuit 69 in FIG. 2).

Figure 12A:
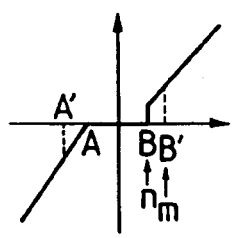
FIGS. 12A, 12B, 12C, and 12D are views for explaining an operation of the circuit shown in FIG. 11.
Figure 12B:
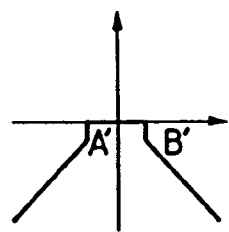
Figure 12C:
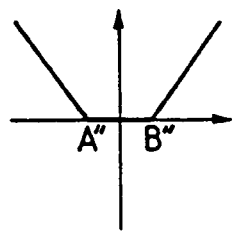
Figure 12D:
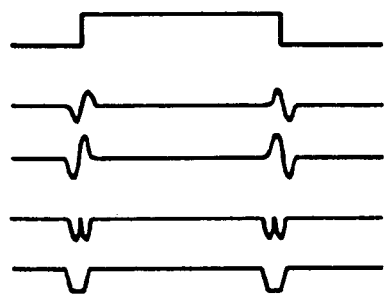

The back character processing circuit 69 for improving black reproduction of a black character or a black thin line in an original and blurring at an edge portion of a black thin line will be described with reference to FIGS. 11 to 12D.

Color signals 559R, 559G, and 559B of R, G, and B (red, green, and blue) black- and white-corrected by the black correction/white correction circuit 46 shown in FIG. 2 are subjected to masking and UCR processing by the color correction circuit 49, and color signals to be output to the printer are selected and output to a signal line 565. At the same time, in order to detect an achromatic edge portion (a portion of a black character or a black thin line) of an original from the signals R, G, and B, a luminance signal Y and color difference signals I and Q are calculated by a Y,I,Q calculation circuit 70 (FIG. 11).

A luminance signal Y575 is input to a 5-line line buffer circuit 71 to perform a 5×5 matrix calculation by a digital quadratic differential circuit 72 well-known to extract an edge signal. As described above, a Laplacian operation is performed by an operation circuit 72. That is, when the input luminance signal Y is a stepwise input (e.g., a character portion) in (i) of FIG. 12D, an output 576 upon Laplacian conversion is given as (ii) in FIG. 12D (to be called as an edge signal hereinafter). Look-up tables LUTA 73a and LUTB 73b are look-up tables to determine a printing amount (e.g., a toner amount) at an edge portion of a black character (or a black thin line) and comprise look-up tables having characteristics shown in FIGS. 12A and 12B, respectively. When the LUTA is operated in response to the edge signal 576, an amplitude is increased as shown in (iii) in FIG. 12D, and an amount of black toner at a back edge portion (to be described later) is determined. When the LUTB is operated in response to the edge signal 576, an absolute value is negative, and amounts of toners of Y, M, and C (yellow, magenta, and cyan) of the black edge portion are determined. This is a signal such as (iv) of FIG. 12D, and is transmitted through a smoothing (averaging) circuit 74 to obtain a signal shown in (v) in FIG. 12D.

An achromatic color detection circuit 75 outputs a signal according to characteristics shown in, e.g., FIGS. 12A to 12D so that "output"=1 for a perfectly achromatic color and "output"=0 for a chromatic color. This signal is selected by a selector 76 in response to a signal serving as a signal 577 of "1" in a black toner printing mode. The selected signal is gated with a signal 578 and is multiplied with a signal 579 ((iii) in FIG. 12D) by a multiplier 77 to determine an amount of black toner. A product signal is then added to an original image signal by an adder 78.

The Y, M, and C (yellow, magenta, and cyan) toners not preferably printed in black thin line portions during printing of the Y, M, and C. A signal of "1" is output to the multiplier by the selector 76 in response to the color selection signal 577. A signal ((v) in FIG. 12D) obtained by smoothing an output from a LUTB 736 is output from a selector 79. The same signal as that ((v) in FIG. 12D) is input to the adder 78, and only a black edge signal is subtracted from the original signal.

That is, a signal for determining the amount of black toner for a black edge portion has a large amplitude. In other words, the amount of black toner is increased, and the amounts of Y, M, and C toners for the same portion are decreased, thereby emphasizing the black portion.

A signal 581 as a binary signal obtained by binarizing an achromatic signal 580 by a binarization circuit 80b is set at level "1" for an achromatic color and "0" for a chromatic color. As described above, in the black toner printing mode (i.e., when 577="1"), S input="1", i.e., the A input or 579 ((iii) in FIG. 12D) is output from the selector 79, and the black edge is emphasized. In the Y,M,C toner printing mode (i.e., when 577="0"), the signal 581="1" is set. The B input is selected to decrease the amounts of Y, M, and C toners for an achromatic color, and the signal (v) in FIG. 12D is selected. However, as for a chromatic color, the signal 581=0, and therefore 581=1, i.e., the S input to the selector 79 is set at "1". The A input is selected, and the signal (iii) in FIG. 12D is output to the adder 78, thus performing known edge emphasis.

The LUTA 73a comprises two LUTs. One LUT which sets a zero output for an edge signal value of in or less, and the other LUT sets a zero output for the edge signal value of ±m or less. The LUTA 73a selects a value for clamping an input to zero in accordance with an original density, i.e., the level of the original signal 565. When a density level of an original is higher than a value set from the CPU 22 through the bus 58, i.e., the original density is high, an output from a comparator 81 is set at "1". In this case, the LUT clamped to zero at A' and B' in FIG. 12A is selected. When the density value of the original is smaller than the value set by the CPU 22, i.e., when the output from the comparator 81 is set at "0", the LUT clamped to zero at A and B is selected. Therefore, noise reduction can be effectively performed in accordance with density levels.

An output 583 from an AND gate 82 is obtained by further performing an improvement for an edge portion of a black character. The signal 583 is used to select an output from an AND gate 584 (B input) in the Y,M,C printing mode and an input 585 in other modes. A signal 586 input to the AND gate 585 is obtained by causing a binarization circuit 80a to binarize a signal obtained by giving the LUTC (FIG. 12C) characteristics to the edge signal. That is, when the absolute value of the edge signal exceeds a predetermined value, the signal 586 is set at "1". Otherwise, the signal 586 is set at "0". If 587="1", 581="1", and 588="L", then the amplitude of the edge signal is large and the color is an achromatic color. In other words, these conditions indicate an edge portion of a black signal, and printing of Y, M, and C toners. At this time, the signal for determining the amounts of Y, M, and C toners is subtracted from the original signal in a portion corresponding to the black edge, as previously described. The remaining signal is smoothed by an averaging circuit 84 and is output from an output 589 of the selector 83 when a signal ER is set at "1". Otherwise, the normally edge-emphasized signal 585 appears at the output 589 of the selector 83.

The signal ER is controlled by the CPU 22. When the signal ER is set at "1", an output from the averaging circuit 84 appears at the output 589. However, when the signal ER is set at "0", a signal of "0" at the output 589. This leads to an effect wherein the color toner signals (Y, M, and C signals) of the edge of the black color are perfectly disabled to eliminate color blurring. The above operations can be arbitrarily selected.

FIGS. 13A to 13F are views for explaining generation of area signals (MAREA 566, UAREA 572, and KAREA 573) in the area generator 69. An area is defined as a portion indicated by a hatched portion, e.g., in FIG. 13E. This area is represented by a signal such as a signal AREA in the timing chart of FIG. 13E every line, i.e., every HSYNC during the sub-scan period and should be distinguished from other areas. The area defined above can be designated with the digitizer 16 or the like.

FIGS. 13A to 13D are views for programmably obtaining a large number of area signal positions, a large number of section lengths, and a large number of sections by the CPU 22. In this arrangement, one area signal is generated by one bit of a RAM accessed by the CPU. For example, in order to obtain n area signals AREA0 to AREAn, two n-bit RAMs are prepared (85A and 85B in FIG. 13D).

Figure 13A:
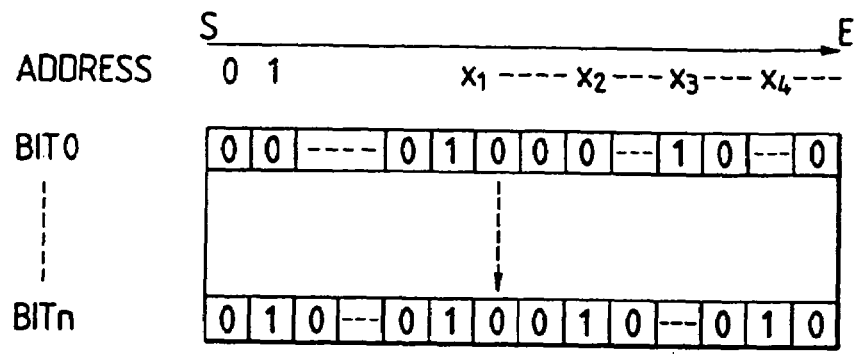
FIGS. 13A, 13B, 13C, 13E, and 13F are views for explaining area signals generated by an area generator 69.
Figure 13B:
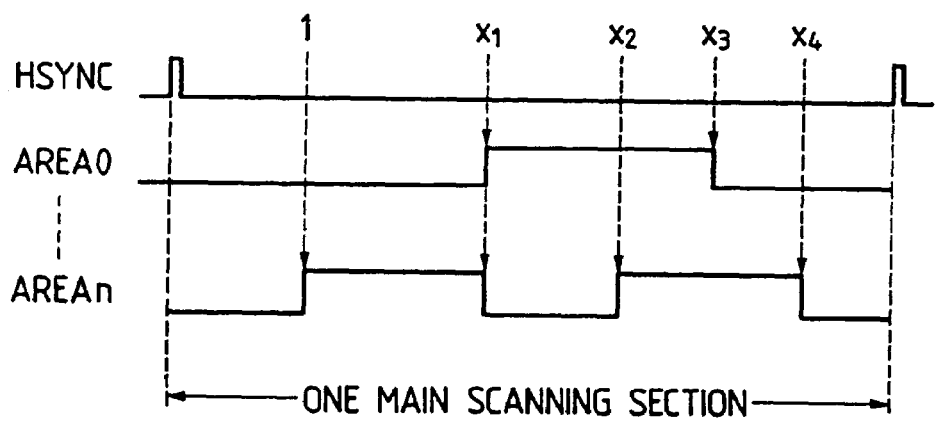

In order to obtain the signals AREA0 and AREAn shown in FIG. 13B, bits 0 of addresses x1 and x3 of the RAM are set at "1", and remaining address bits 0 are set to be all "0"s.

Figure 13C:
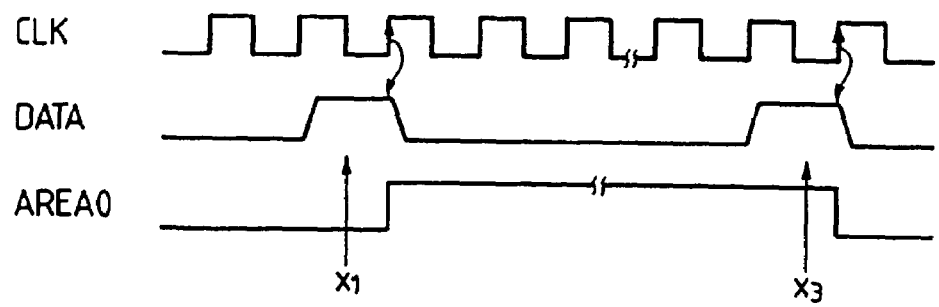

On the other hand, addresses 1, x1, x2, and x4 of the RAM are set to be "1", and the remaining address bits n are set to be all "0"s. When the data from the RAM are sequentially read out in synchronism with a predetermined clock with reference to the horizontal sync signal HSYNC. As shown in FIG. 13C, data of "1" are read at points of addresses x1 and x3. The readout data are input to J and K terminals of J-K flip-flops 86-1 to 86-n, and outputs appear as toggle outputs. That is, when the data of "1" is read out from the RAM and the clock CLK is input, the output is changed from level "0" to "1" or level "1" to "0". A section signal such as the signal AREA0 and then the area signal are output. When all the address bits are set to be all "0"s, no area section is generated, and any area is not designated.

Figure 13D:
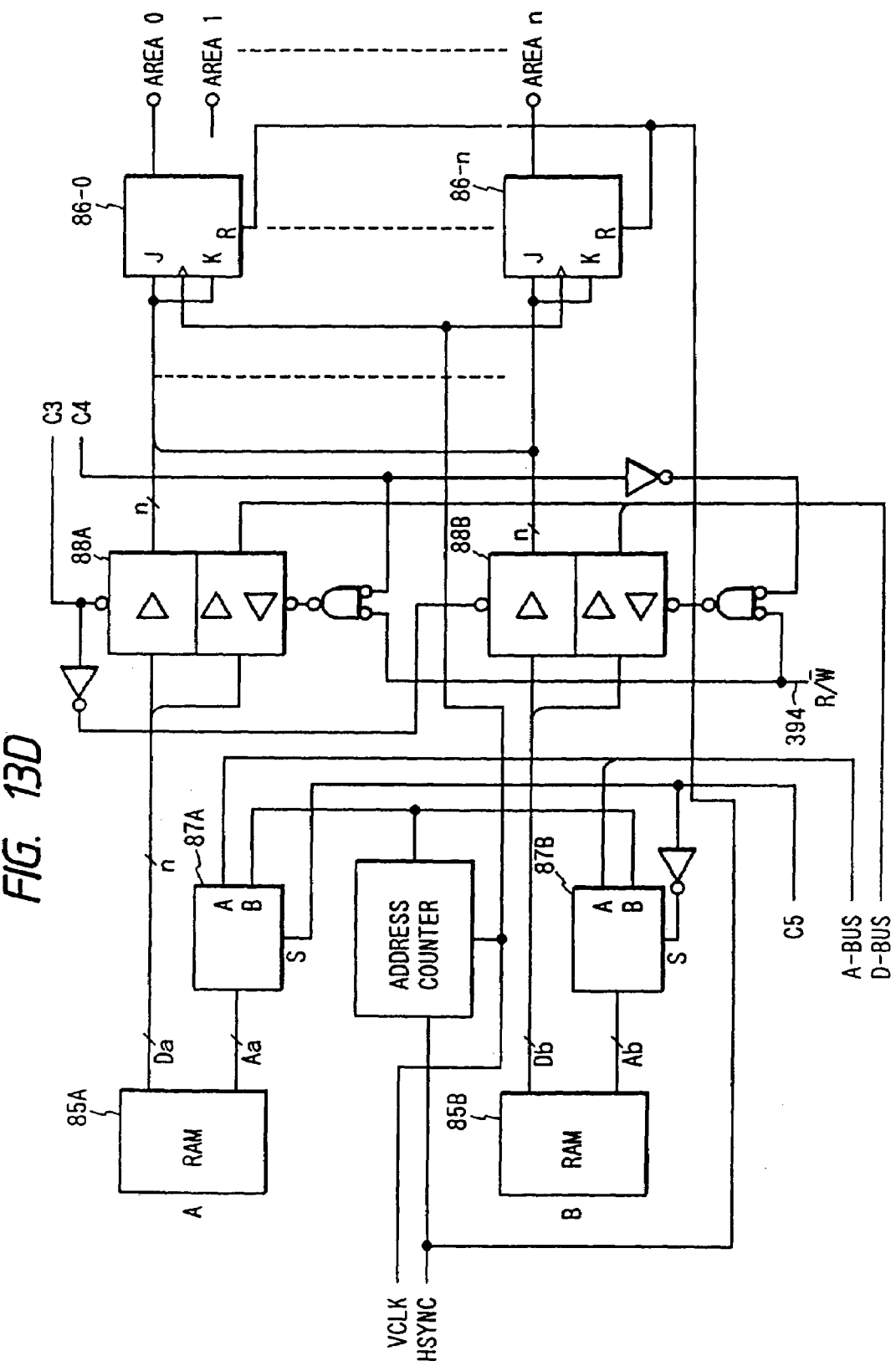
FIG. 13D is a block diagram of the area generator 69.
Figure 13E:
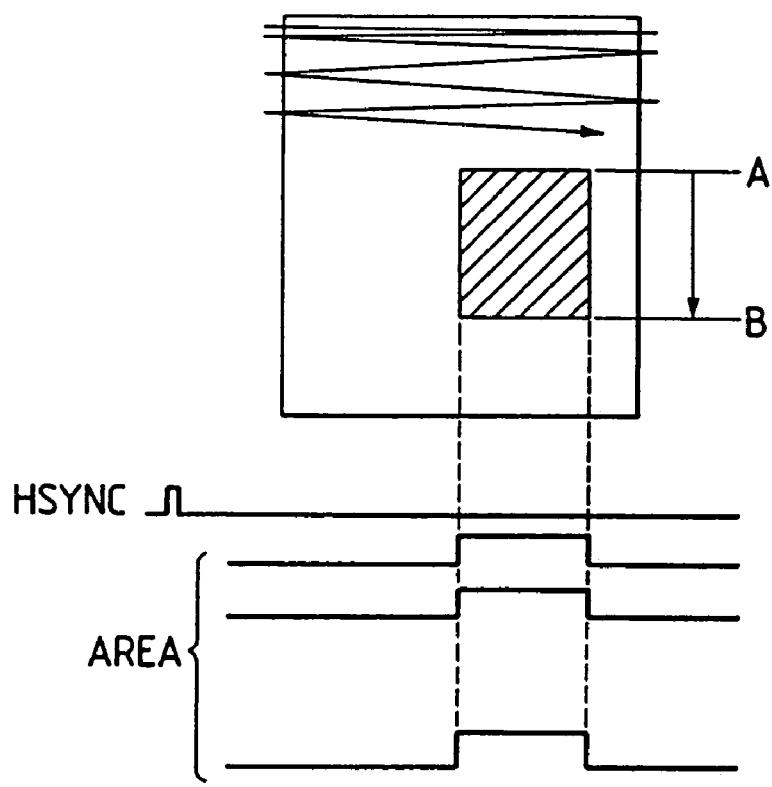
Figure 13F:
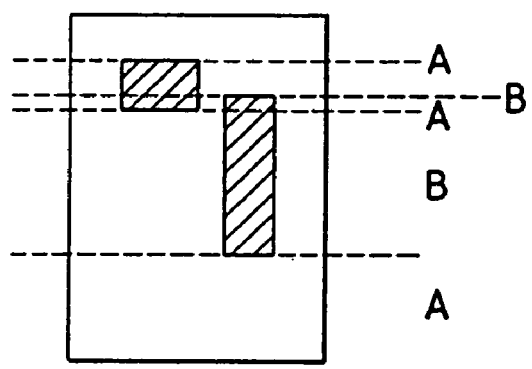

FIG. 13D shows a circuit arrangement of the above operation. This circuit includes the RAMs 85A and 85B. For example, data are read out from the RAMA 85A every switching of the area sections at high speed, while data are written in the RAMB 85B at different positions by the CPU 22. In this manner, section generation and memory write access from the CPU are alternately switched. When hatched areas shown in FIG. 13F are to be designated, the RAMA and RAMB are switched in an order of A, B, A, B, and A. As shown in FIG. 13D, if (C3,C4,C5)=(0,1,0), then a counter output counted by the signal VCLK is supplied as an address (Aa) to the RAMA 85A through a selector 87A, so that a gate 88A is enabled and a gate 88B is disabled to read out data from the RAMA 85A. An n-bit signal of a full bit width is input to the J-K flip-flops 86-0 to 86-n, and section signals of AREA0 to AREAn are generated in accordance with a set value.

Data is written from the CPU to the RAMA through an address bus A-Bus and a data bus D-Bus in accordance with an access signal R/W. However, when a section signal is to be generated on the basis of data set in the RAMB 85B, condition (C3,C4,C5)=(1,0,1) is set, thereby writing data from the CPU to the RAMA 85A.

Image processing such as cutting out (trimming) and frame omissions can be easily performed on the basis of, e.g., these area signals. That is, an area signal 590 generated by the area generator 69 in FIG. 2 is selected by a selector 89 in response to an area switching signal ECH 591 output from an I/O port 25 and is input to an AND gate 90. As is apparent from FIG. 13B, when the signal 590 is generated as indicated by AREA0, image cutting out is performed from the address x1 to the address x3. However, when a signal of AREAn is generated, a frame omission is performed between x1 and x2. Therefore, it is readily understood that image cutting out is performed during periods between 1 to x1 and between x2 to x4.

Figure 14A:
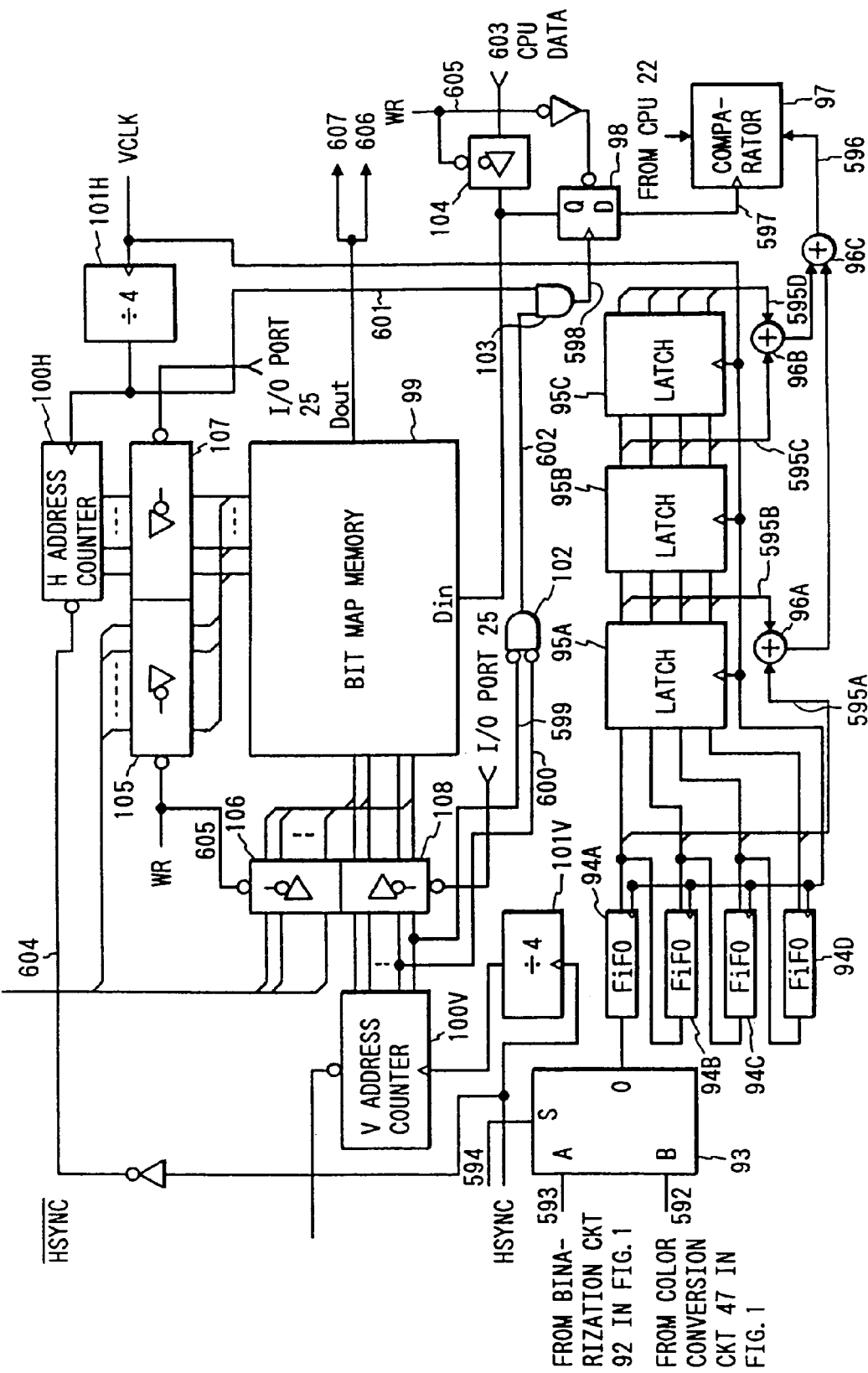
FIG. 14A is a block diagram showing an arrangement of an area limiting mask bit map memory 91.
Figure 14B:
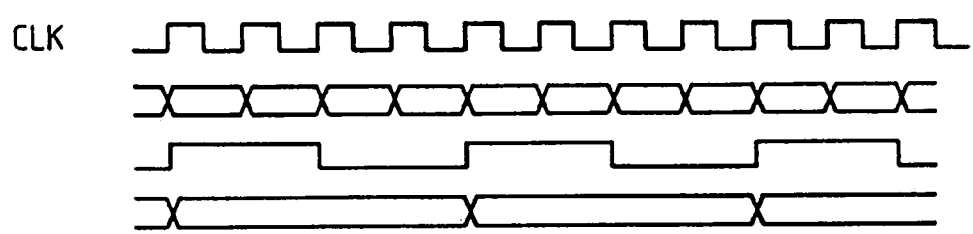
FIGS. 14B to 14D are views for explaining control timings of the mask bit map memory 91.
Figure 14C:
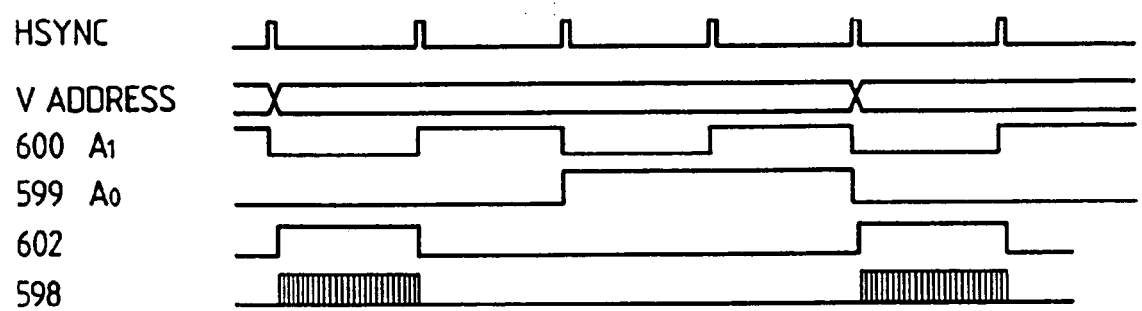
Figure 14D:
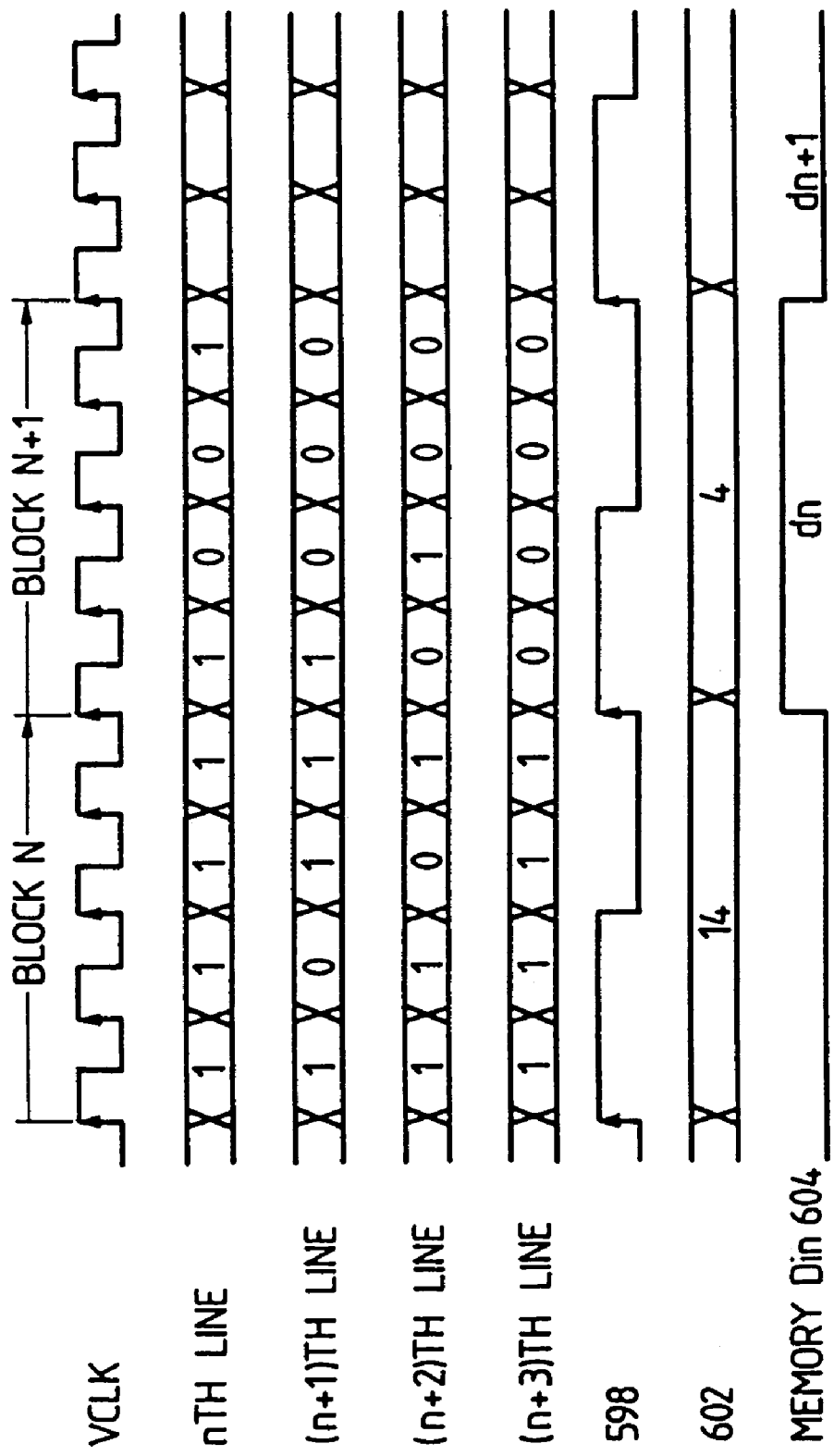
Figure 15:
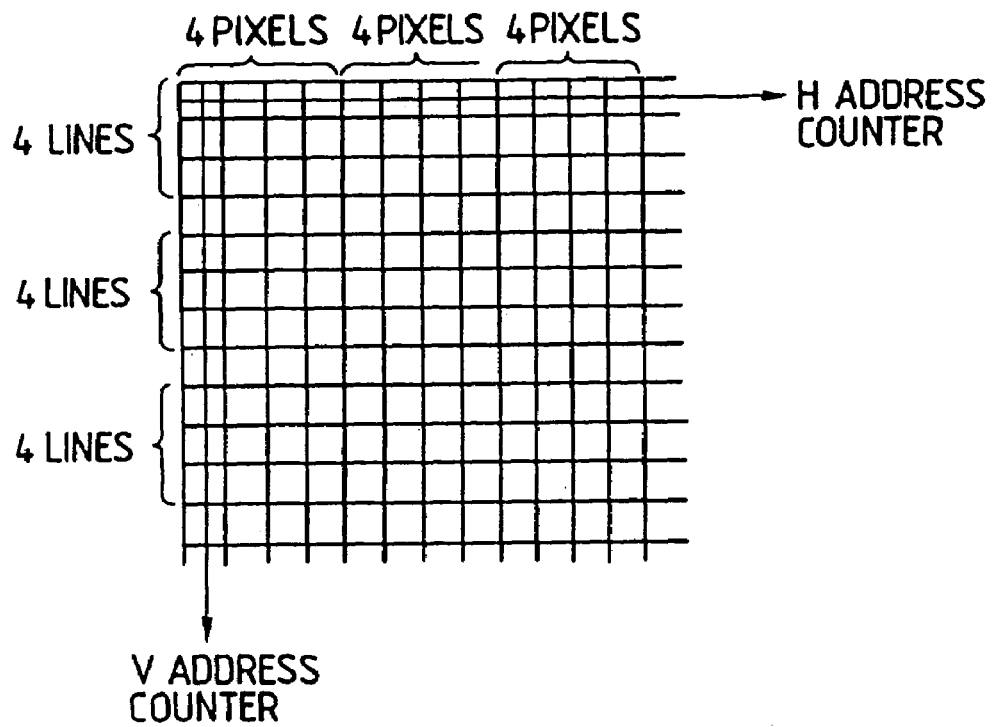
FIG. 15 is a view for explaining a relationship between the mask bit map memory 91 and original image pixels.

FIGS. 14A to 15 show an arrangement of an area limiting mask bit map memory 91 and control timings. As can be understood from FIG. 2, an area limiting mask for limiting an area to a specific color area in an original can be formed by a detection output 592 from a color conversion circuit (to be described later). An area control mask corresponding to a density value (or a signal level) can be formed by a signal 593 binarized by a binarization circuit 92 on the basis of the video image signal 560 input from the external image memory apparatus 3.

FIG. 14A is a block diagram of the area limiting mask bit map memory 91 and shows its detailed control. The mask has each block consisting of 4×4 pixels, as shown in FIG. 15. Each block corresponds to one bit of the bit map memory. For example, the bit map memory 91 can be constituted by two 1-Mbit RAM chips, i.e., (297×420×16×16)/16=2 Mbits, for an A3 size (=297 mm×420 mm).

The signals 592 and 593 input to a selector 93 in FIG. 14A are data input signals for mask generation. For example, when the output 593 from the binarization circuit 92 in FIG. 2 is selected by a switching line 594, the selected signal is input to buffers 94A, 94B, 94C, and 94D of 1 bit×4 lines to count "1"s in a 4×4 block. The FIFOs 94A to 94D are connected such that an output from the FIFO 94A is input to the FIFO 94B, and an output from the FIFO 94B is input to the FIFO 94C. The outputs from the FIFOs are input as 4-bit parallel data to latches 95A to 95C in response to the signal VCLK (timing chart in FIG. 14D). An output 595A from the FIFO and outputs 595B, 595C, and 595D from the latches 95A, 95B, and 95C are added by adders 96A, 96B, and 96C (signal 596), and sums are compared by a comparator 97 with a value (e.g., "12") set by the CPU 22 through the I/O port 25. That is, the comparator 97 determines whether the number of "1"s in the 4×4 block is larger than a predetermined value.

Referring to FIG. 14D, since the number of "1"s within a block N is "14, and the number of "1"s within a block (N+1) is "4", an output 597 from the comparator 97 in FIG. 14A is set to "1" for "14" but "0" for "4" and is latched by a latch 98 once in the 4×4 block in response to a latch pulse 598. A Q output from the latch 98 is input to the $D_{IN}$ input of a memory 99, i.e., serves as mask forming data. An H address counter 100H generates a main scan address of the mask memory, and one address is assigned to this counter by the 4×4 block. The address counter 100H counts up clock pulses obtained by frequency-dividing the pixel clock VCLK by a frequency divider 101H. Similarly, an address counter 100V generates a sub-scan address of the mask memory. The address counter 100V counts up clock pulses obtained by frequency-dividing the sync signal HSYNC of each line by a frequency divider 101V. The H and V addressing operations are controlled in synchronism with counting (addition) of "1"s within the 4×4 block.

Two lower rank bits 599 and 600 of the V address counter 100V are logically NORed by a NOR gate 102 to generate a signal 602 for gating a ¼ clock 601. A latch signal 598 is generated so that an AND gate 103 latches the signal 602 once within the 4×4 block, as shown in the timing chart of FIG. 14C. The CPU bus 508 (FIG. 2) includes a data bus 603 and an address bus 604. A signal 605 serves as a write pulse WR from the CPU 22. In the WR (write) mode for writing data from the CPU 22 to the memory 99, the write pulse WR is set to be "Lo" level, and the address and data buses from the CPU 22 are connected to the memory 99.

Predetermined data are randomly written in the memory 99. When the WR (write) and RD (read) operations are sequentially performed by the H and V address counters 100H and 100V, gates 107 and 108 connected to the I/O port 25 are enabled, and sequential address signals are input to the memory 99.

Figure 16:
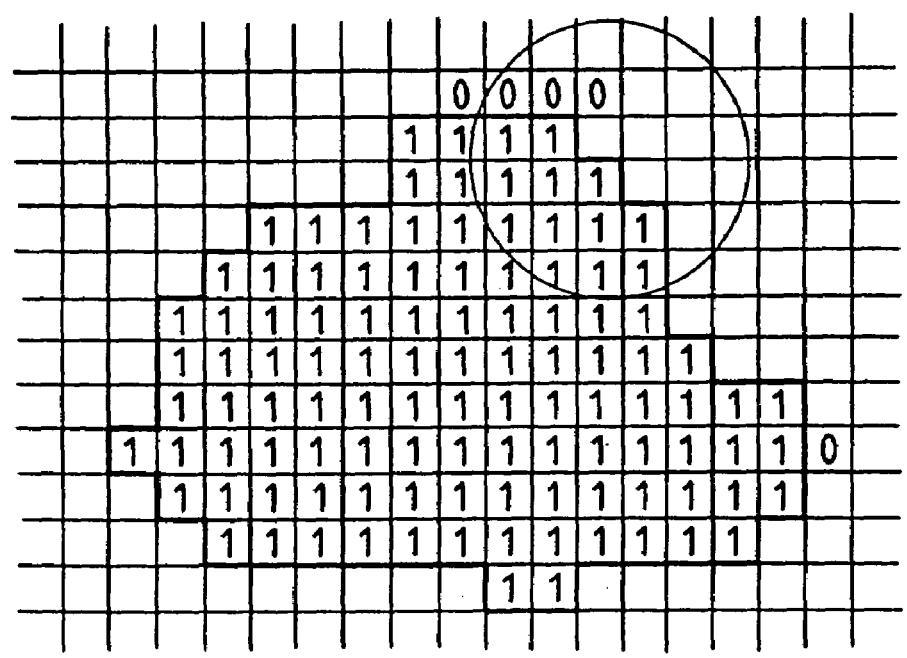
FIG. 16 is a view showing an internal structure of a mask memory formed in the mask bit map memory 91.

For example, when a mask shown in FIG. 16 is formed by the output 593 from the binarization circuit 92, the output 592 from the color conversion circuit, or the CPU 22, image cutting out or synthesis on the basis of the area within the thick frame line can be performed.

In the mask formed in units of 4×4 pixel blocks, an edge portion (boundary portion) of the block is stepwise due to the units of 4 pixels, and the stepwise boundary is smoothed by an interpolation circuit 109 shown in FIG. 2.

Figure 17A:
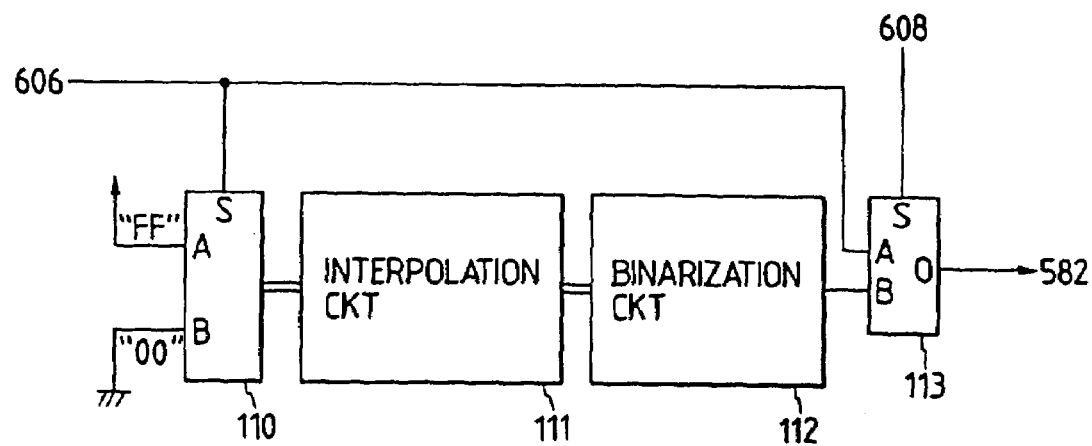
FIG. 17A is a block diagram showing an arrangement of an interpolation circuit 109 shown in FIG. 2.
Figure 17B:
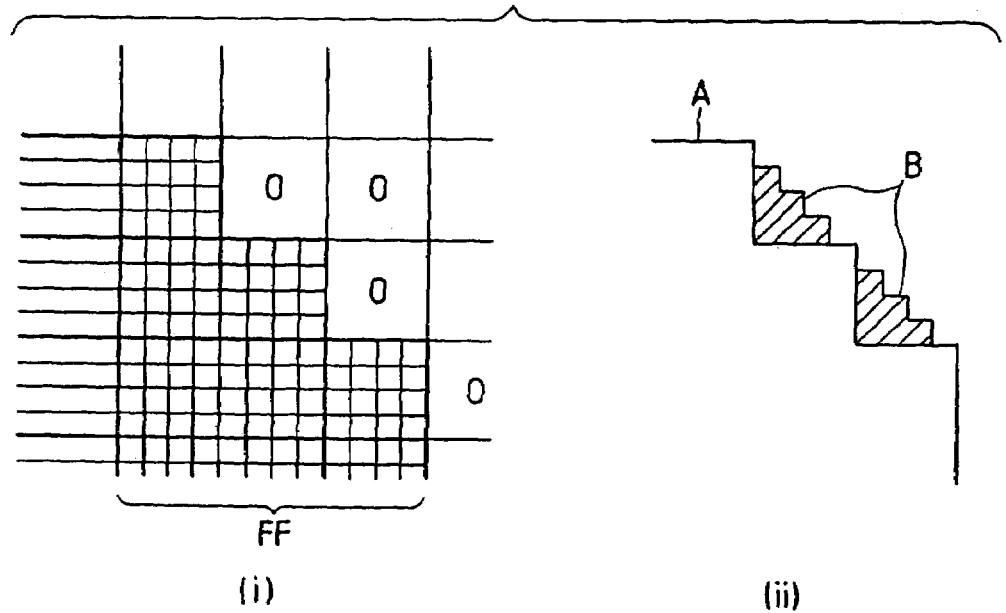
FIG. 17B is a view for explaining an operation of the interpolation circuit shown in FIG. 17A.
Figure 18A:
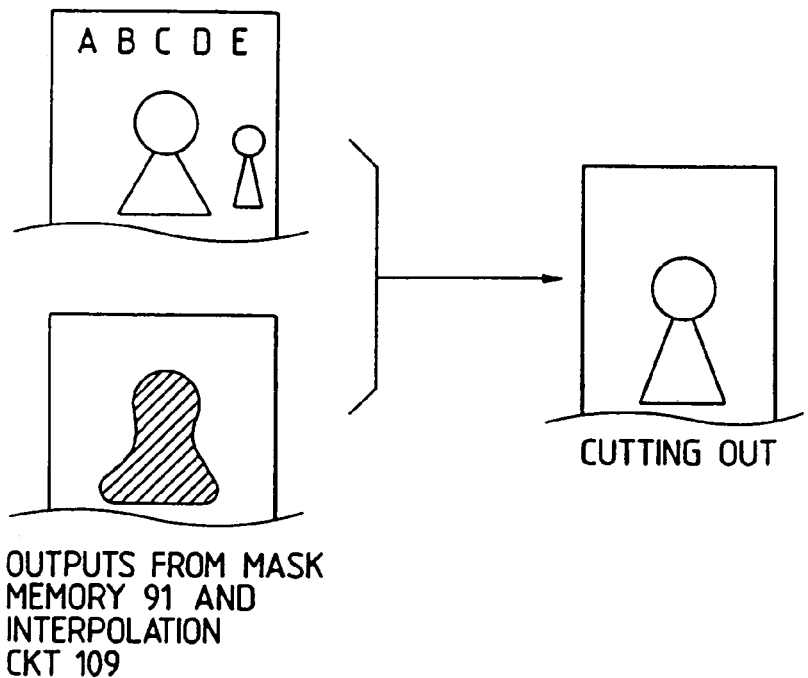
FIGS. 18A and 18B are views showing cutting out and synthesis on the basis of outputs from the mask memory 91, respectively.
Figure 18B:
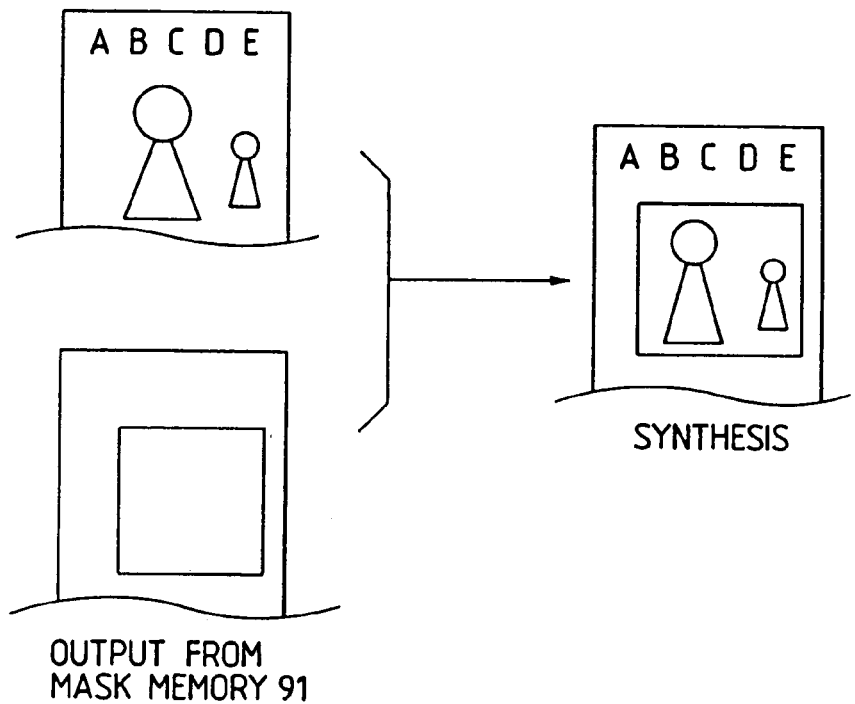

FIG. 17A is a block diagram of the interpolation circuit. The interpolation circuit includes a selector 110. The A input of the selector 110 receives a Hi clamp input, i.e., FFH (in the case of 8 bits), and the B input of the selector 110 receives a GND level, i.e., 00H. The selector 110 selects one of the inputs in response to an output 606 from the bit map memory. Data of FFH is input to an interpolation circuit 111 when an area is designated within the mask. Otherwise, data of 00H is input to the interpolation circuit 111, as shown in (i) of FIG. 17B. The interpolation circuit 111 may employ any interpolation method such as linear interpolation, higher-order interpolation, or sinc interpolation, and its circuit arrangement may be a well-known arrangement. An output from the interpolation circuit 111 is a multi-value output. This multi-value output is binarized by a binarization circuit 112. A boundary is smoothed as indicated by B in (ii) of FIG. 17B, as compared with a stepwise boundary indicated by A. The interpolation mode of the circuit shown in FIG. 17A is switched whether the output from the mask memory is directly output (A) or an interpolated mask signal representing a smooth boundary is output (B) in accordance with a switching signal 608 connected to the I/O port of the CPU 22, as needed. For example, when the interpolated output is selected by the signal 608 and the signal ECH is switched to select an output from the area limiting mask by the selector 89 shown in FIG. 2, non-rectangular figure cutting out can be performed by the mask using the AND gate 90, as shown in FIG. 18A. When the mask memory output from the bit map memory 91 is extracted through a signal line 607 shown in FIG. 2, is selected by a selector 114, and is synthesized by the sythesization circuit 115, an output is obtained, as shown in FIG. 18B.

Figure 19:
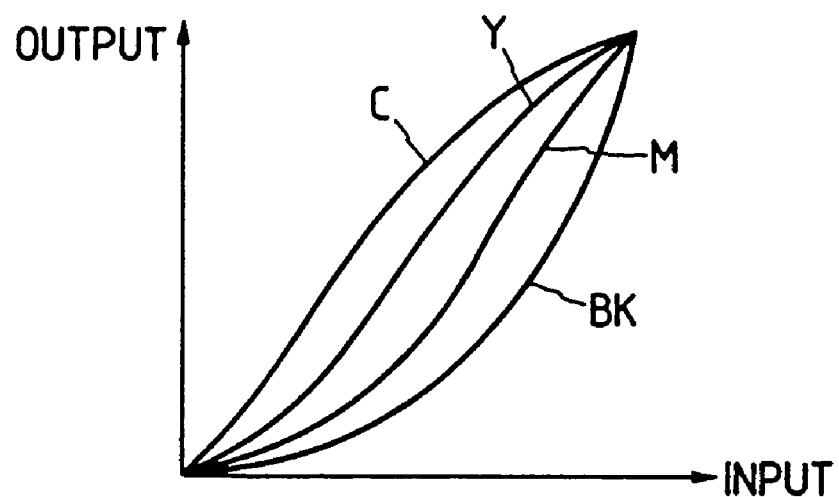
FIG. 19 is a graph showing characteristics of a density conversion circuit 116.
Figure 20A:
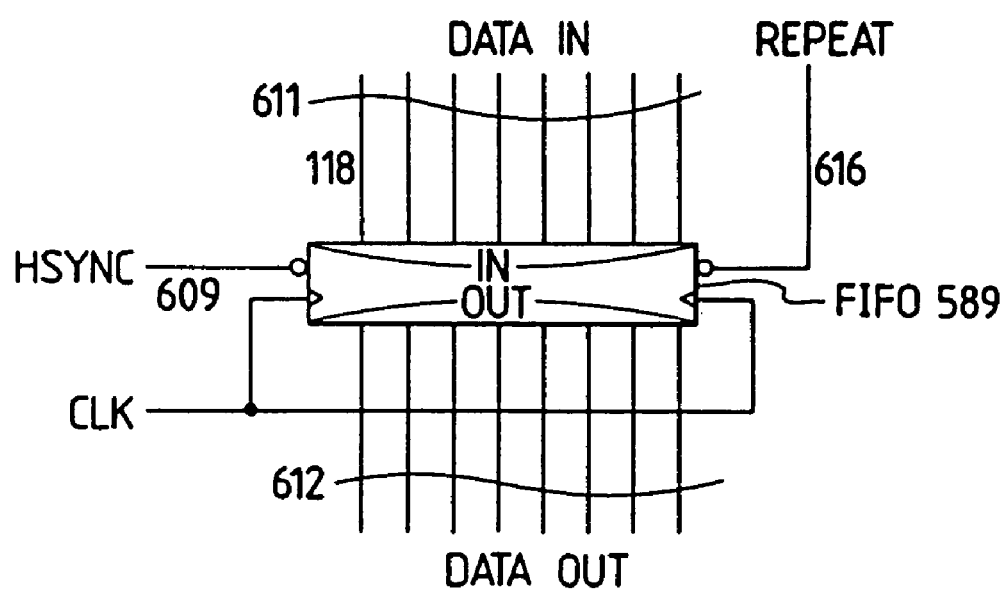
FIG. 20A is a block diagram showing an arrangement of a repeat circuit 118.
Figure 20B:
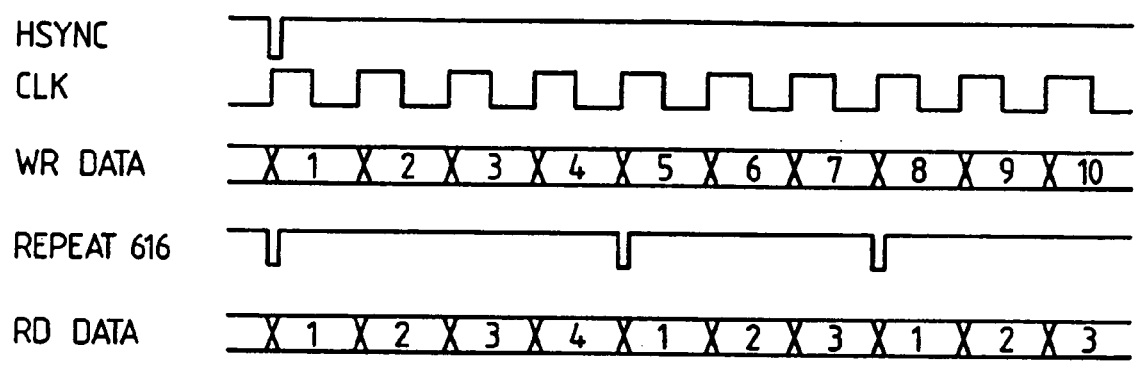
FIG. 20B is a timing chart for explaining an operation of the repeat circuit 118.
Figure 20C:
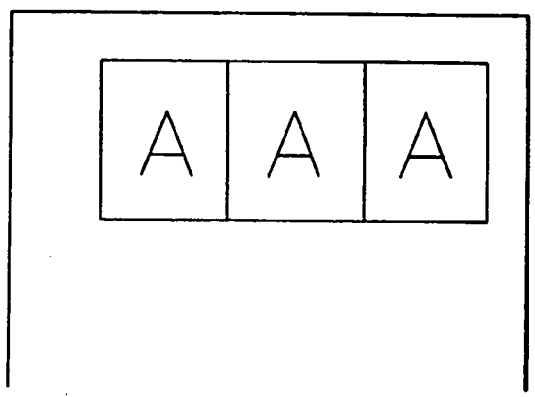
FIG. 20C is a view showing an output result of the repeat circuit 118.

A density conversion circuit 116 shown in FIG. 2 can change the density and gradation in units of colors, as shown in FIG. 19 and comprises an LUT (look-up table). A repeat circuit 118 comprises a FIFO, as shown in FIG. 20A. A signal 609 serves as an HSYNC signal, as shown in FIG. 20B. The signal 609 of Lo level is input as a line sync signal every line to initialize a WR (write) pointer (not shown) in the FIFO. The FIFO 589 receives input image data 611 and outputs output image data 612. A signal Repeat 616 initializes an RD (read) pointer. As shown in the timing chart of FIG. 20B, data 1 to 10 sequentially written in the FIFO are repeatedly read out in an order of 1, 2, 3, 4, 1, 2, 3, 1, 2, and 3 in response to the Repeat signals 616. That is, by supplying the identical Repeat signals 616 to the FIFO every line, identical images are repeated, as shown in FIG. 20C. Therefore, as shown in FIG. 21A, data of "1" is written in the bit map mask area forming memory and is read out and synthesized by the synthesization circuit 115 shown in FIG. 1, thereby forming a dotted line (cutting line).

As described above, the area generator 69 controls to cause the repeat circuit 118 to generate the Repeat signal at timings ① and ② in FIG. 21A, and a cutting line can be formed for the repeated images. As shown in FIG. 21B, data of "1" is written to form a ruled line as shown in FIG. 21C, thereby forming a black frame for each image. An image signal 612 output from the repeat circuit 118 is input to the image synthesization circuit 115 and is subjected to various kinds of image processing.

<Synthesis>

The synthesization circuit will be described in detail with reference to FIG. 25A.

Figure 25A:
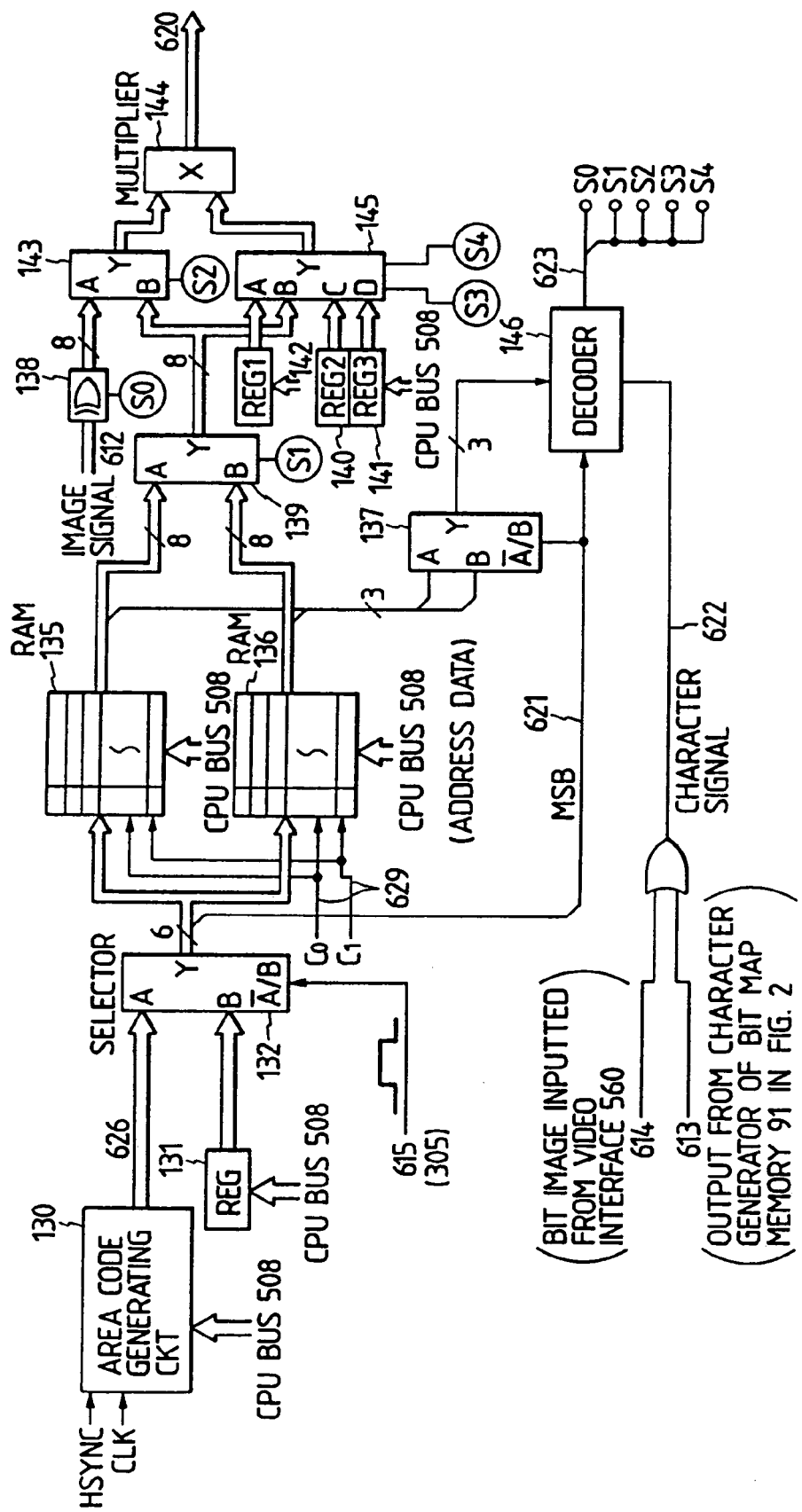
FIG. 25A is a block diagram showing an arrangement of a synthesization or synthesis circuit 115.

Editing processing in the synthesization circuit is programmably performed on the basis of data set in RAMs 135 and 136 shown in FIG. 25A in units of designated areas. That is, data are processed in units of code numbers (to be referred to as area codes hereafter) obtained by an area code generating circuit 130 (to be described in detail later).

The above area designation and the various kinds of editing processing are performed by setting parameters corresponding to editing processing. These parameters are set in the area code generating circuit 130, the RAMs 135 and 136, and registers 140 to 142 through the CPU bus 508 by the CPU in accordance with commands from the digitizer 16, the operation unit 20, and the image memory apparatus 3.

Figure 25B:
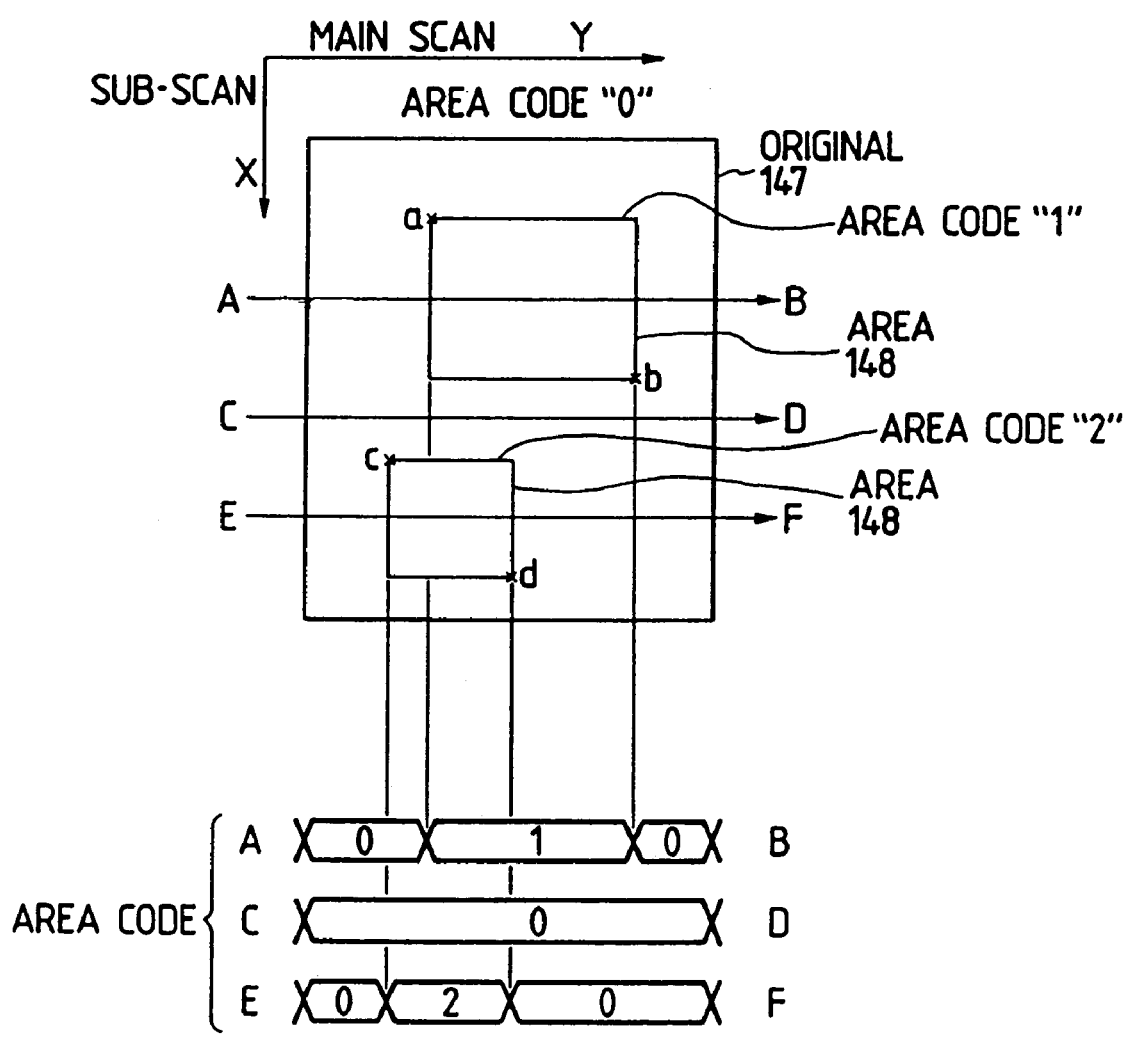
FIG. 25B is a view showing a relationship between an area code and an area on an original.

Referring to FIG. 25A, a selector 132 selects the output from the area code generating circuit 130 or a register 131. The area code generating circuit 130 automatically generates an area code in response to the sync signal HSYNC and the clock CLK. The register 131 receives a signal from the CPU bus 508. The RAMs 135 and 136 store tables of area codes and processing or image data in correspondence with the area codes. The table contents of the RAMs 135 and 136 are given such that codes input through the selector 132 as input address signals and the codes C0 and C1 representing image colors in surface sequential image formation of the printer are input, and a 3-bit function code and 8-bit data are output, as shown in FIG. 25F. The 3-bit function code is supplied to a decoder 146 through a selector 137. An example of the function code is a character add-on command or a masking command for a specific image area (to be described later). Examples of the 8-bit data are various image processing parameters (e.g., density control data of the image signal). Selectors 139, 143, and 145 are switched in response to decoder outputs S0, S1, S2, S3, and S4. A multiplier 144 multiplies outputs from the selectors 143 and 145. A decoder 146 decodes a most significant bit MSB 621 (this is output from the area code generating circuit 130 to be set at "1" at the end of each area of the image, as shown in FIG. 25E) of 6-bit data input through the selector 132, character signals represented by signals 613 and 614 in FIG. 2, and the function code input through the selector 137.

The area code will be described below. The area code is defined as a means for distinguishing one area from another. That is, area codes or area numbers are assigned to areas 148 upon their designation with the digitizer 16 on an original 147, as shown in FIG. 25B. In this embodiment, the entire area of the original is assigned with area code "0". As shown in FIG. 25B, a rectangular area having a diagonal line connecting points a and b is assigned with area code "1", and a rectangular area having a diagonal line connecting points c and d is assigned with area code "2". The area code is generated at a timing (the lower part of FIG. 25B) synchronous with scanning when a section A-B is scanned, as shown in FIG. 25B. This can apply to sections C-D and E-F. The area codes are generated simultaneously with scanning of the original, and the areas are distinguished from each other, thereby performing different kinds of image processing and editing in units of areas in real time.

The above setting operations are performed with the digitizer 16 and the operation unit 20. The maximum number of set area is determined by the number of bits of the area code. If the area code is an n-bit code, a maximum of $2^n$ areas can be set.

Figure 25C:
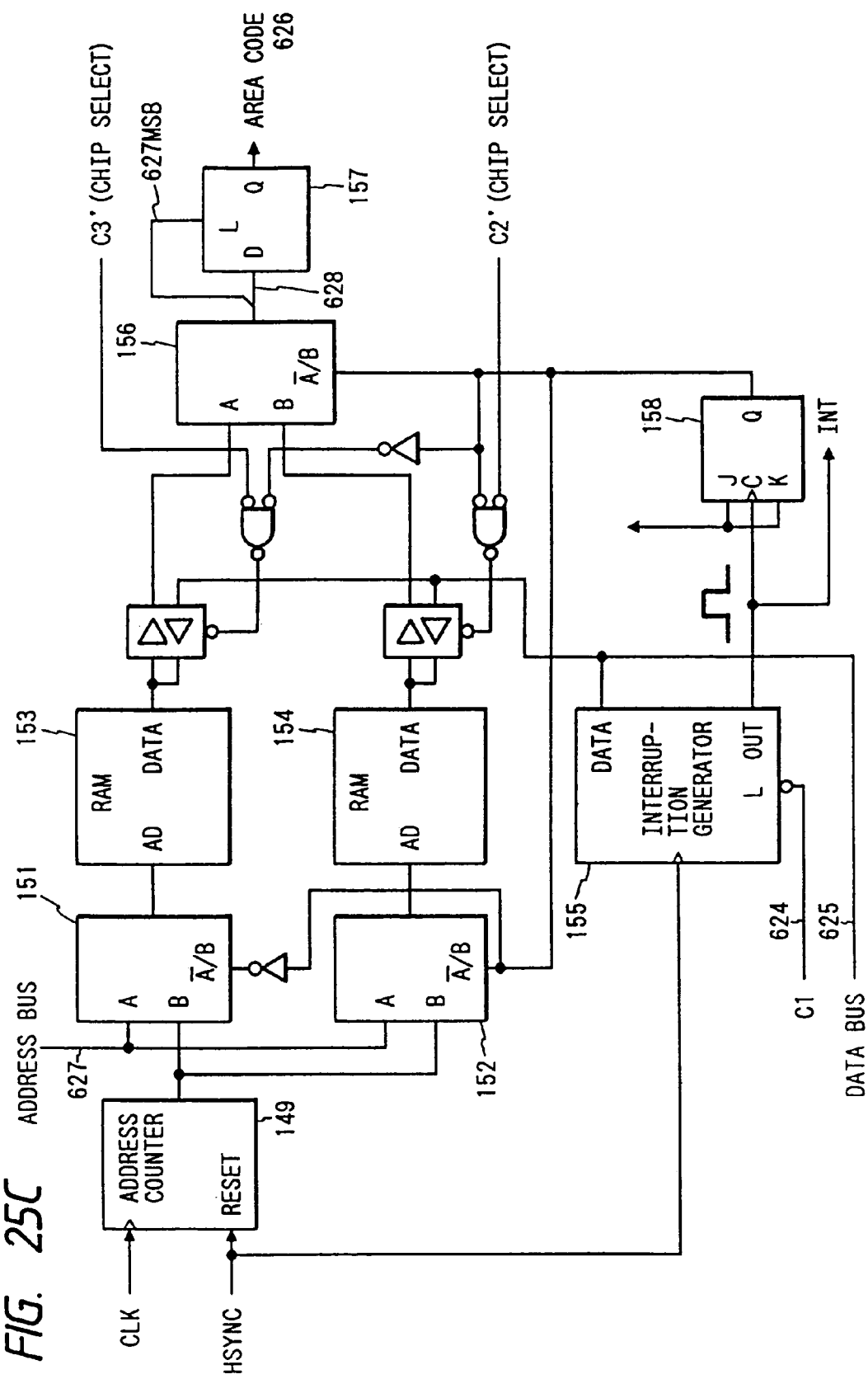
FIG. 25C is a view showing an arrangement of an area code generating circuit 130.

FIG. 25C shows a schematic arrangement of the area code generating circuit 130 in FIG. 25A. The area code generating circuit 130 is a circuit for generating area codes in real time in synchronism with scanning of the original. Coordinates of an area obtained by an area designating means such as the digitizer and the area code are set, thereby programmably generating the area code. The generating circuit 130 will be described in detail below.

RAMs 153 and 154 comprise memories each having a one main-scan line capacity of 7 bits×1 word. These RAMs are connected to the CPU through a CPU address bus 627 and a data bus 625. An address counter 149 counts video clock pulses CLK to generate a RAM address. The counter 149 is reset in response to the signal HSYNC and supplies the same address to the RAMs 153 and 154 through selectors 151 and 152 every scanning of a new line. The RAMs 153 and 154 are reset and data can be read out from the beginning. An interruption generator 155 generates an interruption signal INT to the CPU when a programmed number of HSYNC pulses set by the CPU using a chip select signal 624 is counted. The interruption generator 155 switches the RAMs which can be read-accessed by the address counter 149 upon a toggle operation of a J-K flip-flop 158. Each of the selectors 151 and 152, and a selector 156 selects the A or B input to select the RAM 153 or 154.

Figure 25D:
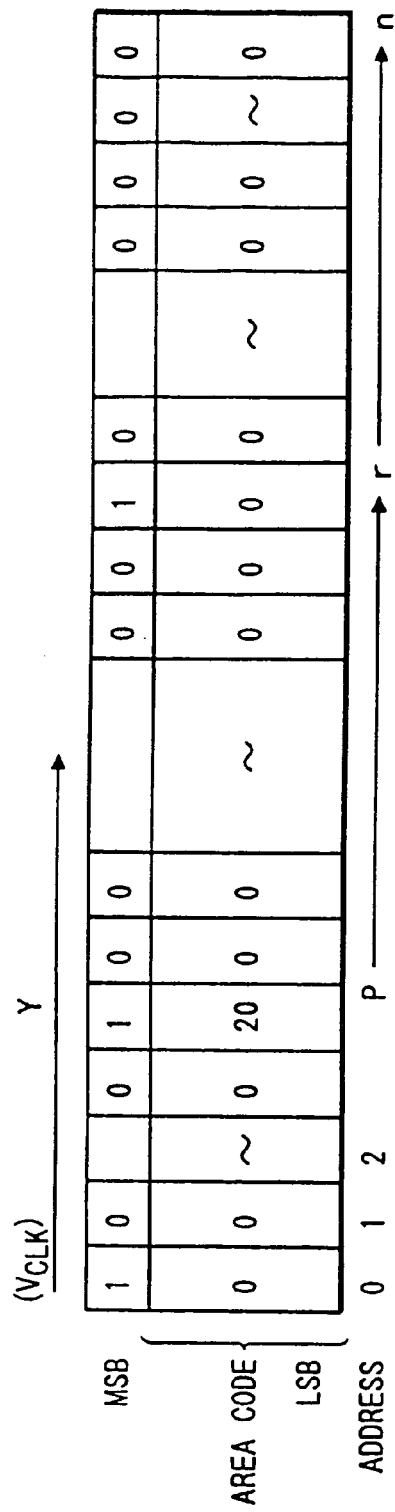
FIG. 25D is a view showing a data format of a RAM 153 or 154 shown in FIG. 25C.
Figure 25E:
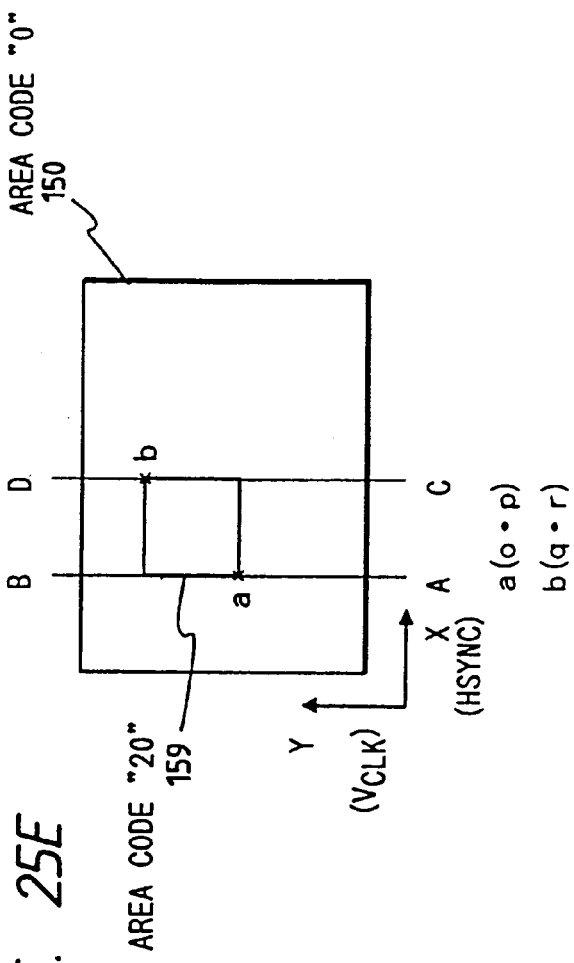
FIG. 25E is a view showing an area corresponding to the data shown in FIG. 25D.
Figure 25F:
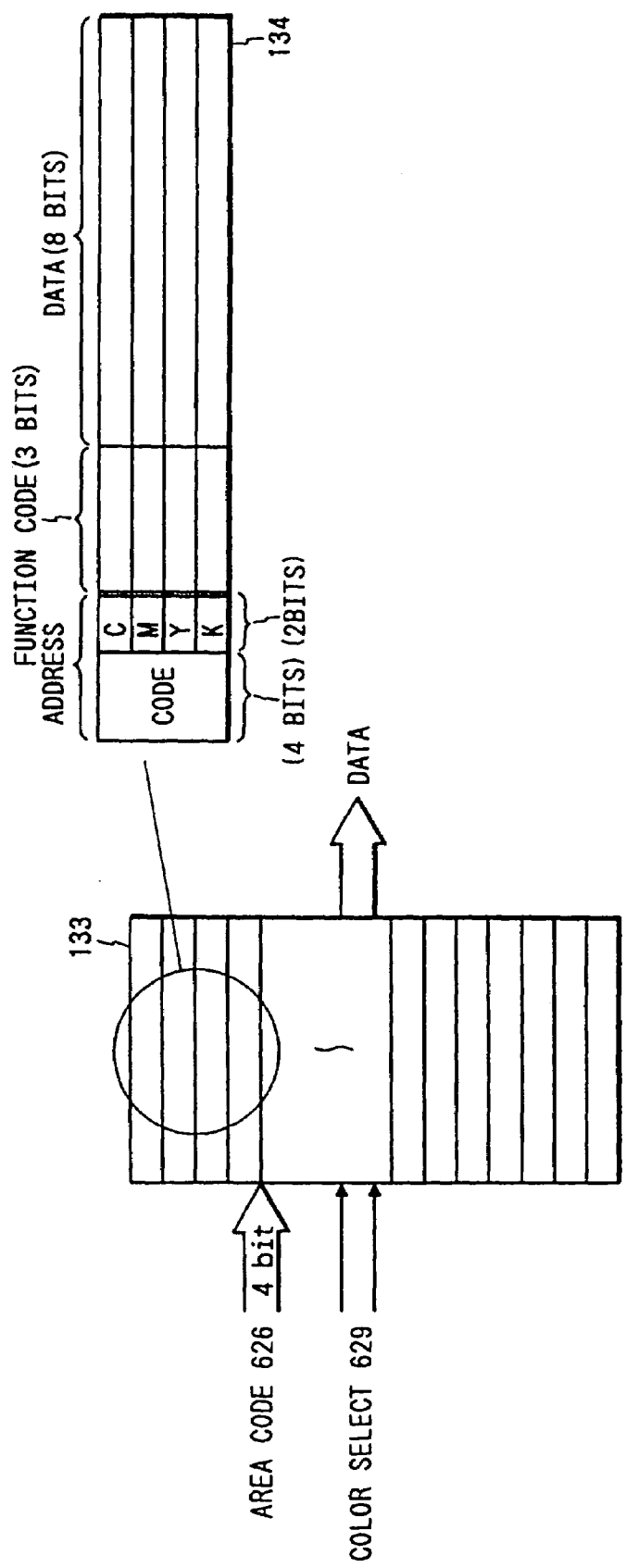
FIG. 25F is a view showing a data structure of a RAM 135 or 136 shown in FIG. 25A.

FIG. 25D is a view for explaining a data structure of the RAM 153 or 154. The memory bits are divided into an MSB bit and six lower rank bits. The MSB represents a change point between a designated area and a non-designated area. The six lower rank bits store a corresponding changing area code. The addresses of the RAM correspond to Y-coordinates in the main scan direction. FIG. 25D shows RAM data when a section A-B of a designated area 159 (area code "20") on an original 150 shown in FIG. 25E is scanned. In this case, the entire area of the original is assigned to area code "0". A set area is assigned with area code "20". The RAMs 153 and 154 are sequentially accessed in response to address signals generated by the address counter 149 of FIG. 25C to read out data, thereby generating area codes. For example, when the section A-B is to be scanned, as shown in FIG. 25E, the MSB is set at "1", and the six lower rank bits are set at all "0"s immediately after scanning, i.e., area code "0" is read out. As shown in FIG. 25C, the six lower rank bits are latched by a latch 157 in response to a latch signal given by the MSB 627, and area code "0" is output. When scanning reaches a point a(O,P), the MSB of the RAM output is set at "1", and the six lower rank bits are set to "20". The six lower rank bits are latched and area code "20" is then read out. That is, area code "20" is kept output from the latch 157 until a new address r is read out and new data is latched.

When scanning progresses and main scanning in the Y direction is completed, scanning advances by one pixel in the X direction. In this case, the signal HSYNC is counted by the interruption generator 155, and the address counter 149 is reset, as previously described. The address from the address counter 149 is then started from zero. Since the area is rectangular, the same data, i.e., one of the RAMs 153 and 154, is kept read out until the end of scanning of the section C-D including the point b in FIG. 25E. When a count (q-o in this case) of the HSYNC pulses in the X direction is set in the interruption generator 155, the interruption generator 155 generates the interruption signal INT when scanning from the section A-B to the section C-D is completed. At the same time, the RAM is switched by the selector 156 upon a toggle operation of the J-K flip-flop 158 in FIG. 25C. The next area information programmed by the CPU is output from the RAM selected by the selector 156. Upon generation of the interruption signal INT, the CPU sets a new area designation signal in the interruption generator 155 and the OFF RAM (i.e., the RAM which is not selected by the selector 156) in accordance with coordinates of an area obtained by the area designating means described above and the area code. This setting can be performed under the control of the data bus 625 from the CPU 22 and chip select signals C2' and C3'. With the above arrangement, i.e., alternate switching of the two RAMs, the area codes 626 for the entire surface of the original can be generated with a small memory capacity by programming the OFF RAM by the CPU.

The area code 626 generated by the area code generating circuit 130 shown in FIG. 25A is input together with an image signal to the selector 132. Editing processing in units of areas is performed on the basis of the input area code.

The area code generating circuit 130 generates area codes for rectangular areas. However, in this embodiment, the area code generating circuit 130 is arranged to cope with a non-rectangular area. For this purpose, the register 131 and the selector 132 are arranged.

The register 131 shown in FIG. 25A is connected to the CPU bus 508. Area codes corresponding to non-rectangular areas are stored in the register 131.

At this time, when a non-rectangular area signal 615 is input from the image memory apparatus 3, a value set in the register 131 is selected by the selector 132 using the signal 615 as a select signal. A non-rectangular area code corresponding to the input non-rectangular area signal is obtained.

The area code is a 6-bit code as previously described. The MSB 621 is input to the decoder 146 and the selector 137. The remaining six lower rank bits are input as a parallel signal to the RAMs 135 and 136.

The RAMs 135 and 136 are programmable memories connected to the CPU bus (including the data and address buses 625 and 627) 508.

FIG. 25F shows a data structure of the RAM 135 or 136. The RAM has a data structure 133. The RAM receives a 4-bit area code and a 2-bit color select signal 629 as address inputs, i.e., a total of six bits. At this time, the color select signals C0, C1, and C2 are converted into 2-bit signal, i.e., C0 and C1 starting from the LSB (least significant bit) to determine whether a surface sequential image signal represents one of the colors, so that the address is changed in units of area codes and colors.

In this embodiment, images are transferred to the printer in an order of M (magenta), C (cyan), Y (yellow), and Bk (black) in accordance with the surface sequential image formation scheme. At this time, kinds of colors to be transferred are represented by the color select 629 signals C0 and C1 shown in FIG. 25A (these signals are the same as the signals C0 and C1 shown in FIG. 10A). Its data structure 134 is shown in FIG. 25F. This data structure includes a 3-bit function code starting from the MSB. This code is decoded to perform different image processing operations in accordance with the different code contents. In this embodiment, since the 3-bit function code is used, a maximum of six image editing operations in units of area codes or colors can be performed. The eight lower rank bits are used to represent various parameters for image processing or editing in accordance with the contents of the function codes.

Data selected by the area code and the color select signal, i.e., a 3-bit function code extracted from the MSB is input to the selector 137 in FIG. 25A, and the 3-bit function codes from the two RAMs are switched by the area code MSB 621. The lower rank 8-bit data is selected by the selector 139 in response to the select signal S1 from the decoder 146.

The selected function code is input to the decoder 146 and is combined with a character signal 622 or the area code MSB bit 621, thereby generating a control signal 623 for performing editing processing. Each control signal is used as a selector select signal to perform editing by changing a signal flow. In this embodiment, the following six editing functions can be realized by the control signals:

[1] Through Processing within Area

This function is to output an image signal for the designated area without any processing. An input image signal passes through a negative/positive inverter (to be described later) 138 and is input to the multiplier 144 through the selector 143 in response to the select signal S2. One of the RAM data is selected by the selector 139 in response to the select signal S1. The signal is selected by the selector 145 in response to the select signals S3 and S4 and is multiplied with the image signal by the multiplier 144, and the product signal is output. At this time, the image density is determined by the RAM data input from the multiplier 144. When different counts are set for different colors sent in accordance with the surface sequential scheme, the density and the color balance can be variably controlled independently in units of areas.

When color balance of each area is set after the area is designated by the operator at the operation panel, the CPU writes these set values in the RAM 135 or 136 through the bus 508. The B input of the selector 145 is selected, and the selected signal is multiplied with the image signal 612 by the multiplier 144.

[2] Masking within Area

This function is to paint the entire area within a designated area uniformly with an arbitrarily color. For example, when this function is set and a given area is scanned, RAM data is selected in place of the image signal in response to the signal S2, and the selected signal is input to the multiplier 144. The register 142 is selected in response to the control signals S3 and S4, and an appropriate coefficient, e.g., "1" is stored from the CPU to the register 142 connected to the CPU through the CPU bus. The data is multiplied with the coefficient by the multiplier 144, and the product signal is output from the multiplier 144.

[3] Character Insertion within Area (1)

Figure 25G:
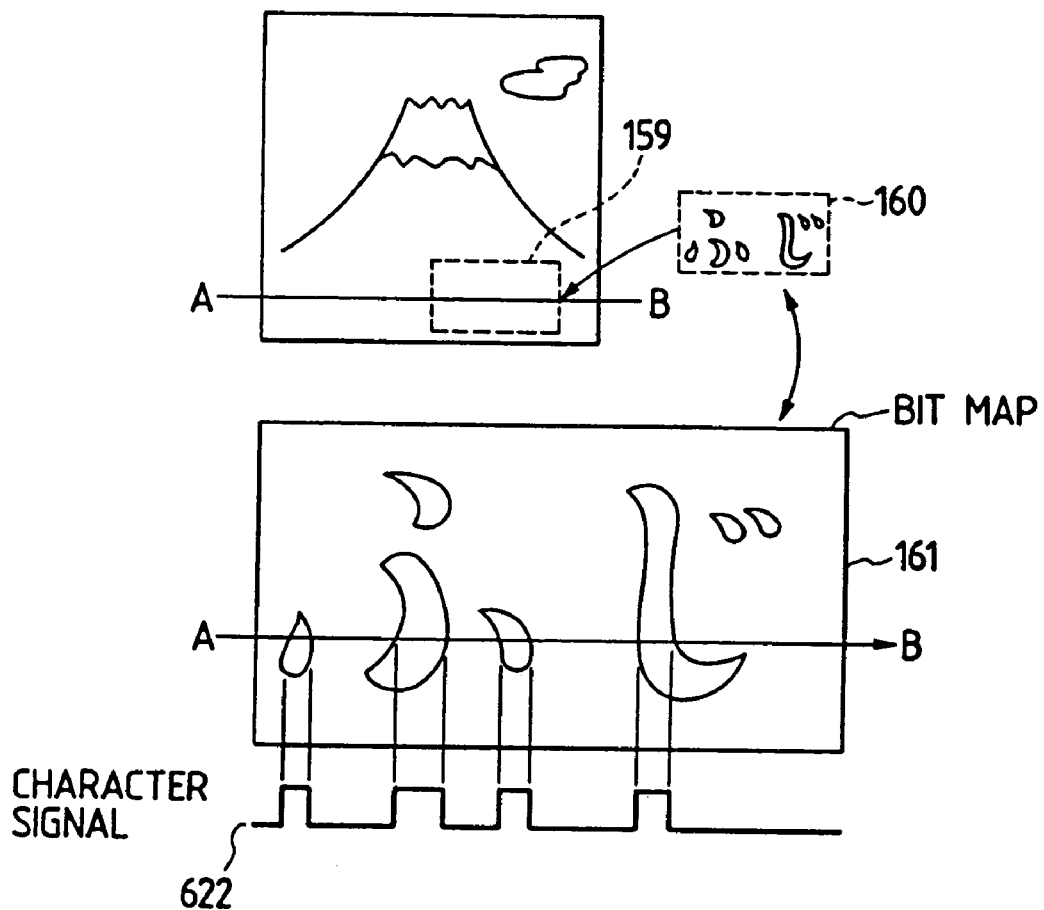
FIG. 25G is a view showing a state of synthesis shown in FIG. 25A.

For example, this function is to insert a character 160 in a designated area 159 of an image shown in FIG. 25G. For example, character data 161 is stored in the bit map memory. Binary data of a character is scanned and read out from the memory at a timing (FIG. 25G) simultaneously with scanning of the designated area, thereby generating a character signal 622. This signal is input as a character signal 622 shown in FIG. 25A to switch the selector 143. More specifically, when the character signal 622 is set at High level, the decoder 146 outputs signals S0 to S4 so that the selector 143 selects data from the RAM 135 or 136. When the character signal 622 is set at Low level, the decoder 146 outputs the signals S0 to S4 so that the selector 143 selects the image signal, thereby performing insertion of the character. The character signal and the control signals S3 and S4 are changed. The coefficient of the multiplier 144 is used to select the register 140 when the character signal 622 is set at High level. In the same manner as described above, the register 140 is connected to the CPU bus, and an appropriate coefficient is set in the register 140. The coefficient of "1" is normally set in the register 140. In particular, the coefficient set in the register 140 is changed to variably change the density of the insertion character.

[4] Character Insertion within Area (2)

Figure 25H:
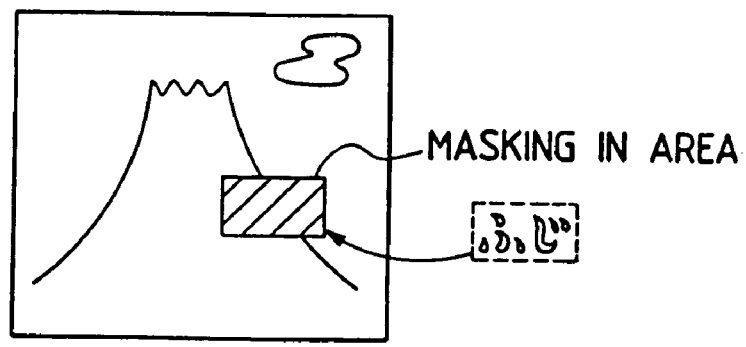
FIG. 25H is a view showing a state wherein masking is performed with a designated color within a designated area, and a character read out from the bit map memory is synthesized in the designated area.

This function is to mask a designated area with a designated color and to insert a character with another designated color within the designated area, as shown in FIG. 25H. During scanning of the designated area, the selector 143 selects the RAM data. As described above, the selector 139 is switched by the character signal obtained from the bit map memory shown in FIG. 25G. That is, when an input signal does not represent a character, data is output from the RAM 135. Otherwise, the RAM 136 is selected. Density data of a character within the designated area is written in the RAM 135, and the density data 135 of a portion except for a character data outside the area is written in the RAM 136 through the CPU 508.

The registers 142 and 140 are selected to output coefficients together with the character signal. The coefficients are operated in the multiplier 144, and the operation result is output from the multiplier 144.

Since the registers 140 and 142 are independently arranged, the densities of the character portion and the portion except for the character portion can independently set.

[5] Negative/Positive Inversion within Area

This function is to preform negative/positive inversion only for an image within an area and is to output it, by switching negative/positive inversion CKT 138 by means of a control signal SO. The output from the CKT 138 is output with a setting equal to that of the above through fanction.

[6] Insertion of Negative/Positive Inversion Character within Area

The character insertion function [1] is combined with negative/positive inversion within the area to insert a character in a negative/positive inversion image. A character inserting means is the same as that described above, and a detailed description thereof will be omitted.

In the embodiment described above, an operation of the decoder 146 shown in FIG. 25A is shown in FIG. 25I.

Numerals 1 to 6 in the leftmost column represent the functions [1] to [6] described above. The "input" on the left side represents an input to the decoder 146, and the "output" on the right side represents outputs S0 to S4 from the decoder 146.

As described above, the image information processed by the video processing unit 12 is output to the color printer 2 through the printer interface 56.

<Description of Color Printer 2>

The arrangement of the color printer 2 will be described with reference to FIG. 1.

The printer 2 shown in FIG. 1 includes a scanner 711 which serves as a laser output unit for converting an image signal from the color reader 1 into an optical signal, a polygonal mirror 712 having a polygonal shape (octagon), a motor (not shown) for rotating the polygonal mirror 712, and an f/θ lens (focusing lens) 713. The printer 2 also includes a reflecting mirror 714 for changing an optical path of a laser beam from the scanner 711 as indicated by the alternate long and short dashed line in FIG. 1, and a photosensitive drum 715.

A laser beam emitted from the laser output unit is reflected by the polygonal mirror 712 and linearly scans (raster scan) the surface of the photosensitive drum 715 by the f/θ lens 713 and the reflecting mirror 714, thereby forming a latent image corresponding to an original image.

The printer 2 further includes a primary charger 717, an entire surface exposure lamp 718, a cleaner unit 723 for recovering a residual toner which is not transferred to the recording medium, a transfer precharger 724, all of which are arranged around the photosensitive drum 715, and a developing unit 726 for developing a latent image formed on the surface of the photosensitive drum 715 with laser exposure.

Developing sleeves 731Y (yellow), 731M (magenta), 731C (cyan), and 731Bk (black) are selectively brought into direct contact with the photosensitive drum 715 to perform color development. Toner hoppers 730Y, 730M, 730C, and 730Bk store the corresponding supplementary toners. A screw 732 feeds each color developing agent. The sleeves 731Y to 731Bk, the toner hoppers 730Y to 730Bk, and the screw 732 constitute the developing unit 726. These members are arranged around a rotating shaft P of the developing unit 726.

For example, in order to form a yellow toner image, yellow toner development is performed at the position shown in FIG. 1. In order to form a magenta toner image, the developing unit 726 is rotated about the shaft P to locate the developing sleeve 731M in the magenta developing unit at a contact position with the photosensitive drum 715. Cyan and black developing operations are performed by rotating the developing unit 726 about the shaft P.

A transfer drum 716 transfers a toner image formed on the photosensitive drum 715 to a sheet. An actuator plate 719 detects an angular position of the transfer drum 716. A position sensor 720 detects a home position of the transfer drum 716 when the actuator plate 718 comes close to the transfer drum 716. A transfer drum cleaner 725, a paper press roller 727, a discharger 728, and a transfer charger 729 are arranged around the transfer drum 716.

Sheets are stored in paper cassettes 735 and 736. Paper feed rollers 737 and 738 feed the sheets from the cassettes 735 and 736. Timing rollers 739, 740, and 741 control paper feed and convey timings. A sheet fed and conveyed by the above members is wound around the transfer drum 716 while the sheet is carried by grippers (to be described later), and an image forming process is then started.

A drum rotation motor 550 causes to synchronously rotate the photosensitive drum 715 and the transfer drum 716. A separation gripper 750 separates the sheet from the transfer drum 716, and the separated sheet is conveyed by a conveyor belt 743. An image fixing unit 743 fixes an image on the sheet conveyed by the conveyor belt 743. A rotational force of a motor 747 mounted on a motor mounting portion 748 is transmitted to a pair of heat and press rollers 744 and 745 through a transmission gear 746 in the image fixing unit 743, thereby fixing the image on the sheet conveyed between the heat and press rollers 744 and 745.

Print-out processing of the printer 2 having the above arrangement will be described with reference to a timing chart of FIG. 22.

When the first signal ITOP signal is input, a Y latent image is formed on the photosensitive drum 715 with a laser beam. The Y latent image is developed by the developing unit 731Y, and the toner image is transferred onto a sheet on the transfer drum, thereby completing magenta print process. The developing unit 726 is pivoted about the shaft P.

When the next signal ITOP 551 is input, an M latent image is formed on the photosensitive drum with a laser beam, and the cyan print process is performed as described above. Yellow and black print processes are performed for the C and Bk components in correspondence with the subsequent signals ITOP 551. In this manner, the image forming process is completed, the sheet is separated by the separation grippers 750, and fixing is performed by the image fixing unit 743. Thus, a series of color printing operations are completed.

<Description of Film Scanner 34>

The film scanner 34 shown in FIG. 1 will be described with reference to FIG. 45.

The film scanner 34 includes a transmitting original illumination light source (lamp) 3001, a heat ray absorbing filter 3002 for removing heat rays from optical rays from the light source 3001, an illumination optical system 3003 for collimating illumination light passing through the filter 3002, a sub-scan drive table 3004 for moving a transmitting original 3007 such as a 35-mm photographic film in the sub-scan direction, a rotary table 3005 for rotating the transmitting original, a film holder 3006 for storing the transmitting original, a movable mirror 3008 which can cross the optical path of the light ray (original image) passing through the transmitting original 3007, a deflecting mirror 3009 for deflecting the optical path of the original image, and a photographing lens 3010 for focusing the original image through the mirror 3009.

The film scanner 34 also includes a lamp holding member 3017 for supporting the light source 3001 and CCD positioning mechanisms 3064. CCD line sensors 3061, 3062, and 3063 using CCD (Charge-Coupled Device) arrays having R, G, and B color separation filters photoelectrically convert the transmitted original image focused by the photographing lens 3010.

An analog circuit 3025 amplifies analog outputs from the CCD line sensors 3061, 3062, and 3063 and converts these analog signals into digital signals. A generator 3026 for signal for adjustment generates a reference signal for the analog circuit 3025. A dark correction circuit 3027 performs dark correction of R, G, and B digital image signals from the analog circuit 3025. A shading correction circuit 3028 performs shading correction of an output signal from the dark correction circuit 3027. A pixel shift correction circuit 3029 corrects a main-scan pixel shift of an output signal from the shading correction circuit 3028.

A color conversion circuit 3030 converts R, G, B signals through the pixel shift correction circuit 3029 into Y (yellow), M (magenta), and C (cyan) color signals corresponding to an output device. An LUT (look-up table) 3031 performs LOG conversion and gamma conversion. An output from the LUT 3031 is input to an interface circuit 3038 and a minimum value detection circuit 3032.

The minimum value detection circuit 3032 detects a minimum value of an output signal from the LUT 3031. An LUT 3033 outputs a control amount for undercolor removal (UCR) corresponding to a detection value from the minimum value detection circuit 3032. A masking circuit 3034 performs masking processing for an output signal from the LUT 3031. A UCR circuit 3035 performs undercolor removal of an output signal from the masking circuit 3034 on the basis of an output value from the LUT 3033. A density conversion circuit 3036 converts a recording density of an output signal from the UCR circuit 3035 into a designated density. A variable magnification processing circuit 3037 converts an output signal from the density conversion circuit 3036 into a designated magnification.

The interface (I/F) circuit 3038 performs signal transmission between this film scanner and the color reader 1 or the image memory apparatus 3. A controller 3039 controls the entire film scanner. The controller 3039 includes a CPU (Central Processing Unit) such as a microcomputer, a ROM (Read-Only Memory) for storing a storing sequence in the form of a program, and a RAM (Random Access Memory) used as a data storage serving as a work area.

An operation unit 3041 inputs various commands to the controller 3039, and a display unit 3042 displays control states of the controller 3039.

A lens iris control unit 3034 performs iris control of the photographing lens 3010. A lens distance ring control unit 3044 performs focal control of the photographing lens 3010. A mirror drive unit 3045 drives the movable mirror 3008.

A film feeding control unit 3048 drives the film holder 3006 and feeds a film. A sub-scan control unit 3049 controls scanning of the sub-scan drive table 3004. A control circuit 3050 for amount of light from lamp controls a light amount of the light source (lamp) 3001. A driving source 3051 for lamp controls the position of the light source 3001 through the lamp holding member 3017.

A timing generator 3052 generates a timing signal (clock) on the basis of control of the controller 3039. A bus 3053 connects the controller 3039 to the control units and processing circuits. A data line 3054 inputs image data from an output device or outputs it thereto. A sync signal line 3055 inputs sync signals Hsync and Vsync from an output device or outputs them thereto. A communication line 3056 exchanges a command by a predetermined protocol between the interfaces.

Operations of the respective parts will be described below.

The light source 3001 comprises a light source such as a halogen lamp. Light emitted from the light source 3001 illuminates the transmitting original 3007 such as a 35-mm photographic film held on the film holder 3006 through the heat ray absorbing filter 3002 and the illumination light source 3003. The optical path is switched by the movable mirror 3008 and an image of the transmitting original 3007 is projected on one of (1) a screen (not shown) through a projection lens 3011 and mirrors 3012 and 3013, and (2) CCD line sensors 3022 to 3024 through the mirror 3009, the photographing lens 3010, and a tricolor separation prism 3021.

In the mode (2), the CCD line sensors 3022 to 3024 are driven in synchronism with clocks from the timing generator 3052. Output signals from the CCD line sensors are input to the analog circuit 3025. The analog circuit 3025 comprises an amplifier and an A/D converter. A signal amplified by the amplifier is converted into digital data by the A/D converter in synchronism with an A/D conversion timing clock output from the timing generator 3052.

The dark signal levels of the R, G, and B digital signals output from the analog circuit 3025 are corrected by the dark processing circuit 3027. The R, G, and B digital signals are corrected by the shading correction circuit 3028 in the main scan direction. In addition, a pixel shift in the main scan direction is performed by the pixel shift correction circuit 3029. For example, this correction is performed by shifting the write timings of the FIFO (First-In First-Out).

The color conversion circuit 3030 performs color correction of the color separation optical system 3021, converts the R, G, and B signals into Y, M, and C signals corresponding an output device, and converts the R, G, and B signals into Y, I, and Q color signals. The LUT 3031 performs LOG conversion of a linear luminance signal and arbitrary gamma conversion.

The components 3032 to 3037 constitute an image processing circuit for outputting an image of four colors, Y, M, C, and Bk (black) used in a printer such as a color laser copying machine. The minimum value detecting circuit 3032, the masking circuit 3034, and the LUT 3033 are combined to perform printer masking and UCR (undercolor removal).

The density conversion circuit 3036 performs table conversion of the respective density signals, and the variable magnification processing circuit 3037 performs variable magnification processing in the main scan direction. The variably magnified Y', M', C', and Bk' signals are sent to the color reader 1 through the interface circuit 3038.

The interface circuit 3038 can output image data R (red), G (green), and B (blue) from the look-up table 3031 in addition to the Y', M', C', and Bk' signals.

This output signals are determined by equipment connected to the film scanner 34. When the film scanner 34 is connected to the color reader 34, the output signals are Y', M', C', and Bk' signals. When the film scanner 34 is connected to the image memory apparatus 3, the data are output in the form of R, G, and B signals.

Figures 45, 45A:
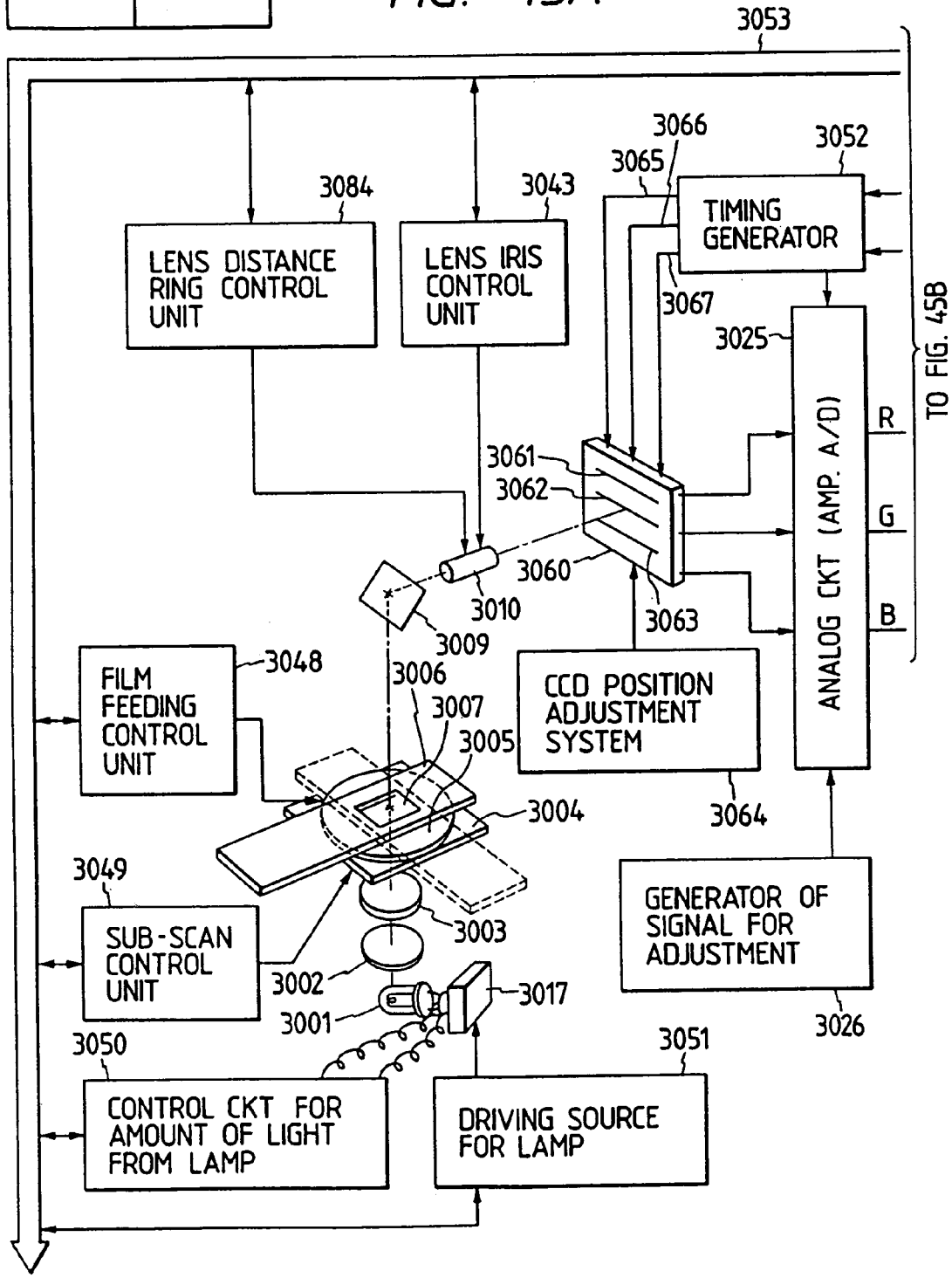
FIG. 45 is a block diagram showing an arrangement of a film scanner 34 shown in FIG. 1.
Figure 45B:
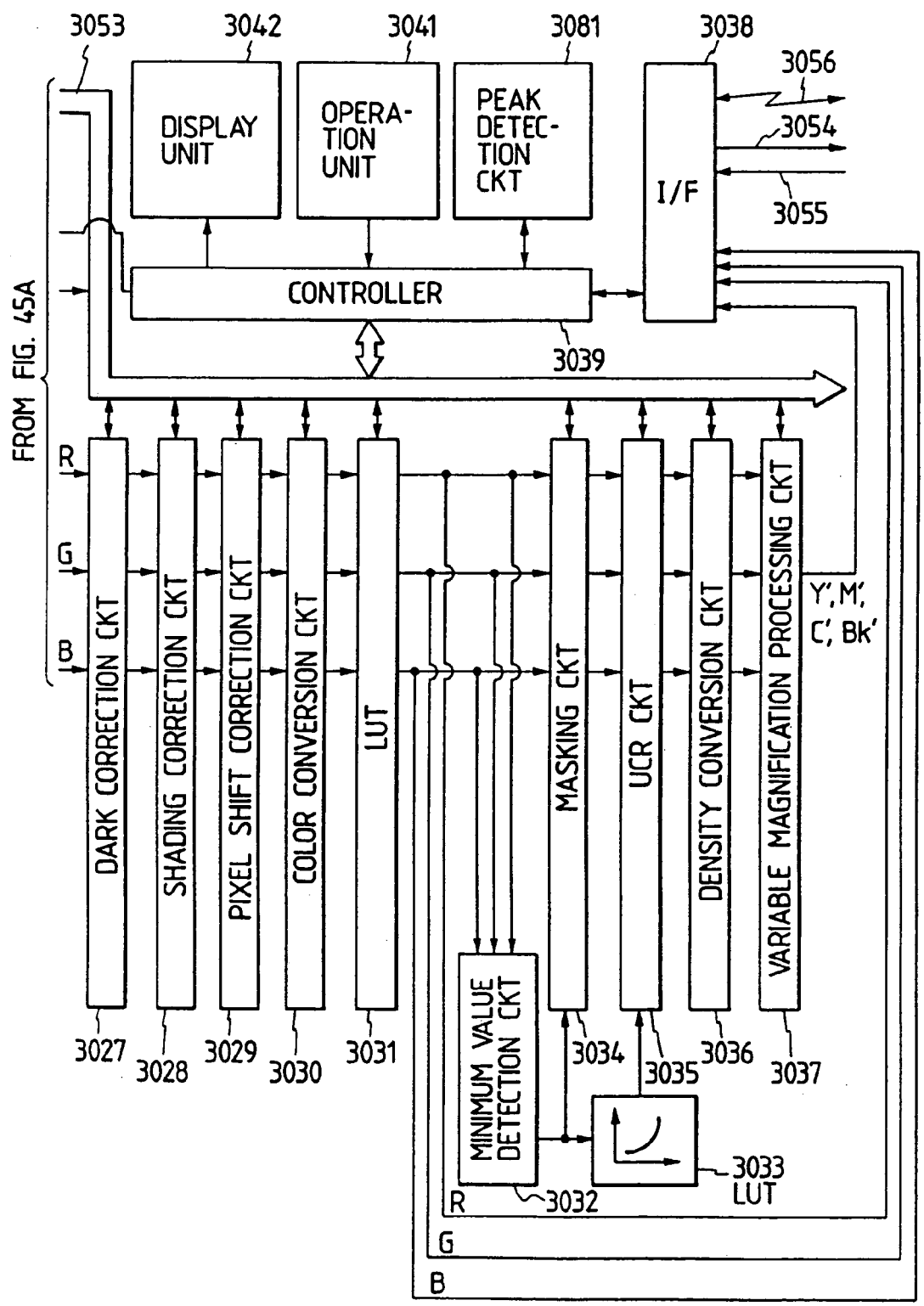

As shown in FIG. 46, there are two types of methods of setting a film in the film scanner 34 in the embodiment shown in FIG. 45.

The upper part of FIG. 46 shows a mount M1 in an auto changer. Films are loaded in the mount M1, and desired image samples are designated during initialization, thereby automatically accessing the desired samples.

The lower part of FIG. 46 shows an auto loader M2. A carrier feed mechanism and a positioning sensor for the carrier are arranged in the magazine.

<Description of Image Memory Apparatus 3>

A method of storing data from the color reader 1 to the image memory apparatus 3 and a method of storing data from the SV recording reproducing unit 31 as one of the input video units to the image memory apparatus 3 in this embodiment will be described below. A method of storing image information from the film scanner 34 to the image memory apparatus 3 will also be described below.

Image formation at the color printer 2 according to an embodiment of the present invention upon read access of image information from the image memory apparatus 3 will be described below.

<Image Storage from Color Reader 1>

A read area at the color reader 1 is designated with the digitizer.

The outer appearance of the digitizer 16 is shown in FIG. 23.

A method of transferring image data from the color reader 1 to the image memory apparatus 3 will be described below. A mode setting surface 420 is used to set an arbitrary area on a read original. A point pen 421 is used to designate coordinates of an area.

In order to transfer image data of an arbitrary area on an original, an image registration mode is set with the operation unit 20, and then a read position is designated with the point pen 421. An operation of the point pen 421 will be described below.

The read information is sent to the video processing unit 12 through the communication line 505 in FIG. 1. The video processing unit 12 sends this signal from the video interface 201 to the image memory apparatus 3 through the CPU bus 508.

The process of sending information of the designated area of the original 999 to the image memory apparatus 3 will be described below.

Figure 24:
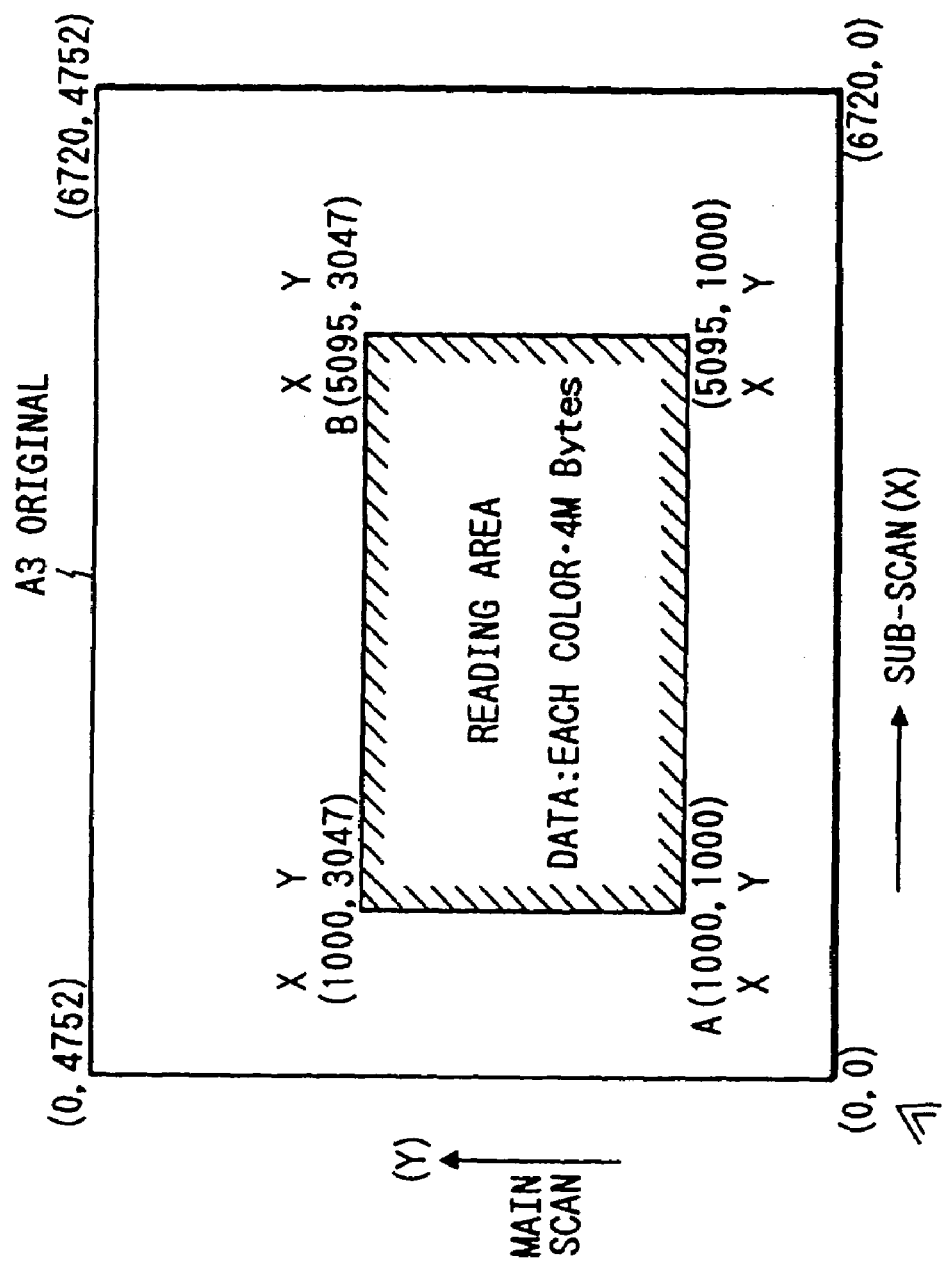
FIG. 24 is a view showing addresses of information in an area designated by a point pen in the digitizer 16.

FIG. 24 shows an address of information (A and B points) of an area designated with the point pen 421 of the digitizer 16.

The color reader 1 outputs the VCLK signal, the signal ITOP, and the $\overline{EN}$ signal together with the image data 205 to the image memory apparatus 3 through the signal line 207. The timing chart of the output signal lines is shown in FIG. 26. A data flow shown in FIG. 3 occurs in the video interface 201.

As shown in FIG. 26, upon depression of a start button on the operation unit 20, the stepping motor 14 is driven to cause the original scanning unit 11 to start scanning of the original. When the original scanning unit 11 reaches the leading end of the original, the ITOP signal goes to "1". The original scanning unit 11 reached an area designated with the digitizer 16 and scans the designated area. During scanning of the designated area, the EN signal goes to "1". For this reason, read image information (DATA 205) is fetched while the $\overline{EN}$ signal is kept at "1".

As shown in FIG. 26, the image data transfer from the color reader 1 is performed as follows. The video interface 201 is controlled, as shown in FIG. 3, and the signal ITOP, the control signal of the $\overline{EN}$ signal, and the signal VCLK are output as the signal 207 from the video interface 201. The R data 205R, the G data 205G, and the B data 205B are sent to the image memory apparatus 3 in synchronism with the signal 207.

The practical storage method of the image memory apparatus 3 in accordance with the image data and the control signals will be described with reference to FIGS. 27A to 27F.

A connector 4550 is connected to the video interface 201 in the color reader 1 in FIG. 2 through a cable. The R data 205R, the G data 205G, and the B data 205B are supplied to a selector 4250 through signals 9430R, 9430G, and 9430B. The signals VCLK, $\overline{EN}$, and ITOP sent from the video interface 201 are input to the selector 4250 through a signal line 9450S. Prior to reading of the original, area information designated with the digitizer 16 is input to a reader controller 4270 (FIG. 27B) through a communication line 9460 and is fetched to a CPU 4360 through a CPU bus 9610.

The R data 9430R, the G data 9430G, and the B data 9430B input to the selector 4250 through the connector 4550 are selected by the selector 4250 and output to signal lines 9421R, 9421G, and 9421B. These signals are then input to a filter circuit 9500.

Figure 28A:
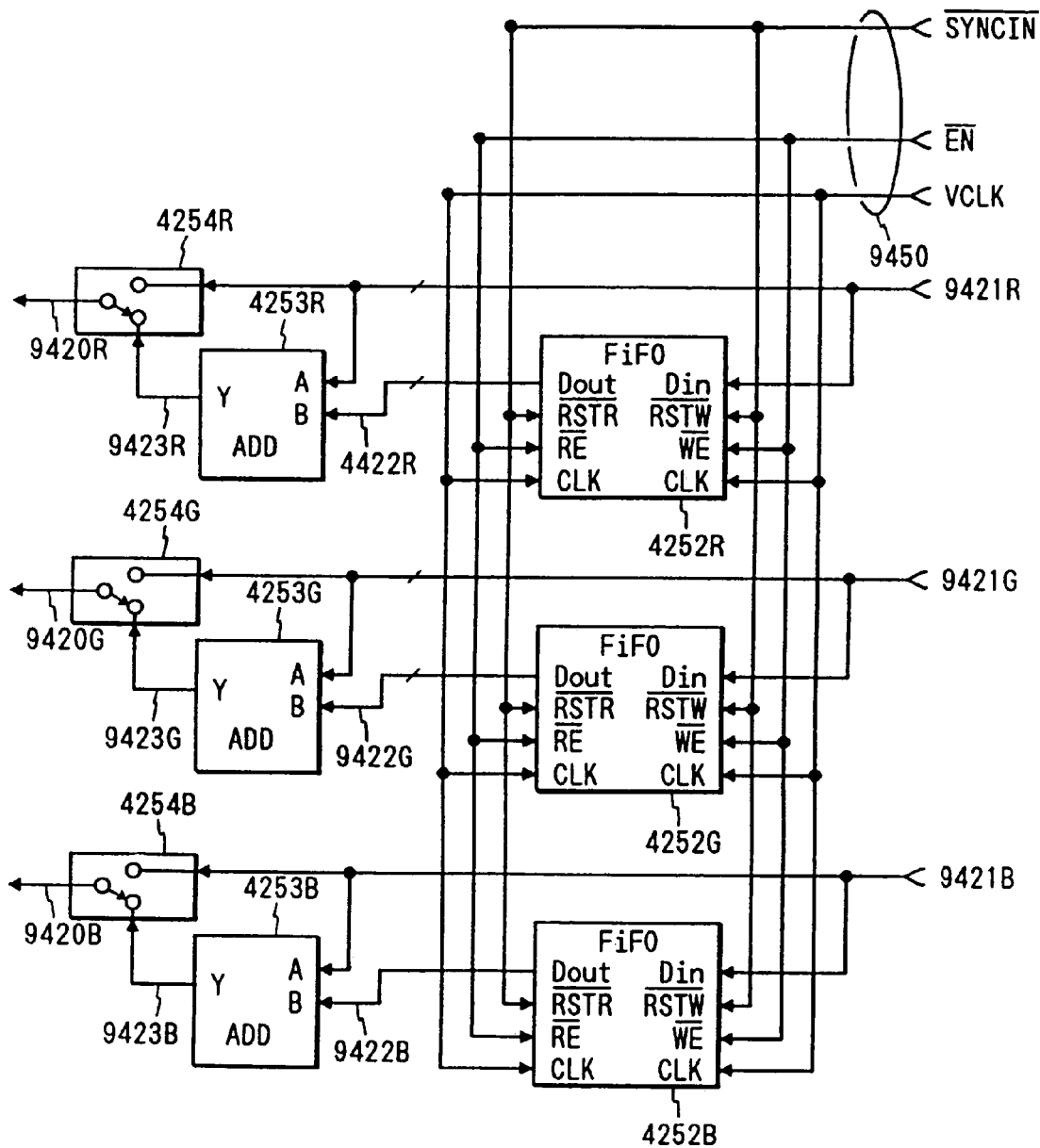
FIG. 28A is a block diagram showing an internal structure of a filter 9500 shown in FIG. 27A.

FIG. 28A is a view for explaining the filter circuit 9500 in detail.

The image signals 9421R, 9421G, and 9421B are input to FIFO memories 4252R, 4252G, and 4252B, respectively, and are controlled by a timing control signal 9450 input from the system controller.

Outputs from the FIFO memories 4252R, 4252G, and 4252B are signals delayed from the image data 9421R, 9421G, and 9421B by one main scan line each and are input to adders 4253R, 4253G, and 4253B through signal lines 9422R, 9422G, and 9422B, respectively. The adders 4253R, 4253G, and 4253B calculate average values of every four pixels, i.e., two pixels in the main scan direction and two pixels in the sub-scan direction, and output them to signal lines 9423R, 9423G, and 9423B.

Selectors 4254R, 4254G, and 4254B select the image signals 9421R, 9421G, and 9421B, or the average signals 9423R, 9423G, and 9423B as signals 9420R, 9420G, and 9420B which are then input to the respective image memories.

The select signals for the selectors 4254R, 4254G, and 4254B are controlled and programmed by the CPU 4360 (not shown).

As described above, the filter circuit 9500 performs image averaging to prevent image degradation caused by a moiré pattern when a dot image is read from, e.g., the color reader 1.

Figure 28B:
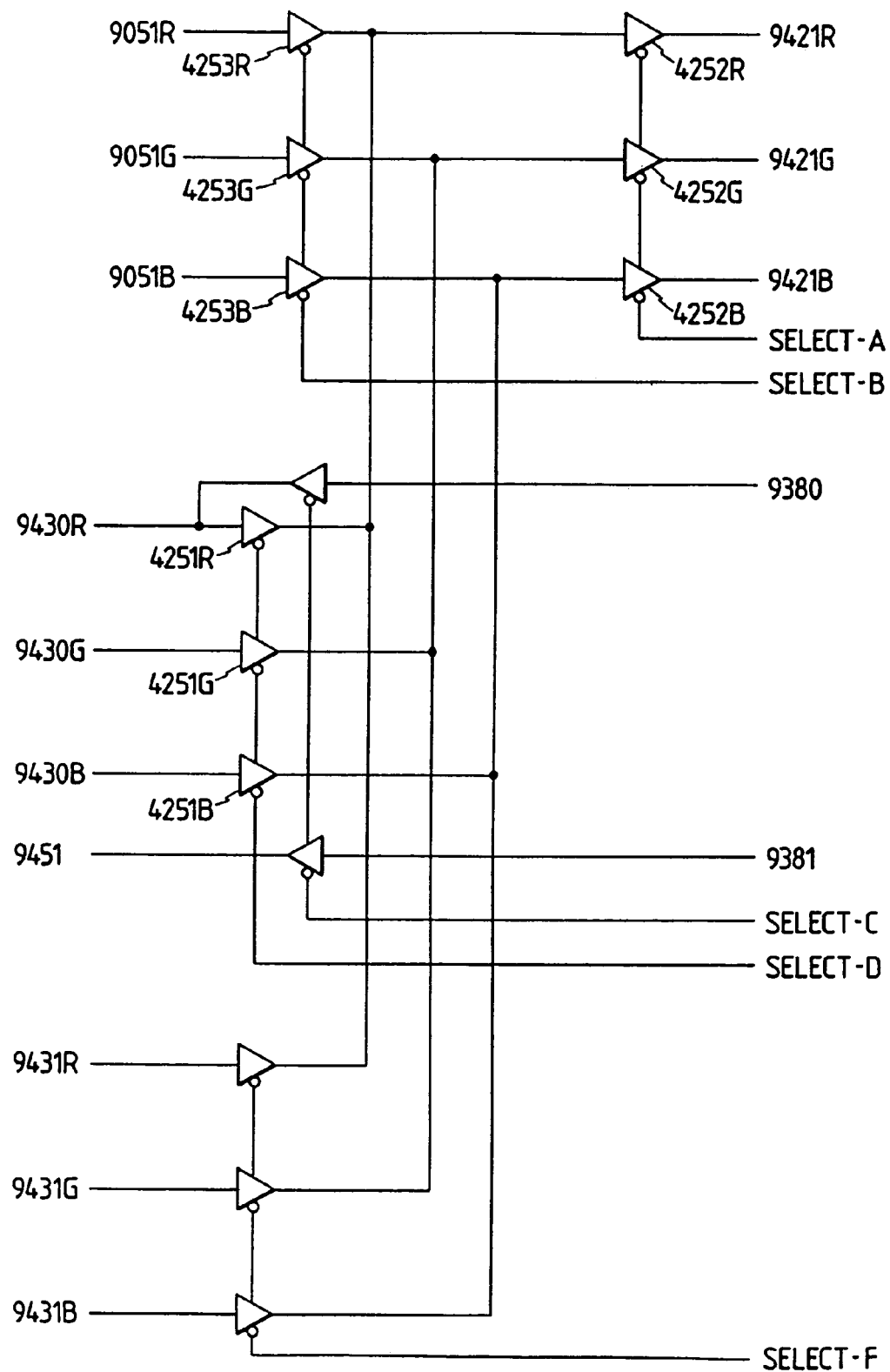
FIGS. 28B and 28C are block diagrams showing an internal structure of a selector 4250 shown in FIG. 27A.
Figure 28C:
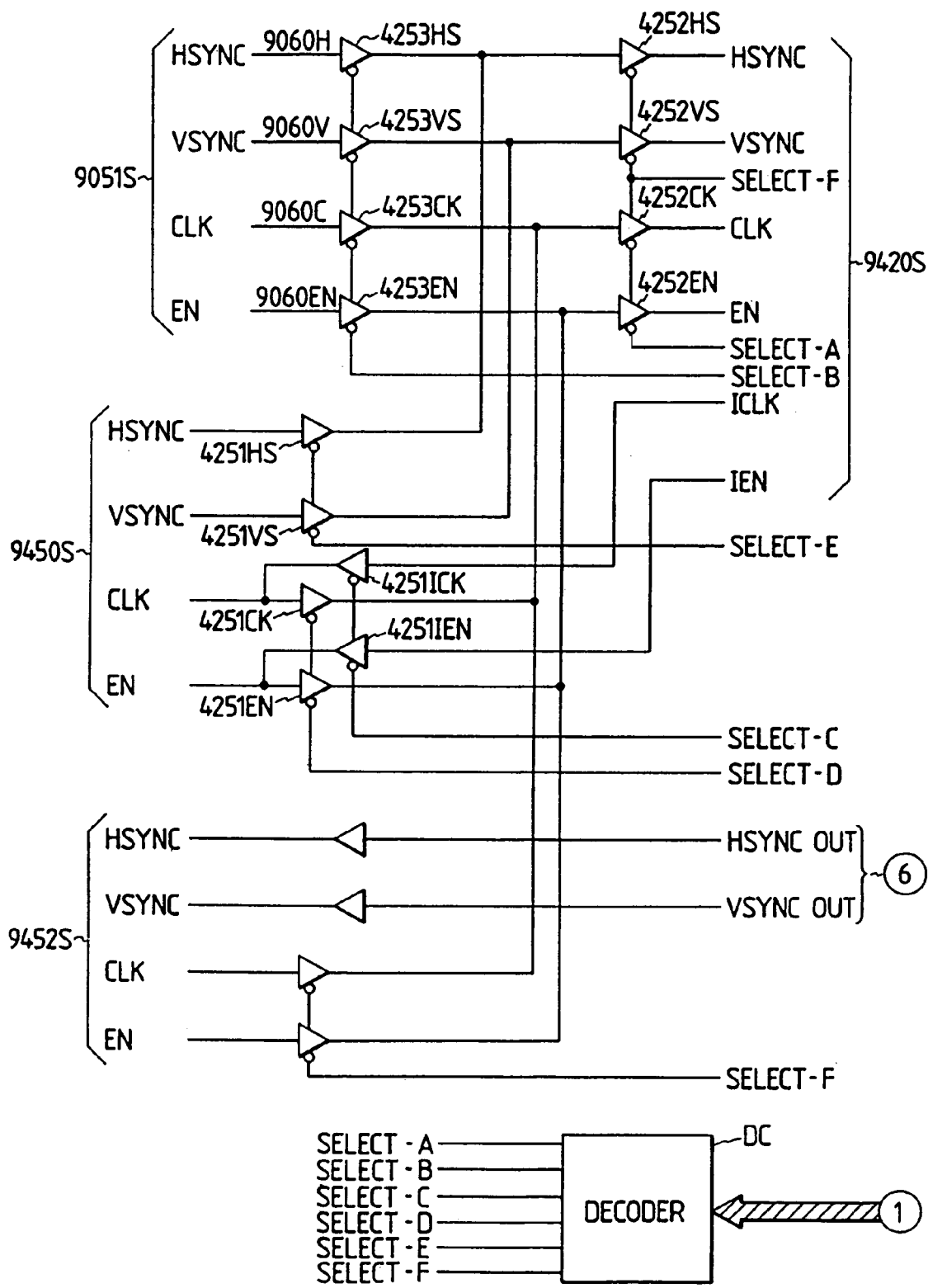

FIGS. 28B and 28C are block diagrams showing internal structures of the selector 4250. As shown in FIGS. 28B and 28C, an image signal from the color reader 1 or each video unit (to be described in detail later) such as a still video reproducing unit or the film scanner can be arbitrarily switched. A switching signal can be programmably controlled by the CPU through a decoder DC.

When image information is to be stored from, e.g., the color reader 1 to the image memory apparatus 3, control signals SELECT-A and SELECT-D are set to be "0", and tristate buffers 4251R, 4251G, 4251B, 4251HS, 4251VS, 4251CK, and 4251EN, the buffers 4252R, 4252G, and 4252B, and buffers 4252HS, 4252VS, 4252CK, and 4252EN are enabled. Other tristate buffers are set in a high impedance state, so that the image signals 9430R, 9430G, and 9430B and the control signal 9450S from the color reader 1 are coupled to the image signals 9421R, 9421G, and 9421B and the control signal 9420S, respectively.

The image signals selected by the selector 4250 pass through the filter circuit 9500 and stored in the corresponding memories under the control of a system controller 4210. This operation will be described in detail below.

The system controller 4210 transfers only effective areas of an image of the image data 9420R, 9420G, and 9420B obtained through the selectors 4254R, 4254G, and 4254B and the filter circuit 9500 shown in FIG. 28A to FIFO memories 4050AR, 4050AG, and 4050AB shown in FIG. 27C. At this time, the system controller 4210 also performs trimming processing and variable magnification processing.

The FIFO memories 4050AR, 4050AG, and 4050AB absorb clock shift amounts between the color reader 1 and the image memory apparatus 3.

These operations of this embodiment will be described with reference to circuit diagrams of FIGS. 27A to 29 and a timing chart of FIG. 30.

Figure 29B:
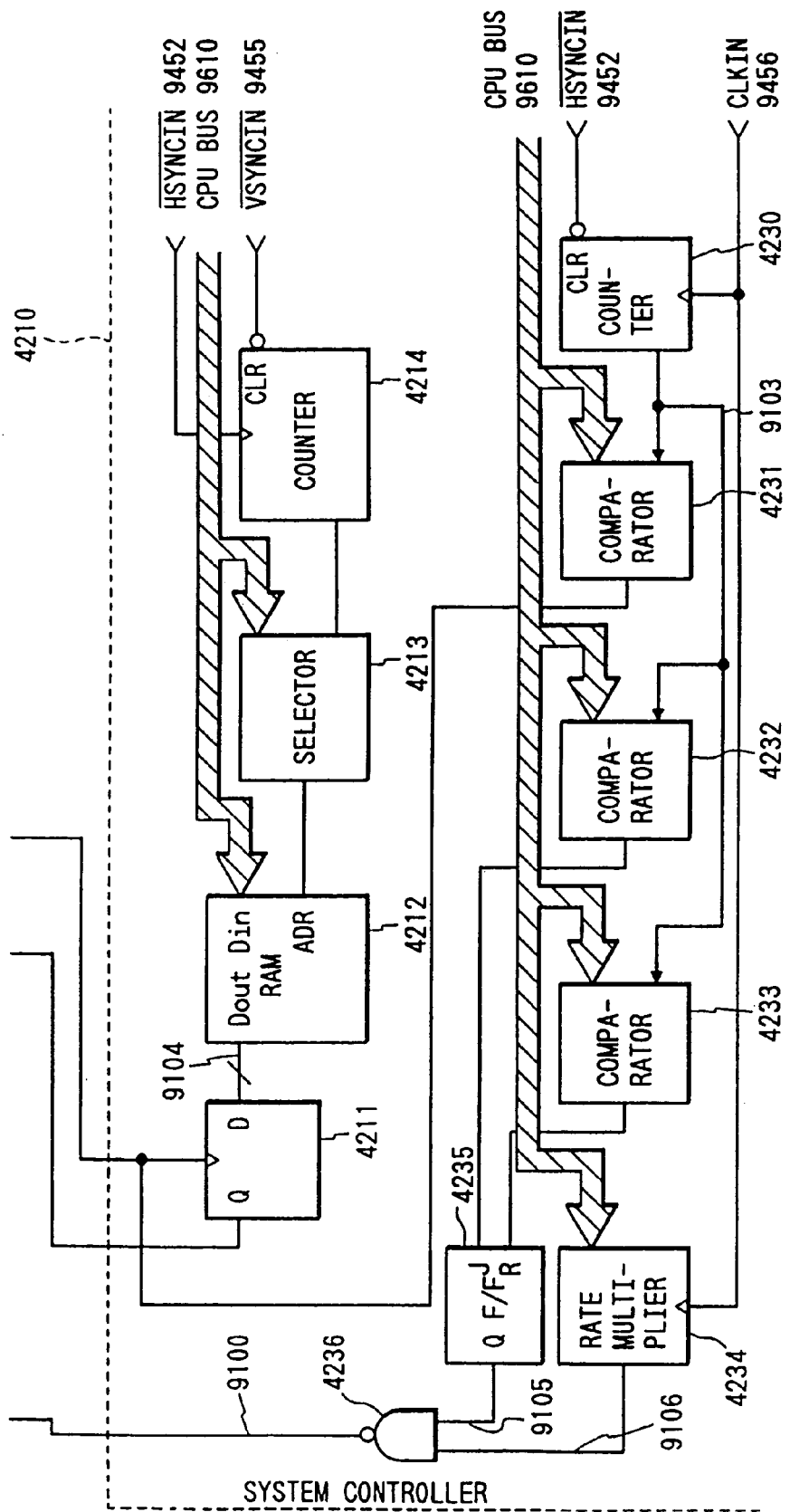
FIG. 29 is a view showing an arrangement of a system controller 4210 shown in FIG. 27A and a relationship between the system controller 4210 and FIFO memories in memories A to M.

Prior to data transfer from the selectors 4253R, 4253G, and 4253B shown in FIG. 28B to the FIFO memories 4050AR, 4050AG, and 4050AB through the filter circuit 9500, a main scan effective area of the area designated with the digitizer 16 is written in comparators 4232 and 4233 shown in FIG. 29 through the CPU bus 9610. FIG. 29 is a view showing arrangements of the system controller 4210 and the FIFO memories in the memories A to M.

A start of first address of the area designated with the digitizer 16 in the main scan direction is set in the comparator 4232, and a stop address is stored in the comparator 4233.

As for the sub-scan direction of the area designated with the digitizer 16, a selector 4213 is controlled to validate the CPU 9610 side. Data of "0" is written in the effective area of the designated area in a RAM 4212, and data of "1" is written in an ineffective area.

Variable magnification processing in the main scan direction is performed by setting a variable magnification in a rate multiplier 4234 shown in FIG. 29 through the CPU bus 9610. Variable magnification processing in the sub-scan direction is performed by writing data in the RAM 4212.

Figure 30:
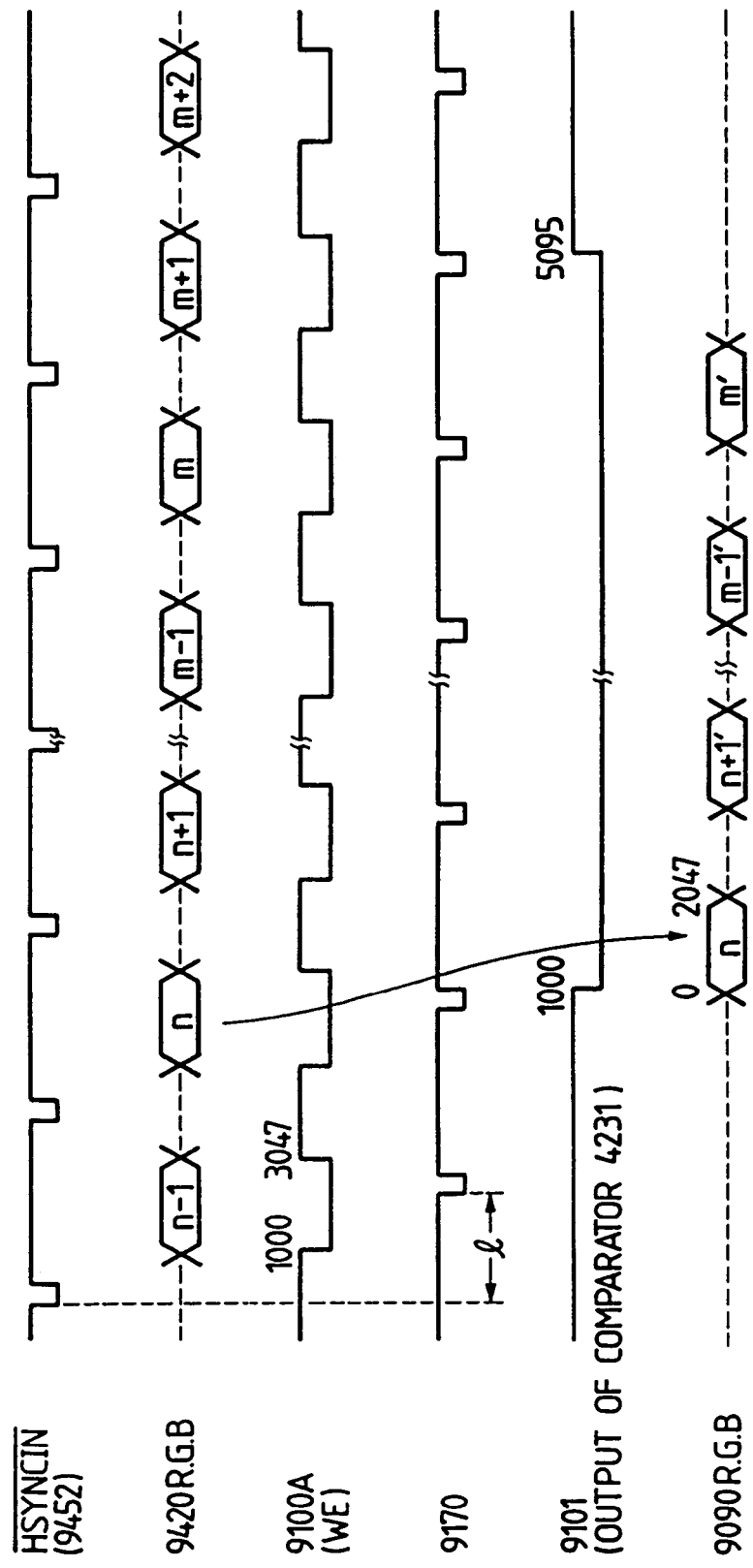
FIG. 30 is a timing chart obtained when trimming processing is performed.

FIG. 30 is a timing chart of trimming processing. As described above, when only the area designated with the digitizer 16 is stored in a memory (trimming processing), a trimming position in the main scan direction is set in the comparators 4232 and 4233 shown in FIG. 29, and a trimming position in the sub-scan direction is set in the RAM 4212 by setting the selector 4213 to the CPU 9610 side (e.g., the trimming area is set to be 1000 to 3047 in the main scan direction and 1000 to 5095 in the sub-scan direction). More specifically, the CPU writes "1" or "0" in an area of the RAM 4212 corresponding to an address which is input through the selector and output from a counter 4214. In this case, the data of "1" inhibits read access of the memories 4050R, 4050G, and 4050B, and the data of "0" allows read access of these memories.

A trimming section signal 9100 in the main scan direction is synchronous with a signal $\overline{\text{HSYNCIN}}$ 9542 and a signal CLKIN 9456 to operate a counter 4230. When a counter output 9103 reaches 1000, an output from the comparator 4232 becomes "1", and an output Q from a flip-flop 4235 goes to "1". Subsequently, when the counter output 9103 reaches 3047, an output from the comparator 4233 goes to "1", and the output from the flip-flop 4235 goes from "1" to "0". In the timing chart of FIG. 30, since equi-magnification processing is performed, an output from the rate multiplier 4234 is set at "1". Data from address 1000 to address 3047 of the FIFO memories 4050AR, 4050AG, and 4050AB in response to the trimming section signal 9100 are written in the FIFO memories 4050AR, 4050AG, and 4050AB.

A comparator 4231 outputs a signal 9107 delayed from the signal $\overline{\text{HSYNCIN}}$ 9452 by l pixels. Since the $\overline{\text{RSTW}}$ and $\overline{\text{RSTR}}$ inputs to the FIFO memories 4050AR, 4050AG, and 4050AB have a phase difference, a difference between the periods of the signal CLKIN 9456 and a signal CLK 9453 input to the FIFO memories 4050AR, 4050AG, and 4050AB can be absorbed.

Trimming in the sub-scanning direction is performed as follows. The counter 4214 side of the selector 4213 is effective, and a period signal 9104 synchronized with a signal $\overline{\text{VSYNCIN}}$ 9455 and the signal $\overline{\text{HSYNCIN}}$ 9452 are output from the RAM 4212. The section signal 9104 is synchronized with the signal 9107 by a flip-flop 4211 and is input to the read enable terminals of the FIFO memories 4050AR, 4050AG, and 4050AB. That is, image data stored in the FIFO memories 4050AR, 4050AG, and 4050AB are output during only the section of a trimming signal 9101 of level "0" (n'–m').

Figure 32:
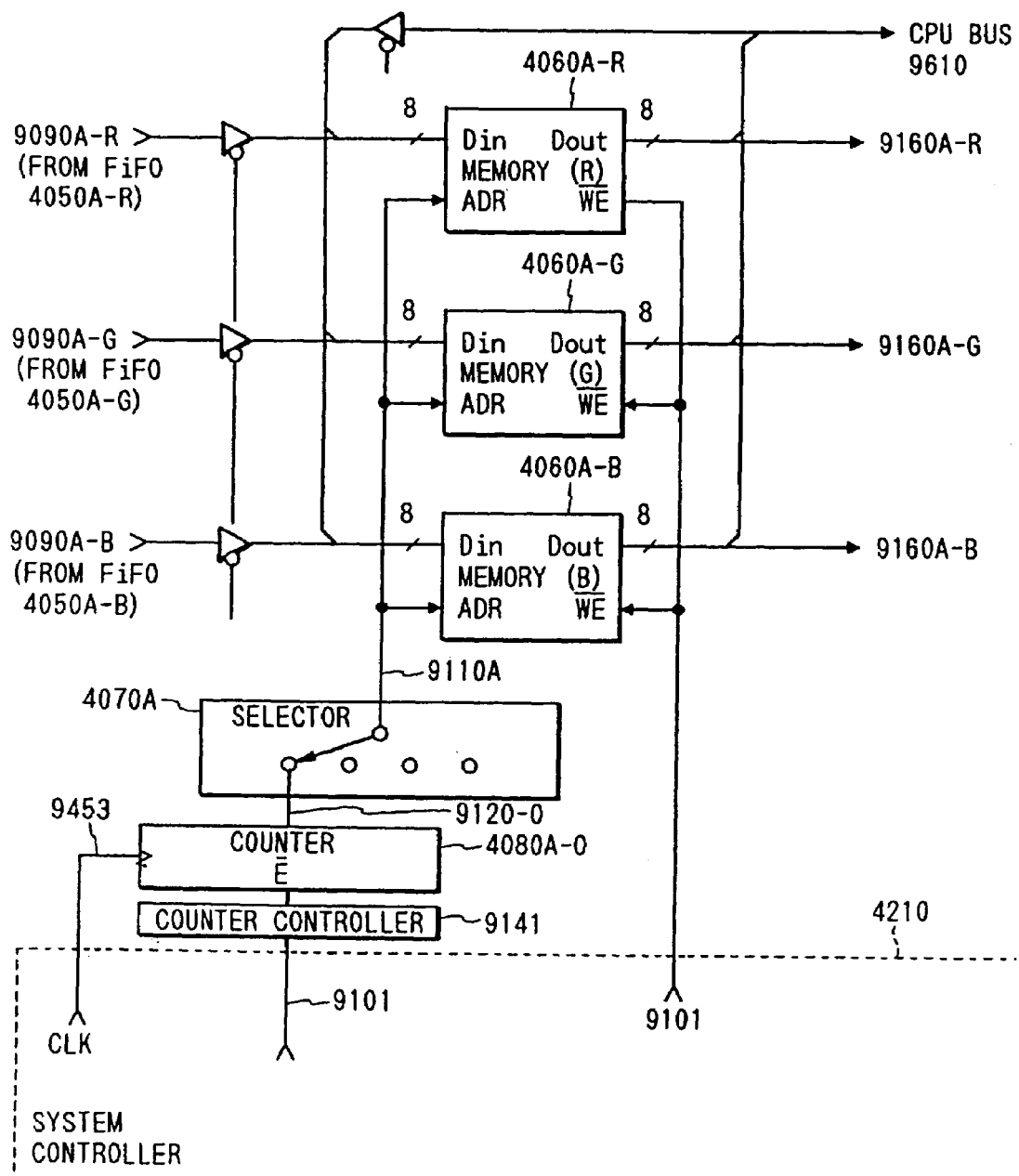
FIG. 32 is a block diagram showing a relationship between memories 4060A-R, 4060A-G, and 4060A-B, a counter controller, and a counter.

The signal 9101 is input to a counter controller 9141 shown in FIG. 32, converted into a counter enable signal, and also serves as a write enable signal for memories 4060A-R, 4060A-G, and 4060A-B. As described above, image data output from the FIFO memories 4050AR, 4050AG, and 4050AB are immediately written in the memories 4060A-R, 4060A-G, and 4060A-B in accordance with address signals output from a counter 4080A-0.

In the above description, only trimming processing is exemplified. However, variable magnification processing can be performed simultaneously with trimming processing. Variable magnification processing in the main scan direction is set through the CPU bus 9610, and variable magnification processing in the sub-scan direction can be performed by writing data in the RAM 4212.

Figure 31:
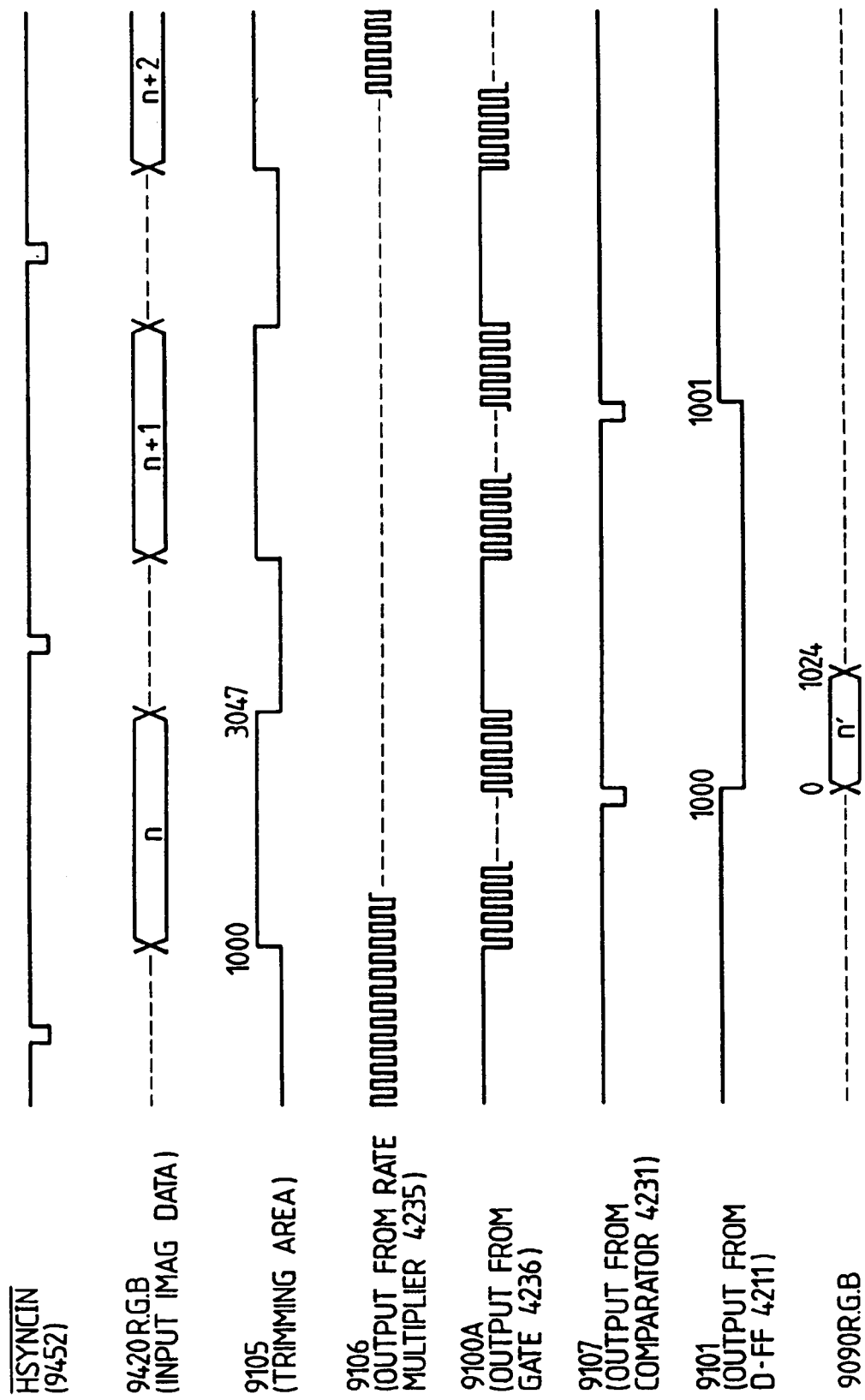
FIG. 31 is a timing chart obtained when trimming processing and variable magnification processing are performed.

FIG. 31 is a timing chart obtained when trimming processing and variable magnification processing (50%) are performed.

FIG. 31 shows an operation wherein image data from the selectors 4254R, 4254G, and 4254B are reduced by 50%, and the reduced data are transferred to the FIFO memories 4050AR, 4050AG, and 4050AB.

A 50% reduction value is set in the rate multiplier 4234 shown in FIG. 29 through the CPU bus 9610. At this time, an output 9106 from the rate multiplier 9106 has a waveform in which "0" and "1" are repeated every pixel in the main scan direction, as shown in FIG. 31. An AND signal 9100 obtained by the signal 9106 and a period signal 9105 produced by the comparators 4232 and 4233 controls the write enable terminals of the FIFO memories 4050AR, 4050AG, and 4050AB, thereby performing image reduction.

A 50% reduction operation in the sub-scan direction is performed as follows. Data to be written in the RAM 4212 (i.e., the read enable signal to the FIFO memories 4050AR, 4050AG, and 4050AB) is set at "1" (read inhibition) within the image data effective area, and only 50%-reduced image data is transmitted to the image memories 4060A-R, 4060A-G, and 4060A-B. In the operation shown in FIG. 31, the read enable signal 9101 repeats states of level "1" and level "0" to perform 50% reduction.

The trimming and variable magnification operations in the main scan direction are performed by controlling the write enable signal for the FIFO memories 4050AR, 4050AG, and 4050AB, and the trimming and variable magnification operations in the sub-scan direction are performed by controlling the read enable signal for the FIFO memories 4050AR, 4050AG, and 4050AB.

Image data transfer from the FIFO memories 4050AR, 4050AG, and 4050AB to the memories 4060A-R, 4060A-G, and 4060A-B is performed by the counter controller 9141A, the counter 4080A-0, and the control line signal 9101, all of which are shown in FIG. 27C.

The signal 9101 is an output from the comparator 4231 shown in FIG. 29 and is used as a read enable signal RE for the FIFO memories 4050AR, 4050AG, and 4050RB, and a write enable signal for the memories 4060A-R, 4060A-G, and 4060A-B shown in FIG. 32.

The counter controller 9141A shown in FIG. 27C is a circuit for controlling counters 4080A-0 to 4080A-3 for generating address signals to the memories 4060A-R, 4060A-G, and 4060A-B and has the following three functions in response to commands from the CPU:

1. CPU Read/Write Mode

Data at an arbitrary address can be referred to by the CPU.

2. Read Mode

Stored image data is read out in accordance with a control signal from the system controller, and a transferred print output appears at the color reader 1.

3. Write Mode

An image from the color reader 1 is stored in accordance with a control signal from the system controller.

In any function, the count start addresses of the counters 4080A-0 to 4080A-3 can be arbitrarily set from the CPU, thus realizing random access. A normal start address is address 0.

The control line signal 9101 is a read enable signal for the FIFO memories 4050AR, 4050AG, and 4050AB and is also input to the counter controller 9141A to control the counter. The control line signal 9101 also serves as a write enable signal for the memories 4060A-R, 4060A-G, and 4060A-B.

When the counter controller 9141A is set in the write mode, the input control signal 9101 is used as a counter enable signal for the counters 4080A-0 to 4080A-3. The counter controller can selectively use a counter corresponding to a CPU command or can use all the counters. A signal 9140A serves as a counter select signal. When the control line signal 9101 is set at "0", image data read out from the FIFO memories 4050R, 4050G, and 4050B are input to the memories 4060R, 4060G, and 4060B, respectively.

In this case, for example, when the counter 4080A-0 is selected, the enable signal from the counter 4080A-0 is set at "0", and a signal 9120-0 counted up in synchronism with the signal CLK 9453 is output from the counter 4080A-0. The output signal is input to terminals ADR 9110 of the memories 4060A-R, 4060A-G, and 4060A-B through a selector 4070.

At this time, the write enable signal $\overline{WE}$ 9101 for the memories 4060A-R, 4060A-G, and 4060A-B is also set at "0", so that image data 9090R, 9090G, and 9090B input from the memories 4060R, 4060G, and 4060B are stored.

In this embodiment, since a memory capacity is 1 Mbyte for each color, upon 50% reduction of the image data of the designated area in FIG. 24, the read image data is converted into data having a maximum memory capacity of the image memory apparatus 3, and the converted data is stored therein.

In the above embodiment, the CPU 4360 calculates an effective area from information of an area of an A3 original designated with the digitizer 16, and the corresponding data are set in the comparators 4231 to 4233, the rate multiplier 4234, and the RAM 4212, all of which are shown in FIG. 29.

In this embodiment, since the volume of image data to be read is larger than the image memory capacity, reduction processing is performed, and the converted data, the volume of which falls within the memory capacity, is stored in the image memory. However, when the volume of image data to be stored is smaller than a maximum image memory capacity, trimming data is stored in the comparators 4232 and 4233 for controlling write access of data of the area designated with the digitizer 16 in the memory, and an equi-magnification coefficient is set in the rate multiplier 4234. The write data for the RAM 4212 is set such that "0" is set for an effective image area, and "1" is set for other areas, thereby setting the equi-magnification mode.

In order to store a read image while an aspect ratio (a ratio of length to width) is kept maintained, the CPU 4360 calculates an effective pixel count x from area information sent from the digitizer 16, and then a value z is obtained from a maximum capacity y of the image storing memory as follows:

$$y/x \times 100 = z$$

As a result, (1) if z≧100, then 100% is set in the rate multiplier 4234, and "0"s are set in the effective image area in the RAM 4212.

(2) if z<100, then z% is set in the rate multiplier 4234 and the RAM 4212, and the image data is stored within the maximum memory capacity while the aspect ratio is kept unchanged.

Even in this case, data of "1" and "0" are appropriately written in the RAM 4212 in correspondence with the reduction factor "z". Details of such control are disclosed in application Ser. No. 385,383 (Jul. 26, 1989) filed by the present inventors.

Under the above control, arbitrary magnification processing can be facilitated while the aspect ratio of the input image is kept unchanged under control by the image memory apparatus 3, thereby effectively realizing the read image. In addition, utilization efficiency of the memory capacity can be maximized.

Figure 27E:
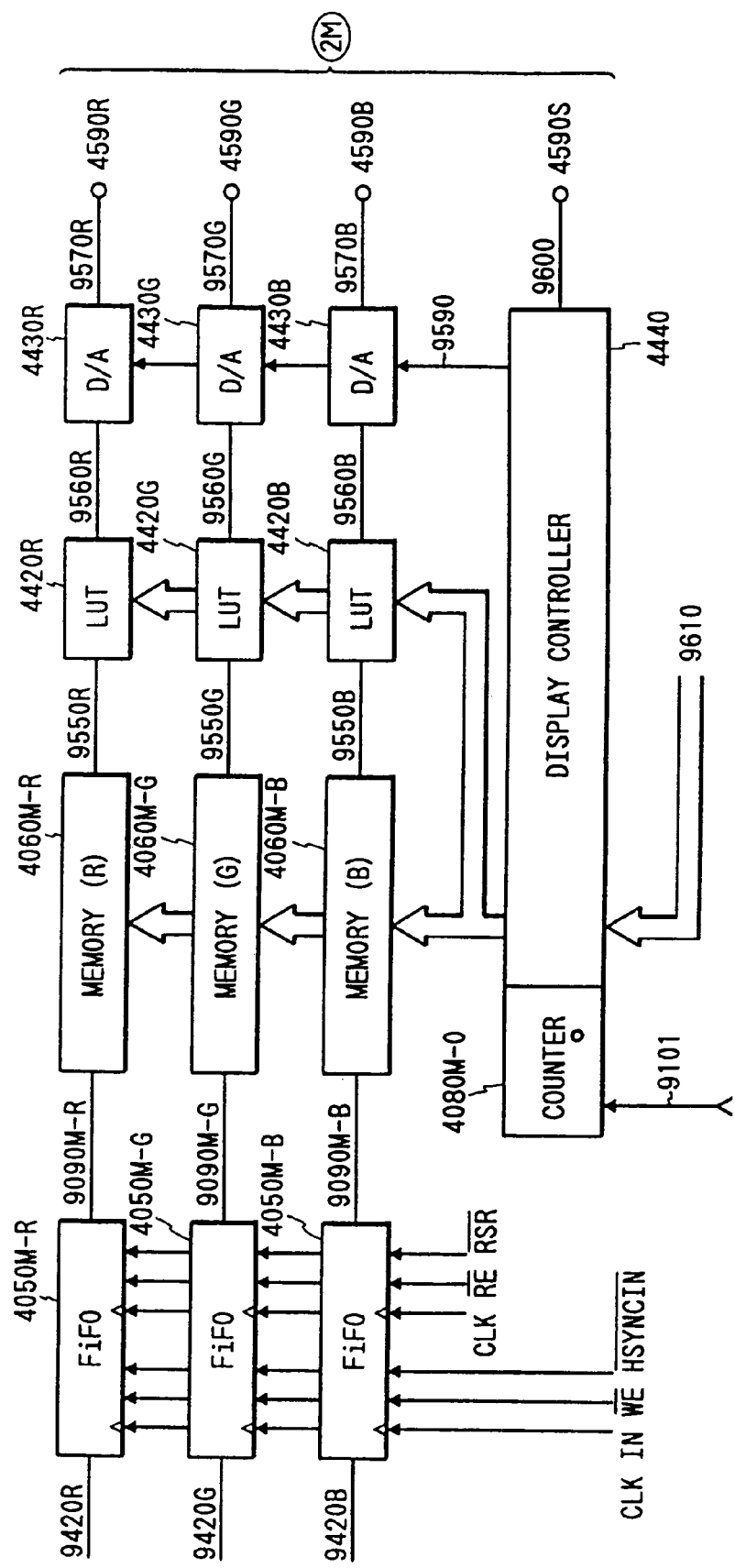
FIG. 27E is a view showing a monitor memory M shown in FIG. 27A.

The above setting operations of the image storing memories (i.e., the memories A, B, C, and D) and the display (the memory M) shown in FIG. 27E can be independently performed. The same image can be stored in different memories such as the memories A, B, C, and D and the memory M at different magnifications.

<Description of Memory E>

The memory E shown in FIG. 27A will be described below. The internal structure of the memory E is shown in FIG. 27D-1. The memory E is a binary image memory (to be referred to as a bit map memory hereinafter), and its operation is the same as that of the memory A previously described.

Of the image data read from the color reader, image data written in the bit map memory E is written in a FIFO 4050E-R (FIG. 27D-1) in the memory E through the selector 4250 and the filter 9500 in the same manner as described above. In this case, write access is controlled by the write enable signal 9100, as in FIG. 29. In this embodiment, the R signal is exemplified as an image signal. Any signal represented by a luminance signal can be used. For example, a G signal or a signal obtained by weighting R, G, and B at a predetermined ratio and averaging the weighted signals. Image data written in the FIFO 4050E-R is read out in response to the control signal 9101 as described above and is binarized by a binarization circuit 4055-R. The binarized signals are sequentially written in the memory. At this time, black corresponds to "1", and white corresponds to "0". A predetermined binarization threshold value is written in a register 4053 through the CPU bus. As shown in FIG. D-2, a heart-like original A is prepared, and an area B as indicated by the dotted line is designated. This area is read in the bit map memory E, so that a binary image represented by "0"s and "1"s shown in FIG. 27D-2 is stored in the bit map memory.

A counter 4080E controls a read/write address of the memory 4060E-R. A counter controller 9141E controls a counting state of the counter 4080E. The read/write position is controlled by the CPU by the system controller 4210 in the same manner as described with reference to FIG. 29. When the data are read out in a direction indicated by an arrow, a non-rectangular area signal F in FIG. 27D-2 is output to a signal line 4072 and is used as a select signal for a selector 4071. An 8-bit register 4074 connected to the CPU bus is connected to one input terminal of the selector 4071, and a predetermined output density value is set. The other input terminal of the selector 4071 receives a fixed value, e.g., 80H. When the signal 4072 is set at "1", the selector 4071 outputs the predetermined density value to an output 4172. As a result, the density value is output to the heart-like area.

The most significant bit (MSB) of the signal 4172 is output to an output 4173 and is used as a non-rectangular area signal (to be referred to as a BI signal hereinafter).

The signals 4171 and 4172 are output to 2E in FIG. 27B and is input to the video interface 201 shown in FIG. 2 through the selector 4230.

The output from the bit map memory E shown in FIG. 27D-1 can be arbitrarily obtained by updating the density set in the register 4074 (FIG. 27D-1) for the binary image stored in the memory 4060E-R. When data exceeding "80H" is written in the register 4074, a bit image appears on a signal line 4173.

<Image Storage from SV Recording Reproducing Unit 31>

In the system of this embodiment, a video image from the SV recording reproducing unit 31 shown in FIG. 1 is stored in the image memory apparatus 3 and output to the monitor TV 32 or the color printer 2. The image memory apparatus 3 also handles the input image.

Storage of a video image from the SV recording reproducing unit 31 to the image memory apparatus 3 will be described below.

Control of storing the video image from the SV recording reproducing unit 31 to the image memory apparatus 3 will be described with reference to block diagrams of the image memory apparatus 3 in FIGS. 27A and 27B.

The video image from the SV recording reproducing apparatus 31 is input in the form of an NTSC composite signal 9000 through an analog interface 4500 and is separated into R, G, and B signals 9015R, 9015G, 9015B, and a composite SYNC signal 9015S by a decoder 4000.

The decoder 4000 decodes Y (luminance) and C (chrominance) signals 9010 from an analog interface 4510 in the same manner as described above. Signals 9020R, 9020G, 9020B, and 9020S to a selector 4010 are separate R, G, and B, and composite SYNC signals.

The selector 4010 is connected to the CPU bus 9610 and selection of signals 9030R to 9030S and the signals 9020R to 9020S can be programmably performed by the CPU.

R, G, and B signals 9050R, 9050G, and 9050B selected by the selector 4010 are converted into digital signals by A/D converters 4020R, 4020G, and 4020B.

A composite SYNC signal 9050S selected by the selector 4010 is input to a TBC/HV separation circuit 4030. The TBC/HV separation circuit 4030 separates the composite SYNC signal 9050S into a clock signal 9060C, a horizontal sync signal 9060H, a vertical sync signal 9060V, and an image enable signal 9060EN shown in FIG. 28C. These signals are input to the selector 4250. The image enable signal EN 9060 is a signal representing a given image area.

The selector 4250 selects and outputs an image from an image source, e.g., an image from the color reader 1, an image from various types of video units (SV reproducing unit in this embodiment), or an image from the film scanner 34. This operation will be described in detail with reference to FIGS. 28B and 28C.

When an image on the video unit side is to be selected, the control signals SELECT-A and SELECT-B are set to be "0", and only the tristate buffers 4253R, 4253G, 4253B, 4253HS, 4253VS, 4253CK, and 4253EN and the buffers 4252R, 4252G, 4252B, 4252HS, 4252VS, 4252CK, and 4252EN are enabled. The signals SELECT-C, SELECT-D, SELECT-E, and SELECT-F are set to be "1", and other tristate buffers are set in a high impedance state. Image signals 9051R, 9051G, and 9051B from the video unit are coupled to the signals 9420R, 9420G, 9420B, and 9420S, respectively.

This operation can apply to an image data input from another unit. In addition, this embodiment is characterized in that a tristate buffer is used in the selector 4250 to use a bidirectional communication line connected to the color reader 1 or the film scanner 34.

Of the signals 9050 output from the TBC/HV separation circuit 4030, the TVCLK 9060 C signal is a 12.27-MHz clock signal, the $\overline{\text{TVHSYNC}}$ 9060H signal is a signal having a pulse width of 63.5 μS, and the $\overline{\text{TVVSYNC}}$ 9060V signal is a signal having a pulse width of 16.7 mS.

In order to switch the selector 4250 so as to input such a video image signal, switches 4254R, 4254G, and 4254B of the filter 9500 are switched to the upper side in FIG. 28 by the CPU. In this case, the video signal is not almost filtered and is input to one of the memories A, B, C, and D. At the time of reception of an image from the reader, since an image having a moiré pattern as in a dot image is present, the switches 4254R, 4254G, and 4254B are switched to the lower side to prevent formation of the moiré pattern. The above operation will be described by referring back to FIG. 27C.

The FIFO memories 4050AR, 4050AG, and 4050AB are reset in response to the $\overline{\text{TVHSYNC}}$ 9060H signal and write data 9060R, 9060G, and 9060B from address 0 in synchronism with the TVCLK 9060C signal. Write access of the FIFO memories 4050AR, 4050AG, and 4050AB is performed when the $\overline{\text{WE}}$ signal 9100 output from the system controller 4210 is kept enabled.

Write access of the FIFO memories 4050AR, 4050AG, and 4050AB by the $\overline{\text{WE}}$ signal 9100 will be described in detail below.

The SV recording reproducing unit 31 in this embodiment complies with the NTSC standards. When a video image from the SV recording reproducing unit 31 is digitized, an image capacity is given as 640 pixels (H)×480 pixels (V). The CPU 4360 in the image memory apparatus 3 writes a set value in the comparators 4232 and 4233 such that the number of pixels in the main scan direction is 640. The input to the selector 4213 is set to the CPU bus 9610 side, and "0"s having the number corresponding to the number of 480 pixels in the sub-scan direction are written in the RAM 4213.

100% data is set in the rate multiplier 4234 for setting a magnification in the main scan direction.

When image information from the SV recording reproducing unit 31 is to be stored in the memories 4060A-R, 4060A-G, and 4060A-B, the system controller 4210 couples the signals $\overline{\text{TVVSYNC}}$ 9060V, $\overline{\text{TVHSYNC}}$ 9060H, and TVCLK 9060C output from the TBC/HV separation circuit 4030 to the signals $\overline{\text{VSYNCIN}}$ 9455, $\overline{\text{HSYNCIN}}$ 9452, and CLKIN 9456 shown in FIG. 29.

As described above, since the image control signal is set on the SV recording reproducing unit side, the output signals 9051R, 9051G, and 9051B as data of one scanning line of a video image from the A/D converters 4020R, 4020G, and 4020B are input to the filter circuit 9500, and the output signals 9420R, 9420G, and 9420B from the filter circuit 9500 are stored as equi-magnification image data in the FIFO memories 4050AR, 4050AG, and 4050AB, respectively.

<Read Operation of Image Memory Apparatus>

Read access of image data from the memories 4060A-R, 4060A-G, and 4060A-B of the image memory apparatus 3 described above will be described below.

An input command for forming an image at the color printer 2 upon read access of the image output from these memories is input from the digitizer 16 shown in FIG. 23 or the operation unit 20.

When an area subjected to image formation is designated with the digitizer 16, as shown in FIG. 37, the color reader 1 sends designated position coordinates to the CPU 4360 in the image memory apparatus 3 through the control line 9460 connected to the connector 4550. These position coordinates are output as, e.g., 8-dot data.

Figure 27F:
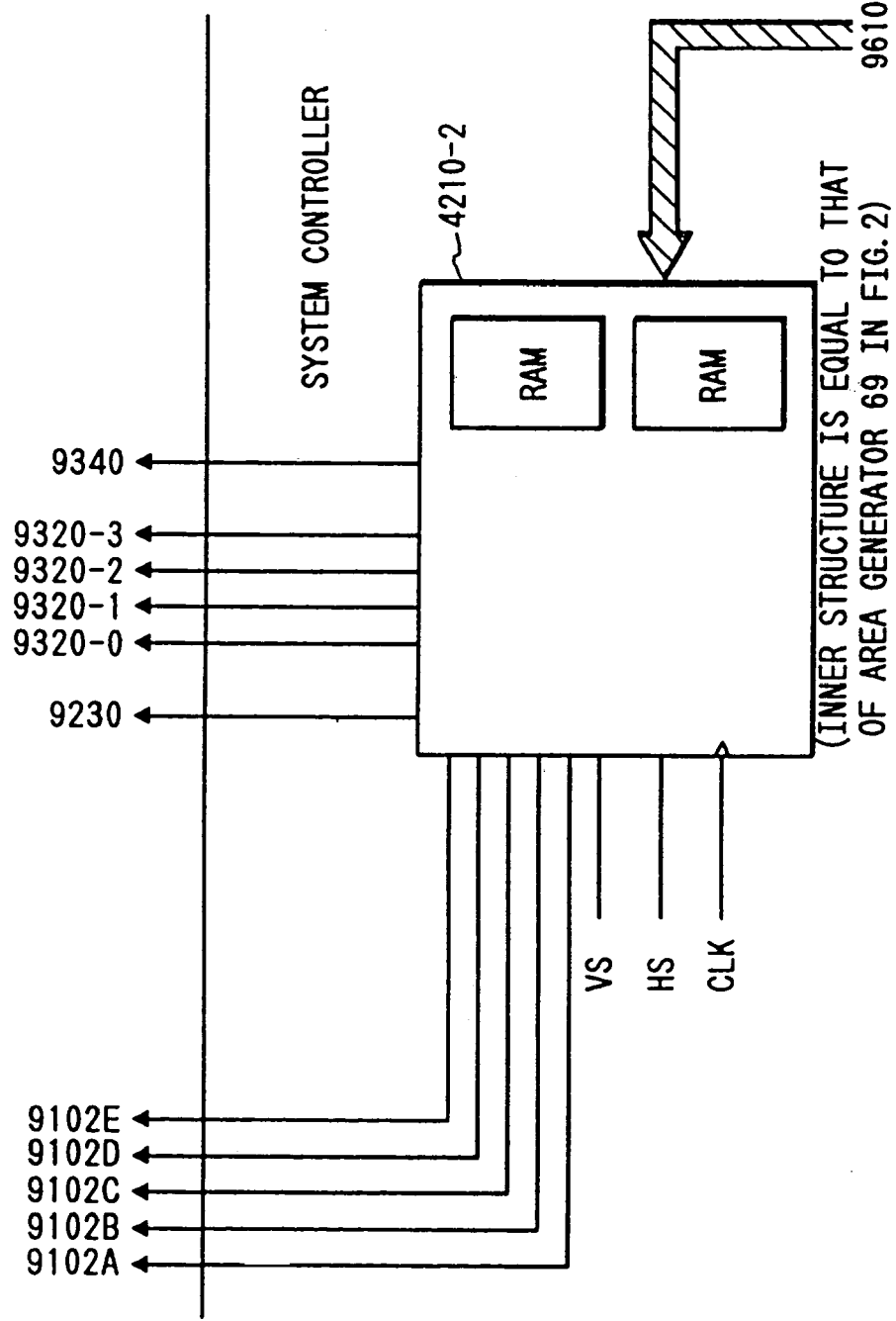
FIG. 27F is a view showing part of an internal structure of a system controller shown in FIGS. 27A and 27B.

The CPU 4360 programs an area generator 4210-2 (identical to that shown in FIG. 13D) in the system controller 4210 shown in FIG. 27F to obtain a desired image output on the basis of the coordinate information sent to the area generator 4210-2. More specifically, data corresponding to the coordinate information are set in the RAMs 85A and 85B shown in FIG. 13D. Signals output from the area generator serve as control signals in units of areas, as shown in FIG. 27F.

When programming described above is completed, the image memory apparatus 3 waits for a command from the color reader 1. Upon depression of a copy start button, image formation is started.

When the start button is depressed, the color reader 1 sends a command to the CPU 4360 in the image memory apparatus 3 through the signal line 4550. Upon reception of this command, the CPU 4360 immediately switches the selector 4250. A setting operation for sending an image from the image memory apparatus 3 to the color reader 1 in FIGS. 28B and 28C is as follows. The control signals SELECT-C, SELECT-E, and SELECT-F are set to be "0" to enable the corresponding gates, and other tristate buffers are kept in a high impedance state. The CPU 4360 sets the counter controller for a memory which stores a desired image in the read mode.

Upon completion of the above setting operations, CPU 4360 receives timing signals ITOP and BD from the color reader 1. The color reader 1 receives the image signals and the CLK image enable signal in synchronism with the above timing signals.

An operation for forming an image in accordance with a paper size, and an operation for forming an image in an area designated with the digitizer will be described below.

<Image Forming Process Corresponding to Paper Size>

In this operation, the color printer 2 has the two cassettes 735 and 736 shown in FIG. 1, and sheets having two sizes are respectively stored in the cassettes 735 and 736. Assume that A4-size sheets are stored in the upper cassette, and A3-size sheets are stored in the lower cassette. The sheet to be used is selected by an input at a liquid crystal touch panel in the scanning or operation unit 20. Image formation of a plurality of images on an A4-size sheets will be exemplified.

Prior to image formation, read image data are input from the color reader 1, the film scanner 34, or the SV recording reproducing unit 31 to the image memory apparatus 3 to store a total of 16 image data, i.e., "image 0" to "image 15" in each of the image memories 4060A-R, 4060A-G, and 4060A-B, as shown in FIG. 33.

A start key is depressed at the operation unit.

Figure 34:
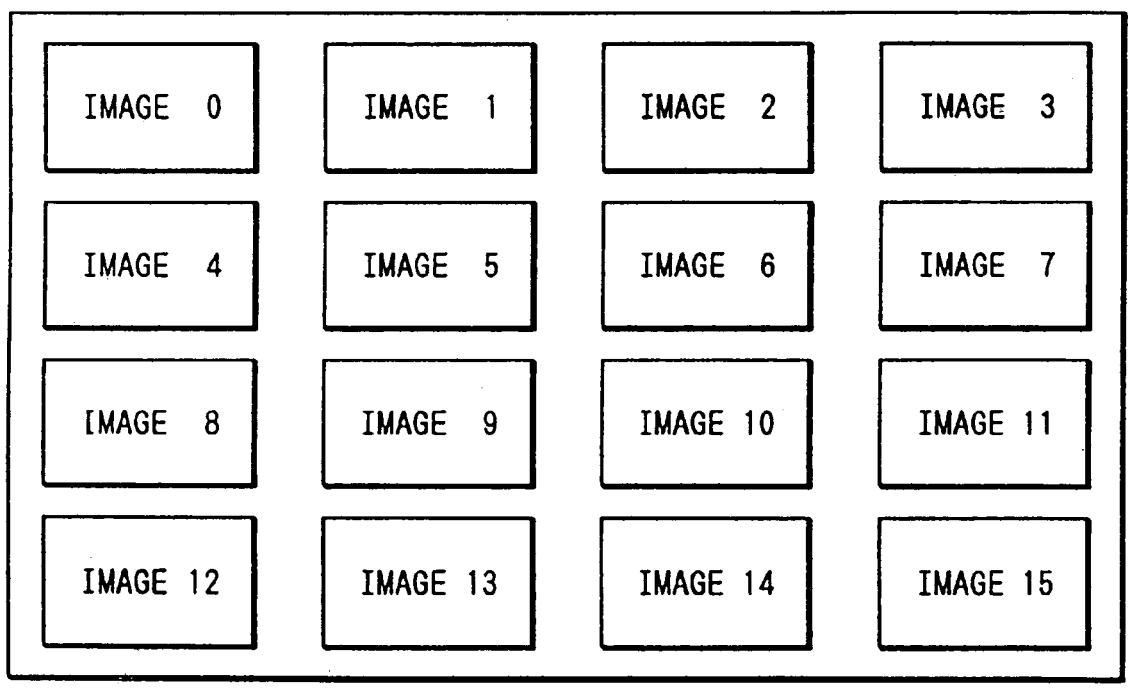
FIG. 34 is a view showing a state wherein an image stored in the image memory apparatus 3 is printed out at the color printer 2.

The CPU 22 shown in FIG. 2 detects this key input to set automatic image forming position for the A4-size sheet. In order to form 16 images shown in FIG. 33, image forming positions are set, e.g., as shown in FIG. 34.

Details of image forming process described above in this embodiment will be described with reference to the block diagrams of FIGS. 27A to 27E and a timing chart in FIG. 35.

The ITOP signal 511 sent from the color printer 2 shown in FIG. 2 to the color reader 1 through the printer interface 56 is input to the video interface 201 in the video processing unit 12 and is then sent to the image memory apparatus 3. The image memory apparatus 3 starts the image forming process in response to the ITOP signal 551. Each image sent to the image memory apparatus 3 is read out from the memories A, B, C, and D under the control of the system controller 4210 shown in FIGS. 27A and 27B.

Control signals 9102-0 to 9102-3 output from the area generator (FIG. 27F) in the system controller 4210 are input to the counter controller 9141 so as to serve as counter enable signals. The counter controller 9141 enables a counter on the basis of the input control signals and controls the select signal 9140 for the selector 4070. At the same time, the counter controller 9141 outputs the read enable signal 9103, and this signal serves as a write enable signal for next FIFO memories 4141-0 to 4140-3.

This allows read access of the image data stored in the memories 4060A-R, 4060A-G, and 4060A-B, and readout image signals 9160A-R, 9160A-G, and 9160A-B from the memories are sent to look-up tables (LUTs) 4110R, 4110G, and 4110B shown in FIG. 27C, and LOG conversion is performed to match the images with the human spectral luminous efficiency. Output data 9020A-R, 9020A-G, and 9020A-B output from these LUTs are input to a masking/black extraction/UCR circuit 4120A. The masking/black extraction/UCR circuit 4120A performs color correction of color image signals in the image memory apparatus 3. In a black recording mode, the circuit 4120A performs UCR/black extraction.

An image signal 9210 from the masking/black extraction/UCR circuit 4120A is input to the FIFO memories 4140-0 to 4140-3 by a selector 4130 shown in FIG. 27B on the basis of a select signal 9230 output from the area generator. As shown in FIG. 33, the sequentially aligned images are simultaneously processed by the FIFO memories 4140-0 to 4140-3.

Figure 35:
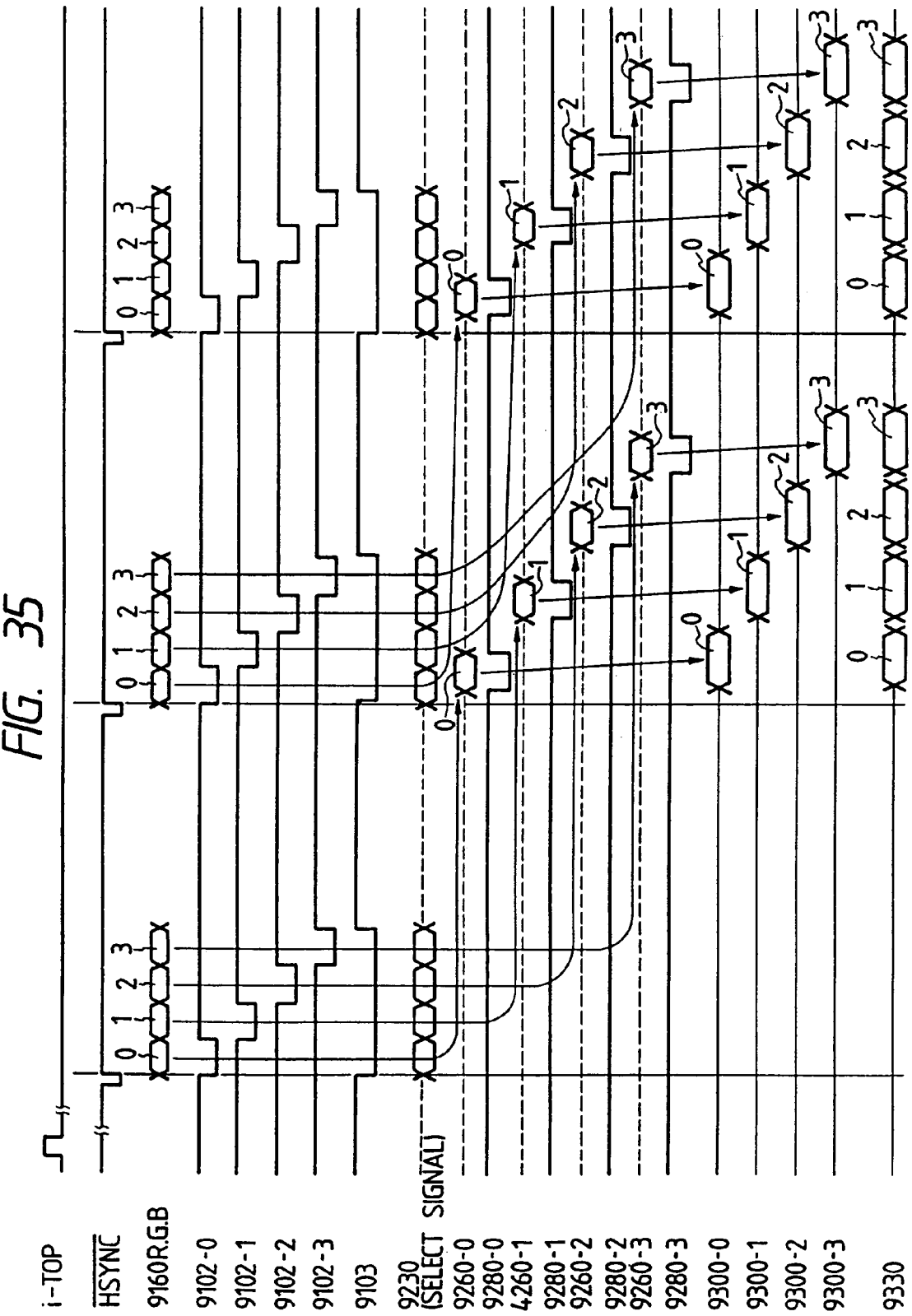
FIG. 35 is a timing chart for explaining an operation of the circuit shown in FIGS. 27A and 27B.

FIG. 35 is a timing chart showing an image flow.

Signals 9320-0 to 9320-3 are used as enable signals for enlargement•interpolation circuits, and a select signal 9340 serves as a select signal for a selector 4190 to select the enlargement•interpolation circuits. These signals are output from the area generator, and a maximum of four independent areas can be enlarged.

For example, when an enlargement•interpolation circuit 4150-0 is enabled in response to the enable signal 9320-0, the enlargement•interpolation circuit 4150-0 outputs a read enable signal 9280-0 to the FIFO memory 4140-0, receives image data from this FIFO memory, and performs enlargement. In this embodiment, linear interpolation is employed. When other enlargement•interpolation circuits are enabled, read enable signals are output to the corresponding FIFO memories to read out the data therefrom. A timing chart of this operation is shown in FIG. 35.

At this time, the image data sequentially read out from the memories are subjected to parallel processing. Finally, the layout of the images is completed by the selector 4190, and the parallel image data is then converted into serial image data again. An image signal 9330 converted into serial image data by the selector 4190 is subjected to edge emphasis and smoothing by an edge filter circuit 4180. The processed image signal passes through an LUT 4200 and is input to the selector 4230 through a signal line 9380.

The selector 4230 receives data 2E from the bit map memory and the image data from the memories. The selection operation of the selector 4230 will be described in detail later with reference to FIG. 41.

The image signal 9380 output from the selector 4230 is input as ⑤ to the selector 4250 and is sent together with the video enable signal and the clock generated by the area generator to the color reader 1.

When image formation of all "image 0" to "image 3" is completed, "image 4" to "image 7", "image 8" to "image 11", and "image 12" to "image 15" are sequentially formed, thereby forming 16 images, i.e., "image 0" to "image 15" shown in FIG. 34.

According to this embodiment, as described above, the 16 images are stored, and these images are laid out, as shown in FIG. 34 and are printed out. However, the number of images can be arbitrarily changed.

When an input image is an image input from the SV recording reproducing apparatus 31, images from the SV floppy disk can be continuously printed out, thus functioning as index printing.

Similarly, the film scanner 34 and the auto changer can be used to automatically and sequentially store images to perform 24-or 36-frame printing, thus performing index printing of film images.

<Image Formation by Layout at Arbitrary Positions>

The above description exemplifies a control operation for developing images so as to be automatically formed. However, the present invention is not limited to the above operation. An arbitrary image can be developed at an arbitrary position and can be formed.

For this purpose, an operation for developing "image 0" to "image 3" in FIG. 37 and forming them will be described below.

Figure 36:
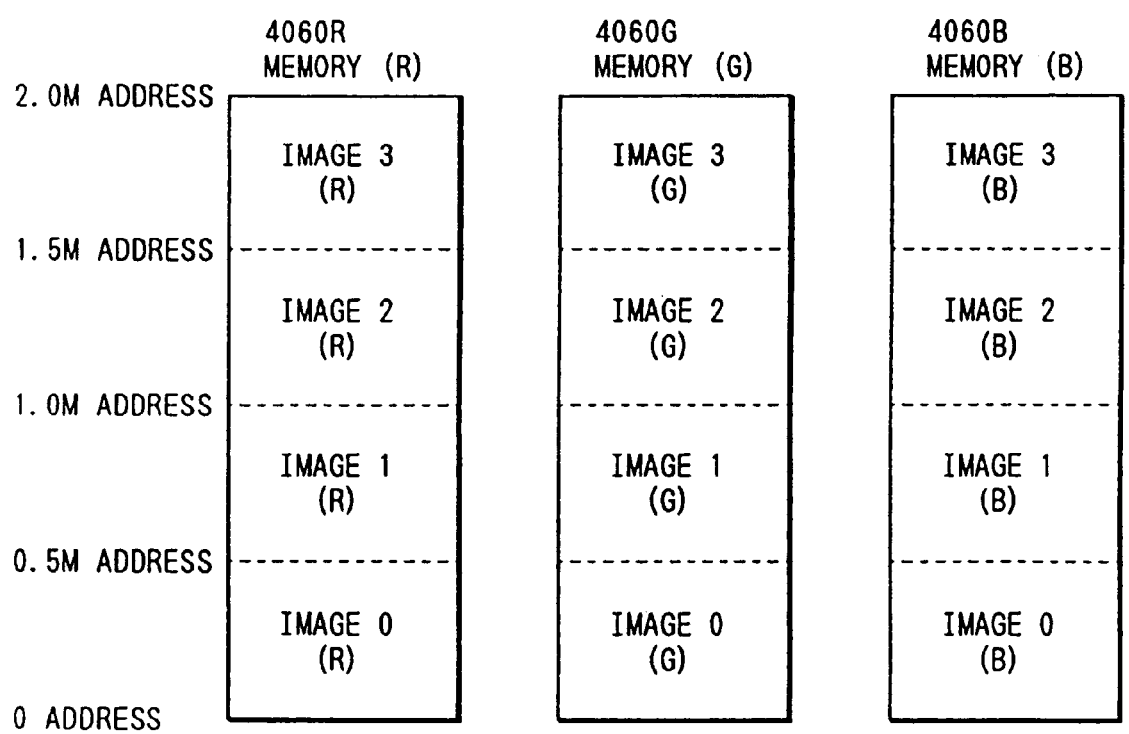
FIG. 36 is a view showing capacities of the memories 4060A-R, 4060A-G, and 4060A-B.

Under the same control as in image input control of the memories described above, four image data read from the color reader 1, the film scanner 34, or the SV recording reproducing unit 31 are stored in the image memories 4060A-R, 4060A-G, and 4060A-B, as shown in FIG. 36.

The point pen 421 is used to input a desired developing position on a coordinate detection board 420. For example, a developing area is designated and input, as shown in FIG. 37. In this case, the image forming process will be described with reference to the block diagrams in FIGS. 27A to 27F and timing charts in FIGS. 38 and 39.

Figure 39:
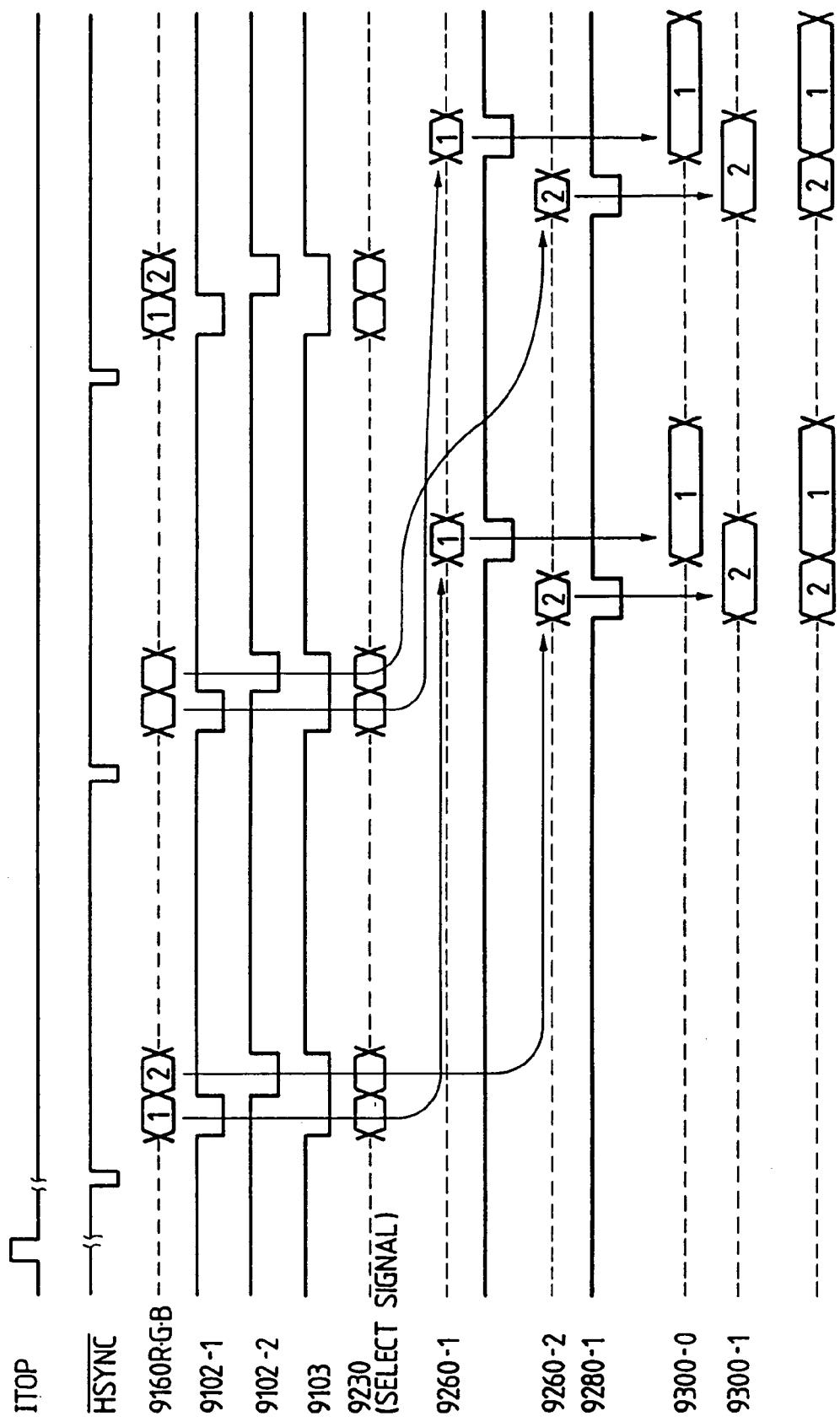
FIG. 39 is a timing chart for explaining operations of the respective parts in FIGS. 27A and 27B on the l2 line.

FIG. 38 is a timing chart of image formation on the l1 line, and FIG. 39 is a timing chart of image formation on the l2 line.

The ITOP signal 551 is output from the printer 2 as described above, and the system controller 4210 starts operation in synchronism with this signal.

Figure 37A:
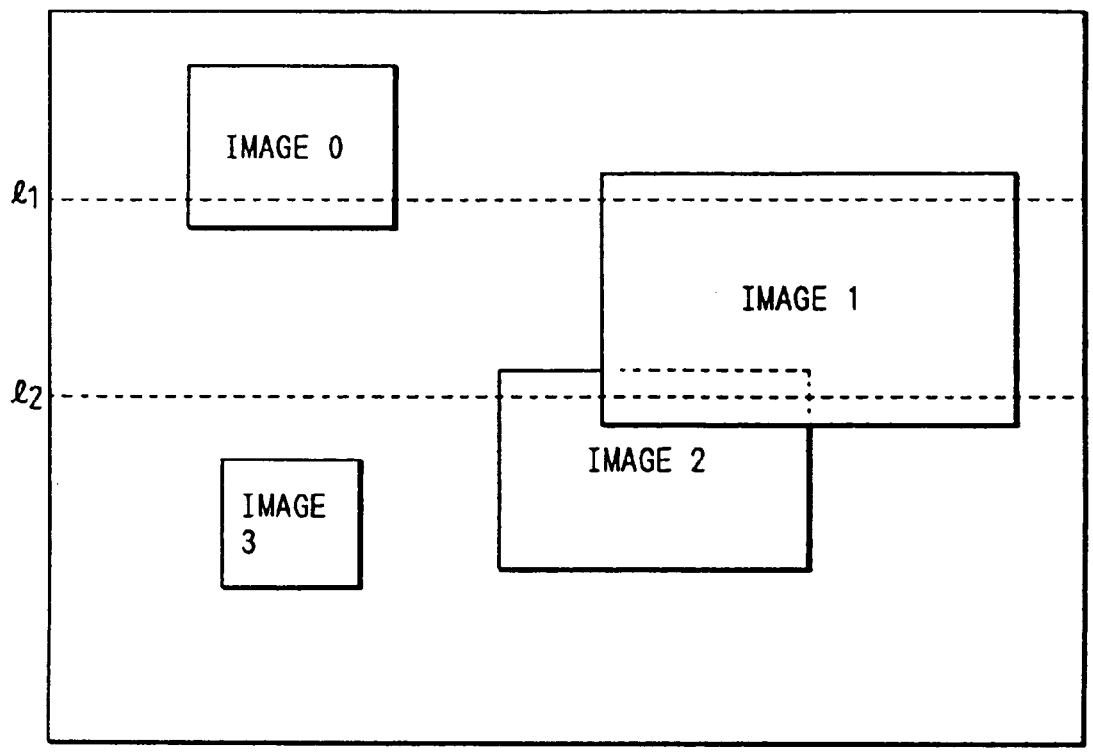
FIGS. 37A and 37B are views showing an image synthesis result.

In the image layout shown in FIG. 37A, "image 3" is obtained by rotating through 90° an image input from the color reader 1, the film scanner 34, or the SV recording reproducing unit 31.

Image rotation can be performed as follows. Images are transferred from the memories 4060A-R, 4060A-G, and 4060A-B to a work memory 4390 by a DMAC (Direct Memory Access Controller) 4380. Known image rotation is performed in the work memory 4390 under the control of the CPU 4360, and the images are transferred from the work memory 4390 to the memories 4060A-R, 4060A-G, and 4060A-B, thereby completing image rotation.

Position data of each image laid out, designated, and input with the digitizer 16 is sent to the image memory apparatus 3 through the video processing unit 12 shown in FIG. 1 along the path described above.

The position data is fetched by the CPU 4360 through the signal line 9460. The CPU 4360 executes a program for the area generator on the basis of the position data, as previously described.

Upon reception of the developing position data for each image, the system controller 4210 generates the operation enable signals 9320-0 to 9320-3 for the enlargement•interpolation circuits 4150-0 to 4150-3, the counter enable signals 9102-0 to 9102-3, and selector control signals, thereby obtaining desired images.

In the layout of arbitrary positions in this embodiment, for example, the counter 0 (4080-0) is operated in correspondence with image 0, the counter 1 (4080-1) is operated in correspondence with image 1, the counter 2 (4080-2) is operated in correspondence with image 2, and the counter 3 (4080-3) is operated in correspondence with image 3.

Image formation control on the l1 line shown in FIGS. 37A to 37G will be described with reference to FIG. 38.

"Image 0" is read out from each of the image memories 4060A-R, 4060A-G, and 4060A-B by the counter 0 (4080-0) from address 0 to address 0.5M (i.e., storage area of "image 0" shown in FIG. 36). The outputs from the counters 4080-0 to 4080-3 are switched by the selector 4070 under the control of the counter controller 9141.

Similarly, "image 1" is read out from each memory by the counter 1 (4080-1) from address 0.5M to address 1M (storage area of "image 1" shown in FIG. 36). The read timings are indicated by 9160A-R, 9160A-G, and 9160A-B in FIG. 38.

Data of "image 0" and "image 1" are sent to the masking/black extraction/UCR circuit 4120A through the LUTs 4110A-R, 4110A-G, and 4110A-B and are converted into the surface sequential color signal 9210. This surface sequential color signal 9210 is converted into parallel data by the selector 4120 and the components in units of pixels are sent to the FIFO memories 4140-0 and 4140-1. When the operation enable signals 9320-0 and 9320-1 for the enlargement•interpolation circuits 4150-0 and 4150-1 from the system controller 4210 are enabled, the enlargement•interpolation circuits 4150-0 and 4150-1 enable the FIFO read signals 9280-0 and 9280-1 and starts read operations.

The FIFO memories 4140-0 and 4140-1 starts transferring image data to the enlargement•interpolation circuits 4150-0 and 4150-1 in response to the signals 9280-0 and 9280-1, respectively. The output and interpolation operations are performed by the enlargement•interpolation circuits 4150-0 and 4150-1 for the area designated with the digitizer 16. The timings are indicated by 9300-0 and 9300-1 in FIG. 38.

"Image 0" and "image 1" after layout and interpolation calculations are selected by the selector 4190 and are input to the LUT 4200 through the edge filter circuit 4180. The subsequent operations up to the operation of the connector 4550 are the same as those described above, and a detailed description thereof will be omitted.

An operation on the l2 line in FIG. 37 will be described with reference to the timing chart in FIG. 39.

The signal flow from the image memories 4060A-R, 4060A-G, and 4060A-B to the enlargement•interpolation circuits 4150-1 and 4150-2 is almost the same as that described above.

However, on the l2 line, "image 1" and "image 2" are output, and the counter 1 (4080-1) and the counter 2 (4080-2), the FIFO memories 4140-1 and 4140-2, and the enlargement•interpolation circuits 4150-1 and 4150-2 are operated. Control of these components is performed by control signals output from the system controller 4210.

Figure 37B:
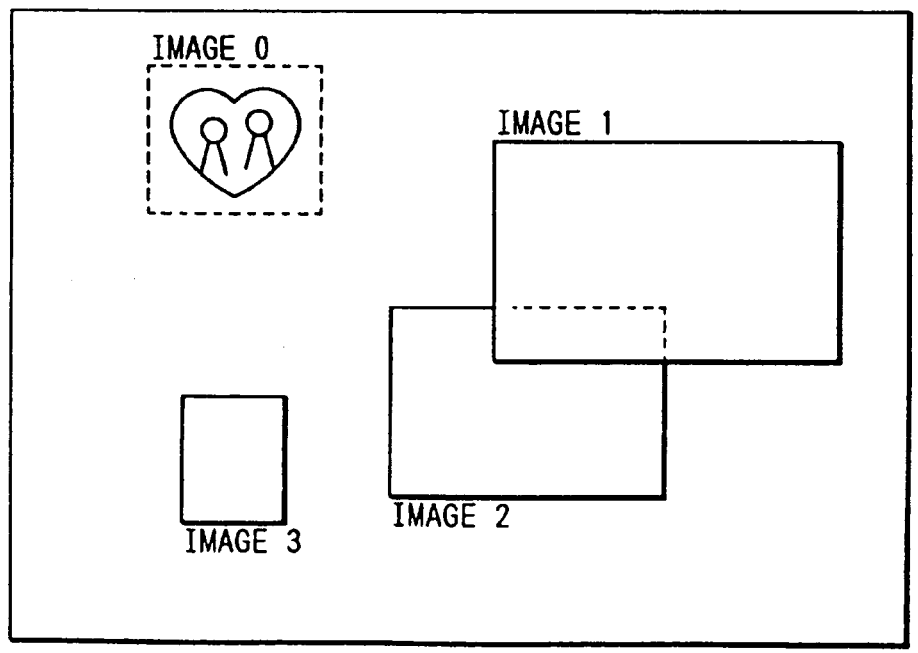

As shown in FIGS. 37A and 37B, "image 1" and "image 2" overlap each other on the l2 line. In an overlapping portion, an image to be formed from "image 1" or "image 2" is determined by the control signal 9340 from the system controller 4210.

Detailed control of the above operation is the same as control on the l1 line.

A signal from the connector 4550 is connected to the color reader 1 through a cable. For example, the video interface 201 in the color reader 1 selectively outputs the image signal 205R from the image memory apparatus 3 to the printer interface 56 through the signaling path shown in FIG. 4.

Transfer processing of image data from the image memory apparatus 3 to the color printer 2 in image formation of the above embodiment will be described in detail with reference to a timing chart in FIG. 40.

As described above, upon depression of the start button in the operation unit 20, the printer 2 is started to feed a sheet. When the sheet reaches a leading end of the image forming portion, the ITOP signal 551 is output. This ITOP signal 551 is sent to the image memory apparatus 3 through the color reader 1. The image memory apparatus 3 reads out image data stored in the image memories 4060A-R, 4060A-G, and 4060A-B, and layout processing, enlargement•interpolation processing and the like are performed.

<Memory Enlargement Continuous Copying>

Figure 43:
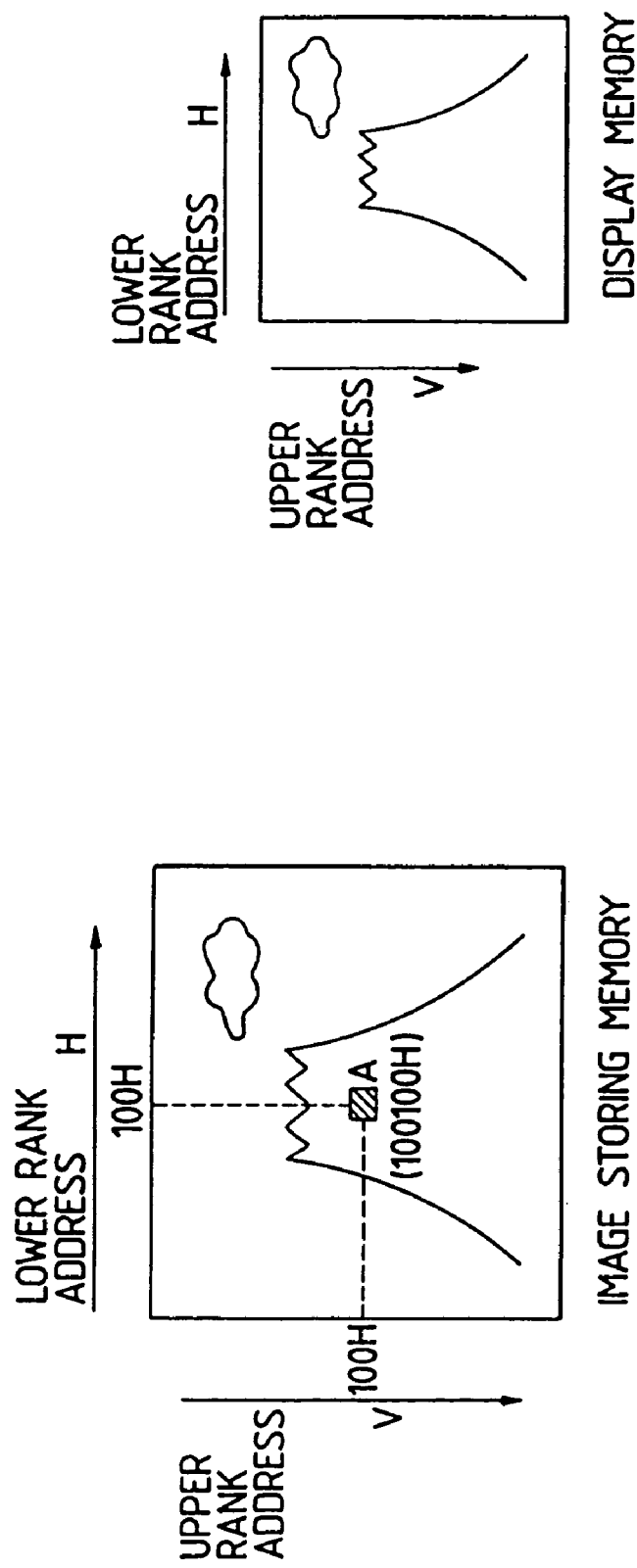
FIG. 43 is a view for explaining an operation of the circuit shown in FIG. 42.

Image data sent from the host computer 33 is input through a GPIB 4580, temporarily developed in the work memory 4390, written in the image memories A, B, C, and D, and read out by the means described above, thereby obtaining a print output. For example, if an image transferred to the image storing memory represents a memory area read out by the counter 0 (4080-0) of FIG. 27C, as shown in FIG. 43, this image can be printed and output to the area of "image 0" in FIG. 37A.

When layout coordinate data, a magnification, and a print command are sent from the host computer, image formation having arbitrary layout as described above can be performed under the control of the host computer.

Since the magnification can be arbitrarily set, an enlarged output image exceeding the size of the print sheet can also be obtained.

FIG. 37G shows an enlarged print obtained by dividing a storage image into four print sheets (to be referred to as enlargement continuous copying hereinafter). This operation will be described in detail below.

Figure 37D:
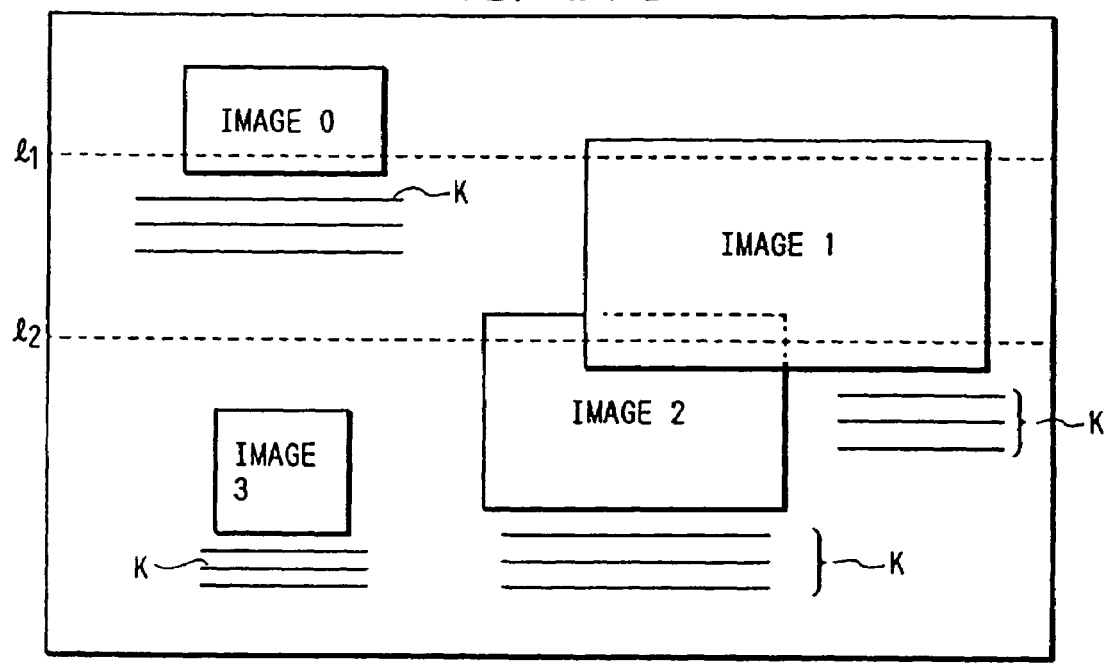
FIGS. 37D and 37E are views showing another image synthesization result.
Figure 37E:
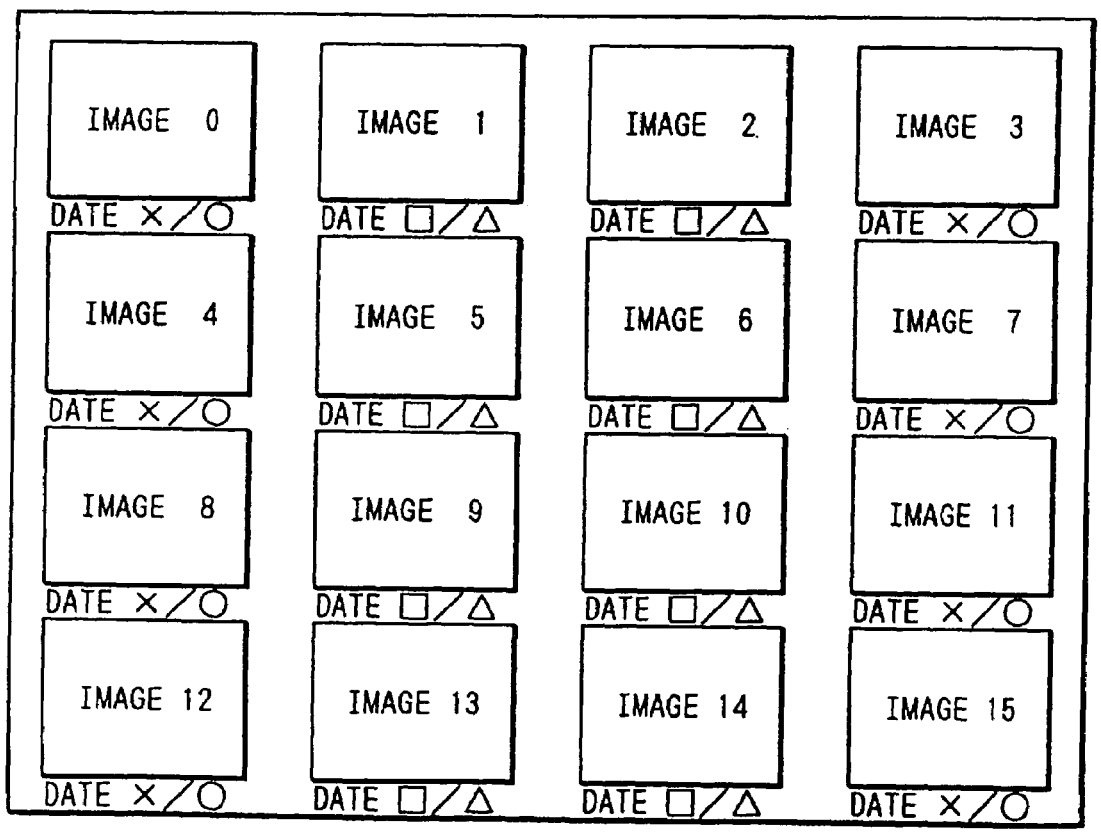
Figure 37F:
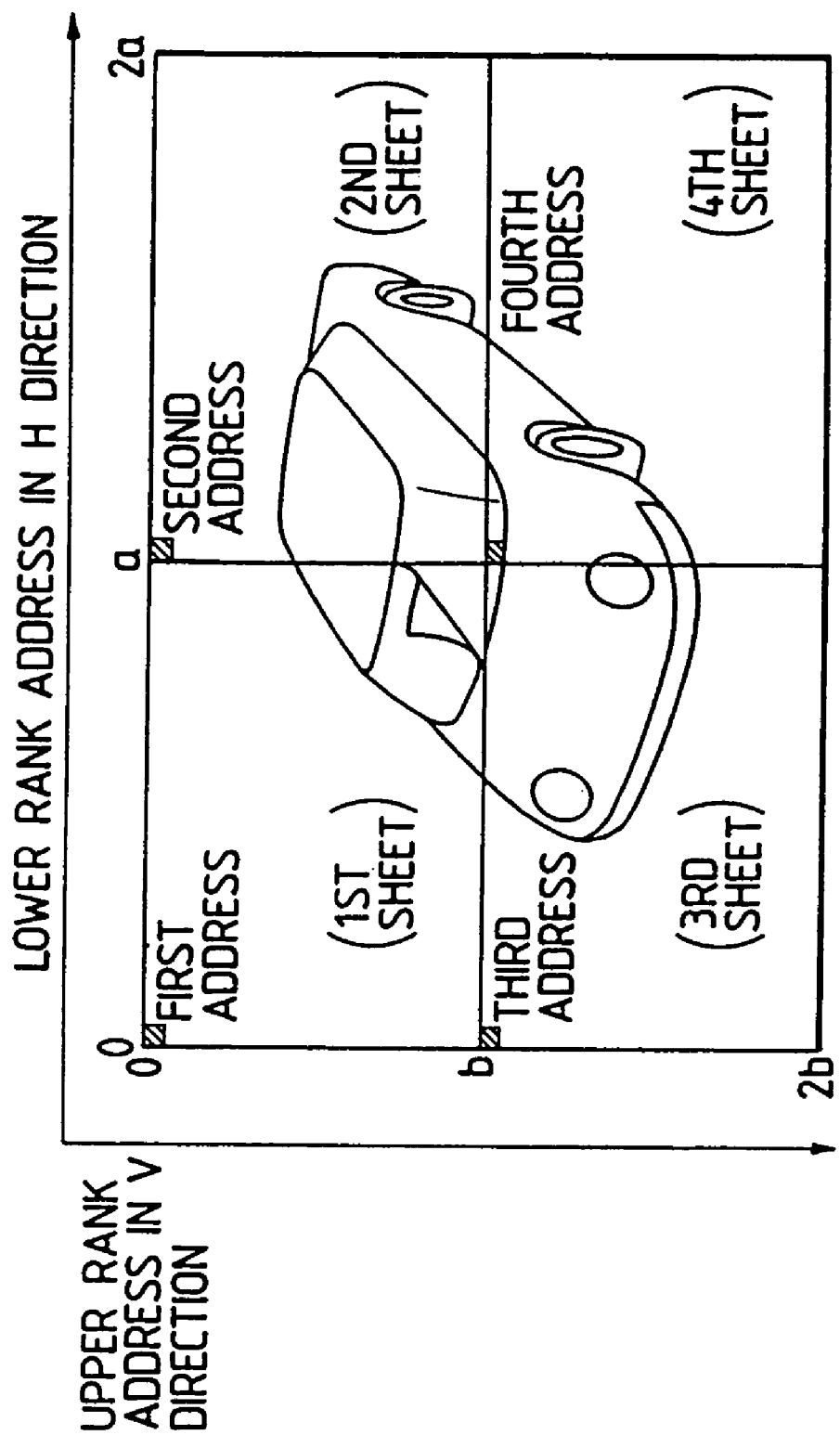

FIG. 37F illustrates an image stored in the memory area accessed by the counter 0 (4080-0) shown in FIG. 27C.

As shown in FIG. 37F, the memory storage area can be arbitrarily divided in accordance with a magnification and a paper size. Upon reception of an enlargement continuous copying command from the host computer, the CPU calculates a memory division size in accordance with the paper size and the magnification and sets the calculated values in the system controller and the read counter 0.

In FIG. 37F, the division size is given as a in the H direction and b in the V direction. The division size is used to calculate a start read address of the counter.

For the sake of simplicity, the four divided memory areas correspond to four print outputs, respectively.

The image forming process is started by the ITOP signal 551 shown in FIG. 40, and one-line data is read out up to address a in response to a counter enable signal 9130-0 from the system controller 4210. The readout data is enlarged and sent to the color reader 1. When the operation of the read counter is completed, the start address of the next line is calculated. Read access is then repeated until the line b, thereby completing printing of one sheet. Start address 2 of the second sheet is calculated until the ITOP signal of the second sheet is input. Printing is continuously performed up to the fourth sheet while the start address is sequentially and repeatedly updated. Finally, the printed images are connected to obtain an enlarged image.

<Non-Rectangular Image Synthesis Using Memory E>

Non-rectangular image synthesis processing using the bit map memory E will be described below.

For example, as shown in FIG. 37B, an output area of "image 0" has a heart-like shape and is synthesized on an original.

The size of an area of "image 0" to be output is taken into consideration, and a heart-like binary image is developed in the bit map memory E. In the same manner as described above, the developing area of each image is designated and input with the digitizer 16 from the color reader 1. At this time, a non-rectangular area selection button in the operation unit is depressed for only "image 0". The designated position data of each image and processing data are sent to the image memory apparatus 3 through the video processing unit 12. The received data are fetched by the CPU 4360 through the signal line 9460, and the output timings of the images are programmed on the basis of the fetched data, as previously described.

Upon reception of the ITOP signal from the color reader, the image memory apparatus 3 starts image read access, and image synthesization is actually performed when the image data pass through the selector 4230 shown in FIG. 27B.

FIG. 41 is a schematic diagram showing an internal structure of the selector 4230 shown in FIG. 27B. The selector 4230 includes a register 1 3010, gates 3020 and 3030. When data set in the register 3010 is controlled, 8-bit density data or the BI signal can be programmably selected from the bit map memory by the CPU. This selection can be performed in cooperation with the gates 3020 and 3030. For example, when the 8-bit density data is selected, the image is synthesized with the bit map by an OR gate 3040.

However, when the BI signal is selected, a select signal is input to a selector 3050, and the density of the data set in a register 3060 and the image data 9380 from the memory can be selected and output by the BI signal.

When non-rectangular image synthesization is to be performed, "0" is set in the register 2 3060. The sequentially readout image data 9380 is cut out by the selector 3050 using as the select signal the non-rectangular area signal BI output from the bit map, thereby performing non-rectangular image synthesis.

The BI signal can also be sent to the color reader 1, and the color reader 1 can perform processing using the BI signal.

Figure 6:
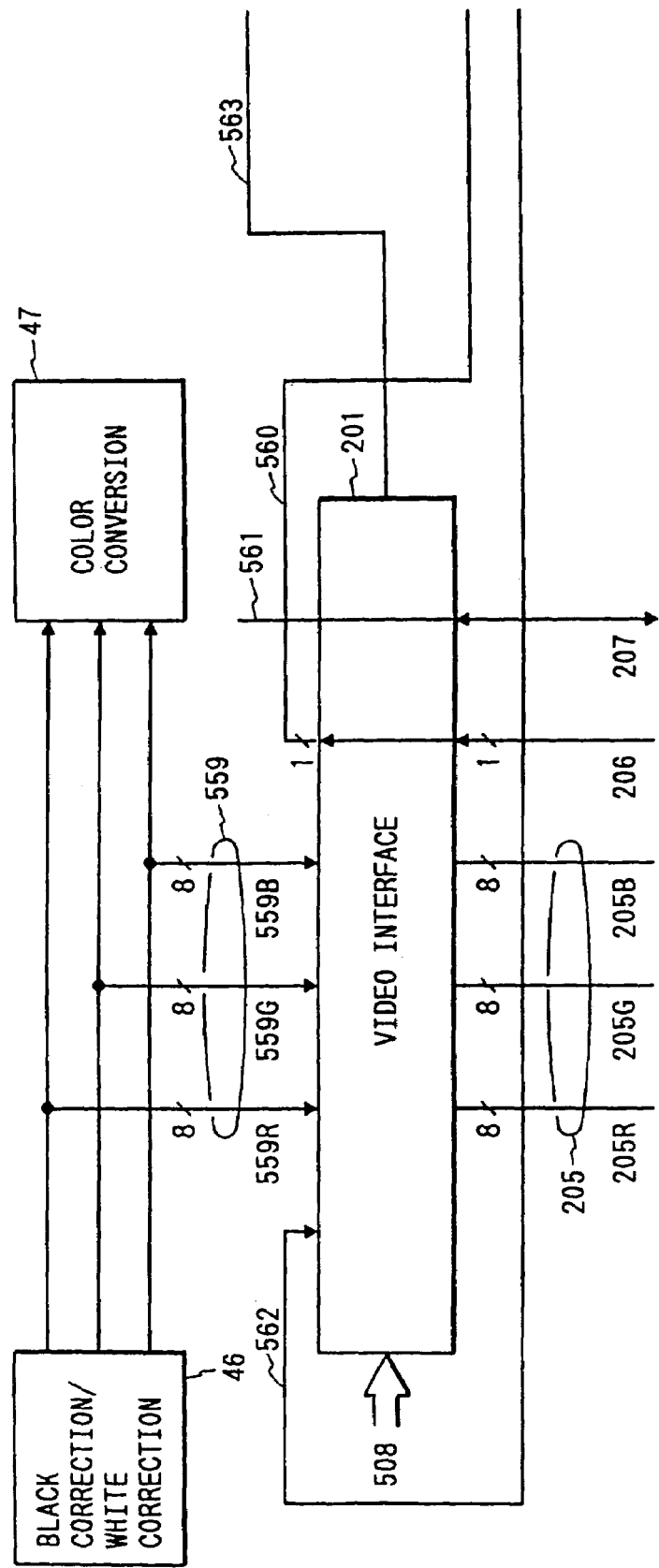

More specifically, the BI signal is used as the signal 206 input to the video interface 201 shown in FIG. 2, and the video interface 201 is used in the state shown in FIG. 6, thereby performing image synthesization on the reader side.

In this embodiment, image synthesization of a color image read by the reader 1 and the image stored in the image memory apparatus 3 can be synthesized in real time.

An image is read out from the image memory apparatus 3 in synchronism with the ITOP signal 551 from the color printer 2, as described above. At the same time, the color reader 1 starts read access of the reflecting original 999 with the full color sensors 6 in synchronism with the ITOP signal 551. The processing in the color reader 1 is the same as described above and a detailed description thereof will be omitted.

Synthesization between image data from the image memory apparatus 3 and image data from the color reader 1 will be described with reference to a timing chart in FIG. 37C.

A portion except for "image 0" to "image 4" in FIG. 37A represents a timing chart as a result of synthesis of a signal from the image memory apparatus 3 and the reflecting original 999 on the 11 line upon synthesis of the reflecting original read by the reader 1.

Image data output from the color reader 1 and read out in synchronism with the ITOP signal 551 serves as the output signals 559R, 559G, and 559B from the black correction/white correction circuit, which are output on the 11 line of FIG. 20 in synchronism with the signal HSYNC. Only the designated portions of the image data 205R, 205G, and 205B which are designated with the digitizer 16 are read out from the image memory apparatus 3. Two types of image data are input to the video interface 101. A color original image is output from the synthesis or synthesization circuit 115 for the area except for the area designated with the digitizer 16. As for the area designated with the digitizer 16, data from the image memory apparatus 3 is output.

As a means for setting a non-rectangular area in this embodiment, a mask pattern having a desired area shape is prepared and is loaded in the reader, thereby developing the pattern in the bit map memory.

In this embodiment, as shown in FIG. 27D-1, the bit map memory is connected to the CPU bus, and the mask pattern can be developed in the bit map memory under the control of the CPU. As for standard mask patterns (e.g., a star-like pattern, a rhombic pattern, and hexagonal pattern) which are assumed to be frequently used, programs for generating these patterns are stored in the program ROM or font ROM 4070 of the CPU. The programs are executed upon use of these patterns, thereby automatically generating the mask patterns.

With the above arrangement, a mask pattern is produced and need not be loaded, so that a mask pattern can be easily formed in the bit map memory, thereby further facilitating the image synthesis shown in FIG. 37B.

In this embodiment, the character font ROM 4070 shown in FIG. 27D-1 can be referred to by the CPU 4360 using code data transmitted from, e.g., the host computer 33, and the character font can be developed in the bit map memory E. In this manner, character fonts can be freely written in the bit map memory. In addition, the AND gate 3020 in FIG. 41 is enabled, the AND gate 3030 is disabled, and the image data 9380 and an image in the bit map memory are synthesized by the OR gate 3040, thereby facilitating character synthesis between the various storage image data.

For example, when a pattern generation program is executed by the CPU 4360, a ruled line K and the like can be written in the bit map. Such a ruled line and the image data can be easily synthesized, as shown in FIG. 37D. Other fixed patterns can be formatted as CPU programs.

In addition, character data from the font ROM 4070 in the bit map memory can be synthesized with image data to obtain an image with a message under the image, as shown in FIG. 37E. These characters can be developed by sending character codes from the host computer, or may be set by reading them from the reader.

<Description of Monitor TV Interface>

In the system of this embodiment, as shown in FIG. 1, contents of the image memories in the image memory apparatus can be output to the monitor TV 32. It is also possible to output a video image from the SV recording reproducing unit 31.

The above operations will be described in detail below. Video image data stored in the image memories 4060A-R, 4060A-G, and 4060A-B are read out by the DMAC 4380 and are transferred to and stored in display memories 4060M-R, 4060M-G, and 4060M-B.

By controlling the control signal output from the system controller 4210 to the respective memories, a desired image can be stored in the image memory and at the same time in the display memory M.

As shown in FIG. 27E illustrating the detailed arrangement of the display memory M, video image data stored in the display memories 4060M-R, 4060M-G, and 4-60M-B are sent to D/A converters 4430R, 4430G, and 443B through LUTs 4420R, 4420G, and 4420B and are converted into analog R, G, and B signals 4590R, 4590G, and 4590B in synchronism with a SYNC signal 4590S from a display controller 4440. The converted signals are then output.

The display controller 4440 outputs a SYNC signal 9600 in synchronism with an output timing of these analog signals. The analog R, G, and B signals 4590R, 4590G, and 4590B, and the SYNC signal 4590S are connected to the monitor 4, and the storage contents of the image memory apparatus 3 can be displayed.

In this embodiment, a control command is sent from the host computer 33 shown in FIG. 1 to the image memory apparatus 3 through the connector 4580 and the GPIB controller 4310 shown in FIG. 27B, and the displayed image can be trimmed.

The CPU 4360 transfers effective area data from the display memories 4410R, 4410G, and 4410B to the image memories 4060A-R, 4060A-G, and 4060A-B under the same control as described above, thereby performing trimming.

The CPU 4360 shown in FIG. 27B sets data in the comparators 4232 and 4233 and the RAM 4212 of FIG. 29 in response to an area command from the host computer 33 in the same manner as described above, and image data is input from the color reader 1 or the SV recording reproducing unit 31 again, thereby storing the trimmed image data in the memories 4060A-R, 4060A-G, and 4060A-B.

When a plurality of images are stored in the image memories 4060A-R, 4060A-R, and 4060A-B, desired layout of the images during its recording at the color printer 2 can be performed by using the monitor TV 32 and the host computer 33.

A sheet size is displayed on the monitor TV 32, and layout position data of each image is input from the host computer 33 while the screen image is being observed, thereby performing layout of the images recorded at the color printer 2.

At this time, read control of the storage data from the image memories 4060A-R, 4060A-G, and 4060A-B to the color printer 2 and recording control at the color printer 2 are the same as those described above, and a detailed description thereof will be omitted.

<Description of Computer Interface>

The system of this embodiment has the host computer 33 shown in FIG. 1 and is connected to the image memory apparatus 3. Interfacing with the host computer 33 will be described with reference to FIG. 27B.

Interfacing with the host computer 33 is performed by the GPIB controller 4310 connected to the connector 4580. The GPIB controller is connected to the CPU 4360 through the CPU bus 9610, and command exchange and image data transfer between the GPIB controller and the host computer 33 can be performed in accordance with a predetermined protocol.

When image data is to be transferred from the host computer 33 through the GP-IB, image data is received by the GP-IB controller 4310 line by line. The received image data is temporarily stored in the work memory 4390. The stored data is sequentially transferred from the work memory to the memories A and B and the memories C and D and the monitor display memory M by DMA. The data is received by the GP-IB controller 4310, and image transfer is performed by repetition.

Figure 42:
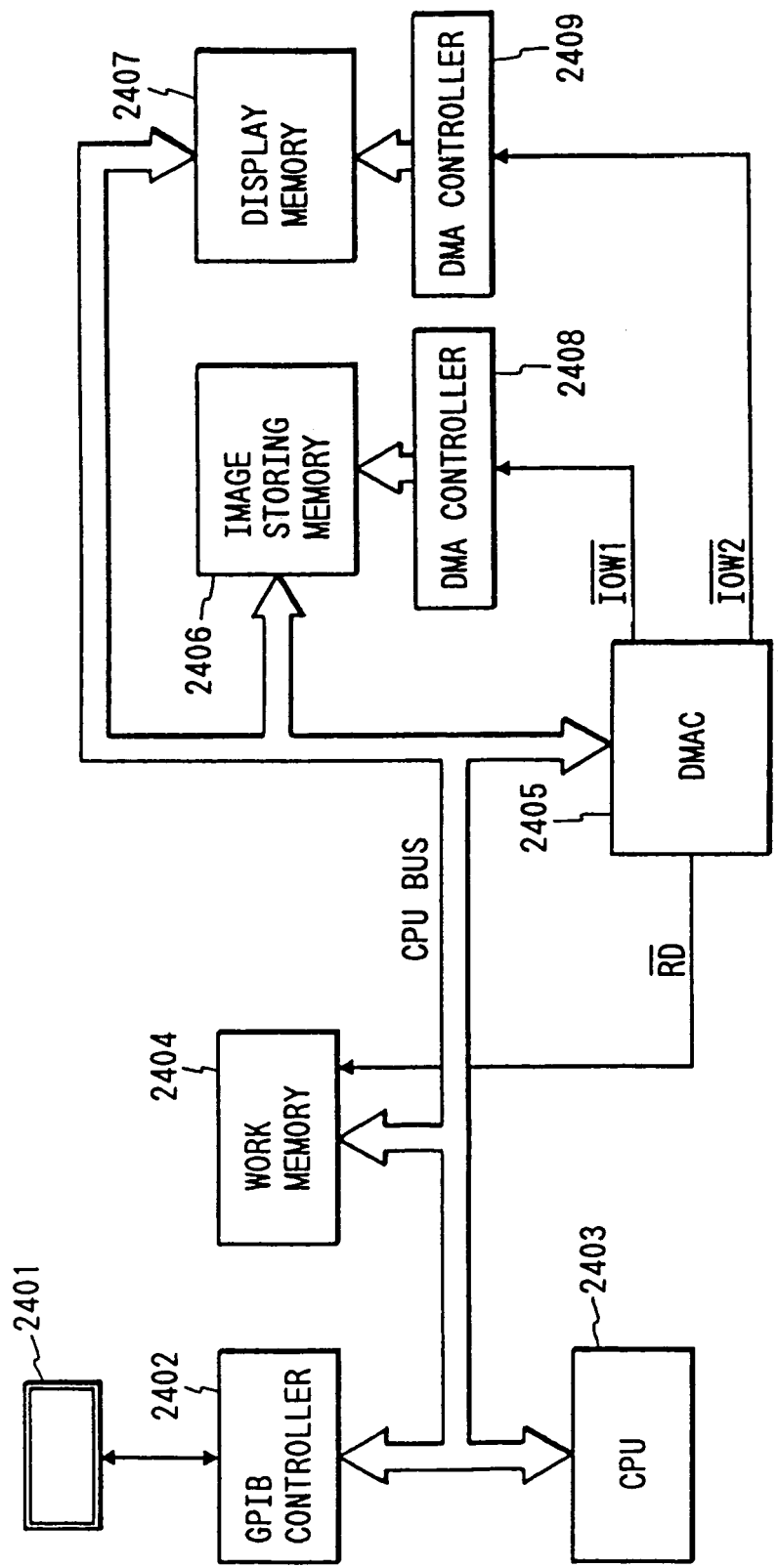
FIG. 42 is a view showing a relationship between the memory M (corresponding to 2407) and the image memories A, B, C, and D (corresponding to 2406), both of which are shown in FIGS. 27A and 27B.

FIG. 42 is a block diagram showing a relationship between a work memory 4369, the image storing memories A to C, and the monitor display memory M.

Reference numerals of components in FIG. 42 are changed. An image size data to be transferred is sent from the host computer 33. More specifically, image size data is fetched from the host computer 33 to a CPU 2403 through an input terminal 2401 and a GP-IB controller 2402. Image data are then read line by line and are temporarily stored in a work memory 2404. The image data stored in the work memory are sequentially transferred to an image storing memory 2406 and a display memory 2407 by a DRAM controller 2405 (to be referred to as a DMAC hereinafter) (for the sake of simplicity, R, G, and B components are represented by a single signal). The above operation will be described in detail below. The image storing memory 2406 and the display memory 2407 are assigned with addresses, as shown in, e.g., FIG. 43, and store image data. The H direction in FIG. 43 corresponds to a lower rank address direction, and the V direction corresponds to the upper rank address direction. For example, if a point A is located at 100H in the H direction and 100H in the V direction, the point A has address 100100H. Similarly, the lower and upper rank addresses are assigned to the display memory in the H and V directions. In this case, sequentially input images are stored in the image storing memory 2402 as equi-magnification images and in the display memory 2407 as ¾ reduced images.

An image size and a reduction factor from the host computer are set in the DMAC, and the first or start address and the reduced image size are set in DMAC controllers 2408 and 2409. When the above setting operations are completed, a command is sent by the CPU to the DMAC 2405 to start image transfer.

The DMAC 2405 supplies address and $\overline{RD}$ signals to the work memory 2404 to read out image data. At this time, the address value is sequentially incremented. When read access of 1H is completed, the next line image is received from the host computer and is stored in the work memory. Signals $\overline{IOW1}$ and $\overline{IOW2}$ are supplied from the DMAC to the DRAM controllers 2408 and 2409 to sequentially write data. At this time, the DRAM controllers 2408 and 2409 count pulses of the $\overline{IOW}$ signal and increment the set first address. When write access in the H direction is completed, the address in the V direction is incremented, and write access from the next H line is started.

During data transfer, the DMAC has the same function as the rate multiplier for the signal $\overline{IOW}$. By culling the signal $\overline{IOW}$, image reduction can be performed. For example, when ¾ reduction is set, every four signals $\overline{IOW}$ are culled in the H direction, and the signal $\overline{IOW}$ is not output for one section per four lines in the V direction. As a result, the signal $\overline{IOW}$ is controlled to manage memory write access, thereby obtaining a reduced image.

Figure 44:
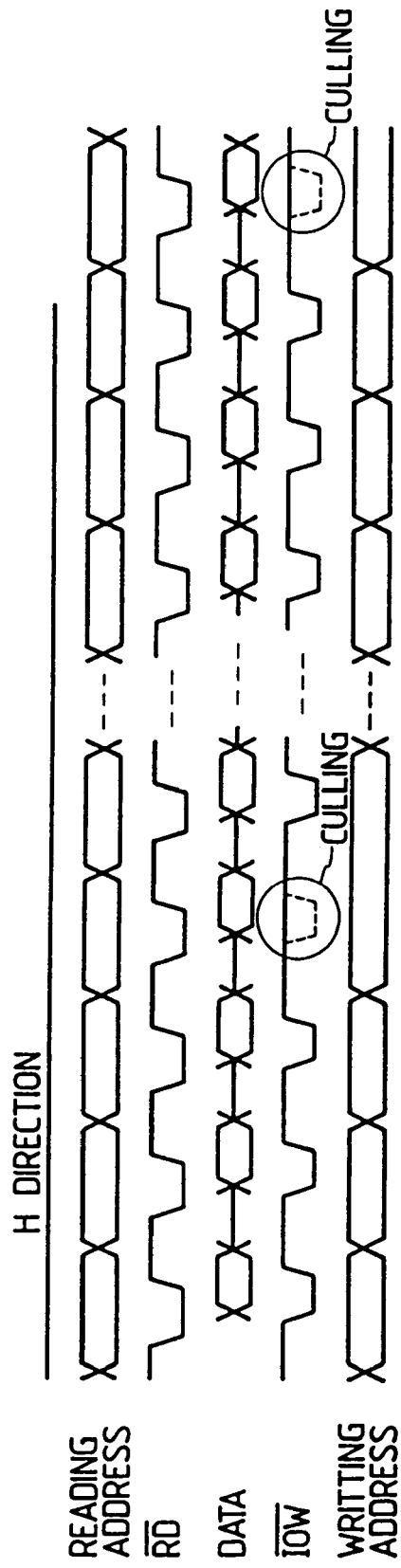
FIG. 44 is a flow chart for explaining an operation of the circuit shown in FIG. 42.

FIG. 44 is a timing chart of the above operation. As shown in FIG. 44, a read address is input to the work memory 2404, and data is output onto a data bus by the $\overline{RD}$ signal. At the same time, a write address is input to a destination address, and data is written by the signal $\overline{IOW}$. In this case, when the signal $\overline{IOW}$ is culled, the write address is not incremented or write access is not performed.

<Description of Man-Machine Interface>

As described above, in the system (FIG. 1) of this embodiment, input operations are performed from the host computer 33 and the operation unit 20 in the color reader 1.

The man-machine interface using the operation unit 20 will be described below.

Upon depression of an external device key (not shown) of the operation unit 20 in the color reader 1, a display A in FIG. 47 is displayed on the liquid crystal touch panel.

FIG. 47 shows operations performed when image data is stored from the color reader 1, the film scanner 34, or the SV recording reproducing unit or reproducer 31 to the image memory apparatus 3.

Upon depression of an image register key in the display A of FIG. 47, the liquid crystal touch panel is displayed as indicated by C. An input source displayed in an area surrounded by the broken line and indicated by X in the display C is selected by the ▼and/or ▲key. The kinds of input source are the color reader 1, the film scanner 34, and the SV recording reproducer 31 and can be selected with the ▲and/or ▼key. This selection procedures are shown in a part below the display C.

Upon depression of an image number key in the display C, the flow advances to the next step. A display D indicates a case in which an image is already stored in the designated image number. An image in the display D can be obtained by touching an area Y in FIG. 47. Displays E, G, and H are determined by selection (i.e., selection with the ▲and/or ▼key) of the input source in the display C. More specifically, when the color reader is selected, the display E is obtained. When the film scanner 34 is selected, the display G is obtained. When the SV recording reproducer 31 is selected, the display H is obtained.

The image register for the color reader 1 is selected, the display E in FIG. 47 is obtained. In this state, a read area on the original 999 on the platen glass 4 in the color reader 1 is designated with the point pen 421 in the digitizer 16 shown in FIG. 23. When this designation is completed, the display F is displayed for confirmation. If the designated read area is to be changed, the C key is depressed to restore the display E. In this state, a desired read area can be designated again.

If the designated read area is O.K., the OK key is depressed to obtain the display G. In this case, a 20 memory amount is then set.

A bar graph representing a memory amount in the display G is changed by mounting memory boards (the memories A to D in FIG. 27A) in the image memory apparatus 3.

A maximum of four memory boards (memories A to D) can be mounted in the image memory apparatus 3. That is, a longest bar is displayed when four memory boards are mounted in the image memory apparatus 3.

The bar graph in the display G sets a memory amount for image register in addition to a memory amount in the image memory apparatus 3. A register memory amount is determined using the +and/or −key, and a register start key is depressed to cause the original scanning unit 11 (FIG. 1) to scan and read the original 999.

Image data from the original scanning unit 11 in FIG. 1 is transmitted through the cable 501 and is processed by the video processing unit 12. The processed image data is output to the image memory apparatus 3 through the video interface 201. The image data stored in the image memory apparatus 3 is displayed on the monitor TV 32. A method of storing image data in the memories (FIG. 27C) in the image memory apparatus 3 is the same as previously described, and a detailed description thereof will be omitted.

As described above, the memory amount can be variably set in the display G. Even if images in a single area are stored, high-quality image storage can be achieved by increasing the memory amount. By decreasing the memory amount, a larger number of images can be input.

Image registration from the film scanner 34 is performed in the display G. A registration method is the same as in the color reader 1, and a detailed description thereof will be omitted.

When image registration from the SV recording reproducer 31 is performed, the display H in FIG. 47 is obtained. In this display H, it is set prior to the start of registration whether a turn direction registration is present, AGC (Auto Gain Control) is ON or OFF, a field or frame is used. After these items are set, the register start key is depressed to fetch image information from the SV recording reproducer 31 to the memories (FIG. 27C) in the image memory apparatus 3. A method of storing image information in the memories is the same as previously described, and a detailed description thereof will be omitted.

Figure 48B:
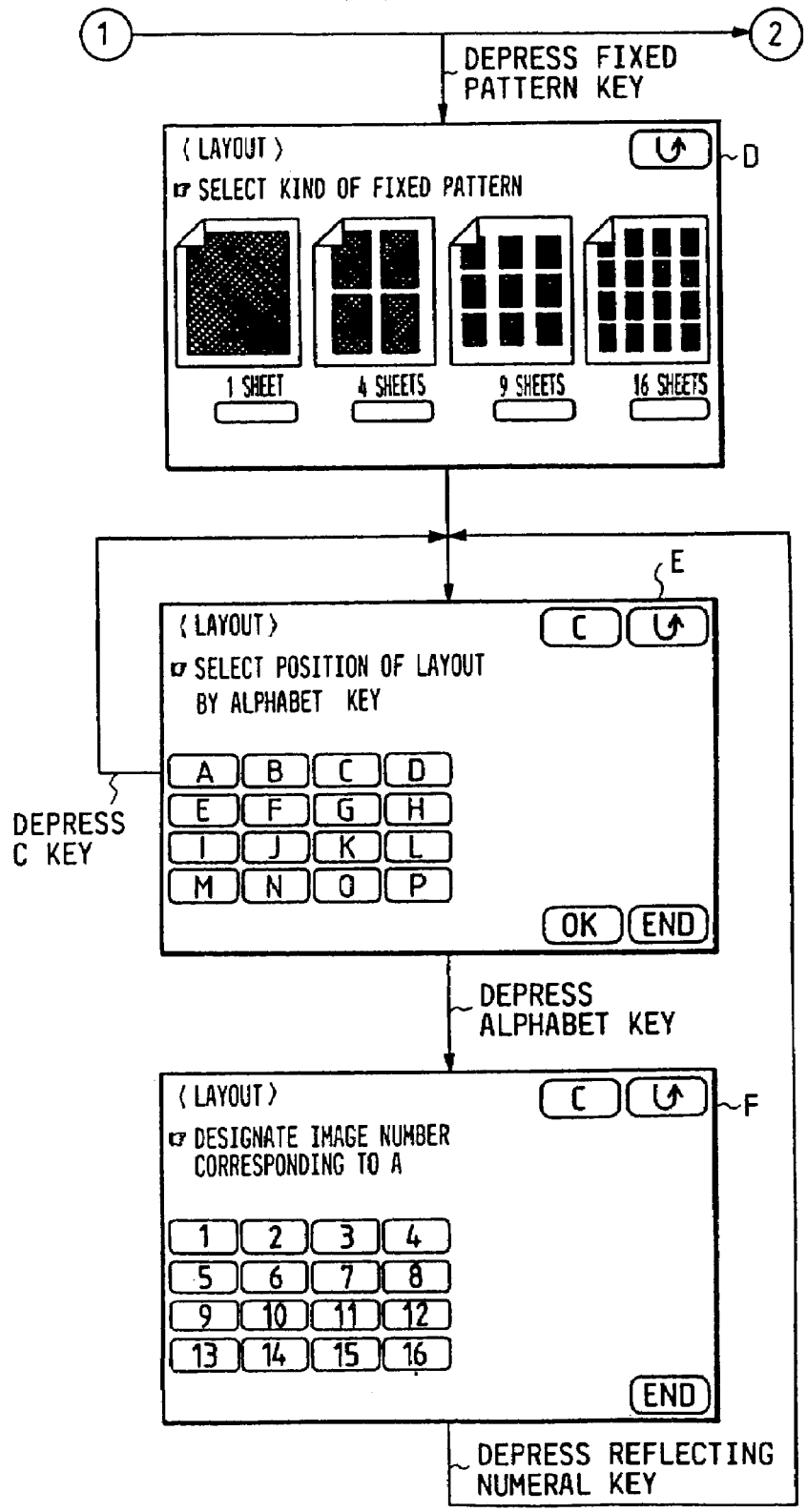
Figure 48C:
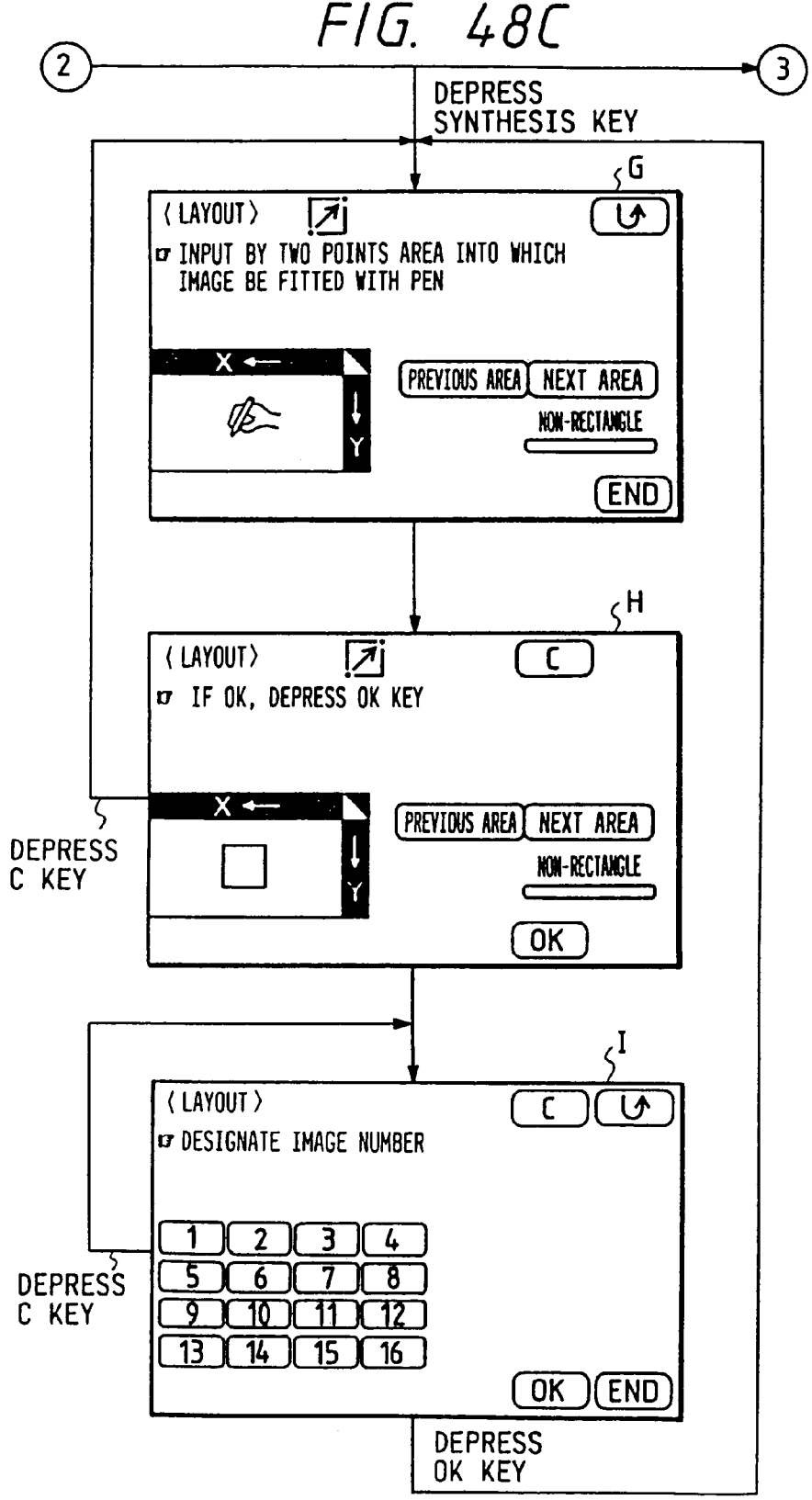

FIG. 48 is a view showing a method of performing layout-printing from the memories in the image memory apparatus 3 to the color printer 2.

A display C in FIG. 48 is used to select three kinds of layout patterns.

The fixed layout pattern is used to perform printing layout of the contents of the memories in the image memory apparatus 3 in accordance with a predetermined pattern.

Free layout is performed to print out the contents of the memories in the image memory apparatus 3 in an area designated with the point pen 421 in the digitizer 16 shown in FIG. 23.

The contents of the memories in the image memory apparatus 3 are written in the area designated with the point pen 421 in the digitizer shown in FIG. 23, an image of the original 999 on the platen glass 4 of the color reader 1 is synthesized with the contents of the memories, and the synthesis image is printed out.

When the fixed layout is selected, the number of print images in the fixed layout is set in a display D of FIG. 48. Image area names A to P are assigned to the image areas of the fixed layout, and image numbers corresponding to the areas (A-P) are set using displays E and F in FIG. 48. For example, when 16 images are selected in the display D of FIG. 48, the display E in FIG. 48 is obtained. When the area A in the display E is selected, the display is changed to a display F in FIG. 48. An image number of an image to be formed within the designated area is set using numeral keys in FIG. 48. This designation is repeated to register a plurality of images. The number of images to be registered is automatically determined in accordance with the kind of fixed pattern selected in the display D of FIG. 48. When these setting operations are completed, the CPU in the color reader stores in the image memory apparatus 3 the image corresponding to a desired image selected in the display F of SV recording reproducer if SV is selected, i.e., in the display in accordance with the kind of external device selected in the display B in FIG. 48.

A message appears to instruct an operator to input an image number corresponding to a start key (not shown) on the operation unit 20. Upon depression of the switch having the designated number, a hard copy having the fixed layout is output from the printer 2. Sixteen images having the fixed layout on one sheet are printed, as shown in FIG. 34.

Free layout printing in a display J of FIG. 48 will be described below. In free layout printing, each area is designated with the point pen 421 of the digitizer 16 shown in FIG. 23. At the same time, image numbers in a display L in FIG. 48 are selected at the ten-key pad.

When each area designation is competed, a start key (not shown) in the operation unit 20 in FIG. 1 is depressed, and the contents of the memories in the image memory apparatus 3 are printed out in the areas set in the displays J and K in FIG. 48.

Synthesis layout in a display G of FIG. 48 can be set in the same manner as in free layout.

An image of a reflecting image is output except for the designated area, and a color image is output within the designated area.

FIG. 49 shows procedures of color balance when a "monitor display" key is turned on in the display A of FIG. 47, i.e., an operation for displaying an image on the monitor TV 32 is performed and the "color balance" key in the illustrated state is turned on, that is, when image information in the image memory apparatus 3 is printed out at the color printer 2.

When the monitor display key in the display A in FIG. 49 is depressed, a display C is obtained. In this display, it is determined whether the image number in the image memory apparatus 3 is selected and the selected image is displayed on the monitor TV 32 or a source display is performed. Since the details of this display mode have been described, a description thereof will be omitted.

The color balance key in the display A of FIG. 49 is depressed to obtain a display D. In this display, an image number for setting a color balance is selected. When the image number is selected, the liquid crystal touch panel is changed to a display E. That is, a bar graph having red, green, and blue bars is displayed. When the [+]key adjacent to the red bar is depressed, the red bar is shortened, i.e., the distal end of the bar is moved to the left. In this state, a red luminance signal is electrically amplified to reduce a red component displayed on the monitor. Characteristic curves of the look-up tables (LUTs) 4420R, 4420G, and 4420B in the monitor or display memories in FIG. 27E are changed to change the color balance on the monitor TV. At the same time, characteristic curves in the look-up tables (LUTs) 14110A-R, 4410A-G, and 4410A-B shown in FIG. 27C are also changed. That is, the CPU in the color reader 1 communicates with the CPU in the image memory apparatus 3, and then the LUTs are updated by the CPU in the image memory apparatus 3. As described above, by simultaneously changing the characteristic curves in the two types of LUTs, an image displayed on the monitor TV can be printed out from the color printer 2 with the same color balance as the image displayed on the monitor TV.

Figure 50B:
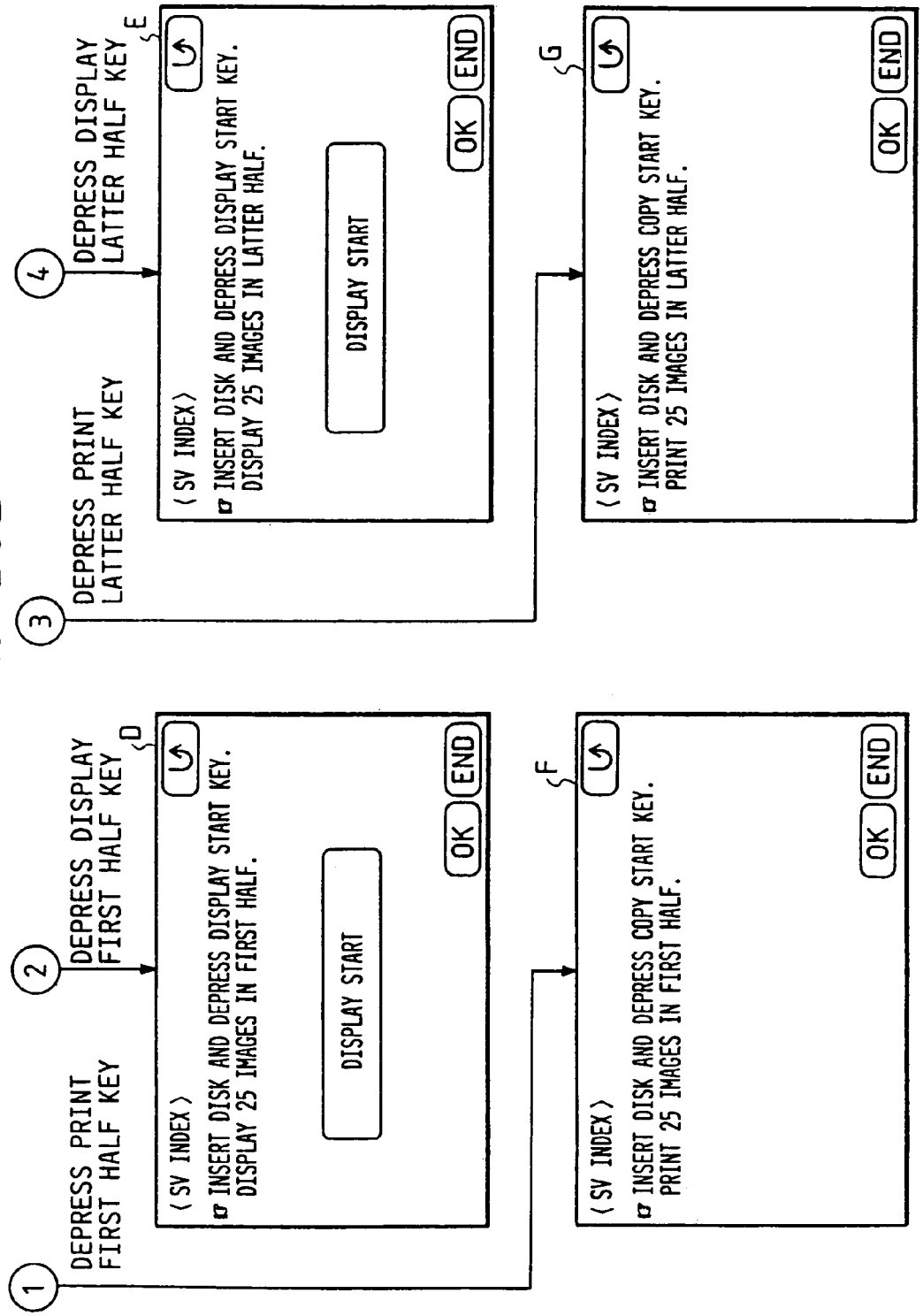

FIG. 50 is displayed when the [⊙]key is turned on in a display A of FIG. 47. A display B of FIG. 50 shows a state obtained when the [sv]key is turned on. That is, this operation is performed to display the content of the SV disk which is reproduced by the SV recording reproducer 31 and to print out it from the color printer 2.

A display C in FIG. 50 shows procedures for selecting an index display or index printing.

An SV disk can store 50 field images or 25 frame images.

When a display start key in a display D of FIG. 50 is depressed, the first 25 field images stored in the SV disk are displayed in field recording. When a display start key in a display E of FIG. 50 is depressed, the 25 remaining field images are displayed on the monitor. In this case, the CPU in the image storing apparatus 3 sets the SV recording reproducer in a remote state.

In this case, the CPU in the color reader 1 generates a command for sequentially storing images of a plurality tracks from the SV recording reproducer to the memories of the CPU in the image memory apparatus 3. The CPU in the image memory apparatus 3 generates the following command to the SV recording reproducer. The first half of the 50 field images recorded in the SV disk is sequentially stored in the memories in the image memory apparatus 3. In this case, the image memory apparatus 3 supplies only a head movement command to the SV recording reproducer. More specifically, prior to storage of the image signal in the image memory apparatus 3, a reproduction head of the SV recording reproducer accesses the outermost track, and a video image from this track is stored in memories in the image memory apparatus 3. The CPU in the image memory apparatus 3 sends a command for moving the reproducing head to a position inside the outermost track by one track. The image memory apparatus 3 stores a video image from this track in the memories. These operations are repeated to sequentially cause the image memory apparatus 3 to store the image signals in the memories. A multi-index image is formed in the internal memories. In frame recording, the display start key in the display D is depressed to display all SV disks.

Displays F and G in FIG. 50 show procedures for printing out the contents of the above index at the color printer 2.

When setting operations on the display F are completed, the start key on the operation unit 20 is depressed, and the image memory apparatus 3 reads out 25 field images from the SV recording reproducer 31 and stores them in the memories. Index printing is then performed at the color printer 2 through the color reader 1. Operations in the display G are the same as those in the display F, and a detailed description thereof will be omitted.

As described above, upon completion of the operations in the displays F and G of FIG. 50, image registration and layout printing can be easily performed.

<Control by Host Computer>

The system of this embodiment includes the host computer 33 shown in FIG. 1 and is connected to the image memory apparatus 3. Interfacing with the host computer 33 will be described with reference to FIG. 10.

Interfacing with the host computer 33 is performed by the GP-IB controller 4310 connected to the connector 4580. The GP-IB controller 4310 is connected to the CPU 4360 through the CPU bus 9610 and can exchange commands with the host computer 33 and can transfer image data to the host computer 33.

The image data from the color reader 1 or the SV recording reproducer 31 is sent to the host computer 33 by the GP-IB controller 4310 connected to the connector 4580 and is stored in the memory area in the host computer 33, thereby performing enlargement/reduction processing, cutting out of part of the image data, and layout of a plurality of image data as in a conventional system. In this case, in the conventional system, however, it takes a long period of time to transfer data from the color reader 1 or the SV recording reproducer 31 to the host computer 33 even through a general-purpose interface such as a GP-IB interface since a data volume of a color image is considerably large. In order to solve this problem, input image data are not directly sent to the host computer 33. Instead, a predetermined instruction is sent from the host computer 33 to the GP-IB controller in the image memory apparatus 3, the CPU 4360 decodes this instruction and controls the input image data from the color reader 1 or the SV recording reproducer 31, and only a necessary image area is designated. Other image portions are not stored in the memories, thereby effectively using the memories. Therefore, all image data need not be transferred to the host computer 33.

Even if the input image data is not stored in the memory area in the host computer 33 in response to an instruction from the host computer 33, the image memory apparatus 3 can store a plurality of image data in the image memories 4060A-R, 4060A-G, and 4060A-B. Even if image processing such as layout of the images and enlargement/reduction is not performed by the host computer 33, the CPU 4360 in the image memory apparatus 3 performs processing of only the input image in accordance with only a command from the host computer 33. Image transfer time between the host computer 33 and the image memory apparatus 3 can be shortened, and therefore, the total processing time can be shortened.

In the processing described above, a method of storing and processing the input/output images by the image memory apparatus 3 in accordance with an instruction from the computer 33 will be described in detail.

Figure 51:
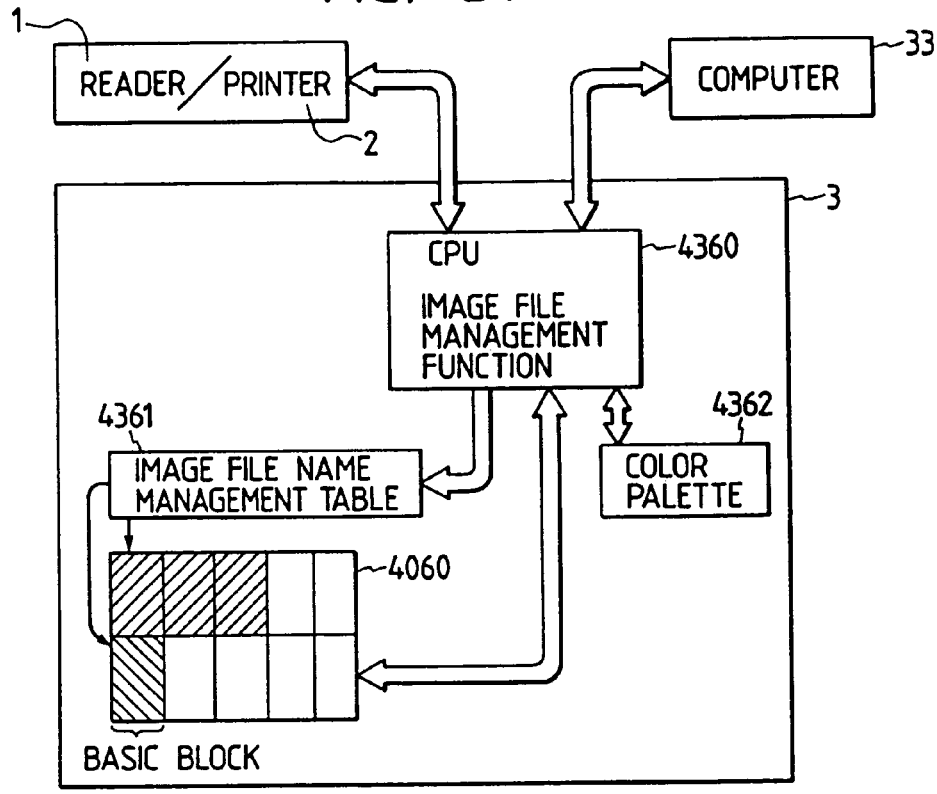
FIG. 51 is a block diagram showing an arrangement of the image memory apparatus 3 when viewed from a host computer 33 shown in FIG. 1.

The input/output image data stored in the image memory apparatus 3 is entirely processed as an image file in the image memory apparatus 3. For this reason, the image registration memories A (4060A), B (4060B), C (4060C), and D (4060D) serve as RAM disks. At this time, the image files to be stored are controlled by an image file management table 4361 whose file names are controlled as keys (FIG. 51).

When the image files are registered and stored in the image memory apparatus 3 serving as the RAM disk, basic blocks obtained by dividing each of the registration memories 7 A to 7 D are used as management units for minimum image files.

The CPU 4360 can manage to combine some of these basic blocks by the image file management table 4361 and to constitute one large image file. In this case, data of image file names, image data sizes, and arrangements of file protect and file management tables are stored in the image file management table 4361 upon their registration.

In the image memory apparatus 3, when an image is generally input from the image reader 1, it is reduced or set as an equi-magnification or reduced image, and the resultant image is registered as an image file in the image memory apparatus. For this reason when an image is registered in an enlarged size, this size is close to the original size of the original image output from the image reader 1, and the reduction factor can be reduced. Therefore, when this registered image file is output to the printer 2 or the like, its quality can be improved.

An image file name used as a key by the CPU 4360 at the time of image input from an input unit or device (e.g., the reader 1) or the computer 33 is assigned with a file name having a format shown in FIG. 56 in accordance with an instruction from the computer 33. This file name is used to clarify image data management between the input/output devices of the computer 33 and the image memory apparatus 3. The host computer 33 can assign an arbitrary image file to an image.

The image file name consists of eight characters (ASCII code) constituting a name of an image file and an extension representing a kind of image represented by the image data.

The extension can distinguish types of images to be processed from each other and can manage to register an image in a suitable image type in the registration memories 4060.

An image having an extension ".R" is RGB type luminance image data, an image data having an extension ".C" is a CMYK type density image, and an image having an extension ".P" is an image whose data can set 256 colors from 8-bit palette type 16.7 million colors. An extension ".S" represents an image file having a special meaning in a special file and having a special structure in the image memory apparatus 3.

Figure 52:
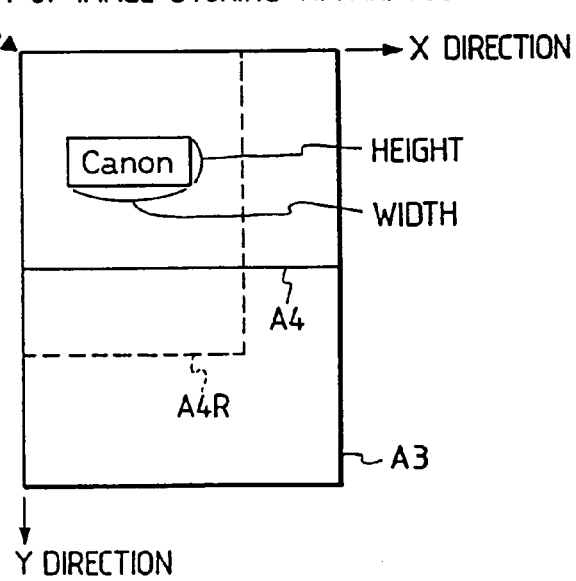
FIGS. 52 to 55 are views showing coordinate systems for the respective apparatuses.

A coordinate system for processing an image in an image memory apparatus has an origin as a reference, an X direction representing the direction of width of a sheet, and a Y direction representing the direction of height (length) of the sheet (FIG. 52).

The image memory apparatus processes data from each input device in the image memory apparatus coordinate system and manages various types of image data.

Figure 53:
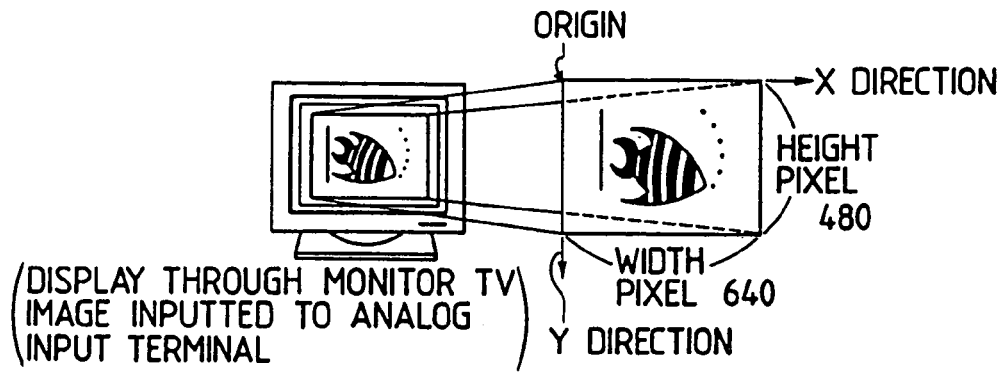

When an image is input from an analog input terminal (RGB, video) (4500, 4510, 4520R, 4520G, 4520B; and 4520S) and is registered in the registration memories, the input image is registered as an image, as shown in FIG. 53. In this case, The input image is entered in a size of 600 pixels in the X direction (width) and 450 pixels in the Y direction (height).

Figure 54:
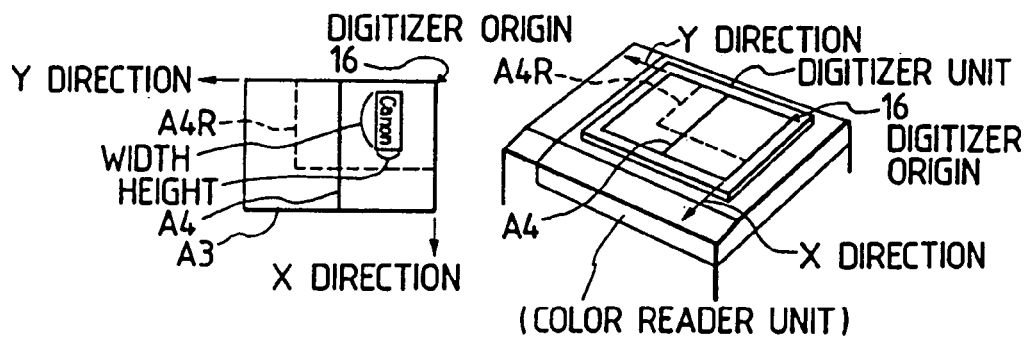

When a coordinate system of the digitizer 16 is observed from the image memory apparatus, it is shown in FIG. 54.

The coordinate system of the image memory apparatus is identical with that of the digitizer. The origin and X and Y directions of the coordinate system of the image memory apparatus correspond to those of the digitizer.

Figure 55:
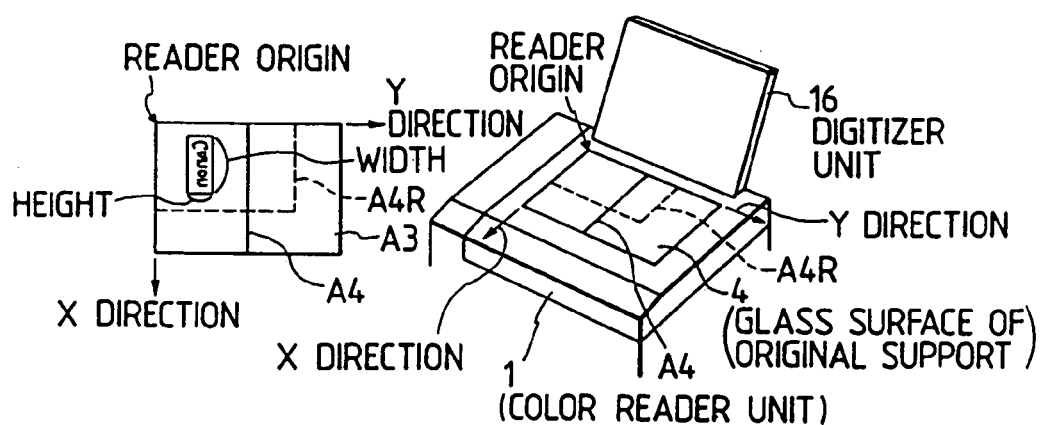

When a coordinate system of the reader 1 is observed from the image memory apparatus, it is shown in FIG. 55. The origin and the X and Y directions of the coordinate system of the image memory apparatus correspond to those of the reader 1.

Data exchange through the GP-IP controller will be described below.

Types of data exchanged between the image memory apparatus 3 and the host computer 33 through the GP-IB controller 4310 are classified as follows:

(1) Command (Instruction)

This is an instruction sent from the host computer 33 to the image memory apparatus 3.

(2) Parameters

They are various types of values attaching to commands.

(3) Data a) Image data

This data is binary data of a color (monochromatic) image such as an RGB or CMYK image.

b) Extension data

This data is data transferred to obtain data set in the image memory apparatus 3 or update the set data.

(4) Response Data

This data represents ACK/NAK or a response (RET) with attached information, i.e., a response from the image memory apparatus in response to a command.

The above four types of data are exchanged between the host computer 33 and the image memory apparatus 3 through the GP-IB controller 4310.

These four types of data will be described in detail with reference to FIG. 57.

Image data exchanged between the image memory apparatus 3 and the input/output image reader 1, the analog inputs 4500, 4510, 4520R, 4520G, 4520B, 4520S, or the printer 2, and between the image memory apparatus and the host computer are classified into four types:

(1) RGB data type (2) CMYK data type (3) 8-bit palette data type (4) binary bit map data type These image data are distinguished by extensions of the image files. For example, when the extension ".R" representing the RGB image data is assigned to an image file name attaching to a SCAN command on the host computer 33, the CPU 4360 in the image memory apparatus 3 controls an input as RGB type luminance data input and registers it as RGB type image data in the image memory apparatus.

Figure 60:
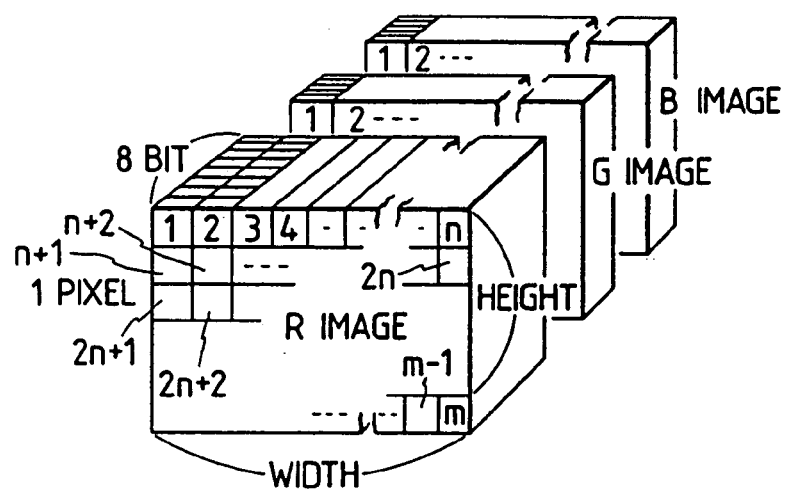
FIG. 60 is a view showing a state of storage of R, G, and B image inputs in memories.
Figure 61:
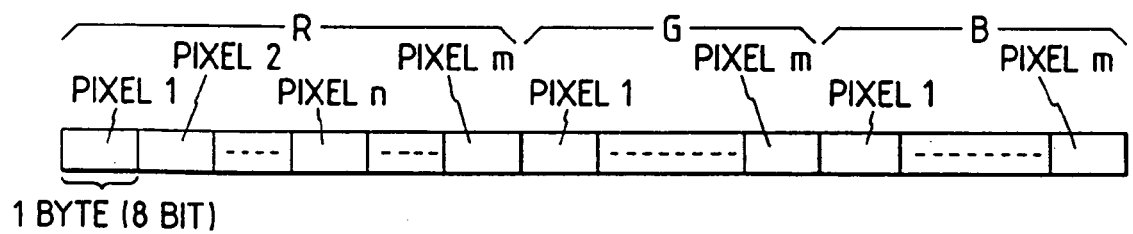
FIG. 61 is a view showing a data transfer format.

A format of RGB type image data is shown in FIGS. 60 and 61.

In the image memory apparatus, basic blocks of the registration memories A to D (4060A to 4060D) are constructed, as shown in FIG. 60. The basic blocks of a B image (4060A-R), a G image (4060A-G), and a B image (4060A-B) are combined for the memory A (4060A). The construction of the image is determined by the number of pixels (i.e., the number of dots) as a width in the horizontal direction and a height in the vertical direction.

In an RGB color image, each of R, G, and B pixels has a depth of eight bits (one byte), and R, G, and B components constitute three frames.

One pixel of the R frame can express 256 gray scale levels (0 to 255), and a data structure of the R, G, and B frames can express 16.7 ($\cong 256 \times 256 \times 256$) million colors.

Value "0" represents a lowest gray scale level, and value "255" represents a highest gray scale level.

The data are aligned in an order from the upper left position in the F frame, and such structures are aligned in an order of R, G, and B components:

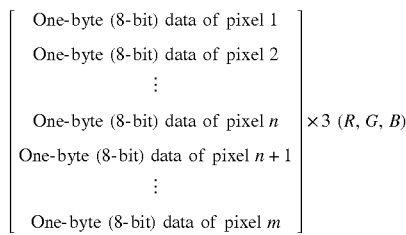

Image data transfer between the image memory apparatus 3 and the input/output device and between the image memory apparatus 3 and the computer 33 is performed by a transfer format shown in FIG. 61. That is, image data are transferred in accordance with a surface sequential scheme.

Figure 62:
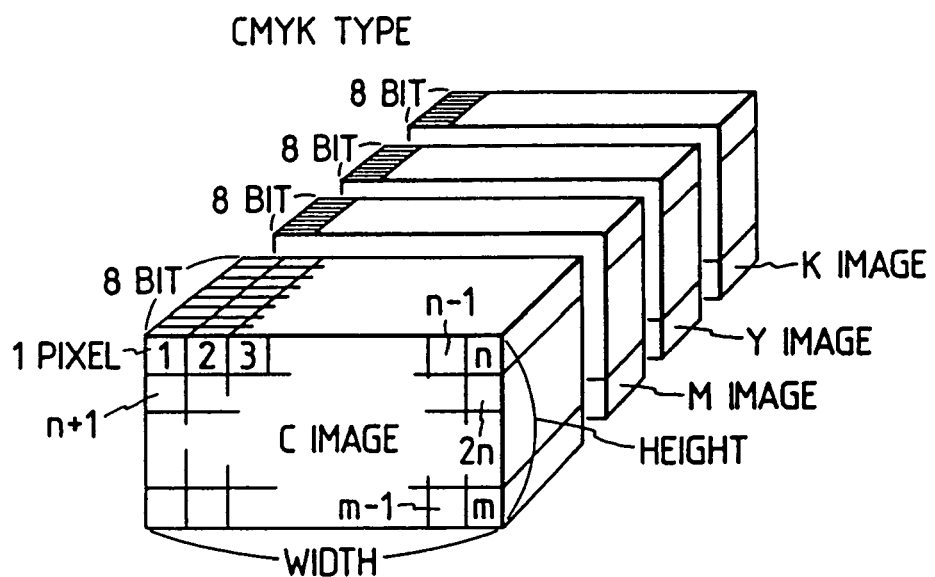
FIG. 62 is a view showing a state of storage of Y, M, C, and K image inputs in memories.
Figure 63:
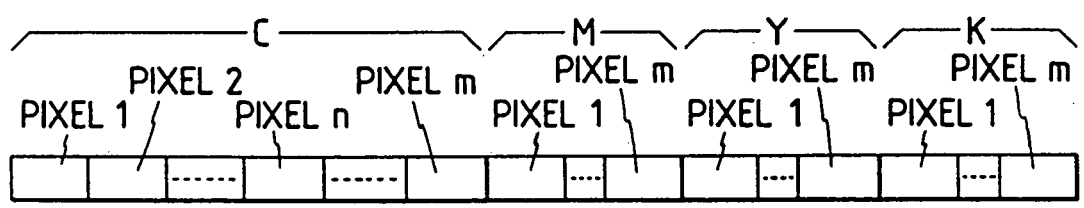
FIG. 63 is a view showing a data transfer format.

An image structure and its transfer format of CMYK type image data are shown in FIGS. 62 and 63. C represents cyan; M, magenta; Y, yellow; and K, black. In this case, the basic blocks in the registration memories A to D (FIG. 27A) are arranged in an image, as shown in FIG. 31, and the basic blocks are assigned to these arrangements, respectively.

Each pixel of C, M, Y, and K components in a CMYK color image has a depth of eight bits (one byte), and C, M, Y, and K components constitute four frames.

One pixel of the C frame can express 256 gray scale levels, and this can also apply to other components, i.e., M, Y, and K frames.

Level "0" represents a lowest gray scale level or density, and level "256" represents a highest gray scale level or density. A data structure is obtained by aligning data from the upper left position in the C frame, and the M, Y, and K components follow the C component.

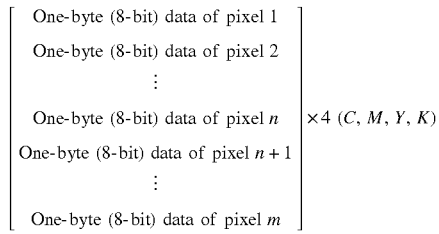

Figure 64:
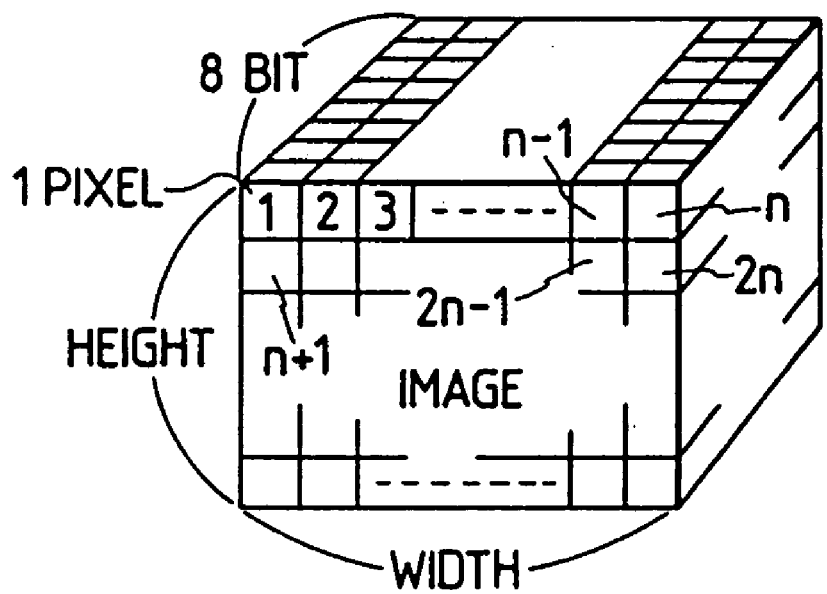
FIG. 64 is a view showing a state of storage of palette image data in a memory.
Figure 65:
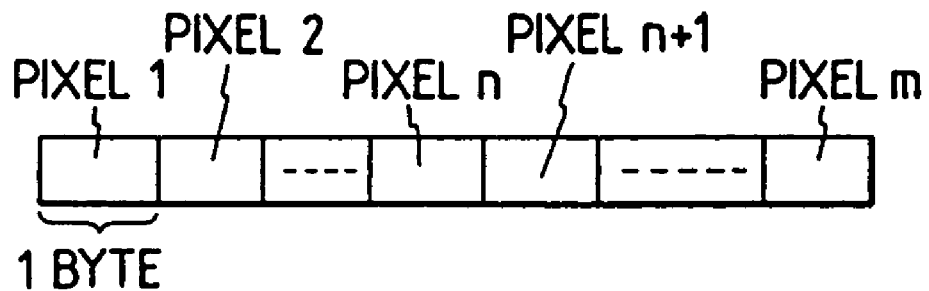
FIG. 65 is a view showing a data transfer format.

FIGS. 64 and 65 show an 8-bit palette type image data structure and its transfer format.

The basic blocks of the registration memories A to D (FIG. 27A) are arranged, as shown in FIG. 64, and the basic blocks are assigned to these arrangements.

The image has a depth of 8 bits (one byte) per pixel.

Figure 66:
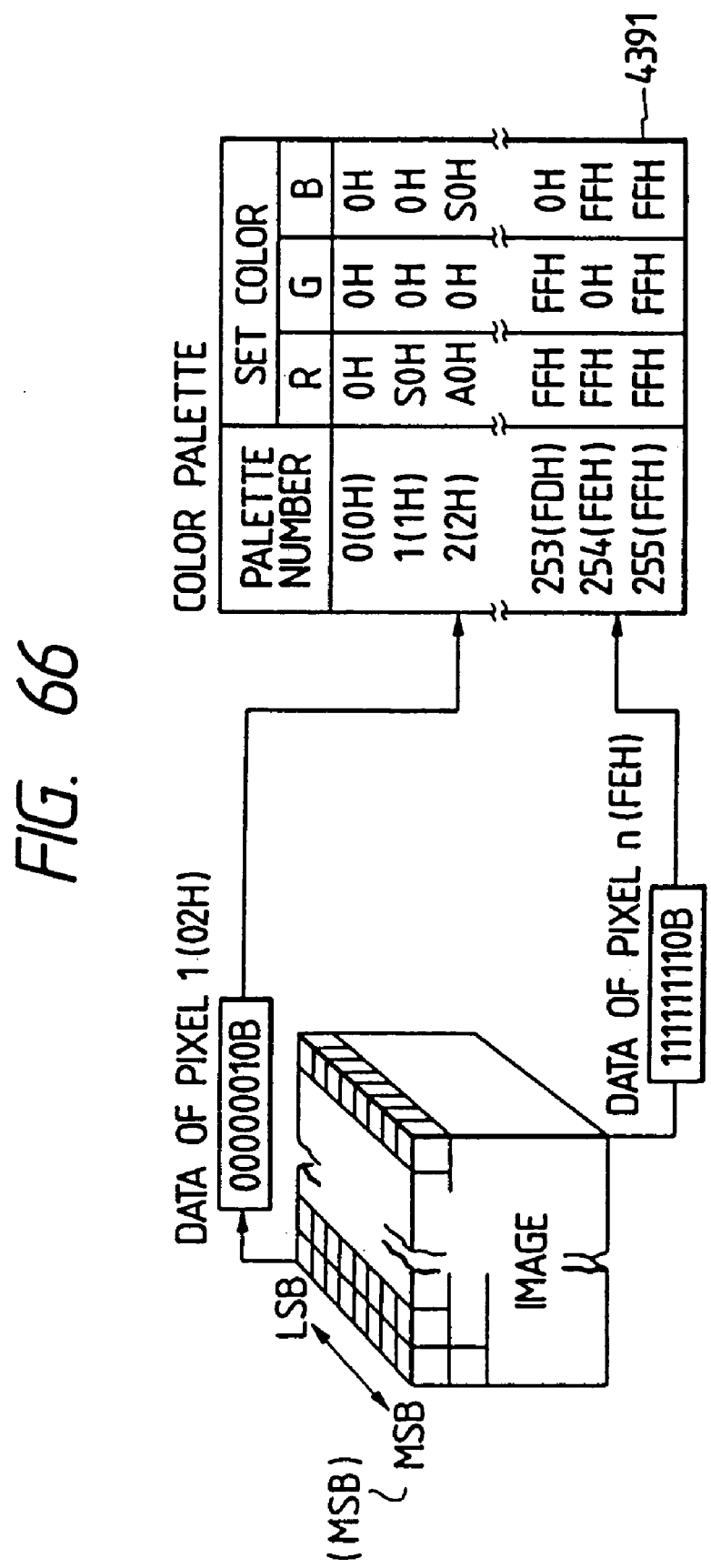
FIG. 66 is a view showing a correspondence between the palette image data and data representing the R, G, and B components of each palette.

A data value of eight bits per pixel corresponds to a color index No. of a color palette table 4391, as shown in FIG. 66, and an image can be arbitrarily painted with a desired color by a user.

With the above arrangement, 256 colors per pixel can be expressed.

Figure 85:
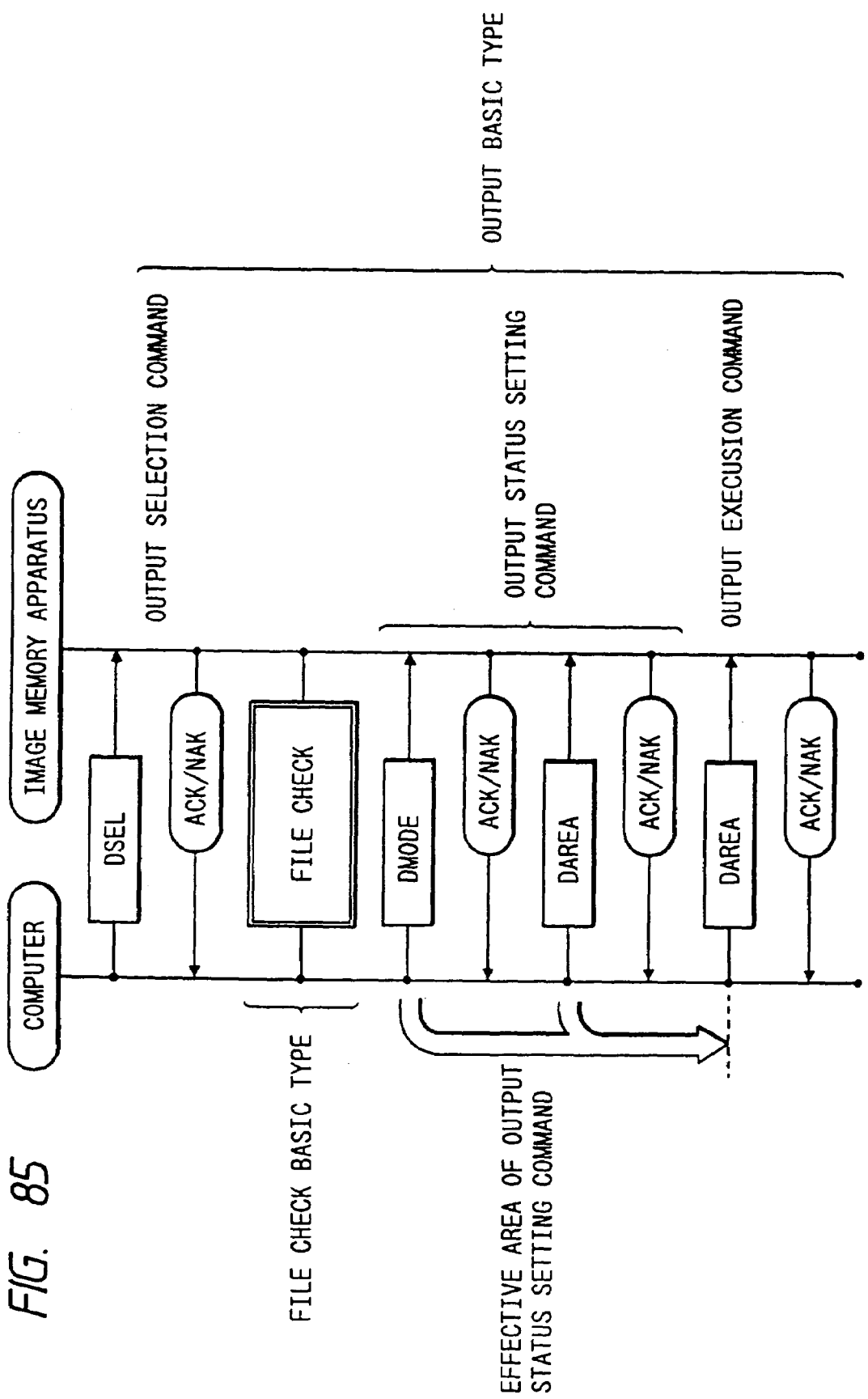

A relationship between the image data and the color palette is shown in FIG. 85.

The data are aligned in the following order from the upper left position:

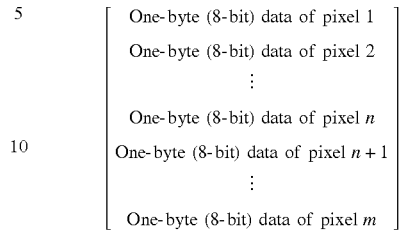

Figure 67:
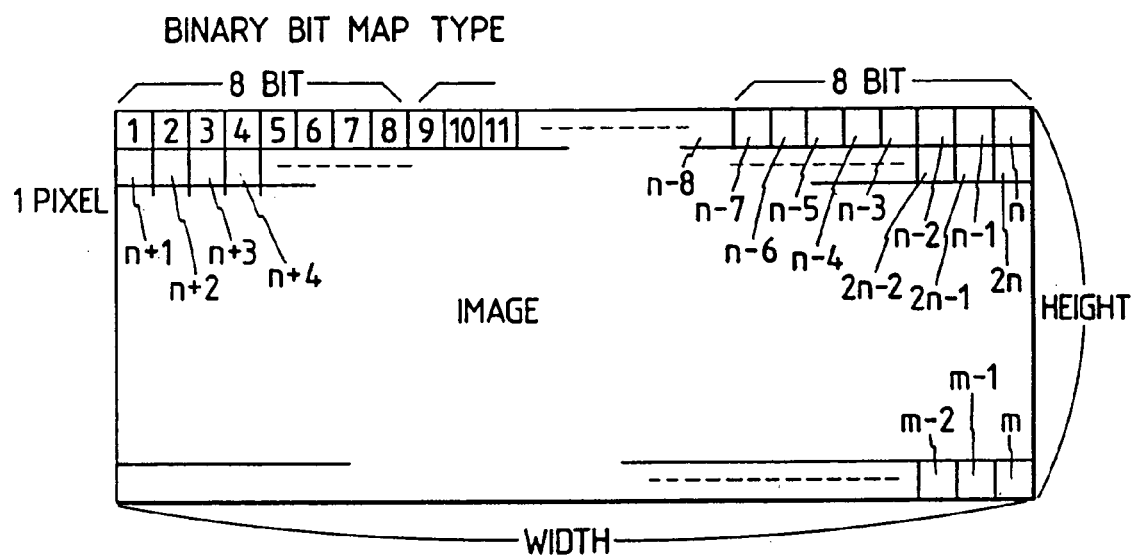
FIG. 67 is a view showing a state of storage of binary inputs in a memory.
Figure 68:
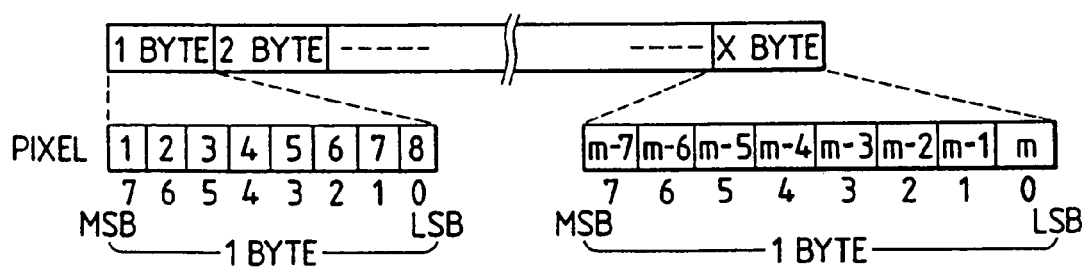
FIG. 68 is a view showing a data transfer format.

FIGS. 67 and 68 show a binary bit map type image data structure and its transfer format.

The binary bit map is registered using the register memory E (FIG. 27A).

This image data has an extension ".S" (i.e., a special file) of the image file name. This image file name is "BITMAP.S". The image data is registered in the memory E (FIG. 27A) which allows registration of only the bit map type data.

Since the memory E (FIG. 27A) consists of only a basic block, a plurality of entries cannot be registered in it.

The binary bit type image data has a depth of one bit per pixel.

Each pixel can express binary values, i.e., "0" and "1". The value "0" represents white (not print), and the value "1" represents the maximum density (black).

In the data structure, data is set every eight bits, i.e., eight pixels from the upper left position of the image. The length of the binary bit map type image data in the direction of width must be a multiple of eight. The length of the image data in the direction of height can be arbitrarily determined.

Since the size of the image file is set in units of pixels, the volume of data to be transferred is given as follows:

Data Capacity (byte)=<width>/8×<height> where
    <width>: the width of the image file
    <height>: the height of the image file
    8: this value is given since eight pixels constitute one-byte data.

A response data format in command transfer from the computer 33 to the image memory apparatus 3 will be described with reference to FIG. 69.

The response data except for the image data are basically classified as follows:

(1) ACK
(2) NAK
(3) RET

FIG. 69 shows formats of the response data.

As is apparent from FIG. 69, different response data are input in accordance with different kinds of commands.

The response data ACK and NAK are paired, and one of these data can be used as response data for most of the commands.

The ACK type response data is an affirmative response to each command and represents that a command is normally transmitted to and decoded in the image memory apparatus 3. This response data represents a 3-byte fixed value of the first byte as 2EH and remaining two bytes as 00H.

The NAK type response data is a negative response to each command and represents a response generated upon occurrence of any error. The first byte of this response data is 3DH, and the remaining two bytes represent an error code.

(Error Code)=(Upper Rank Byte)×(100(HEX)+ (Lower Rank Byte))

The RET type (response with attached information) response data represents a response in response to a command from the computer 33 and is sent from the image memory apparatus 3 while necessary information is attached thereto. The RET type response data is 8-byte data, and the first byte is a fixed value of a header (02H). First to seventh data of the response data respectively byte data, and contents vary depending on kinds of commands.

Commands are used to cause the computer 33 to control input/output of the image data to/from the image memory apparatus 3 and to perform image file management and are listed as shown in FIG. 70.

The commands are mainly classified into a command which can provide an instruction by itself and a command which requires a parameter following this command.

FIG. 58 shows a format of a command•parameter structure.

Since a command and a parameter are sent to the image memory apparatus 3 to the GP-IB controller 4310 as a character train, a parameter value, if any, must be converted into a decimal character train. The parameter may include a character train representing an image file name.

Figure 59:
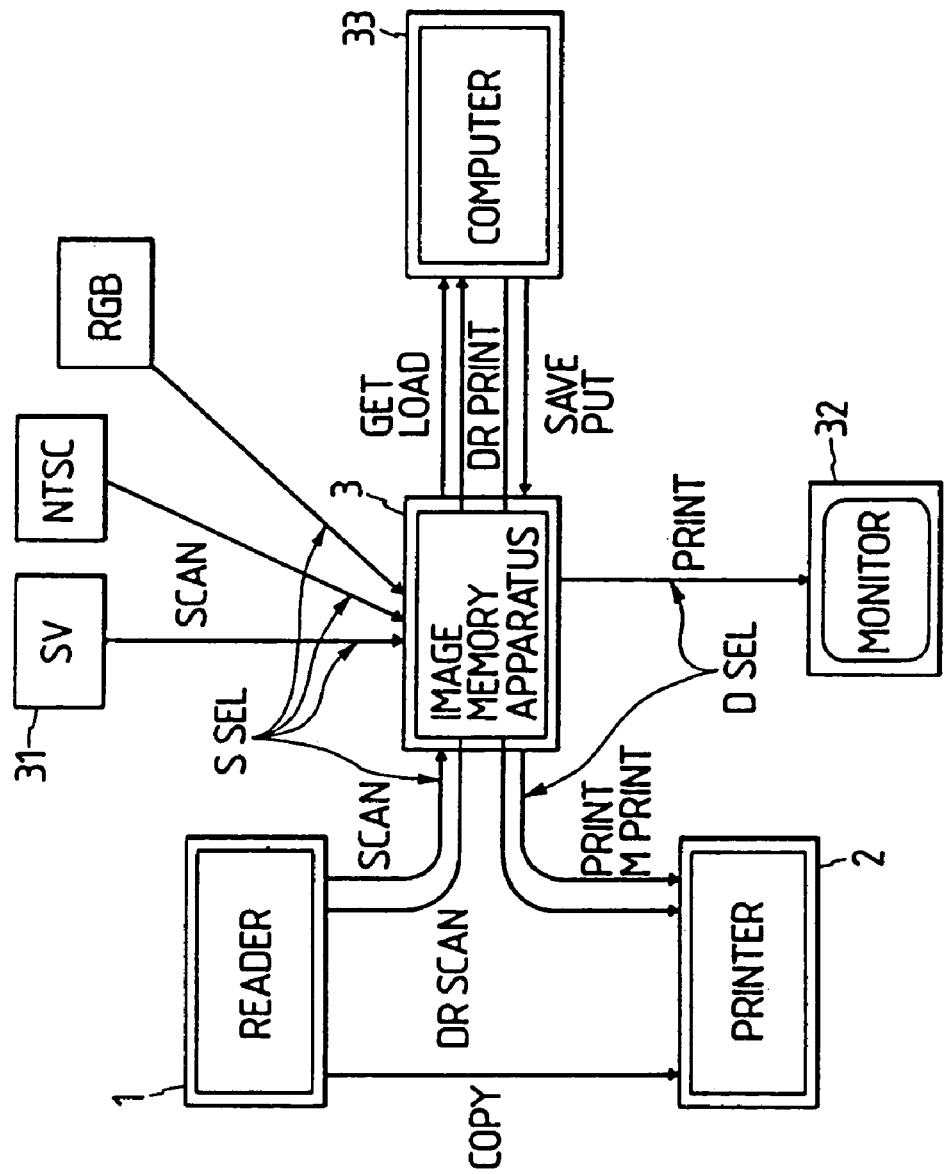
FIG. 59 is a view showing a flow of image data instructed by each command.

Flows of the image data instructed by these commands between the computer 33, the image memory apparatus 3, the input units 1 and 31, and the output units 2 and 32 are shown in FIG. 59.

The commands from the computer 33 to the image memory apparatus 3 are classified into the following seven types of commands (FIGS. 70 to 72).

(1) Initializing Command:
Various initializing operations are performed.
(2) Input Output Sel. Command:
The input and output units are selected.
(3) Input Output Mode Set Command:
The input and output conditions of images are set.
(4) Input Output Exec. Command:
The input and output operations of images are executed.
(5) File Operation Command:
Operations associated with image files are performed.
(6) Color Set command:
Conditions associated with colors are set.
(7) Other Commands
Others
The respective commands will be described below.
The initializing commands will be described with reference to FIG. 73.

An INIT command is a command for setting initializing data for the image memory apparatus 3.

An INITBIT command is a command for clearing an image of a binary bit map special file "BITMAP.S".

An INITPALET command is a command for initializing a palette table in the image memory apparatus 3.

The input output sel. commands will be described with reference to FIG. 74.

An SSEL command is used to select an input system such as a color reader 1, or the analog input 4500, 4510, 4520R, 4520G, 4520B, and 4520S. By this command, the CPU 4360 causes the selector 4250 to select an analog input system designated by using no parameters, and to cause the selector 4250 to select a reader 1 input through the selector 4010.

A DSEL command is a command for setting an image data output from the color printer 2 to the image memory apparatus 3.

The input output status set commands will be described with reference to FIG. 75.

A DAREA command is a command for setting an upper left coordinate position (sx,sy) and an output size (width× height) when an image, is output from the image memory apparatus 3 to the printer. At this time, the unit is set in type, and kinds of type include mm, inch, and dot.

An SAREA command is a command for setting an input area from the color reader 1 as in the DAREA command. The input and output ranges designated by the SAREA/DAREA command are set by the system controller 4210.

A DMODE command (for an area designated by the DAREA command) is a command for setting a variable magnification in the enlargement•interpolation circuits 4150-0 to 4150-3 when data is to be output by this command.

An SMODE command is a command for causing the system controller 4210 to control a read variable magnification when data is input to an area designated by the SAREA command.

An ASMODE command is a command for causing the system controller 4210 and the counter controller 9141 to determine whether an image input from an analog input terminal is input as a field or frame signal under the control of the CPU 4360.

The field and frame signals are known in the field of television technology, and a detailed description thereof will be omitted.

The Input output exec. commands will be described with reference to FIG. 76.

A COPY command is a command for reading an image from a reflecting original by the reader 1 and directly outputting the read image to the printer 2 without being registered as an image file in the image memory apparatus 3. In this case, the number of copies at the printer 2 can be designated by a parameter indicated by <count>.

A SCAN command is a command for causing the CPU 4360 to fetch image data from an input unit designated by the SSEL command, load the image data in a (width×height) pixel size as an image type designated by the extension by using an image file name designated by a parameter <filename>, and store the read image in the image memory 4060.

In this case, the CPU 4360 sets data of an image file name, an image type, an image size, and a specific image memory in the image file management table 4361 shown in FIG. 51.

A PRINT command is a command for designating image file data already registered in the image memory apparatus 3 with the parameter <filename>, unlike the SCAN command. The CPU 4360 outputs data from the image memory 4060 through the video interface 201 by using data stored in the image file management table 4361. At this time, the image is repeatedly printed a number of times represented by the parameter represented by <count>.

An MPRINT command is a command for virtually outputting image file data designated by the parameter <filename> stored in the image memory apparatus 3. When a plurality of images are to be laid out and synthesized, a plurality of image files are sequentially designated by this command, and the CPU 4360 stores the image file names designated by the MPRINT command. These stored images are triggered in response to the PRINT or COPY command, and image files stored by the MPRINT in the memory 4370 are laid out and synthesized by the CPU 4360, and the synthesis image is output to the printer 2.

A PRPRINT command is a command for registering image data (width×height (size)) sent from the computer 33 through the GP-IB interface in the image memory 4060 with a file name designated by the parameter <filename> under the control of the CPU 4360. By the PRPRINT command, the registered image data is then directly output to the printer in the same manner as in the PRINT command.

A DRSCAN command is a command for registering image data from the color reader 1 in the designated size (width×height) read image memory 4060 as a file name designated by the parameter <filename> and for setting attached data in the image file management table as in the SCAN command. In addition, the data is transferred to the computer 33 through the GP-IB interface 4580.

The file operation commands will be described with reference to FIG. 77.

A DELE command is a command for deleting from the image file management table 4360 an image file designated with the parameter <filename> in an image file already registered in the image memory apparatus 3. In this case, an empty capacity of the image memory after deletion from the management table 4361 is determined by the CPU 4360, and data having the same capacity as the empty capacity is set as RET type response data, thereby sending 8-byte RET response data to the computer 33 through the GP-IB interface.

A DKCHECK command is a command for causing the CPU 4360 to determine from the image file management table 4361 whether an image file type (CMYK, RGB, 8-bit palette, or binary bit map) image designated by the type parameter can be stored in the (width×height) image size in the image memory in the image memory apparatus 3. In addition, the CPU 4360 determines whether the RET type response data can be stored. After this response data is stored, the remaining capacity data as response data is sent to the transmission source of the DKCHECK command, e.g., the computer 33 through the GP-IB interface.

The display G in FIG. 47 can be obtained by the above command or specific code.

An FNCHECK command is a command for checking whether the image file designated by the parameter <filename> is present in the image file management table 4361, setting the RET response data representing the presence/absence, and sending it to the computer 33.

An FNLIST command is a command for transmitting the present content of the image file management table to the computer.

An REN command is a command for changing a name of an image file set in the image file management table. More specifically, this command is to change the image file name <Sfilename> before the change to the image file name <Dfilename> after the change.

Image data input and output commands included in the file operation commands will be described with reference to FIG. 78.

A LOAD command is a command for transferring the image file data designated by the parameter <filename> in the commands registered in the image memory apparatus from the image memory 4060 to the computer 33 through the GP-IB interface.

A SAVE command has the function opposite to the LOAD command. The data having the (width×height) image size in the computer is registered in the image memory apparatus 3 with the file name represented by the <filename> parameter. The CPU 4360 sets the file name, the image type, and the image size in the image file management table 4361, and the image data sent from the computer is set in an empty area of the image memory 4060.

A PUT command can set image data sent from the computer with respect to the image file data designated by the parameter <filename> already registered in the image memory apparatus 23 within the range of the (width×height) size from the upper left coordinates (sx,sy)

A GET command can cut out the image data of the image file having the parameter <filename> within the (width×height) image range from the upper left coordinates (sx,sy) and for transferring the cut image to the computer 33, unlike the PUT command.

Other commands are shown in FIG. 80.

A MONITOR command causes the display controller 4440 to supply the analog output 4590R, 4590G, 4590B, and 4590S data to the analog inputs designated by the SSEL command corresponding to the <type> command and to display the through data. Note that type variables are, e.g., "0" (through display setting) and "1" (monitor mute setting). In addition, the MONITOR command has lower priority than other commands. The through display setting can be canceled by the DSCAN and SCAN commands.

A PPRREQ command is a command for supplying paper size information currently set in the color printer 2 to the control unit 13 through the video interface 201 and sending sheet discrimination data to the computer under the control of the CPU 4360.

A PPRSEL command is a command for selecting a specific one of the plurality of sheet cassettes upon designation with the <no> parameter and supplying the selected one to the control unit 13. This command is output to the color printer 2 through the image memory apparatus 3.

A SENSE command is a command for causing the CPU 4360 to communicate with and receive data from the control unit 13 about the status levels between the image memory apparatus 3, the color reader 1, and the color printer 2, and for transmitting the resultant data to the computer.

The command transmission sequence from the computer 33 to the image memory apparatus 3 will be described below.

Figure 82:
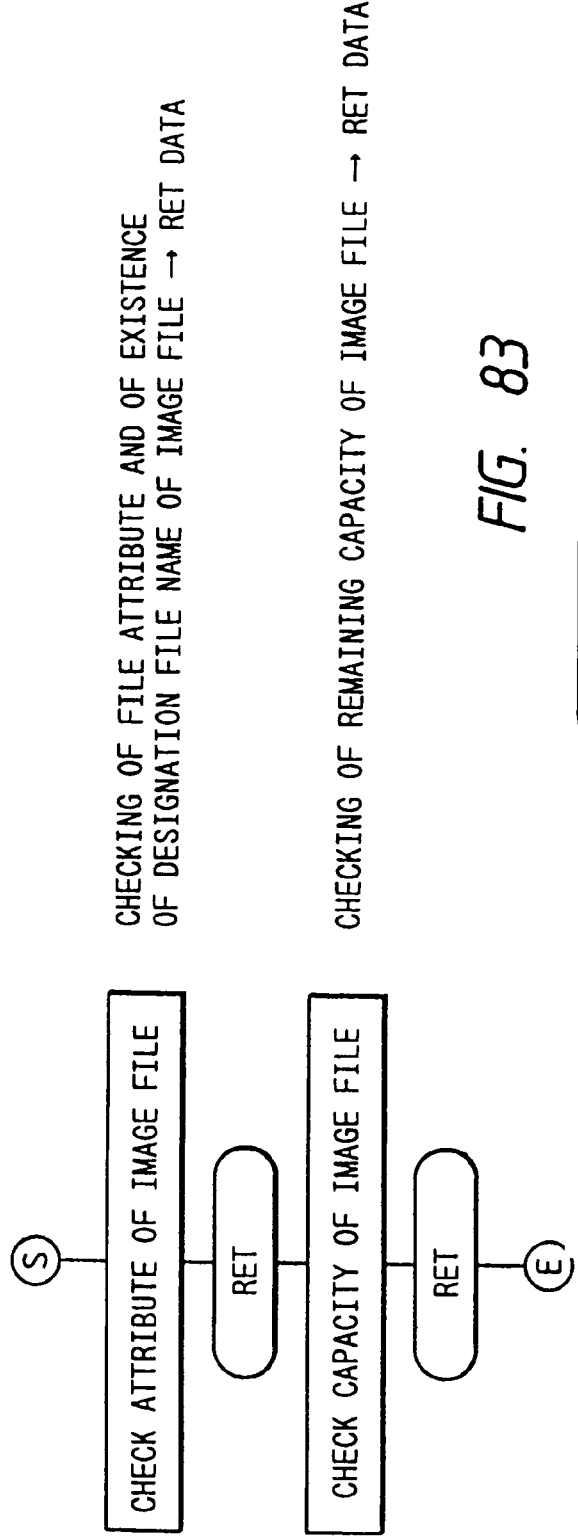

The commands serving as basic input and output commands for the images are mainly classified as follows:
  (i) Input Output Sel. Commands SSEL and DSEL
  (ii) Input Output Status Set Commands SMODE, SAREA, DMODE, DAREA, RPMODE, and ASMODE
  (iii) Input Output Exec. Commands SCAN, DRSCAN, PRINT, MPRINT, and DRPRINT As shown in FIG. 82, the command transmission sequence for the input/output of the image data has a basic sequence.

The input and output units are selected by using input output sel. commands. In response to these commands, the CPU 4360 in the image memory apparatus 3 analyzes these commands and sends back the ACK/NAK response data to the computer 33.

An input output status set command is sent from the computer 33 to the image memory apparatus 3, and its result, i.e., the ACK/NAK response is sent back from the image memory apparatus 3 to the computer 33 in the same manner as described above.

The input output status set command is invalidated when the input output exec. command is executed, and the default state is set. For this reason, when the input output status set command is not executed but the input output exec. command is executed, the input output status setting is given by the default values. At the time of input output execution, when a specific input output state is to be set, the input output status set commands are executed every input output execution (i.e., every basic type).

The input output exec. command for performing the input output operation of the image data is actually transmitted, and the CPU 4360 sends back the RET type response data to this command. If an affirmative (ACK) response is sent back, the actual image data input/output operation is performed between the image memory apparatus 3 and the image reader 1, the SV recording reproducer 31, the printer 2, or the monitor TV 32.

This input/output operations are the same as those described in the above embodiment, and a detailed description thereof will be omitted.

The CPU 4360 checks attributes of an image file in response to the image file registration command from the computer 33, the empty capacity of the files (memories A to D) (FIG. 27A), and the like by using the image file management table 4361 in advance. The check results are sent back from the CPU 4360 to the computer 33.

The precheck commands for the image files are FNCHECK and DKCHECK commands.

Figure 83:
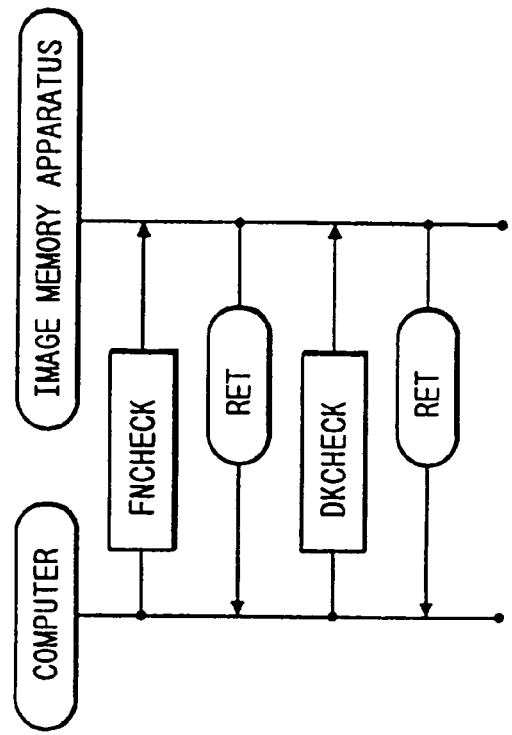

The sequences for checking the image files are shown in FIGS. 82 and 83. Data representing the presence of the designated image file and file attributes are sent as RET type response data to the computer 33. In addition, data including the remaining capacity of each image file and data representing whether the desired image file size can be assured are sent back as RET type response data from the image memory apparatus 3 to the computer 33.

The basic type of the file check is included in the basic type of each input output command described above. It is possible to check the above items of the image files in advance prior to the actual input/output operations.

Synthesis of image files will be described below.

In order to synthesize a plurality of images registered as image files in the memories 4060 in the image memory apparatus 3 and to output a synthesis output image, the MPRINT command is sent from the computer 33 to the image memory apparatus 3.

The MPRINT command is used to designate an image file name registered in the image memory apparatus 3 by using the MPRINT parameter. The CPU 4360 analyzes a command train of the MPRINT command and temporarily registers a file name in the memory 4370.

The MPRINT command trains, the number of which corresponds to a plurality of layout pattern images, are sequentially transmitted from the computer 33, and the designated file names are temporarily registered in the RAM. When the last image for the plurality of layout pattern images is input, the computer 1 sends the PRINT command train to the image memory apparatus 3. When the CPU 4360 analyzes this PRINT command train, the CPU 4360 transfers the designated image data from the image memories, i.e., the image file management table 4361, to the color printer in an FIFO order of image files corresponding to the MPRINT commands sequentially sent from the computer. A synthesis output is the same as that as previously described.

The transmission order of the MPRINT commands from the computer and the priority order of image synthesis by the PRINT commands are given such that previously designated images have higher priority, as shown in FIG. 88.

In order to synthesize a special file stored in the binary bit map memory (memory in FIG. 27A) and an image file registered in the image memory apparatus 3, the special file name "BITMAP.S" is set in the plurality of image files designated by the MPRINT and PRINT commands on the computer side, and the resultant command is transmitted to the image memory apparatus 3. The CPU 4360 synthesizes a plurality of image files and performs synthesis of the binary bit map data. In this embodiment, in the binary bit map image, a dot of "1" basically represents "black", and a "0" portion is switched such that other image files have priority over it, as shown in FIG. 89.

Since the above switching operation is performed by using the video interface 201 in the reader 1, the arrangement of the image memory apparatus can be simplified.

As an image synthesis function, it is possible to synthesize the image file, the special file "BITMAP.S" of the binary bit map, and the reflecting original on the reader 1, and the resultant synthesis output can be obtained in the same manner as described above.

The above operations by the commands from the computer can be executed by the MPRINT and COPY commands.

The plurality of image files are designated by the MPRINT command, and the COPY command is finally transmitted as a trigger command. The CPU 4360 sends back an instruction for a copying operation in the CPU in the color reader. The image file and the reflecting original in the reader are synthesized by the MPRINT command, and the resultant image can be output.

In this case, when the "BITMAP.S" image file is designated by the MPRINT command, synthesis with the binary bit map can also be performed.

In this embodiment, the lowest priority is automatically set by the COPY command for the reflecting original set in the reader 1, and the image on the reflecting original can be a background image.

The command transmission order of the computer and the output results at the printer are shown in FIG. 90.

As shown in FIG. 79, color adjustment functions are a color palette function, a color balance function, a gamma correction function, and bit color function which respectively correspond to computer commands, i.e., the PALETTE command, the BALANCE command, the GAMMA command, and the BITCOLOR command.

The color palette function is used to set a color of an 8-bit palette type image and to color the binary bit map image data. For this purpose, color data is set in a palette number in the color palette. More specifically, 256 color data can be set, and 8-bit R, G, and B data can be sets The color data set by the color palette 4362 in the image memory apparatus 3 are set to be equal to the color palette set in the host computer. Therefore, the image colors output at the color printer 1 can be the same as those in the host computer 33 through the image memory apparatus 3.

The color palette table in the image memory apparatus 3 can be set in units of image files registered in the image memory apparatus 3 by the PALETTE command. For this reason, when an image file of an 8-bit palette type having an extension of ".P" is output by the MPRINT command, the PALETTE command is set from the computer and sets 768-byte (=256×3) RGB palette table data in the palette table in the image memory apparatus 3 through the GP-IB interface 4580, as shown in FIG. 91. When the PRINT/MPRINT command is executed, the present R, G, and B components set in the palette table 4362 are respectively set in the LUTs 4110A-R, 4110A-G, and 4110A-B. Operations for converting luminance data into density data are performed in the respective tables.

At this time, the palette type image file data designated by the PRINT/MPRINT command are converted from the 8-bit palette luminance data into density data through the LUTs 4110A-R, 4110A-G, and 4110A-B which store the palette tables. The converted density data are then sequentially output to an output system and are printed at the color printer.

The 8-bit palette type image is set in the work memory 4360 line by line when they are sent from the computer through the GP-IB interface. The same data are set in the register memories 4060-R, 4060-G, and 4060-B by DMA. These operations are repeated.

A maximum number of 8-bit palette tables which can be set by the PALETTE commands is 16. These tables can be set for 8-bit palette type image data at the time of synthesis using a plurality of layout images.

Before the plurality of 8-bit palette type images are virtually output by the MPRINT command, their color palette data (768 bytes) are temporarily stored in the memory 4370 in the image memory apparatus 3 by the PALETTE command.

The above operations are repeated for the plurality of 8-bit palette images to be laid out and synthesized. When the last image is output, an actual output is obtained by the PRINT command.

When palette tables of 8-bit palette images currently formed by the MPRINT command are sequentially synthesized and output, the image memory apparatus 3 is sets these palette tables in the output color palette table 4362 by the PRINT command. A plurality of images can be then synthesized and the synthesis image is output to the printer 2 in the same manner as described above.

The RGB and CMYK type color balance modes can be distinguished by the type parameter and can be set. This setting can be performed by using the BALANCE command.

In RGB color balance setting, luminance gradients are set by ±50% values of the parameters C2, C2, and C3 of the BALANCE command in the LUTs 4110 A-R, 4110 A-G, and 4110A-B, thereby converting the luminance data into density data.

In CMYK color balance setting, density gradients can be set by ±50% values of the parameters C1, C2, C3, and C4 of the BALANCE command in the LUTs 4200.

The image data files can be converted by the LUTs to change image quality ranging from a low luminance to a high luminance or from a low density to a high density.

The GAMMA command has the following function. The LUT data already registered in the memory 4370 are set in the LUTs 4110A-R, 4110A-G, and 4110A-B and conversion from luminance data to density data is performed so as to obtain CRT color reproduction quality of RGB type image file data (its gamma correction value is $\gamma=0.45$ in consideration of CRT light-emitting characteristics) by the type parameter. Therefore, the RGB image data having the CRT-corrected (i.e., $\gamma=0.45$) value can be color-reproduced and output.

The BITCOLOR command has the following function. When a binary bit map output "BITMAP.S" is sent to the color printer 2, the color having an index No. of the color palette 4362 designated by the index parameter within the range of the (width×height) size using the upper left coordinates (sx,sy) in the binary bit map memory (special file "BITMAP.S"). This operation can be performed by the command described above. The CPU 4360 can set a plurality of sx, sy, width, height, and index parameters by the BITCOLOR command in the memory 4370. In practice, when a file name "BITMAP.S" is designated in the filename by the MPRINT or PRINT command, the CPU 4360 transmits the sx, sy, width, and height parameters from the image memory apparatus 3 and the RGB 3-byte color data from the color palette table 4362 corresponding to the index No. (index parameter) of the color palette to the CPU 22 in the control unit 13 in the color reader 1 or the color printer 2 (this operation is repeated when a plurality of areas are designated by the BITCOLOR command). The control unit 13 sets these parameters in the programmable synthesis circuit 115. Therefore, an image having a designated area colored with a designated color can be output at the color printer when a binary bit map color print is required.

As described above, after the area and color are designated by the control unit 12, the CPU 4360 in the image memory apparatus 3 can output color binary bit map data (memory E in FIG. 27A) of "BITMAP.S" defined by the PRINT or MPRINT command through the video interface in accordance with the commands from the computer.

Each bit of "1" in the binary bit map image is colored.

The color reader/color printer and the image memory apparatus 3 can be set by a remote function in a state wherein they can be controlled by the host computer.

Figure 92:
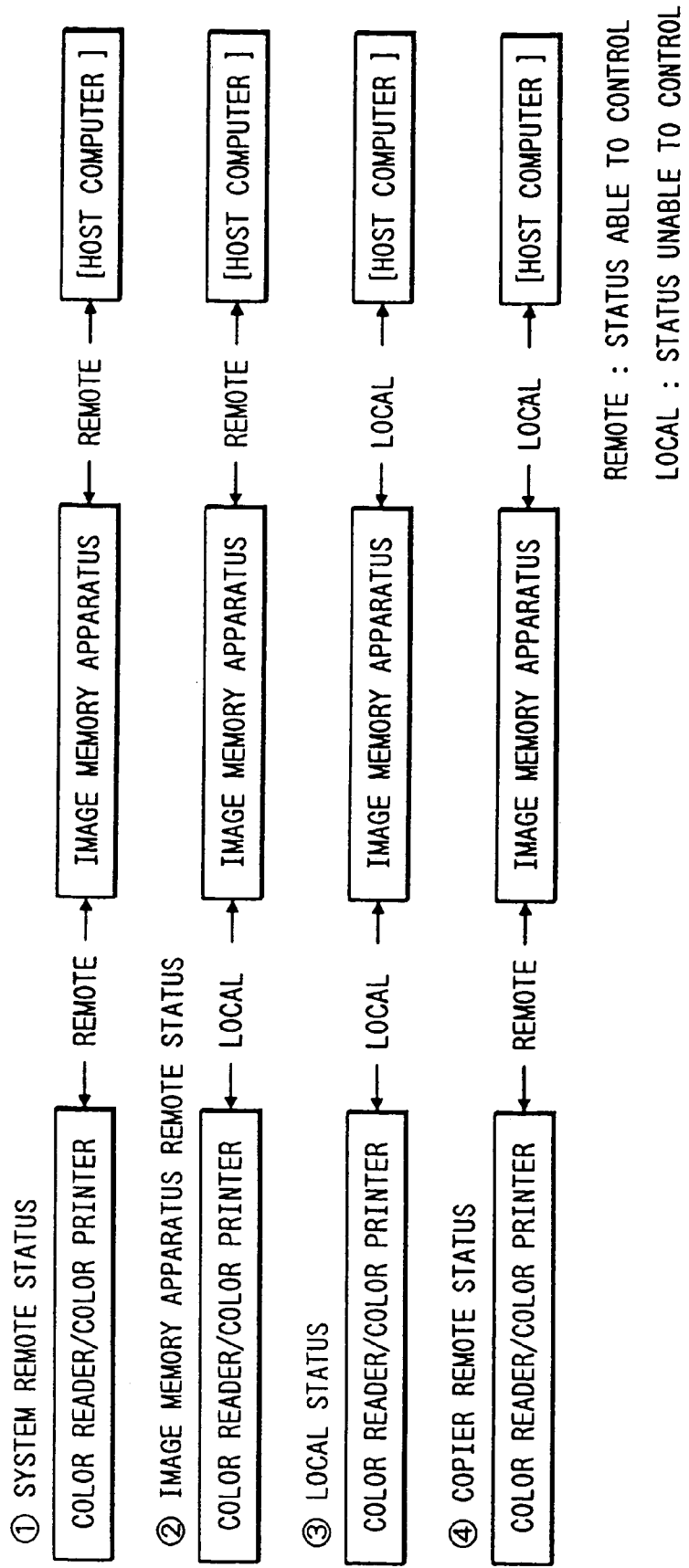
FIG. 92 is a view showing a relationship between a color reader 1, the image memory apparatus 3, and the host computer 33.

A command for remote-controlling the color reader/color printer and the image memory apparatus 3 from the computer is a REMOTE command. This command can set the following four status levels (FIG. 92).

In the system remote status, the color reader/color printer and the image memory apparatus 3 can be controlled by the command from the computer 33.

In addition, only the image memory apparatus 3 can be controlled by the command from the host computer 33. At this time, the color reader and the color printer constitute a single copying machine for performing a copying operation.

The local status (status representing a noncontrollable state) is set by the host computer in the color printer/color reader. The remote status is set in accordance with an earlier one of a remote designation command from the operation unit of the color reader 1 and the REMOTE command from the host computer 33.

In the copier remote status, the image memory apparatus 3 can be controlled in a remote state in accordance with an instruction from the operation unit of the color reader 1. At this time, a command from the computer cannot execute any function of the image memory apparatus 3.

The remote/local status can be designated by the type parameter of the REMOTE command from the host computer 33.

The CPU 4360 communicates with the color printer 2 and the CPU 22 of the control unit 13 in the color reader 1 through the video interface 201 to instruct the four remote/local status levels from the computer 33 by type parameter of REMOTE command.

Several transmission sequences of the commands will be described with reference to FIGS. 84 to 87.

Figure 84:
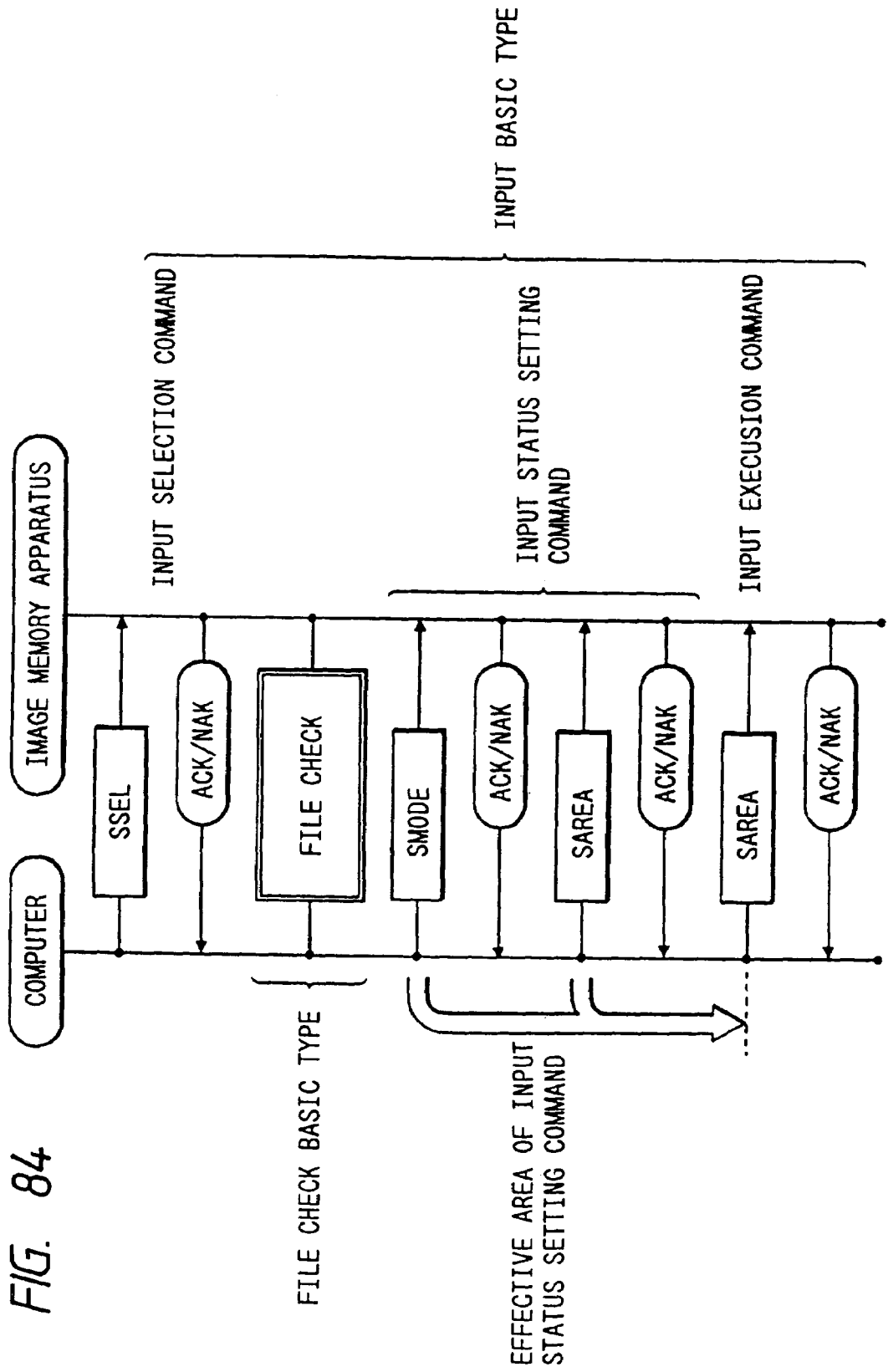

FIG. 84 shows a sequence for registering image data from the input unit to the image files in the image memory apparatus 3 by the SCAN command. A portion of a file check basic system can be checked in advance by using the sequence shown in FIG. 83.

FIG. 85 shows a sequence for outputting image data of image files already registered in the image memory apparatus 3 by the PRINT command.

Figure 86:
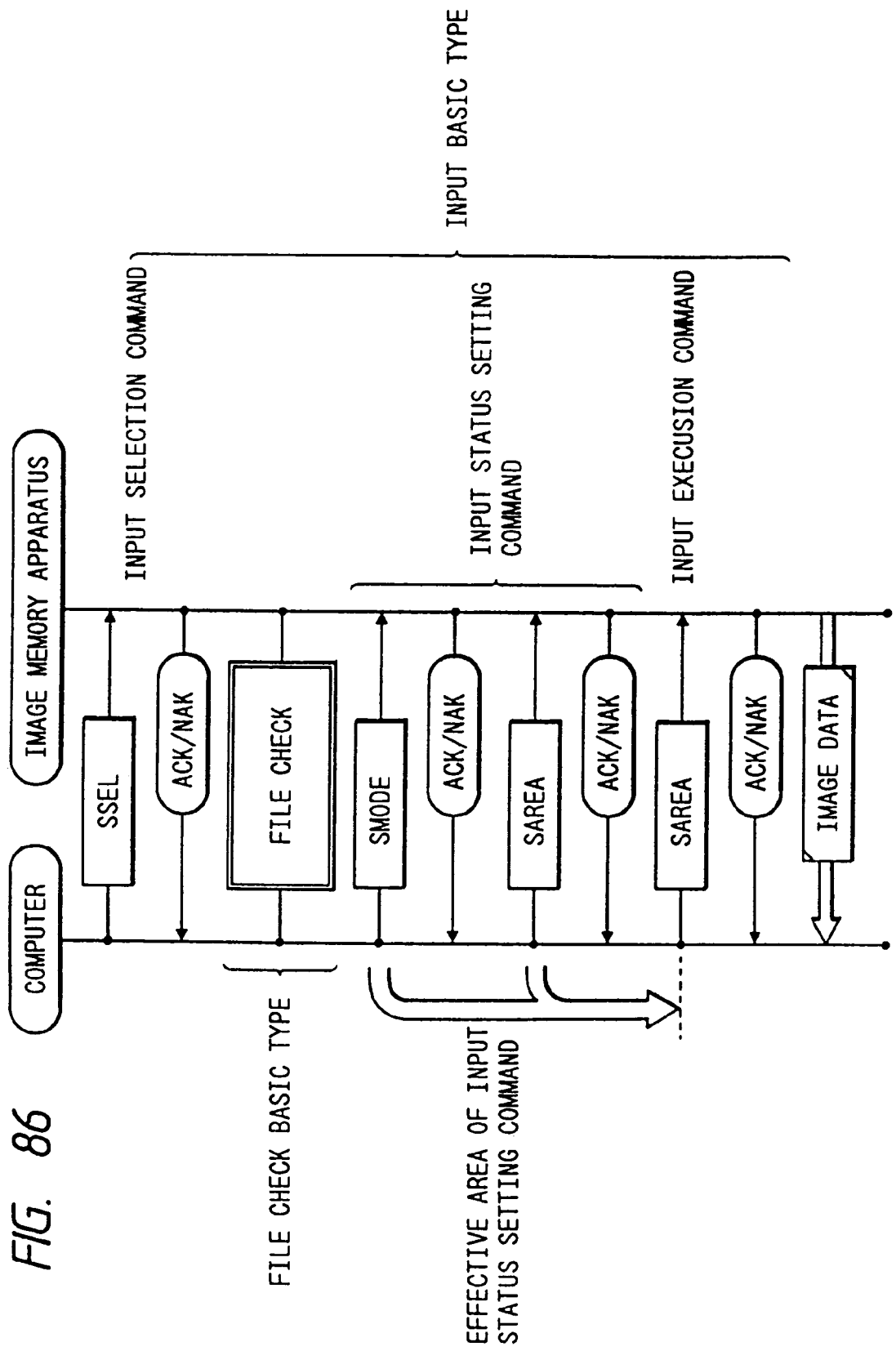

FIG. 86 shows a sequence for inputting and registering image data from the input unit and transferring this image data to the host computer 33 by the DRSCAN command.

Figure 87:
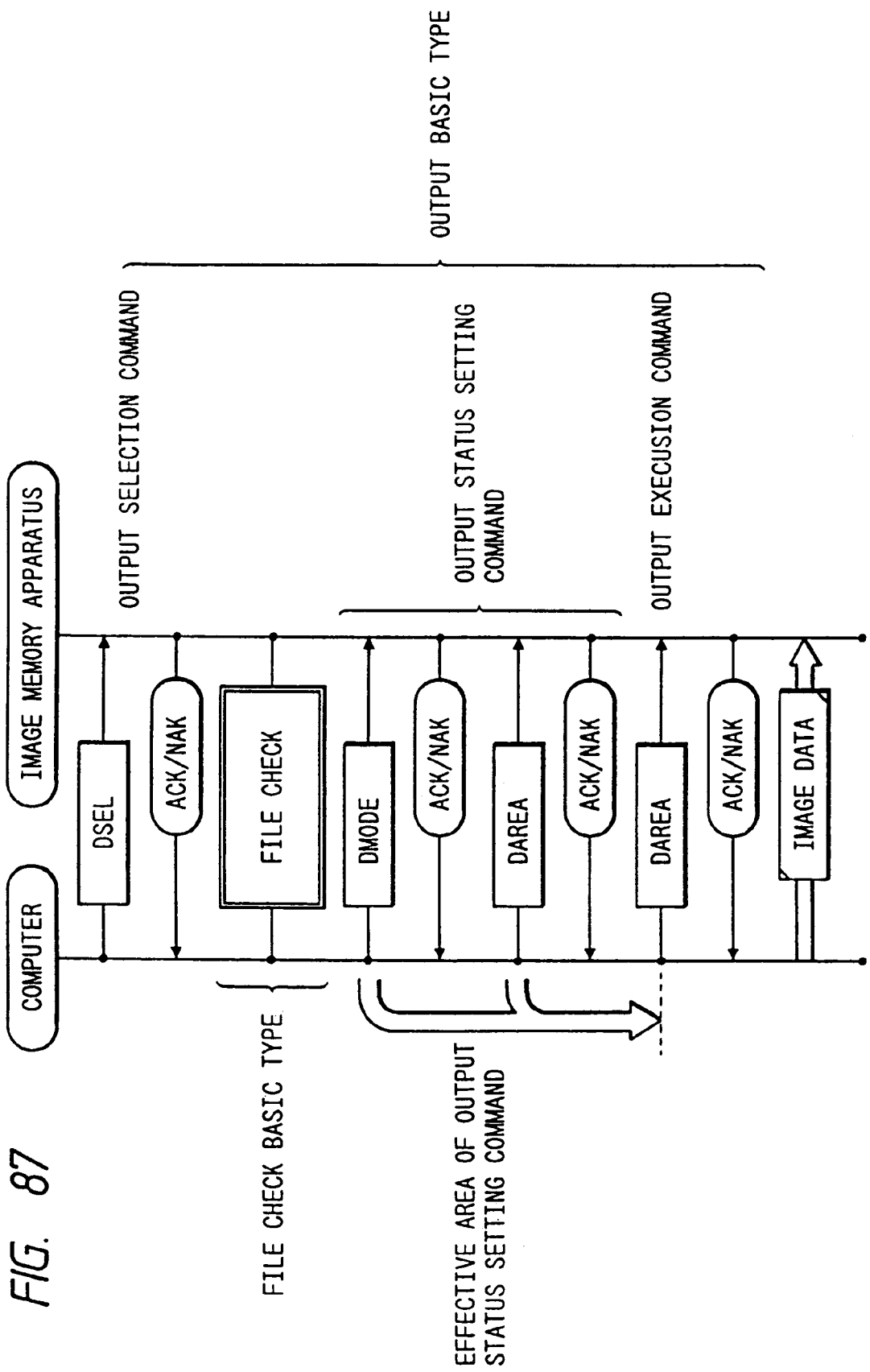

FIG. 87 shows a sequence for outputting the image data from the computer 33 to the output unit, unlike by DRSCAN command.

The commands are actually executed as follows.

An operation for outputting an image from the host computer to the color printer as a single image output will be described below, as shown in FIG. 93. More specifically, an operation for centering an RGB type image of 1,024×768 pixels starting from the upper left position (10,10) mm within the range of 277×190 mm, and for outputting the resultant image will be described below.

Figure 94:
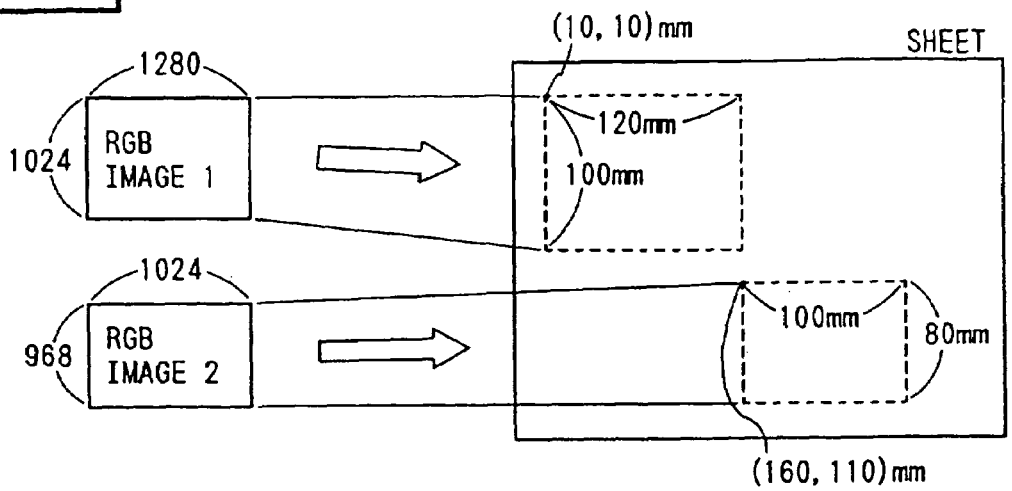
Figure 94B:
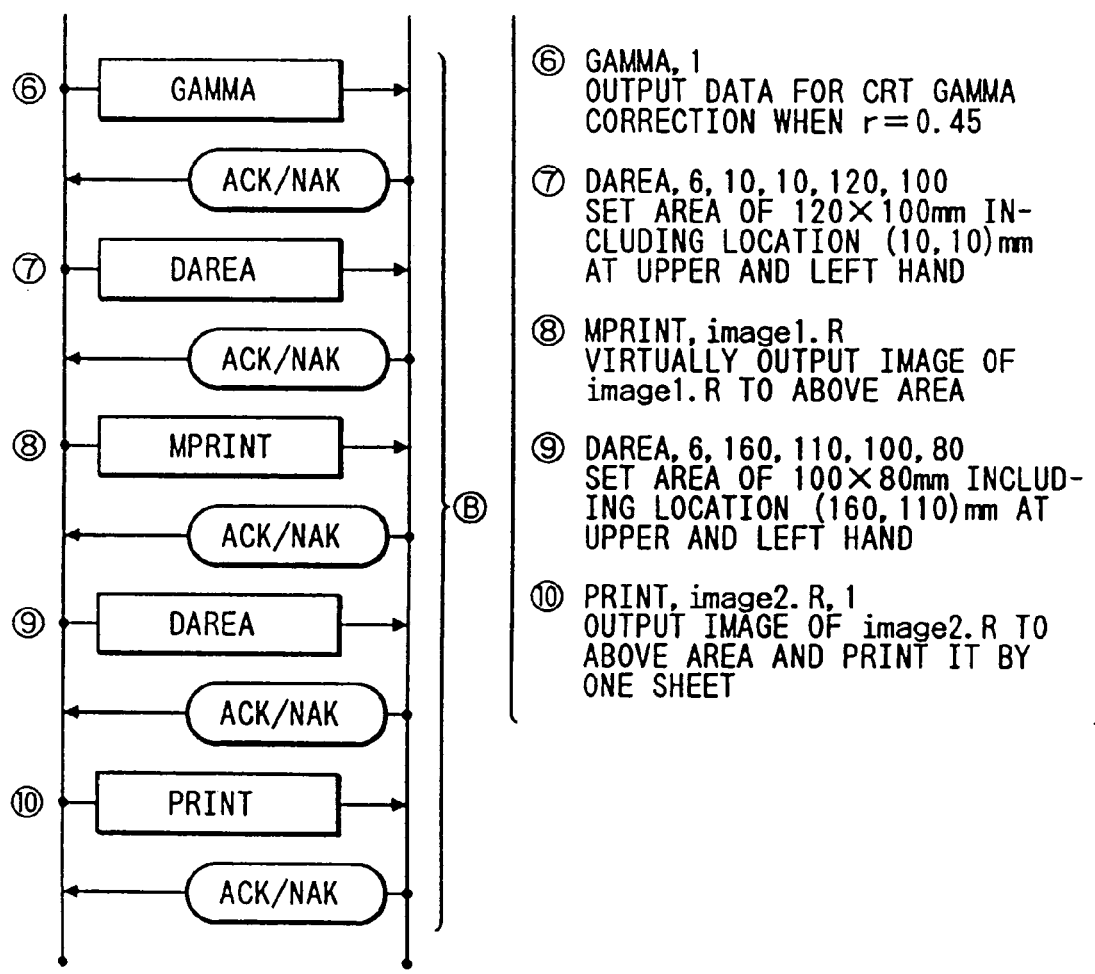

An output obtained by laying out a plurality of images, i.e., two RGB images in the host computer, on a single sheet and appearing at the color printer 2 will be exemplified (FIG. 94).

In this output, the RGB image of 1,280×1,024 pixels and the RGB image of 1,024×768 pixels are centered within the range, and the resultant image is output.

When a plurality of images are to be output, the following two cases are given. First, the images are registered and virtually output from the host computer 33 to the image memory apparatus 3 one by one, and the images are output from the image memory apparatus 3 to the printer 2 (FIG. 96). Second, all the image data are registered in the image memory apparatus 3, and all the virtual outputs are output to the printer 2 (FIG. 95). In either case, the identical output can be obtained.

Figure 97:
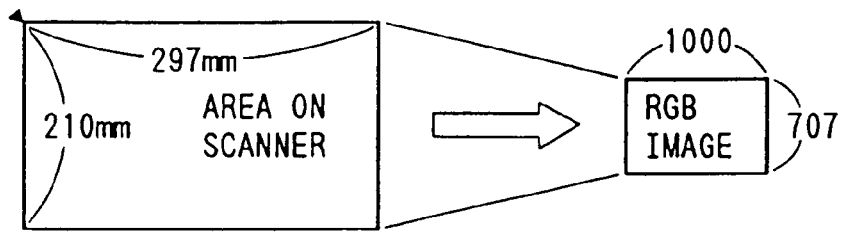
Figure 98:
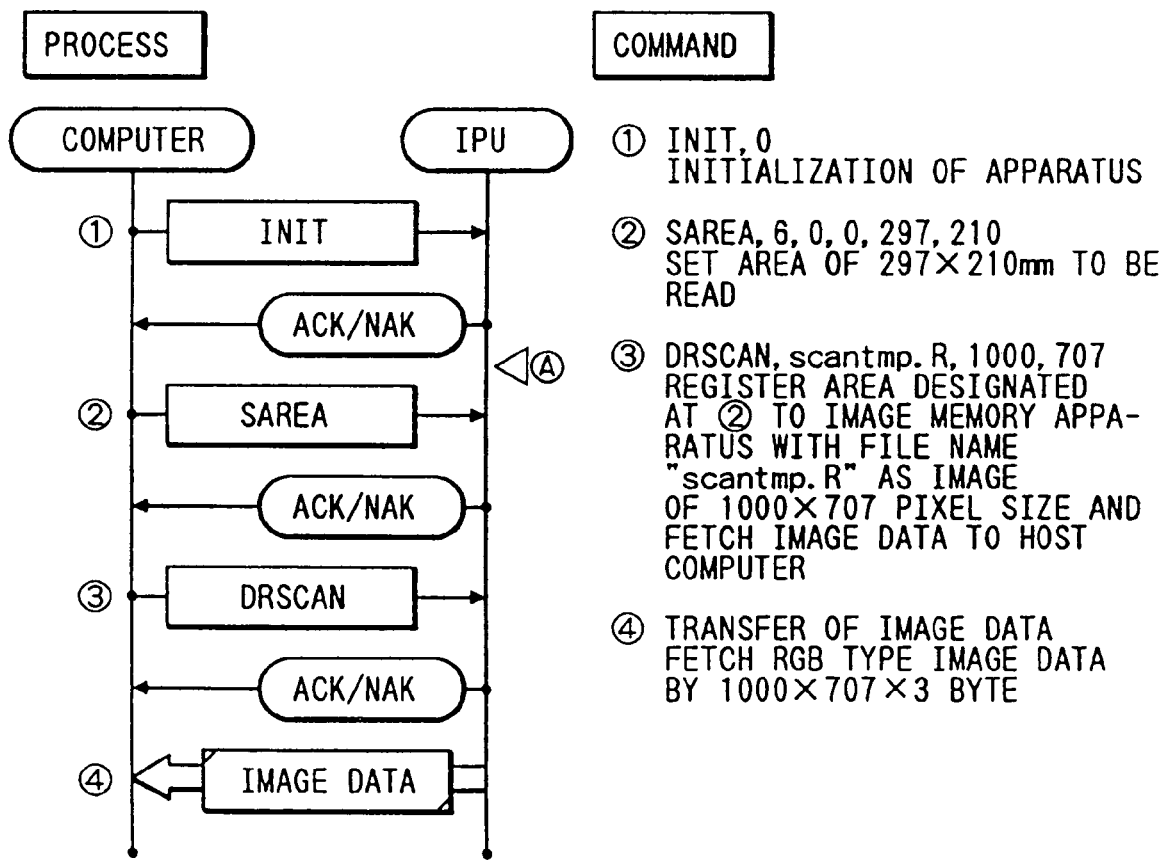

Operations for receiving images from the reader 1 to the host computer 33 are exemplified in FIGS. 97 and 98.

In this case, data within, e.g., the A4 area (297×210 mm) on the reader 1 is fetched as RGB type image data in a size of 1,000×777 pixels, and the data is then fetched in the host computer 33.

As described above, according this embodiment, the input/output image data need not be stored in the computer 33. The image data can be input or output by only exchange of an instruction (command) between the image memory apparatus 3 and the computer 33. Data transfer between the input and output units (reader 1 and the printer 2) can be reduced.

In the above embodiment as has been described above, a so-called flat bed type sensor is used as a color line sensor as a means for photoelectrically converting a target image. However, the sensor is not limited to this. For example, a spot type sensor may be used. The type of sensor is not limited to any specific type of sensor.

In the above embodiment, the color printer for forming a full color image by so-called surface sequential image formation is used as a means for forming an image. However, a printer except for a printer employing the surface sequential scheme, such as an ink-jet printer, a thermal transfer printer, or a thycolor printer may be used as such a color printer.

In the above embodiment, the host computer, the image memory apparatus, and the color readers are independent units which communicate with each other to realize the various functions, thereby providing a new system.

This embodiment has the following arrangement. That is, by using the input unit for receiving image information, the image memory apparatus for storing these input images, the means for registering data in the image memory apparatus with respect to the binary image data generated in the computer under the control of the computer, the arbitrary area information of the binary image, and the means for setting a color code for coloring an area represented by the area information, the multi-value image stored in the image memory apparatus can be synthesized with an image obtained by setting a multi-value color in the binary image, and the resultant image is output from the image output unit.

In this embodiment, the multi-value color code is assigned to any area of the binary bit map image by the control instruction from the computer, and the multi-value color code is assigned to any area. In addition, tables of the luminance components corresponding to the color codes are set, and any colors can be assigned to identical color codes. An image having a given color can be synthesized with another color image having a color different from the given color, and the resultant synthesis image can be output.

As described above, according to this embodiment, a desired color can be easily assigned to a binary image, and this image can be easily synthesized with another image.

A multi-value color code can be assigned to any area of the binary bit map image by a control instruction from, e.g., a computer.

In addition, according to this embodiment, an input image storing area can be variably set. When the area is increased, a high-quality image can be directly stored. When the area is decreased, various types of images can be stored. This increases a variety of application fields. For example, since an image storing area is set variable for an input image, the memory area can be efficiently used.

According to this embodiment, a bit map memory is arranged, and a non-rectangular area is developed in the bit map memory. Data is read out from the bit map memory and is used as a non-rectangular area signal, thereby allowing editing of the non-rectangular area.

According to this embodiment, editing of a non-rectangular area can be easily and freely performed.

According to this embodiment, the binary bit map image can be synthesized with another color image by a control instruction from the computer.

The above effects can provide an electronic device capable of synthesizing a binary image with an image from an input unit.

According to this embodiment, a binary memory for storing characters and the like is arranged in addition to the image storing memory. A message or ruled line data is input from an external device to the binary memory, the message or comment can be attached to the video input image, and the resultant image can be output.

What is claimed is:

1. An apparatus which has a color image formation function, comprising:

selection means for selecting digital image information stored in an external memory, wherein the external memory stores digital image information based on output from a scanner unit and stores digital information based on output from a computer;

setting means for manually setting a color characteristic for performing image formation of the digital image information selected by said selection means; and control means for reading the digital image information selected by said selection means from the external memory, and causing an image formation means to perform image formation of the digital image information read from the external memory in accordance with the color characteristic manually set by said setting means, wherein said setting means and said selection means share a same operation unit, wherein the operation unit includes a display unit, and wherein it is possible to cause the display unit, which can execute a first display corresponding to said selection means, to execute a second display corresponding to said setting means.

2. An apparatus according to claim 1, wherein the first display corresponding to said selection means displays a selection screen to select the digital image information stored in the external memory.

3. An apparatus according to claim 1, further comprising generation means for reading an original image and generating the digital image information.

4. An apparatus according to claim 1, further comprising color image formation means for forming a color image on a recording media.

5. An apparatus according to claim 1, wherein the operation unit is a touch panel.

6. A control method for an apparatus which has a color image formation function, said method comprising:
- a selection step of selecting digital image information stored in an external memory, wherein the external memory stores digital image information based on output from a scanner unit and stores digital image information based on output from a computer;
- a setting step of manually setting a color characteristic for performing image formation of the digital image information selected in said selection step; and
- a control step of reading the digital image information selected in said selection step from the external memory, and causing an image formation means to perform image formation of the digital image information read from the external memory in accordance with the color characteristic manually set in said setting step,
- wherein said setting step and said selection step share a same operation unit to perform each step,
- wherein the operation unit includes a display unit, and
- wherein it is possible to cause the display unit, which can execute a first display corresponding to said selection step, to execute a second display corresponding to said setting step.

7. A control method according to claim 6, wherein the operation unit is a touch panel.

8. A system which has a color image formation function, comprising:
- an external memory for storing digital image information;
- selection means for selecting the digital image information stored in said external memory, wherein the external memory stores digital image information based on output from a scanner unit and stores digital image information based on output from a computer;
- setting means for manually setting a color characteristic for performing image information of the digital image information selected by said selection means;
- color image formation means for forming a color image on a recording media; and
- control means for reading the digital image information selected by said selection means from said external memory, and causing said color image formation means to perform image formation of the digital image information read from said external memory in accordance with the color characteristic manually set by said setting means,
- wherein said setting means and said selection means share a same operation unit,
- wherein the operation unit includes a display unit, and
- wherein it is possible to cause the display unit, which can execute a first display corresponding to said selection means, to execute a second display corresponding to said setting means.

9. A system according to claim 8, wherein the first display corresponding to said selection means displays a selection screen to select the digital image information stored in said external memory.

10. A system according to claim 8, further comprising generation means for reading an original image and generating the digital image information.

11. A system according to claim 8, wherein the operation unit is a touch panel.

12. A method for a system which includes an apparatus capable of processing image information, said method comprising:
- a first display step of causing a display unit, which is provided for an apparatus comprising a printer unit, to perform a first display for selecting image information from a storage unit which can store a plurality of image information including at least one of image information based on output from a scanner unit and image information based on output from a computer;
- a second display step of causing the same display unit as the display unit for the first display to perform a second display for enabling a setting of a processing condition for processing the image information; and
- an output step of causing output of the image information selected through the first display according to the processing condition set through the second display.

13. A method according to claim 12, wherein said output step comprises causing a printer to print the image information selected through the first display according to the processing condition set through the second display.

14. A method according to claim 12, wherein said output step comprises transferring the image information selected through the first display to a host computer according to the processing condition set through the second display.

15. A method according to claim 12, wherein any of plural kinds of image information stored in the storage unit is selected through the first display.

16. A method according to claim 15, further comprising a step of enabling the printer unit to perform an index print of the plural kinds of image information stored in the storage unit.

17. A method according to claim 15, further comprising a step of causing to perform an index display of the plural kinds of image information stored in the storage unit.

18. A method according to claim 15, further comprising a step of causing to store at least either of image information from an input unit and image information from a host computer in the storage unit.

19. A method according to claim 15, wherein a file name corresponding to the image information can be stored in the storage unit.

20. A method according to claim 12, further comprising a monitor step of causing to display the image information before a process according to the processing condition set through the second display is performed.

21. A method according to claim 12, further comprising a monitor step of causing to display the image information after the process according to the processing condition set through the second display was performed.

22. A method according to claim 12, wherein the processing condition set through the second display includes at least any of an image information registration process, an image information deletion process, an image information layout process, and an image information color balance setting process.

23. A method according to claim 12, further comprising a monitor step of causing to display the image information according to a display instruction of the image information, wherein said output step enables the printer unit to output the image information selected through the first display and displayed in said monitor step according to the processing condition set through the second display.

* * * * *

UNITED STATES PATENT AND TRADEMARK OFFICE
CERTIFICATE OF CORRECTION

PATENT NO. : 7,167,266 B2
APPLICATION NO. : 10/754924
DATED : January 23, 2007
INVENTOR(S) : Masanori Sakai et al.

It is certified that error appears in the above-identified patent and that said Letters Patent is hereby corrected as shown below:

ON THE TITLE PAGE:
Item (60), Related U.S. Application Data, Line 7, "No. 07/979,665," should read --No. 07/976,665,--.
Item (30), Foreign Application Priority Data, "11-118467" should read --1-118467--.

IN THE DRAWINGS:
Sheet No. 38, Figure 27B-1, "INTER POLATION" (all occurrences) should read --INTERPOLATION--.
Sheet No. 112, Figure 85, "EXECUSION" should read --EXECUTION--.
Sheet No. 113, Figure 86, "EXECUSION" should read --EXECUTION--.
Sheet No. 114, Figure 87, "EXECUSION" should read --EXECUTION--.

COLUMN 7:
Line 23, "exchange" should read --exchange of--.

COLUMN 9:
Line 55, "images-obtained" should read --images obtained--.

COLUMN 11:
Line 5, "in" should read --$\pm$n--.

COLUMN 12:
Line 3, "When the" should read --The--, and "are" should read --is--.
Line 14, "any area is not" should read --no area is--.

COLUMN 19:
Line 12, "can" should read --can be--.
Line 15, "preform" should read --perform--.
Line 19, "fanction." should read --function.--.

COLUMN 20:
Line 59, "are" should read --is--.

UNITED STATES PATENT AND TRADEMARK OFFICE
CERTIFICATE OF CORRECTION

PATENT NO. : 7,167,266 B2 Page 2 of 2
APPLICATION NO. : 10/754924
DATED : January 23, 2007
INVENTOR(S) : Masanori Sakai et al.

It is certified that error appears in the above-identified patent and that said Letters Patent is hereby corrected as shown below:

COLUMN 25:
Line 10, "stored" should read --are stored--.

COLUMN 28:
Line 28, "z24 100," should read --$z \geq 100$,--.

COLUMN 29:
Line 34, "2E" should read --  --.

COLUMN 53:
Line 13, "This" should read --These--.

COLUMN 59:
Line 10, "media." should read --medium.--.
Line 52, "media;" should read --medium;--.

Signed and Sealed this

Thirteenth Day of May, 2008

JON W. DUDAS
*Director of the United States Patent and Trademark Office*